US012368405B1

(12) United States Patent
Jasmin et al.

(10) Patent No.: US 12,368,405 B1
(45) Date of Patent: Jul. 22, 2025

(54) RAILLESS MOUNTING SYSTEM AND DEVICES FOR ATTACHING SOLAR MODULES TO ROOFS

(71) Applicant: Sunmodo Corporation, Vancouver, WA (US)

(72) Inventors: Roland Jasmin, Vancouver, WA (US); Brice Veyna, Vancouver, WA (US); Steve Mumma, Vancouver, WA (US); Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 19/031,574

(22) Filed: Jan. 18, 2025

Related U.S. Application Data

(63) Continuation of application No. 18/824,870, filed on Sep. 4, 2024, now Pat. No. 12,231,076.

(51) Int. Cl.
*H02S 20/23* (2014.01)
*F24S 25/613* (2018.01)

(52) U.S. Cl.
CPC ............ *H02S 20/23* (2014.12); *F24S 25/613* (2018.05)

(58) Field of Classification Search
CPC ........ F24S 25/61; F24S 25/613; F24S 25/617; F24S 25/63; F24S 25/632; F24S 25/634; F24S 25/636; H02S 20/23
See application file for complete search history.

(56) References Cited

U.S. PATENT DOCUMENTS

| 949,321 A | 2/1910 | Good |
| 1,473,504 A | 11/1923 | Neely |
| 1,568,122 A | 1/1926 | Zifferer |

(Continued)

FOREIGN PATENT DOCUMENTS

| CH | 713372 B1 | 8/2021 |
| CN | 202363497 U | 8/2012 |

(Continued)

OTHER PUBLICATIONS

European Examination Report, European Patent Application No. EP 23169417, Applicant: Sunmodo Corporation, Date of Action: Feb. 18, 2025, European Patent Office, Munich, Germany.

(Continued)

*Primary Examiner* — Jonathan Liu
*Assistant Examiner* — Guang H Guan
(74) *Attorney, Agent, or Firm* — Stone Creek Services LLC; Alan M Flum

(57) ABSTRACT

This disclosure discusses devices, systems, and methods for attaching solar modules to roofs. A first device may include an upper platform and a clamp jaw. The upper platform includes a top surface and a bottom surface that extends obliquely downward with respect to the top surface. The clamp jaw clamps a solar module downward against the top surface as the clamp jaw moves along the bottom surface. A second device may include an upper platform and a pair of clamp jaws spaced apart along the upper platform. The upper platform includes a top surface and a bottom surface that extends obliquely downward with respect to the top surface. The pair of clamp jaws clamps a pair of adjacent solar modules downward against the top surface as the clamp jaws move along the bottom surface.

9 Claims, 94 Drawing Sheets

(56) References Cited

U.S. PATENT DOCUMENTS

| | | | |
|---|---|---|---|
| 3,100,556 A | 8/1963 | Ridder | |
| 4,392,009 A | 7/1983 | Napoli | |
| 5,203,135 A | 4/1993 | Bastian | |
| 6,959,517 B2 | 11/2005 | Poddany et al. | |
| 7,487,771 B1 | 2/2009 | Eiffert | |
| D599,034 S | 8/2009 | Placer | |
| 7,592,537 B1 | 9/2009 | West | |
| 7,694,466 B2* | 4/2010 | Miyamoto | F24S 25/61 52/173.3 |
| 7,774,998 B2 | 8/2010 | Aschenbrenner | |
| 8,176,693 B2 | 5/2012 | Abbott et al. | |
| 8,387,319 B1 | 3/2013 | Gilles-Gagnon et al. | |
| 8,413,944 B2 | 4/2013 | Harberts et al. | |
| 8,418,688 B2 | 4/2013 | King et al. | |
| 8,461,449 B2 | 6/2013 | Kobayashi | |
| 8,480,330 B2 | 7/2013 | Urban et al. | |
| 8,590,223 B2 | 11/2013 | Kilgore et al. | |
| 8,683,761 B2 | 4/2014 | Danning | |
| 8,745,936 B2 | 6/2014 | Plaisted et al. | |
| 8,806,813 B2* | 8/2014 | Plaisted | H02S 20/23 52/173.3 |
| 8,806,815 B1 | 8/2014 | Liu et al. | |
| 8,839,575 B1 | 9/2014 | Liu et al. | |
| 8,875,401 B2 | 11/2014 | Jolley | |
| 8,984,818 B2 | 3/2015 | McPheeters et al. | |
| 9,010,041 B2 | 4/2015 | Danning | |
| 9,057,540 B2 | 6/2015 | Buettner et al. | |
| 9,057,542 B2 | 6/2015 | Schuit et al. | |
| 9,057,545 B2 | 6/2015 | Stapleton | |
| 9,080,792 B2 | 7/2015 | Patton et al. | |
| 9,136,411 B2 | 9/2015 | Jolley | |
| 9,160,273 B2 | 10/2015 | Schuit et al. | |
| 9,166,522 B1 | 10/2015 | Zvanut et al. | |
| 9,193,014 B2 | 11/2015 | Danning | |
| 9,249,925 B2 | 2/2016 | Roensch et al. | |
| 9,273,708 B2 | 3/2016 | Urban et al. | |
| 9,314,904 B2 | 4/2016 | Veloso et al. | |
| 9,397,605 B2 | 7/2016 | Stapleton | |
| 9,455,662 B2 | 9/2016 | Meine | |
| 9,584,062 B2 | 2/2017 | Ganshaw et al. | |
| 9,599,280 B2 | 3/2017 | West et al. | |
| 9,628,018 B2 | 4/2017 | Stapleton | |
| 9,647,433 B2 | 5/2017 | Meine et al. | |
| 9,698,724 B2 | 7/2017 | West et al. | |
| 9,712,106 B2 | 7/2017 | Wentworth et al. | |
| 9,853,597 B2 | 12/2017 | West | |
| 9,876,463 B2 | 1/2018 | Jasmin | |
| 9,893,677 B1 | 2/2018 | Liu | |
| 10,033,328 B2 | 7/2018 | Wildes et al. | |
| 10,036,577 B2 | 7/2018 | Mascolo et al. | |
| 10,177,704 B2 | 1/2019 | Kapla et al. | |
| 10,205,418 B2 | 2/2019 | Nayer | |
| 10,270,385 B2 | 4/2019 | Xie | |
| 10,277,161 B2 | 4/2019 | Tan et al. | |
| 10,312,855 B2 | 6/2019 | Lester et al. | |
| D853,954 S | 7/2019 | McPheeters | |
| 10,361,653 B2 | 7/2019 | Truthseeker et al. | |
| 10,381,974 B2 | 8/2019 | McPheeters | |
| 10,476,425 B2 | 11/2019 | Stearns et al. | |
| 10,536,108 B2 | 1/2020 | Goldberg et al. | |
| 10,622,935 B1 | 4/2020 | Liu | |
| 10,749,459 B1 | 8/2020 | Liu et al. | |
| 10,797,634 B1 | 10/2020 | Jasmin et al. | |
| D909,853 S | 2/2021 | Jasmin | |
| 11,005,414 B2 | 5/2021 | McDonald et al. | |
| 11,146,207 B2 | 10/2021 | Stapleton | |
| 11,152,889 B1 | 10/2021 | Affentranger, Jr. et al. | |
| 11,251,743 B2 | 2/2022 | Schuit et al. | |
| 11,274,855 B2 | 3/2022 | Harris et al. | |
| 11,296,648 B1 | 4/2022 | Jasmin et al. | |
| 11,309,831 B2 | 4/2022 | Crook et al. | |
| 11,463,040 B2 | 10/2022 | Affentranger, Jr. | |
| 11,486,434 B2* | 11/2022 | Kovacs | F16B 37/046 |
| 11,515,831 B2 | 11/2022 | Affentranger, Jr. et al. | |
| 11,552,591 B2 | 1/2023 | Jasmin et al. | |
| 11,575,345 B2 | 2/2023 | Affentranger, Jr. | |
| D983,015 S | 4/2023 | Jasmin et al. | |
| D983,016 S | 4/2023 | Jasmin et al. | |
| D983,018 S | 4/2023 | Jasmin et al. | |
| 11,621,665 B2 | 4/2023 | Jasmin et al. | |
| 11,750,143 B1 | 9/2023 | Jasmin et al. | |
| 11,757,400 B1 | 9/2023 | Jasmin et al. | |
| 11,770,097 B1* | 9/2023 | Jasmin | H02S 30/10 248/229.12 |
| 11,824,483 B1 | 11/2023 | Affentranger, Jr. | |
| 11,848,636 B2* | 12/2023 | Stephan | F24S 25/35 |
| 11,863,119 B2* | 1/2024 | Lin | H02S 20/20 |
| 11,881,808 B1 | 1/2024 | Jasmin et al. | |
| 12,009,774 B1 | 6/2024 | Jasmin | |
| 12,057,801 B1* | 8/2024 | Jasmin | H02S 20/23 |
| 12,149,200 B1* | 11/2024 | Jasmin | H02S 20/23 |
| 12,231,076 B1* | 2/2025 | Jasmin | F24S 25/613 |
| 12,286,994 B1* | 4/2025 | Liu | F16B 2/06 |
| 2008/0203242 A1 | 8/2008 | Buck | |
| 2008/0302407 A1 | 12/2008 | Kobayashi | |
| 2009/0019796 A1 | 1/2009 | Liebendorfer | |
| 2009/0114269 A1 | 5/2009 | Fletcher et al. | |
| 2009/0194098 A1 | 8/2009 | Placer | |
| 2010/0154784 A1 | 6/2010 | King et al. | |
| 2010/0193012 A1 | 8/2010 | Klammer et al. | |
| 2010/0206301 A1 | 8/2010 | Aftanas | |
| 2010/0276558 A1 | 11/2010 | Faust et al. | |
| 2010/0294340 A1 | 11/2010 | Cunningham et al. | |
| 2011/0024582 A1 | 2/2011 | Gies et al. | |
| 2011/0209422 A1 | 9/2011 | King et al. | |
| 2011/0247295 A1 | 10/2011 | Stearns et al. | |
| 2012/0211252 A1 | 8/2012 | Turziano et al. | |
| 2012/0273029 A1 | 11/2012 | Bragagna et al. | |
| 2012/0298188 A1 | 11/2012 | West et al. | |
| 2012/0298817 A1 | 11/2012 | West et al. | |
| 2013/0011187 A1 | 1/2013 | Schuit et al. | |
| 2013/0118107 A1 | 5/2013 | Maday et al. | |
| 2013/0125492 A1 | 5/2013 | Molek et al. | |
| 2013/0200245 A1 | 8/2013 | Markiewicz et al. | |
| 2013/0340358 A1 | 12/2013 | Danning | |
| 2014/0001129 A1 | 1/2014 | Danning | |
| 2014/0042286 A1 | 2/2014 | Jaffari | |
| 2014/0110543 A1 | 4/2014 | Aliabadi et al. | |
| 2014/0174507 A1 | 6/2014 | Jung et al. | |
| 2014/0339179 A1 | 11/2014 | West | |
| 2014/0353435 A1 | 12/2014 | Liu | |
| 2015/0183066 A1 | 7/2015 | Lippert et al. | |
| 2015/0240845 A1 | 8/2015 | Mann et al. | |
| 2015/0288320 A1 | 10/2015 | Stearns et al. | |
| 2015/0357964 A1 | 12/2015 | McPheeters et al. | |
| 2016/0043689 A1 | 2/2016 | McPheeters et al. | |
| 2016/0111995 A1 | 4/2016 | Nayar | |
| 2016/0134230 A1 | 5/2016 | Meine et al. | |
| 2016/0226435 A1 | 8/2016 | Almy et al. | |
| 2016/0248367 A1 | 8/2016 | Almy et al. | |
| 2016/0248368 A1 | 8/2016 | Seery et al. | |
| 2016/0248369 A1 | 8/2016 | Almy | |
| 2016/0268965 A1 | 9/2016 | Stearns et al. | |
| 2016/0352283 A1 | 12/2016 | Stearns et al. | |
| 2017/0025987 A1 | 1/2017 | Stearns et al. | |
| 2017/0102167 A1 | 4/2017 | Stephan et al. | |
| 2017/0279403 A1 | 9/2017 | Seery et al. | |
| 2017/0366131 A1 | 12/2017 | Stearns et al. | |
| 2018/0019701 A1 | 1/2018 | McPheeters | |
| 2018/0131314 A1 | 5/2018 | Stearns et al. | |
| 2019/0006983 A1 | 1/2019 | Goldberg et al. | |
| 2019/0036474 A1 | 1/2019 | Schuit et al. | |
| 2019/0068110 A1 | 2/2019 | McPheeters | |
| 2019/0093340 A1 | 3/2019 | Meine | |
| 2019/0178274 A1 | 6/2019 | Katz | |
| 2020/0116191 A1 | 4/2020 | Uppu et al. | |
| 2020/0252023 A1 | 8/2020 | Stearns et al. | |
| 2020/0259448 A1 | 8/2020 | Schuit et al. | |
| 2020/0266757 A1 | 8/2020 | Goldberg et al. | |
| 2020/0389122 A1 | 12/2020 | Stephan et al. | |
| 2021/0242826 A1 | 8/2021 | Basarich et al. | |
| 2021/0265939 A1 | 8/2021 | De Bie | |
| 2021/0285596 A1 | 9/2021 | Affentranger, Jr. et al. | |
| 2021/0285689 A1 | 9/2021 | Affentranger, Jr. | |

(56) References Cited

U.S. PATENT DOCUMENTS

| | | |
|---|---|---|
| 2022/0082207 A1 | 3/2022 | Gumaer |
| 2022/0094299 A1 | 3/2022 | Wang et al. |
| 2022/0221195 A1 | 7/2022 | Affentranger, Jr. et al. |
| 2022/0345074 A1 | 10/2022 | Neal et al. |
| 2022/0368277 A1 | 11/2022 | Jasmin et al. |
| 2023/0216441 A1 | 7/2023 | Neal et al. |
| 2024/0167730 A1 | 5/2024 | Jasmin et al. |
| 2024/0171115 A1 | 5/2024 | Jasmin et al. |

FOREIGN PATENT DOCUMENTS

| | | |
|---|---|---|
| CN | 103280473 A | 9/2013 |
| CN | 203562992 U | 4/2014 |
| CN | 203942481 U | 11/2014 |
| CN | 205566178 U | 9/2016 |
| CN | 106788191 A | 5/2017 |
| CN | 206251017 U | 6/2017 |
| CN | 107248841 A | 10/2017 |
| CN | 206575356 U | 10/2017 |
| CN | 206575358 U | 10/2017 |
| CN | 105141240 B | 12/2017 |
| CN | 210129839 U | 3/2020 |
| CN | 112165299 A | 1/2021 |
| CN | 213402923 U | 6/2021 |
| CN | 113179083 A | 7/2021 |
| CN | 113794431 A | 12/2021 |
| DE | 102011076971 A1 | 12/2012 |
| DE | 102012007535 A1 | 10/2013 |
| DE | 202014004487 U1 | 9/2015 |
| ES | 211089 U | 5/1976 |
| JP | 2011237030 A | 11/2011 |
| JP | 2013163951 A | 8/2013 |
| KR | 20110058294 A | 6/2011 |
| TW | M539609 U | 4/2017 |
| WO | 2010074701 A1 | 7/2010 |
| WO | 2013163667 A1 | 11/2013 |
| WO | 2016157692 A1 | 10/2016 |
| WO | 2017027758 A2 | 2/2017 |
| WO | 2020162746 A1 | 8/2020 |
| WO | 2021061866 A1 | 4/2021 |
| WO | 2022169989 A1 | 8/2022 |
| WO | 2022197973 A1 | 9/2022 |
| WO | 2022240909 A1 | 11/2022 |
| WO | 2023028101 A1 | 3/2023 |
| WO | 2023192199 A2 | 10/2023 |

OTHER PUBLICATIONS

ClickFit: Complete Rail-Based Racking System for a variety of roof types, web page snapshot from Mar. 18, 2021 Internet Archive, EcoFasten Solar LLC, Phoenix, Arizona, downloaded from the Internet from https://web.archive.org/web/20210318140918/https://ecofastensolar.com/system/clickfit/ on Nov. 21, 2021.

Composition Mount with Leading Edge T-Clamp and Integrated Grounding Installation Manual, Sep. 2017, Sol Attach, LLC, New Braunfels, Texas.

EcoFasten ClickFit Installation Guide, V. 2.3, Dec. 9, 2020, EcoFasten Solar LLC, Phoenix, Arizona.

EcoFasten The Rail-less Mounting System Rockit, Jul. 8, 2020, EcoFasten Solar LLC, Phoenix, Arizona (a division of Rillito River Solar, LLC).

Evaluation of Installation Time for SMASHmount by SMASHsolar, Apr. 2017, National Renewable Energy Laboratory (NREL), Golden, Colorado.

Extended European Search Report, European Patent Application No. EP 23169417, Applicant: Sunmodo Corporation, Date of Action: Jan. 29, 2024, European Patent Office, Munich, Germany.

European Examination Report, European Patent Application No. EP 23169417, Applicant: Sunmodo Corporation, Date of Action: Jul. 9, 2024, European Patent Office, Munich, Germany.

GridFlex Installation Guide, Unirac Cod-Compliant Installation Manual, Document No. PUB19JAN2022, Publication Date: Jan. 2022, Unirac, Inc., Albuquerque, New Mexico.

Kelly Pickerel, Monarc Solar launches pre-assembled, pre-wired solar array, Jul. 20, 2015, Solar Power World, downloaded from the Internet from https://www.solarpowerworldonline.com/2015/07/monarc-solar-launches-pre-assembled-pre-wired-solar-array/ on Jul. 31, 2022.

Kelly Pickerel, New mounting system provides quick way to install frameless panels on residential roofs, Dec. 15, 2016, Solar Power World, downloaded from the Internet from https://www.solarpowerworldonline.com/2016/12/new-mounting-system-provides-quick-way-install-bifacial-panels-residential-roofs/ on Jul. 31, 2022.

Lumeta Lynx 72, Version LYNX72_Data_Sheet_0318_Prelim, Mar. 2018, Lumeta Solar, Emeryville, California.

Module Level Power Electronics Bracket, Nov. 2018, Pegasus Solar, downloaded from the Internet from https://www.pegasussolar.com/wp-content/uploads/2018/11/Pegasus-Universal-MLPE-Data-Sheet-2.14.18.pdf on Jul. 21, 2022.

NanoRack System Product Installation Manual, Document No. D10252-V1.54, Sep. 20, 2023, Sunmodo Corporation, Vancouver, Washington.

NanoRack Data Sheet, Document No. D10261-V001, Sep. 20, 2023, Sunmodo Corporation, Vancouver, Washington.

NanoRack One-Sheet, Sep. 20, 2023, Sunmodo Corporation, Vancouver, Washington.

NanoRack Overview webpage: https://sunmodo.com/nanorack/, Public publication date: Sep. 19, 2024, Sunmodo Corporation, Vancouver, Washington, downloaded from the Internet from the Internet Archive, from http://web.archive.org/web/20230922112226/https://sunmodo.com/nanorack/ on Aug. 5, 2024, Internet Archive capture date::Sep. 22, 2023.

Solar Power International Tradeshow, Las Vegas, Nevada, Sep. 11-14, 2023, public showing by Sunmodo Corporation of components described on NanoRack Overview web page.

NXT Umount, Part & Assembly Drawings, Nov. 2022, Unirac, Albuquerque, New Mexico.

SMR System Data Sheet, Document No. D10225-V001, Sep. 2020, Sunmodo Corporation, Vancouver, Washington.

SnapNrack Solar Mounting Solutions Ultra Rail Residential PV Mounting Systems Installation Manual, Jan. 2019, SnapNrack, San Luis Obispo, California (a subsidiary of Sunrun Inc.).

SnapNrack Solar Mounting Solutions, Ultra Rail Residential Roof Mount System Installation Manual, v. 3.2, Jan. 2021, pp. 52-55, SnapNRack, Inc., San Luis Obispo, California (a division of Sunrun, Inc.).

SnapNRack Ultra Rail Comp Kit Drawing Set, Revision B, Feb. 2019, SnapNrack, San Luis Obispo, California (a subsidiary of Sunrun Inc.).

SnapNRack Ultra Rail Mounting Hardware Drawing Set, Revision A, Jan. 2018, SnapNrack, San Luis Obispo, California (a subsidiary of Sunrun Inc.).

SnapNRack Ultra Rail Tile Hook F Drawing Set, Jan. 2019, SnapNrack, San Luis Obispo, California (a subsidiary of Sunrun Inc.).

SnapNRack UR-60 Splice Drawing Set May 2019, SnapNrack, San Luis Obispo, California (a subsidiary of Sunrun Inc.).

Solar's Fastest Attachment NanoMount, Feb. 2020, Sunmodo Corp., Vancouver, Washington.

Unirac Roof Mount RM Universal Module Clamp—310750, downloaded from the Internet from https://www.solarpanelstore.com/products/unirac-rm-universal-module-clamp on Feb. 8, 2023.

Non-Final Office Action, U.S. Appl. No. 18/058,731, Inventors: Roland Jasmin et al., Date of Action: Sep. 29, 2024, Assigned: Sunmodo Corporation, United States Patent and Trademark Office, Alexandra, Virginia.

* cited by examiner

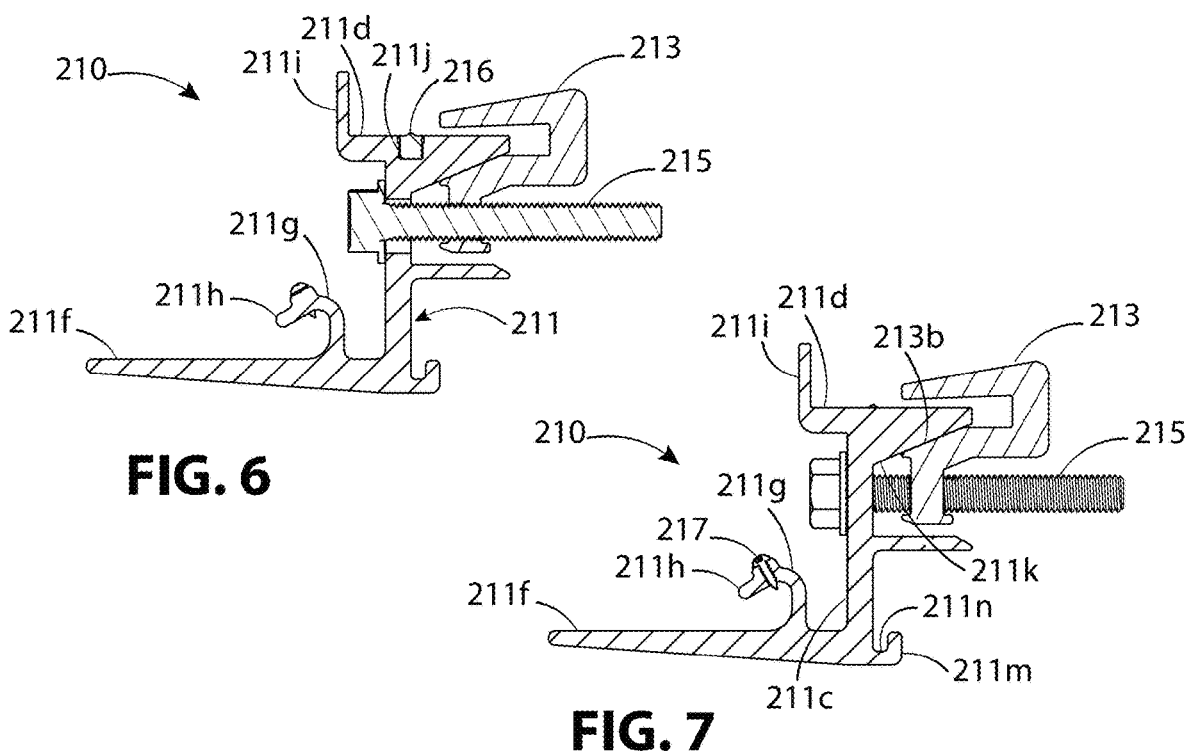
FIG. 6
FIG. 7
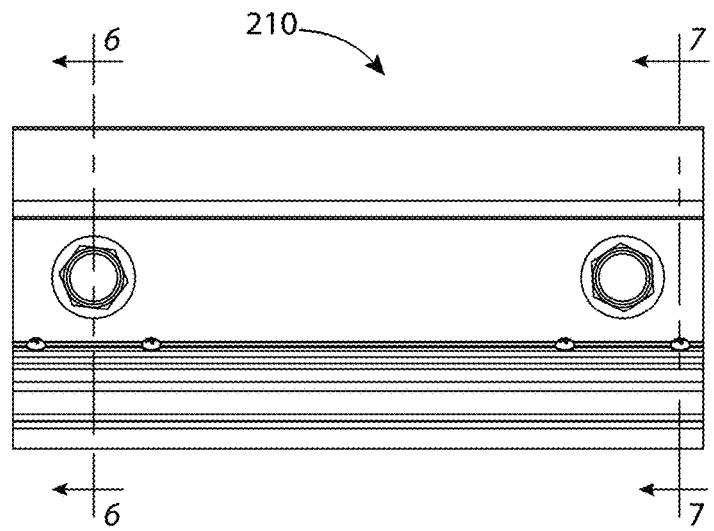
FIG. 8

```
                                                    ┌─ 430
                                                   ↙

┌─────────────────────────────────────────────────────────────┐
│ Secure each non-first row module assembly to a corresponding module in │
│ a module assembly in an immediately adjacent subsequent row by │
│ engaging the module hook brackets with corresponding loop splices and │
│ loop brackets, and rotating the non-first row module assemblies in place │
│                                                         431 │
└─────────────────────────────────────────────────────────────┘
                              ↓
┌─────────────────────────────────────────────────────────────┐
│     Install loop splices on the trailing edge between each  │
│              non-first-row module assembly                  │
│                                                         432 │
└─────────────────────────────────────────────────────────────┘
                              ↓
┌─────────────────────────────────────────────────────────────┐
│ Install loop brackets on the trailing edge outside corners of the │
│    non-first-row module assemblies at the ends of the row   │
│                                                         433 │
└─────────────────────────────────────────────────────────────┘
                              ↓
┌─────────────────────────────────────────────────────────────┐
│    Position end clamps over edge-clamp secured rafters and  │
│                 remove unused end clamps                    │
│                                                         434 │
└─────────────────────────────────────────────────────────────┘
                              ↓
┌─────────────────────────────────────────────────────────────┐
│ Install splice links and roof-attachment brackets to edge splices, │
│         loop splices, and loop brackets as needed           │
│                                                         435 │
└─────────────────────────────────────────────────────────────┘
                              ↓
┌─────────────────────────────────────────────────────────────┐
│   Repeat the previous five steps for each additional row of │
│              non-first row module assemblies                │
│                                                         436 │
└─────────────────────────────────────────────────────────────┘
```

FIG. 35

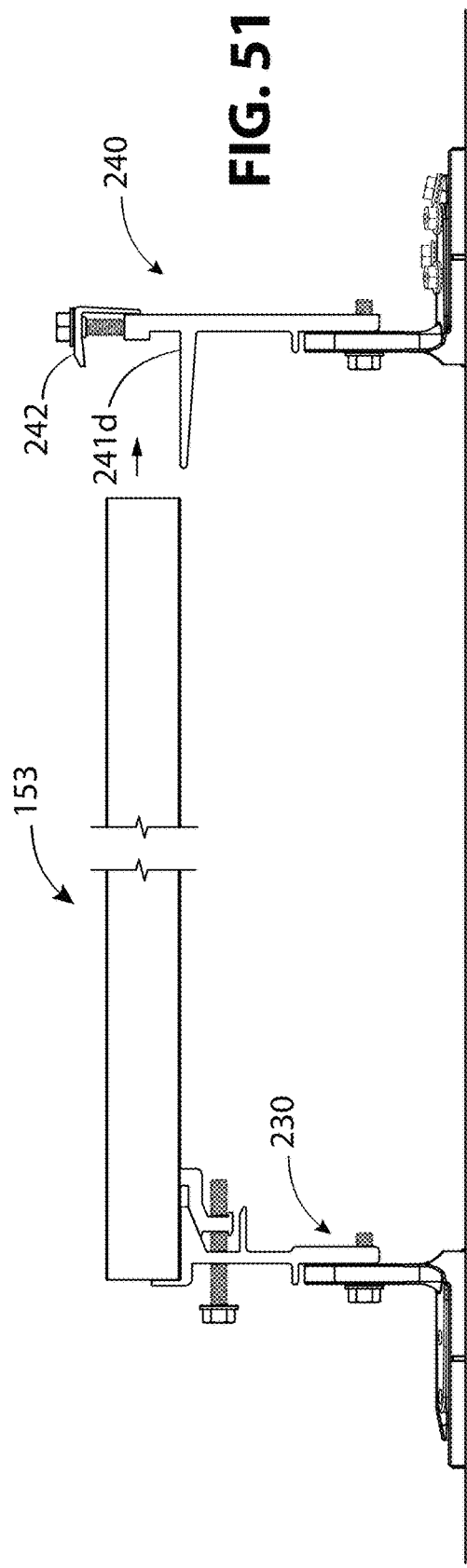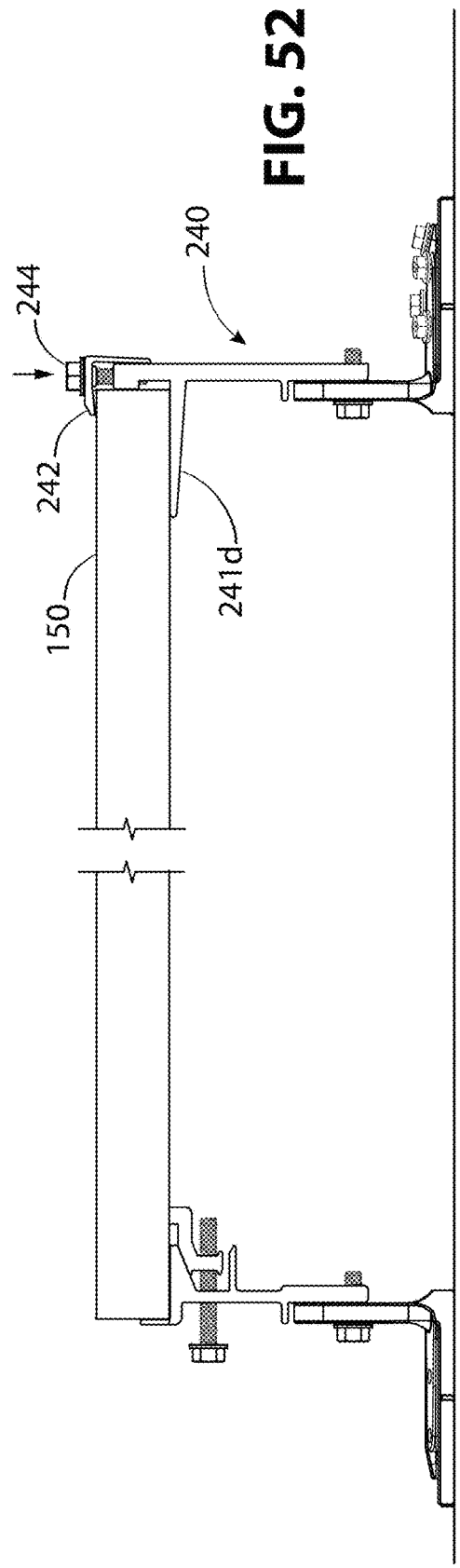

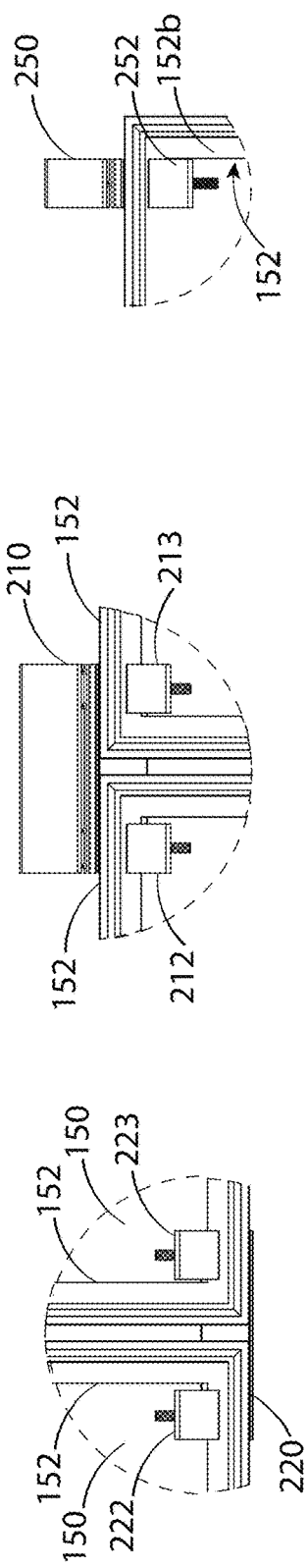
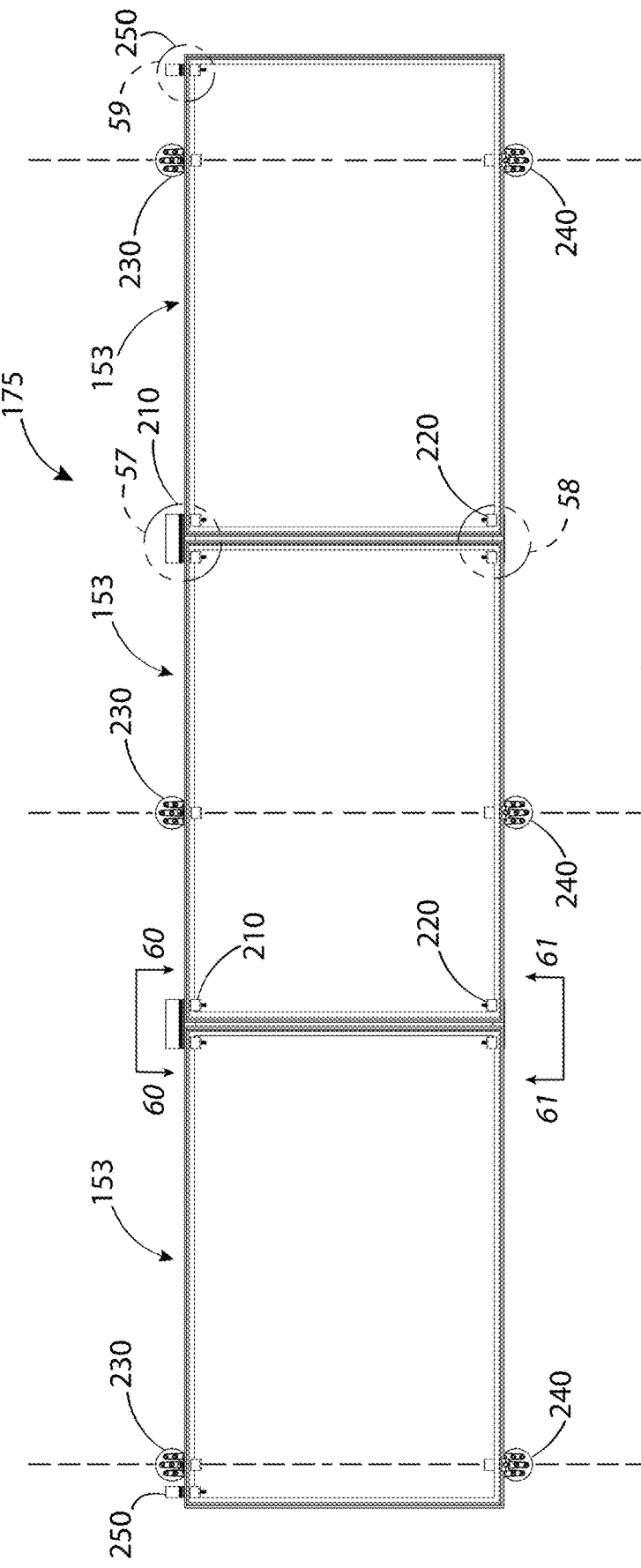

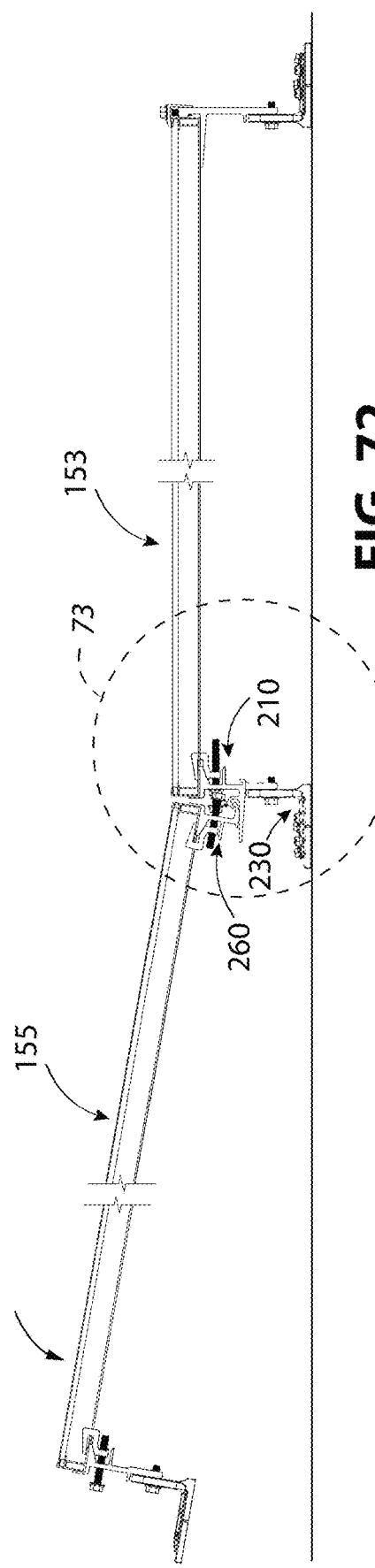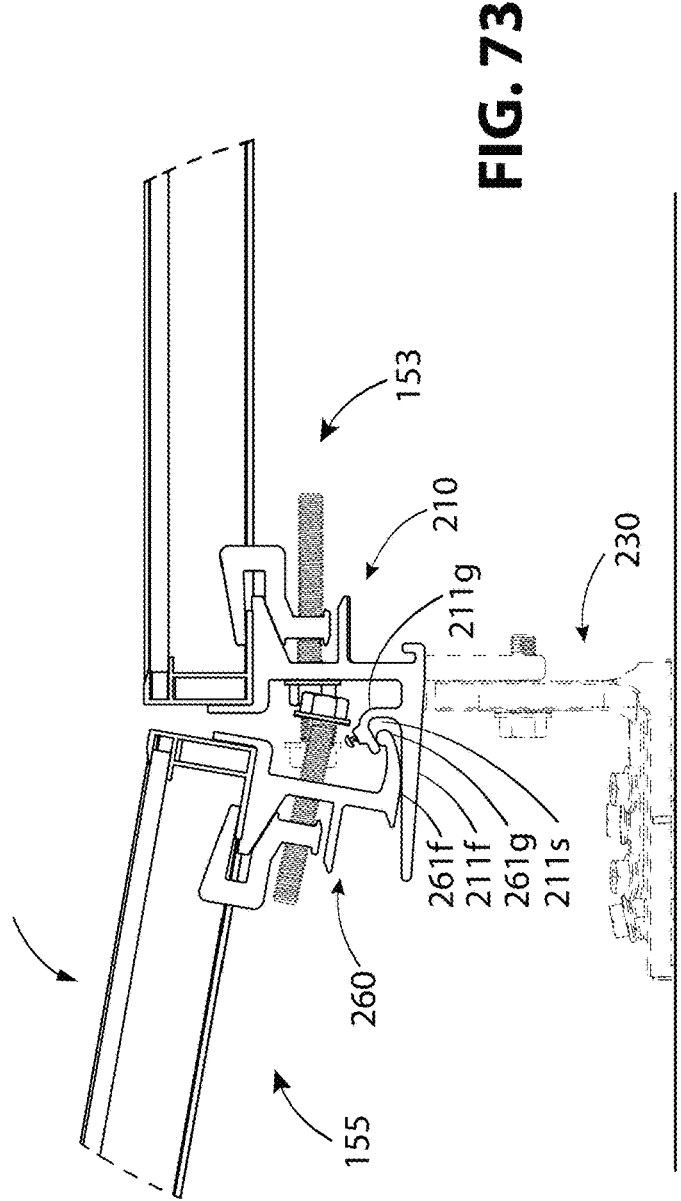
FIG. 72
FIG. 73

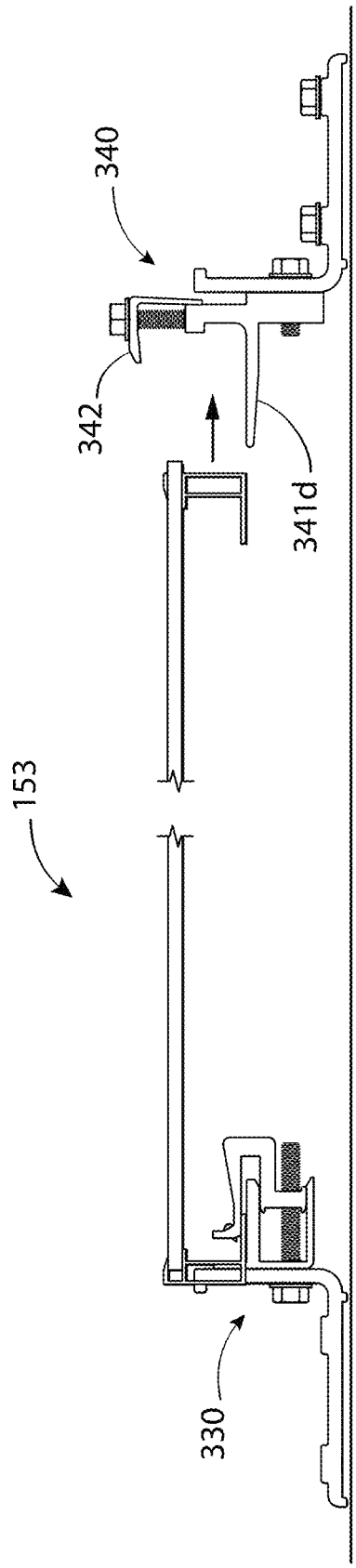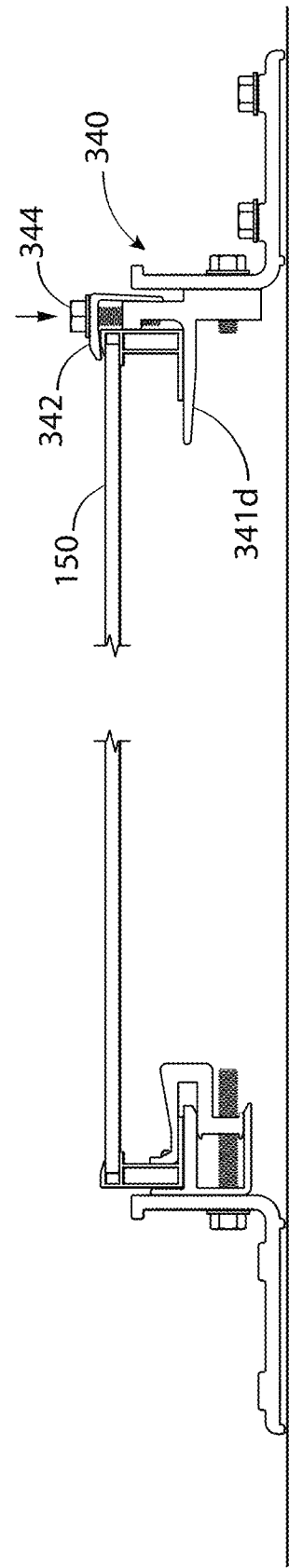

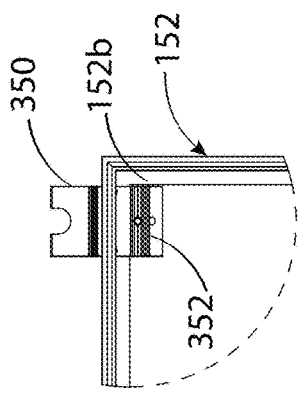
FIG. 136
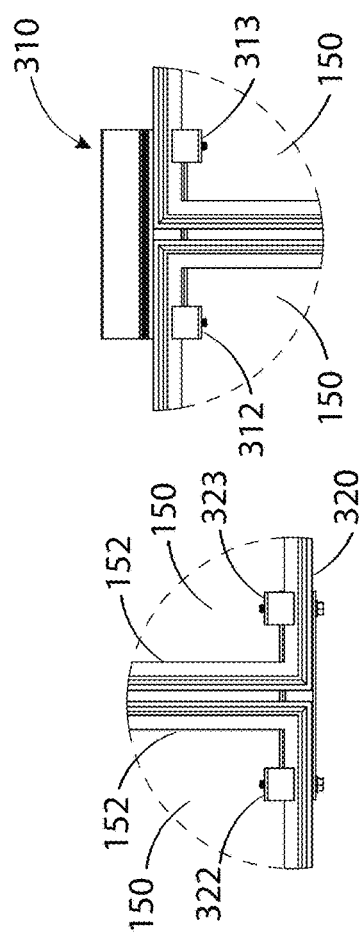
FIG. 135
FIG. 134
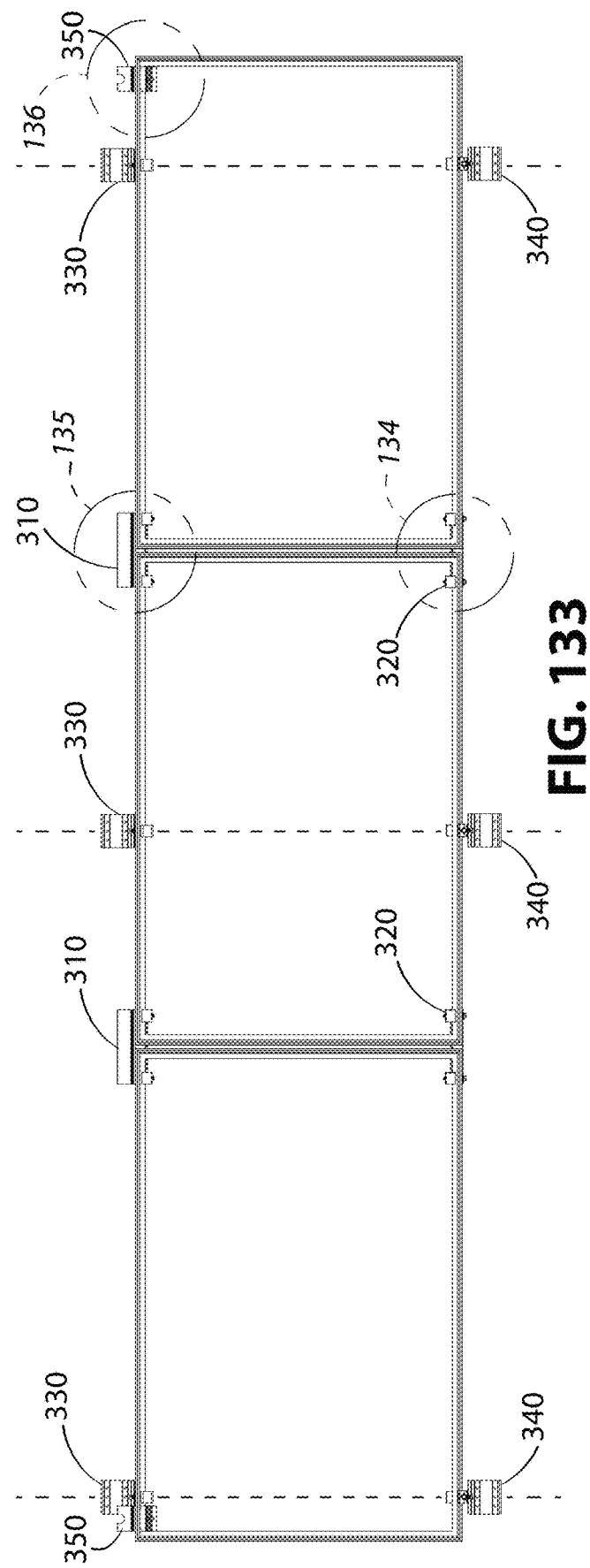
FIG. 133

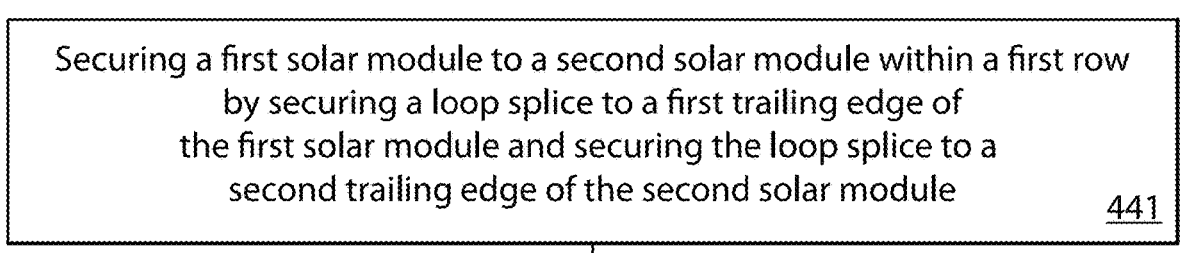

Securing a first solar module to a second solar module within a first row by securing a loop splice to a first trailing edge of the first solar module and securing the loop splice to a second trailing edge of the second solar module
441

Securing a third solar module and a fourth solar module within a second row to the first row by rotationally engaging a first module hook bracket with the loop splice and rotationally engaging a second module hook bracket with the loop splice, the first module hook bracket is secured to a third leading edge of the third solar module and the second module hook bracket is secured to a fourth leading edge of the fourth solar module.
442

FIG. 143

RAILLESS MOUNTING SYSTEM AND DEVICES FOR ATTACHING SOLAR MODULES TO ROOFS

CROSS REFERENCE TO RELATED APPLICATIONS

This application is a continuation of U.S. patent application Ser. No. 18/824,870. filed on Sep. 4, 2024. The contents of U.S. patent application Ser. No. 18/824,870 are hereby incorporated by reference.

BACKGROUND

This application relates to structures and devices for mounting solar energy collecting apparatus such as solar modules. These structures and devices may be attached to or integrated into static structures, such as buildings and roof tops.

Solar modules, or solar panels, are often mounted to building roof tops using solar "mounting" or "racking" systems. These mounting systems can be rail-based or railless. Some roof tops are sloped or "pitched," to help shed rain. Both rail-based and railless mounting systems can accommodate pitched roofs.

Rail-based mounting systems use rails to support the solar modules. Module clamps typically secure the solar modules to the rails. The rails may be secured to the building surface, or roof top, using roof attachment brackets.

Railless mounting systems do not use rails. Instead, railless mounting assemblies attach directly to the solar modules and the roof. Because they do not use rails, railless mounting assemblies typically require less mounting hardware than rail-based systems.

SUMMARY

The Inventors recognized that while railless mounting systems generally use less mounting hardware than rail-based systems, the railless mounting assemblies may be structurally complex. In addition, some jurisdictions or installation environments may require that the railless mounting structures be tied directly to roof rafters. This may add significantly to the planning, assembly complexity, installation time, and therefore cost.

The Inventors' developed a solar module mounting system, installation method, and associated devices, that address the above-described issues. The systems, components, and methods discussed in this disclosure secure solar modules to the roof rafters of pitched roofs. The system may include loop splices, edge splices, splice brackets, module hook brackets, end clamps, and edge clamps. The end clamps may attach the trailing-edge of the solar modules to roof rafters. The edge clamps may attach the front edge, or "leading-edge," of the first-row of modules to roof rafters. Loop splices may secure the trailing-edge of two adjacent modules within a row. Edge splices may attach the leading-edge of adjacent modules on the perimeter of the solar module assembly, typically in the first row. Loop brackets take the place of the loop splices on the perimeter edges of a row.

Loop splices and edge splices serve several purposes. They mechanically secure adjacent modules, within a row of modules, together. This provides rigidity and causes the adjacent modules to act as one unit. This allows the installer to attach modules to the roof with a greater span than conventional systems. For example, a typical railless solar module system attaches to the roof at intervals of 4 feet (1.22 meters) or less. The present system can attach to the roof, using end clamps and edge clamps, at intervals of 6 feet (1.83 meters) and greater. Because there are fewer roof attachments, there are fewer fasteners and fewer roof penetrations. This reduces the risk of water leakage through the roof from the mounting structure. It also simplifies assembly by cutting down on the number of parts. The loop splices provide electrical bonding between modules. This may reduce or eliminate the need for separate bonding splices, which again, simplifies assembly. The loop splices and edge splices are easy to install and align because they are structured to attach to the corners of adjacent modules. There is no need for complex measurement or alignment.

The present system is designed so that once the first-row is in place, each subsequent row can be rotated and secured to the previous row. Module hook brackets secured to the subsequent row engage loop splices and loop brackets of the previous row. The module hook brackets may be secured to the inside corners of the module frames. The module hook brackets provide a "hook" to engage a "loop" in the loop splices and loop brackets.

Because the loop splices, loop brackets and module hook brackets are secured to corners, alignment is assured between module hook brackets and the other components.

Conventional solar module systems use end clamps to secure the outside module system boundaries to the roof and mid clamps to secure adjacent modules to each other and to the roof. In contrast, the present system primarily uses end clamps to secure modules to the roof and loop splices to primarily secure adjacent modules to one another, but typically not to the roof. This separation between roof-securing devices and inter-module securing devices allow the present system to assemble quickly and allows for greater flexibility in design, span, and module placement.

The Inventors observed that many efficient installation crews initially have some members working on the ground while others are doing roof preparation. Based on this observation, the assembly method disclosed herein, can take advantage of this. As a non-limiting example, the ground crew can preinstall end brackets on the trailing-edge of each solar module. They can install module hook brackets on the leading-edge of modules except in the first-row. The module hook brackets may be installed in their final position on the inside corners of the module frames. The position of the end brackets is not critical as they initially provide temporary support and will be adjusted to their final positions by the roof crew.

In the meantime, the roof crew would determine the system boundary and draw a chalk line along the leading-edge of the system. Typically, this will be parallel to the front edge of the roof. The roof crew would also locate each roof rafter that will be used to support the module assembly, and draw chalk lines along the support roof rafters. The roof crew would then install edge clamps along the leading-edge chalk lines where they crisscross the roof rafter chalk lines.

Once the edge clamps are secured to the roof rafters, the roof crew can install the first-row module assemblies to the edge clamps. Once the first-row module assemblies are in place, the roof crew may then install the loop splices to the trailing-edge of adjacent modules. They can also install loop brackets on the inside corners of the trailing-edge of the modules located at the module assembly boundary. With the loop splices and loop brackets installed, the roof crew may then position end clamps over the roof rafter chalk lines and secure them to the roof. They may remove the extra end clamps for reuse.

With the first-row secured, the roof crew might then attach each second-row module to a corresponding first-row module. They may do this by rotationally engaging the loop splices and loop bracket on the first-row modules with corresponding module hook brackets on the second-row modules. With the modules rotated in place, the roof crew may then install loop splices on the trailing-edge of adjacent second-row modules. They may also install loop brackets on the trailing-edge corners of the outer-most second-row modules. As with the first row, some of the trailing-edge end clamps will be repositioned over the roof rafter chalk lines and secured to the roof rafters. The remaining trailing-edge end clamps would be removed for reuse. The installer may then repeat the second-row installation process for each subsequent row. In this way, each additional row can be installed quickly and without further measurement or calculation.

The Inventors envision that several versions of the solar module mounting system may be developed using the principles described herein. This disclosure includes a first version that provides relative separation between the modules and the roof and a second version where the modules are mounted closer to the roof surface. While each version includes structural differences that allow them place the modules at a different relative spacing from the roof, they share structural and functional features described in the previous paragraphs.

This Summary discusses various examples and concepts. These do not limit the inventive concept. Other features and advantages can be understood from the Detailed Description, figures, and claims.

BRIEF DESCRIPTION OF DRAWINGS

FIGS. 5-9 illustrate a loop splice in various views, with FIGS. 6 and 7 illustrating section views of FIG. 8 taken along section lines 6-6 and 7-7, respectively.

FIGS. 31-35 provide a general assembly method that can be applied to both solar module assembly examples within this disclosure.

FIGS. 50-61 illustrate, in various views, an example of carrying out the steps in the flow chart of FIG. 33, with FIGS. 57, 58, and 59 illustrating enlarged portions of FIG. 56, and FIGS. 60 and 61 illustrating sections of FIG. 56.

FIGS. 72-77 illustrate an example, in various views, of carrying out the steps in the flow chart of FIG. 35, with FIGS. 73 and 75 showing an enlarged view of a portion of FIG. 72 and FIG. 74, respectively.

FIGS. 128-130 illustrate, in various views, an example of the step of attaching a first-row solar module assembly to roof-rafter-attached edge clamps.

FIGS. 131-136 illustrate, in various views, an example of a first-row of solar modules to the roof with FIGS. 134-136 showing enlarged portions of FIG. 133.

FIG. 143 illustrates an assembly method of attaching two adjacent modules within a row using a loop splice and attaching two adjacent rows by rotationally engaging module hook brackets with the loop splice.

DETAILED DESCRIPTION

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not excluded unrecited elements. The terms "secure" and "attach" are used interchangeably.

The Detailed Description includes the following sections: "Definitions," "Overview and Common Features," "First embodiment," "Assembly Method: First embodiment," "Second embodiment," "Assembly Method: Second embodiment," and "Conclusion and Variations."

Definitions

Return flange: As defined in this disclosure, a return flange is the lower lip of a solar module frame that projects inward underneath the solar module.

End clamp: As defined in this disclosure, an end clamp is a solar module attachment bracket that attaches to the frame of only one solar module at a time, it does not bridge two or more solar modules together.

Overview and Common Features

The Inventors and Applicant develop both rail and railless solar module mounting systems. As discussed in the Summary, the Inventors recognized that while railless mounting systems generally use less mounting hardware than rail-based systems, the railless mounting assemblies can be structurally complex. In addition, some jurisdictions or installation environments may require that the railless mounting structures be tied directly to roof rafters. This may add significantly to the planning, assembly complexity, installation time, and therefore cost.

Figure 3:
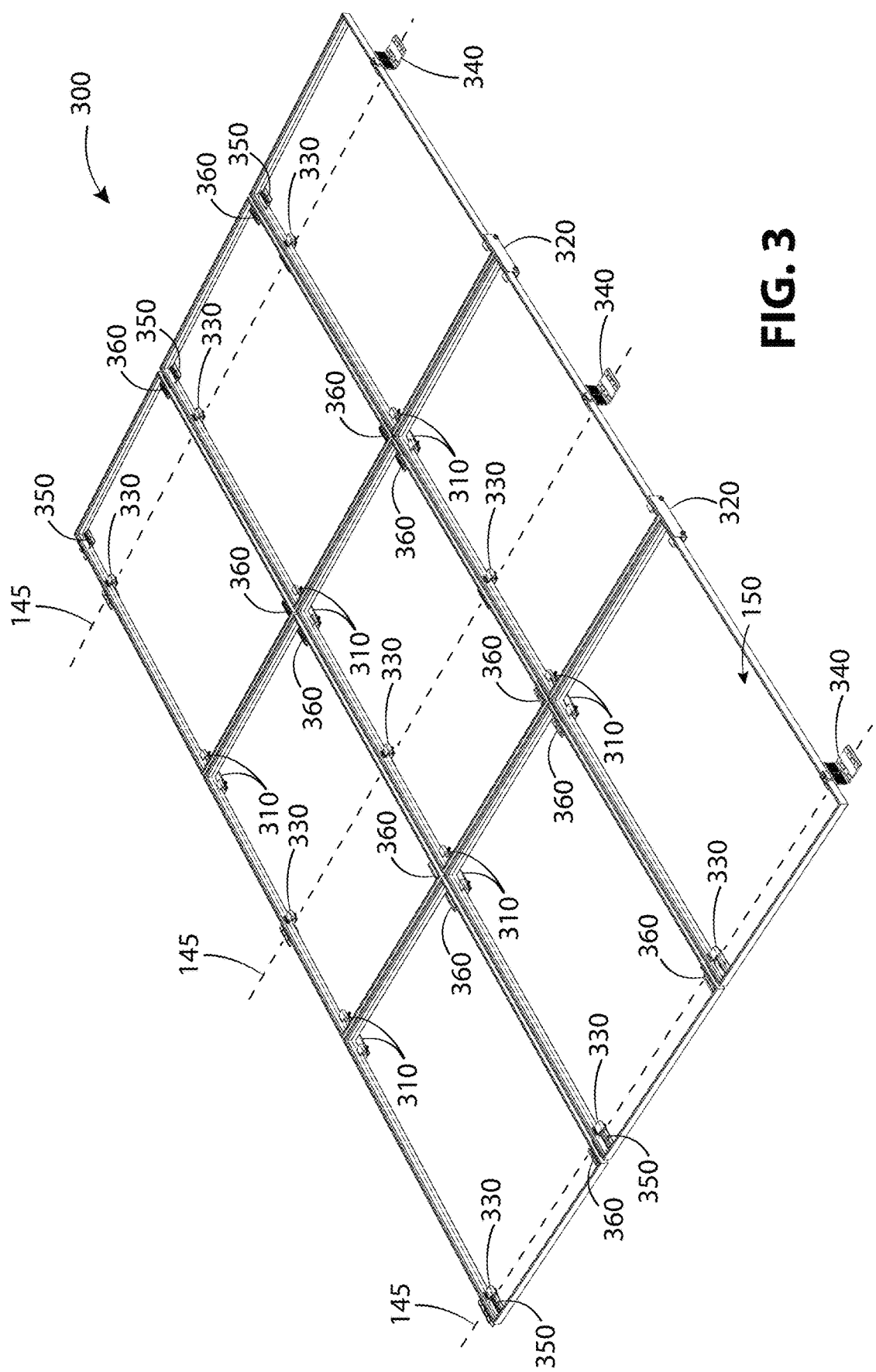
FIG. 3 illustrates, in perspective view, a second embodiment of a solar module system of the present disclosure, illustrating the solar modules as transparent (i.e., x-ray view), to view the structure beneath.
Figure 4:
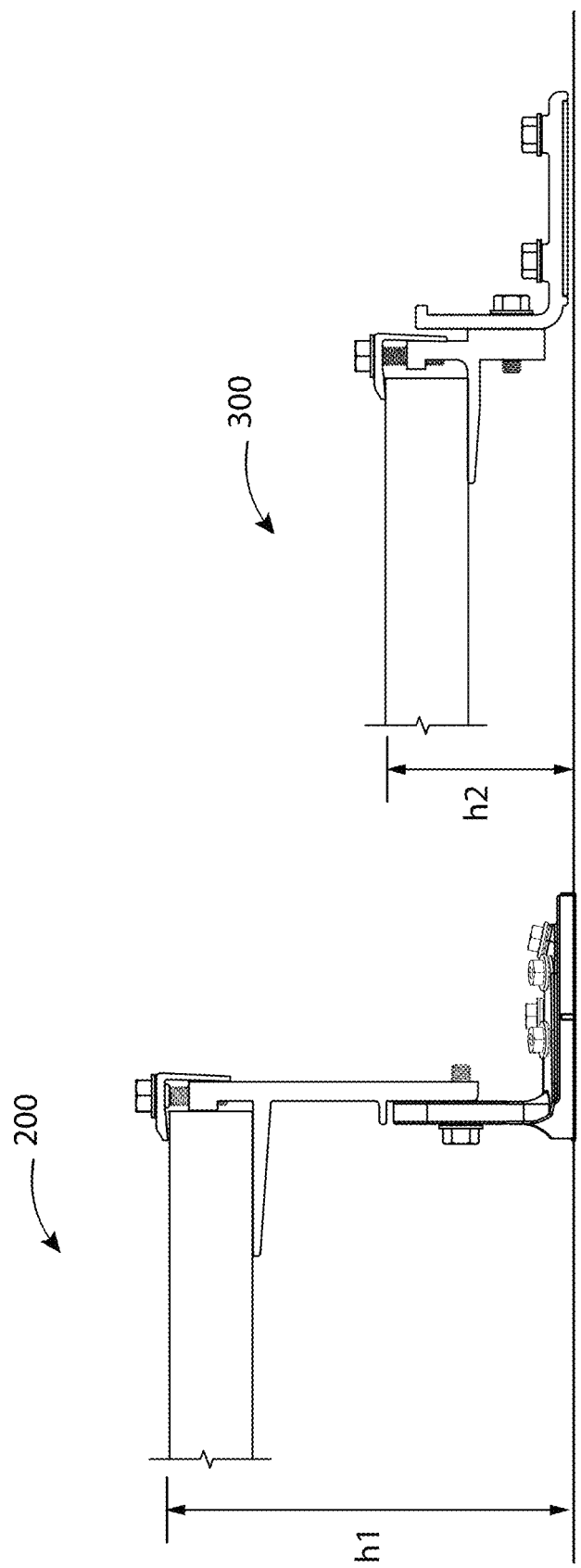
FIG. 4 illustrates, in side view, portions of FIGS. 2 and 3 to illustrate relative height differences between the first and second embodiments of solar module systems.

The Inventors' developed a solar module mounting system, installation method, and associated devices that address the above-described issues. In addition, the Inventors developed instances of their solar module mounting system that could address different installation requirements. FIGS. 1-4 illustrate two exemplary embodiments of solar module systems utilizing the principles described herein. The first embodiment is illustrated as solar module system 200 in FIGS. 1 and 2. The second embodiment is illustrated as solar module system 300 in FIG. 3. FIG. 4 shows portions of each of these to system. Referring to FIG. 4, solar module system 200 mounts higher from the roof surface, at height h1, then the solar module system 300, at height h2. In hotter climates, mounting solar modules higher from the roof surface may allow for better air circulation, heat dissipation, and better efficiency. Mounting the solar modules closer to the roof may be more aesthetically pleasing and may have better resistance to uplift from wind storms.

Figure 1:
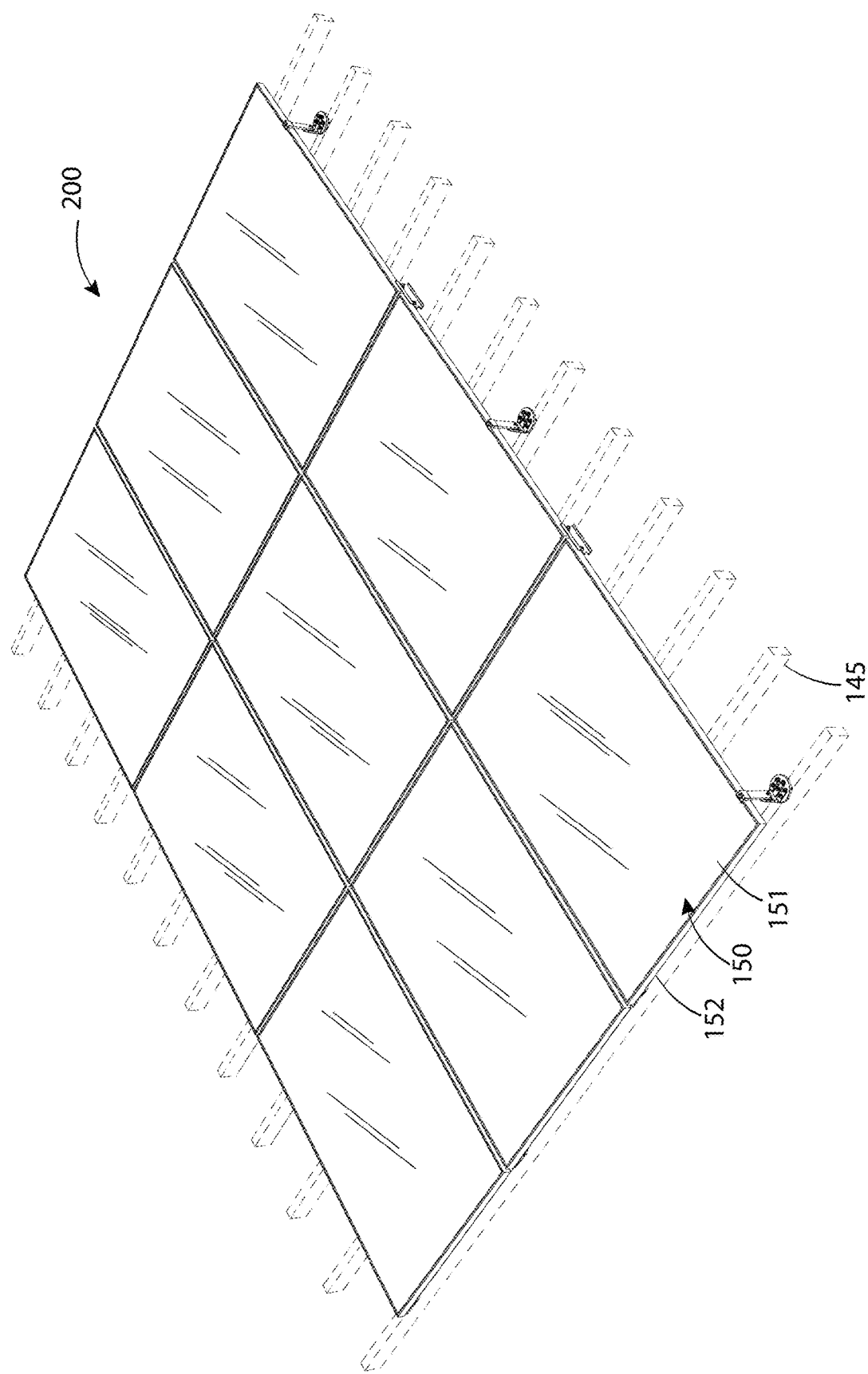
FIGS. 1 and 2 illustrates, in perspective view, a first embodiment of a solar module system of the present disclosure, with FIG. 2 illustrating the solar modules as transparent (i.e., x-ray view), to view the structure beneath.
Figure 2:
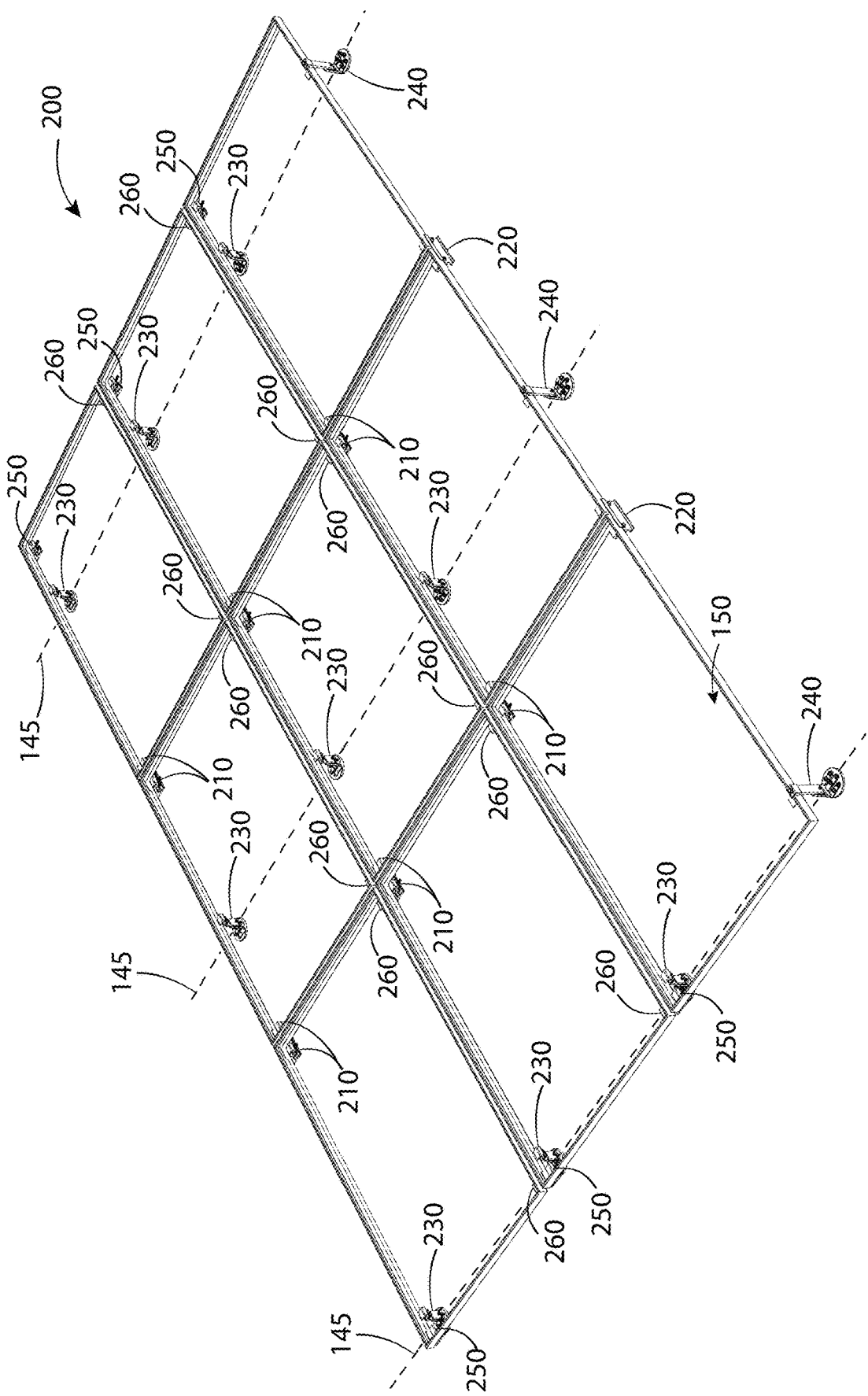
Figure 5:
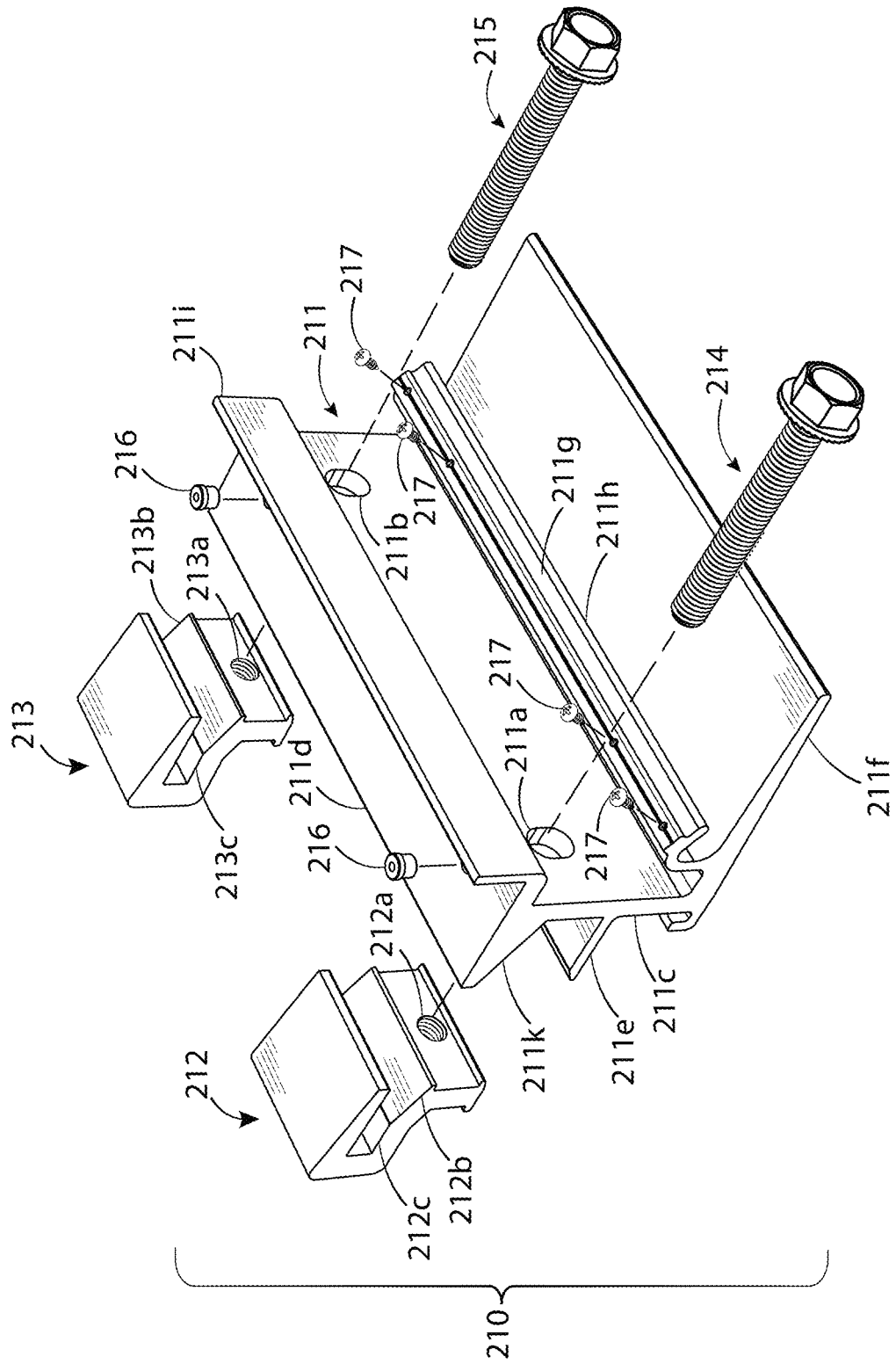
Figure 79:
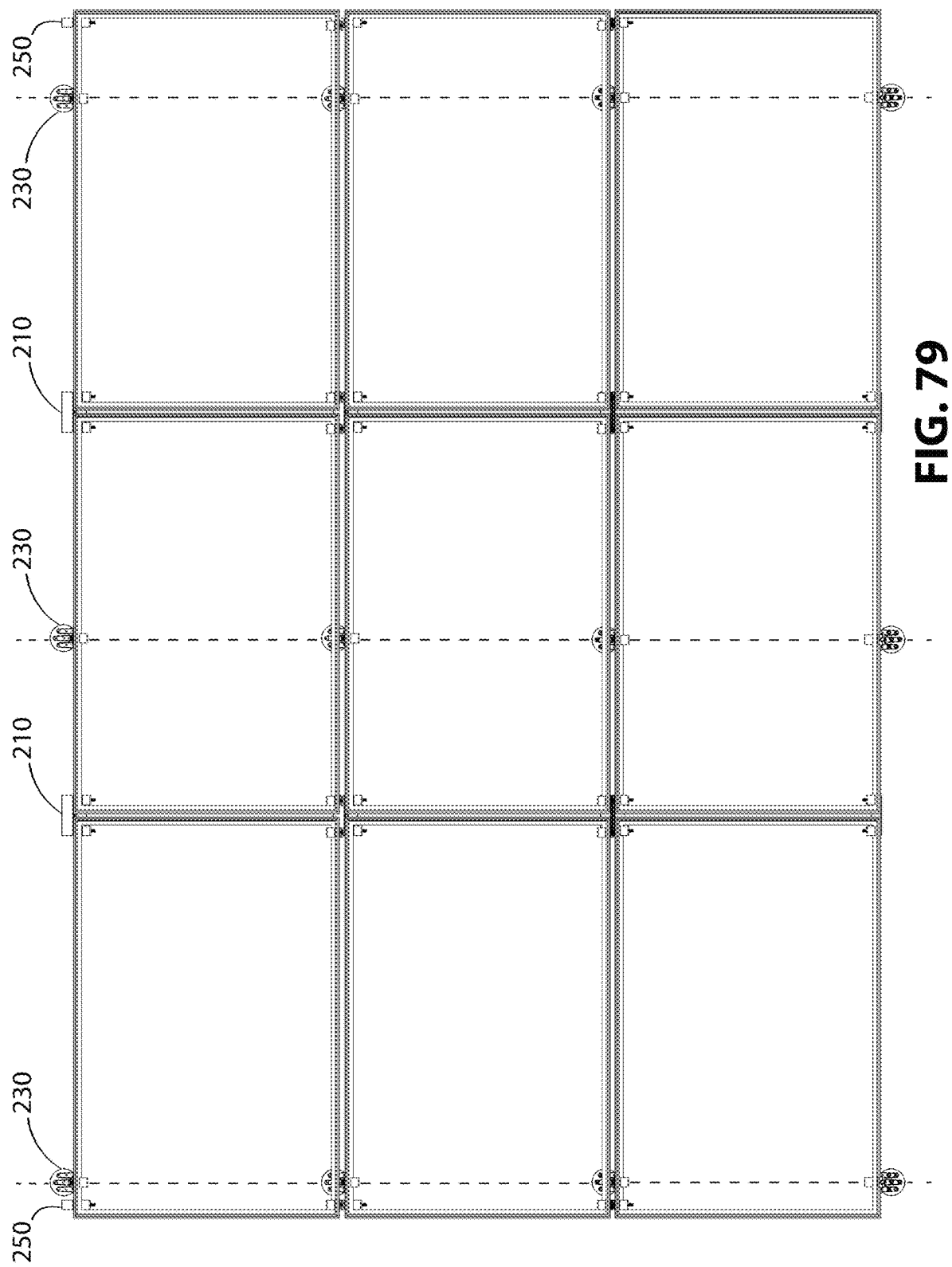
FIG. 79 illustrates in top view, the solar module of FIG. 78 with the solar module bodies shown as transparent (x-ray view) to reveal the structure beneath.
Figure 80:
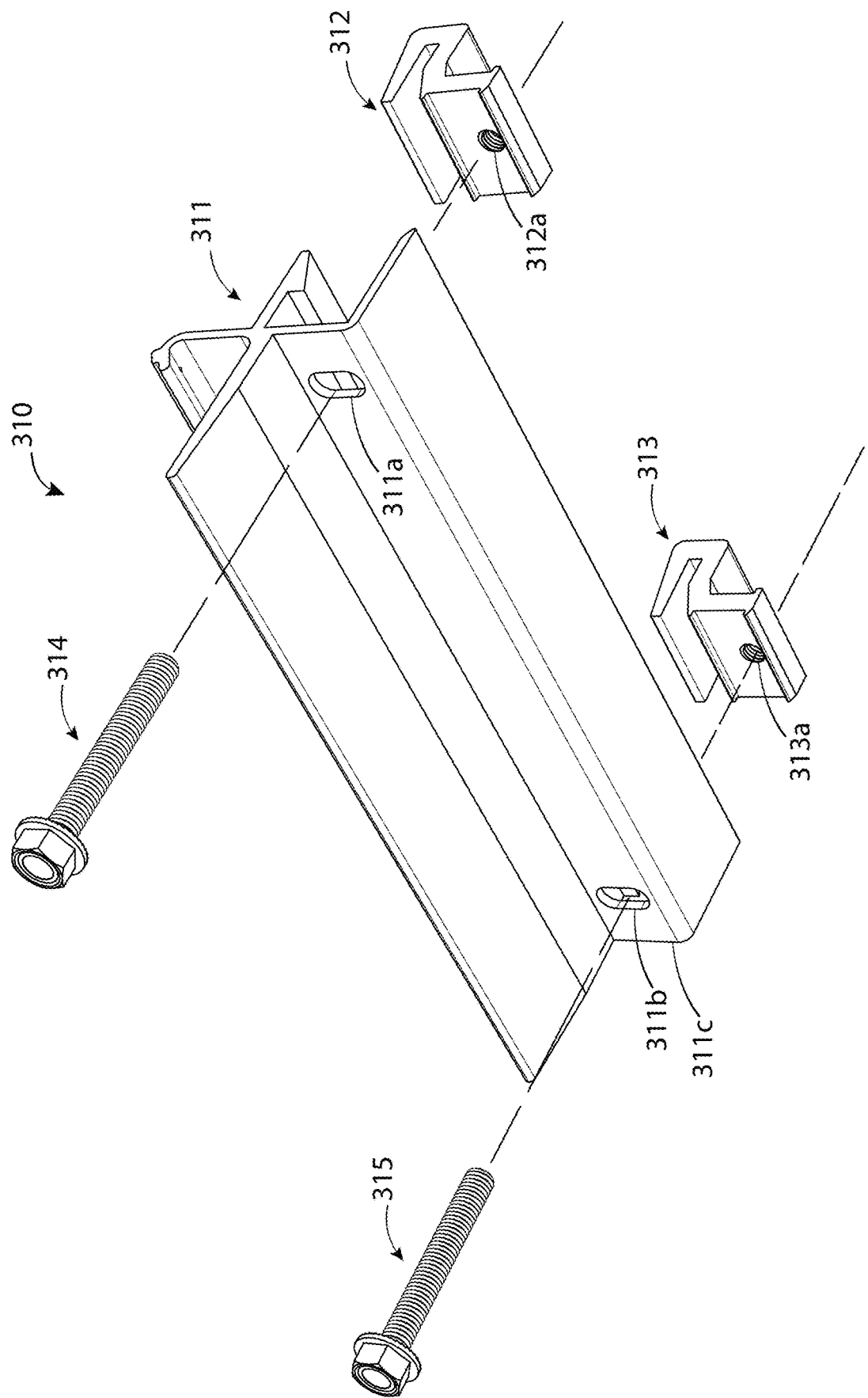
FIGS. 80-86 illustrate the loop splice in various views, with FIGS. 83 and 84 illustrating section views of FIG. 82 taken along section lines 83-83 and 84-84, respectively.
Figure 142:
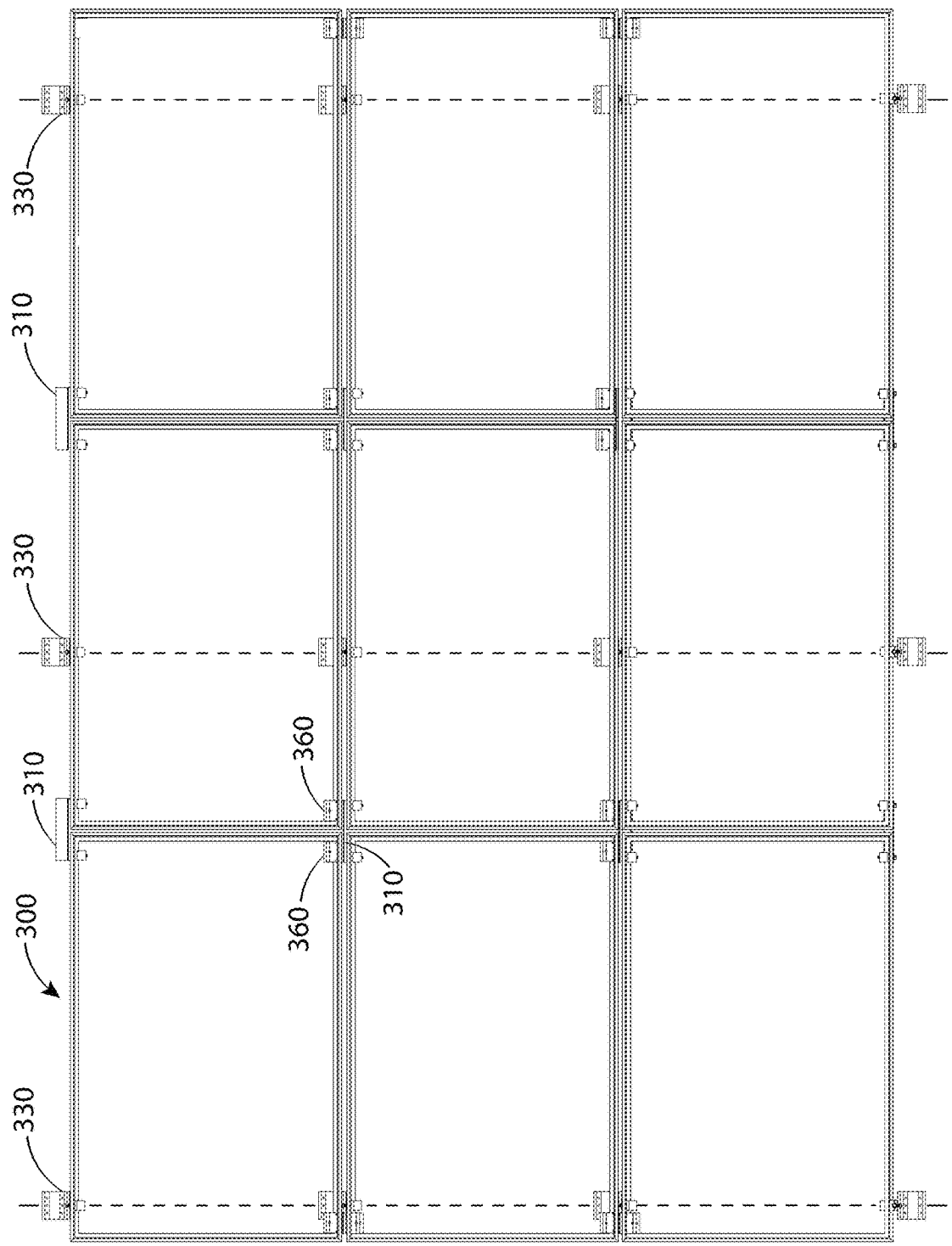
FIG. 142 illustrates an example of a complete solar module assembly using the components from the second embodiment.

FIGS. 5-79 discuss the components and installation of solar module system 200 of FIGS. 1 and 2. FIGS. 80-142 discuss components and installation of the solar module system 300 of FIG. 3. The mounting components include loop splices, edge splices, loop brackets, module hook brackets, edge clamps, and end clamps. The loop splices and edge splices provide structural rigidity between modules within a row. This allows for a greater span between roof mounting components. Therefore, the solar module systems require fewer roof mounting components (i.e., edge clamps and end clamps). FIG. 1 illustrates the solar module system 200 showing an example of the relative position of instances of roof rafter 145. FIGS. 2 and 3 illustrate, edge clamps and end clamps secured to instances of roof rafter 145. FIGS. 2 and 3 illustrates instances of the roof rafter, roof rafter 145, as dashed lines. Loop splice 210, edge splice 220 of FIG. 2, are discussed in the text for FIGS. 5-9 and FIGS. 10-13, respectively. Loop splice 310, edge splice 320 of FIG. 3, are discussed in the text for FIGS. 80-86 and FIGS. 87-92, respectively. End clamp 230 and the edge clamp 240 of FIG. 2 are discussed in the text for FIGS. 23-26 and FIGS. 27-30, respectively. End clamp 330 and edge clamp 340 of FIG. 3 are discussed in the text for FIGS. 106-112 and FIGS. 113-119, respectively.

Referring to FIGS. 2 and 3, module hook brackets secured to a subsequent row of modules, rotationally engage the loop splice and the loop bracket to allow an installer to align and rotate modules within subsequent rows to previous rows. FIG. 2 illustrates instances of module hook bracket 260 rotationally engaging instances of loop splice 210 and loop bracket 250. Module hook bracket 260 of FIG. 2 is discussed in FIGS. 18-22. Loop bracket 250 of FIG. 2, is discussed in FIGS. 14-17. FIG. 3 illustrates instances of module hook bracket 360 rotationally engaging instances of loop splice 310 and loop bracket 350. Module hook bracket 360 of FIG. 3 is discussed in FIGS. 100-105. Loop bracket 350 of FIG. 3, is discussed in FIGS. 93-105.

Note that FIG. 1-3 illustrate a simplified system with nine instances of solar module 150. Using the principles discussed in this disclosure, the solar module system 200 of FIG. 2 and the solar module system 300 of FIG. 3 are scalable. As a non-limiting example, using the disclosed principles, it is possible to construct residential solar module systems with hundreds of solar modules. The module body 151 shown in FIG. 1, which may include the solar cells, glass cover, and encapsulant, is shown as transparent (i.e., x-ray view) in FIGS. 2 and 3 to reveal the mounting components underneath.

First Embodiment

FIGS. 5-9 illustrate the loop splice 210 in various views with FIGS. 6 and 7 illustrating section views of FIG. 8 taken along section lines 6-6 and 7-7, respectively. Referring to FIG. 5, the loop splice 210 may include a loop splice body 211, a first clamp jaw 212, a second clamp jaw 213, a first threaded fastener 214, a second threaded fastener 215, multiple instances of bonding pin 216, and multiple instances of bonding screw 217. The first threaded fastener 214 passes through a slot-shaped aperture 211a in a splice body arm 211c of the loop splice body 211, and engages a threaded aperture 212a in the first clamp jaw 212. The second threaded fastener 215 passes through a slot-shaped aperture 211b in the splice body arm 211c, and engages a threaded aperture 213a in the second clamp jaw 213. FIG. 6 illustrates, in section view, the second threaded fastener 215 threadedly engaging the second clamp jaw 213.

Figure 9:
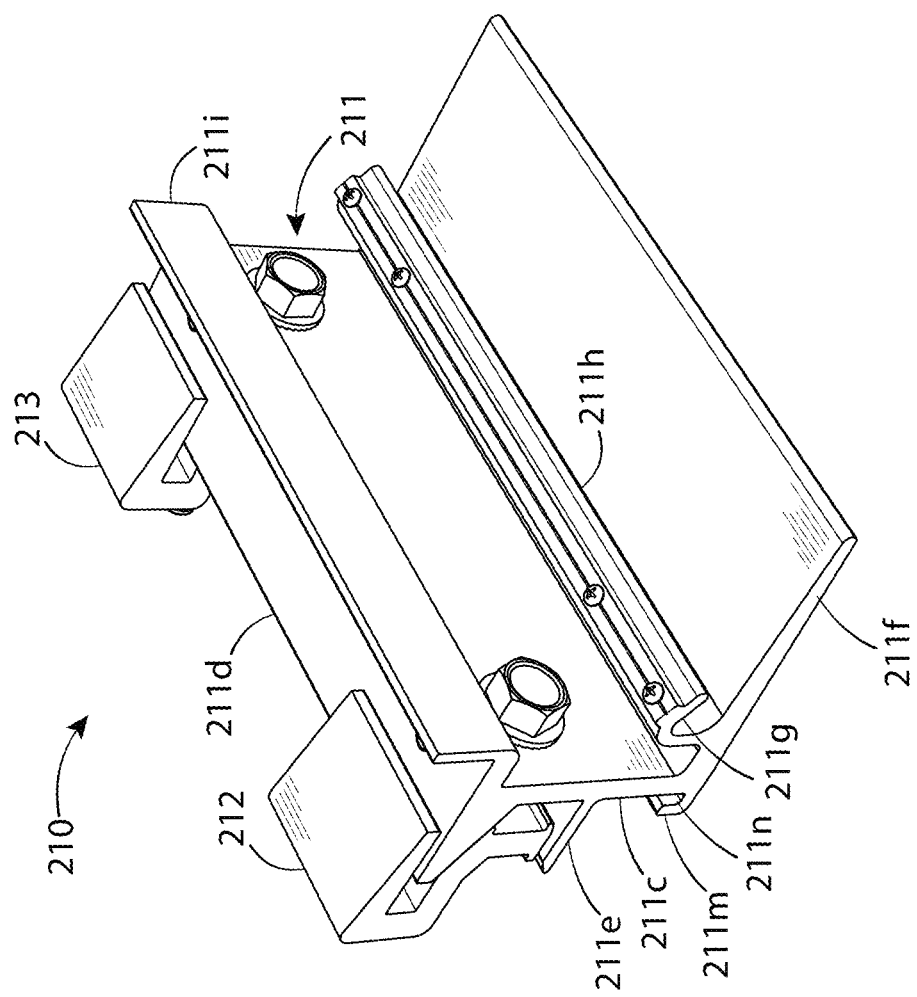

Referring to FIGS. 5 and 9, the loop splice body 211 includes an upper platform 211d and a lower platform 211e extending away from the splice body arm 211c toward the first clamp jaw 212 and second clamp jaw 213, and a loop platform 211f extending away the splice body arm 211c in the opposite direction.

Referring to FIGS. 5-7, and 9, open loop 211g extends upward from the loop platform 211f with an open end 211h that extends back toward the loop platform 211f. The loop platform 211f and open loop 211g are sized and shaped to capture and retain the module hook bracket 260 of FIG. 18. A backstop 211i extends upward from the upper platform 211d. The upper platform 211d is structured to seat a return flange of a solar module. The backstop 211i is structured to seat the outside perimeter side of the frame of the solar module. The first clamp jaw 212 of FIGS. 5 and 9, and the second clamp jaw 213 of FIGS. 5-7 and 9, clamp the return flange of the solar module against the upper platform 211d.

Figure 18:
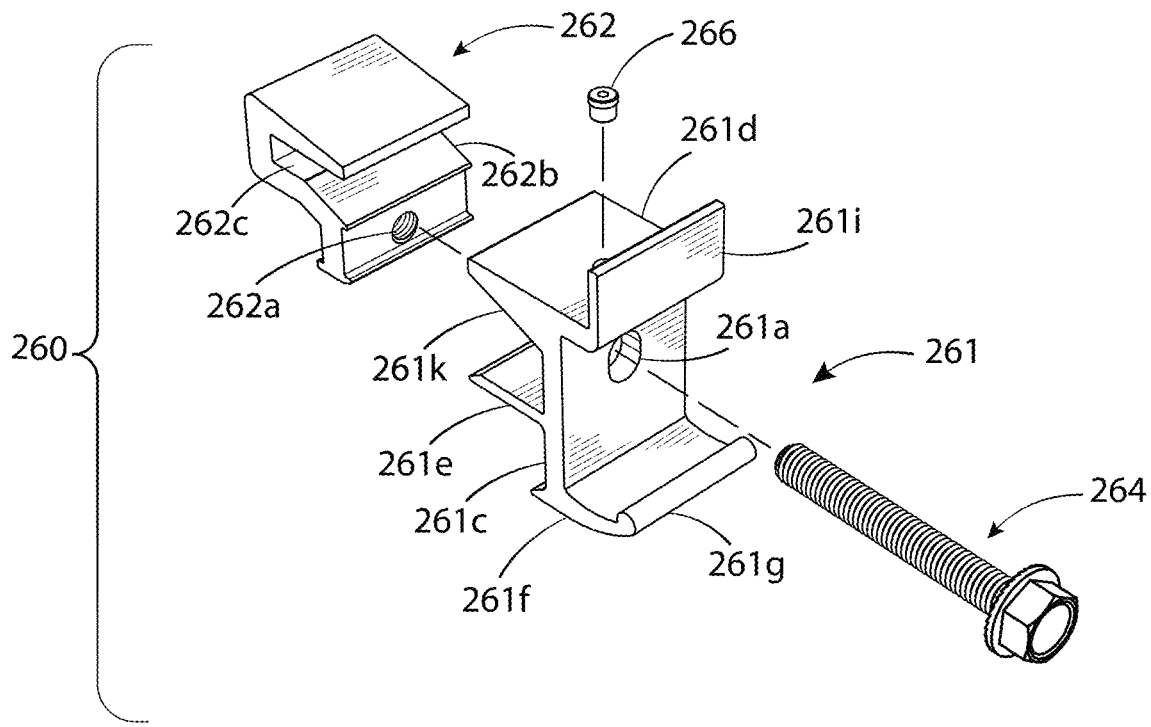
FIGS. 18-22 illustrate, in various views, the module hook bracket, with FIGS. 21 and 22 showing section views for FIG. 20 taken along section lines 21-21.

The bonding screws and bonding pins together provide electrical bonding between the loop splice 210 of FIG. 5, module hook bracket 260 of FIG. 18, and their associated solar modules. Referring to FIG. 6, the bonding pin 216 extends upward from a blind hole 211j in the upper platform 211d. Referring to FIG. 7, the bonding screw 217 extends through the open loop 211g toward the loop platform 211f. The bonding pins and bonding screws include sharpened ends that break through non-conductive oxide layers, anodized layers, or paint layers to create an electrical bond between components.

Referring to FIGS. 5 and 7, the upper platform 211d includes a wedge-shaped bottom surface 211k extending obliquely downward toward the splice body arm 211c. Referring to FIG. 5, the first clamp jaw 212 and second clamp jaw 213 include a wedge-engaging surface 212b and wedge-engaging surface 213b, respectively. The wedge-engaging surface 212b extends obliquely downward from a cavity 212c from within the first clamp jaw 212. The wedge-engaging surface 213b extends obliquely downward from a cavity 213c from within the second clamp jaw 213. Referring to FIG. 7, the wedge-engaging surface 213b is at the same oblique angle as the wedge-shaped bottom surface 211k. This causes the wedge-engaging surface 213b to move up and down along the wedge-shaped bottom surface 211k. As the second threaded fastener 215 is tightened or loosened, the clamping surface 213d is drawn toward or away, respectively, from the upper platform 211d. Referring to FIG. 5, as the first threaded fastener 214 is loosened or tightened, the slot-shaped aperture 211a allows the first threaded fastener 214 to move up or down as the first clamp jaw 212 moves up or down. As the second threaded fastener 215 is loosened or tightened, the slot-shaped aperture 211b allows the second threaded fastener 215 to move up or down as the second clamp jaw 213 moves up or down.

Referring to FIGS. 7 and 9, the loop splice body 211 includes a catch 211m extending lengthwise along the splice body arm 211c in a direction opposite the loop platform 211f. The catch 211m includes a groove 211n. The groove 211n extends downward into the catch, and lengthwise along the catch 211m. Sometimes the attachment-rafter falls over the loop splice 210. The purpose of the catch 211m is to optionally attach the loop splice 210 to the attachment-rafter via a splice link and roof-attachment bracket. This will be discussed in the assembly method section of this disclosure.

Figure 10:
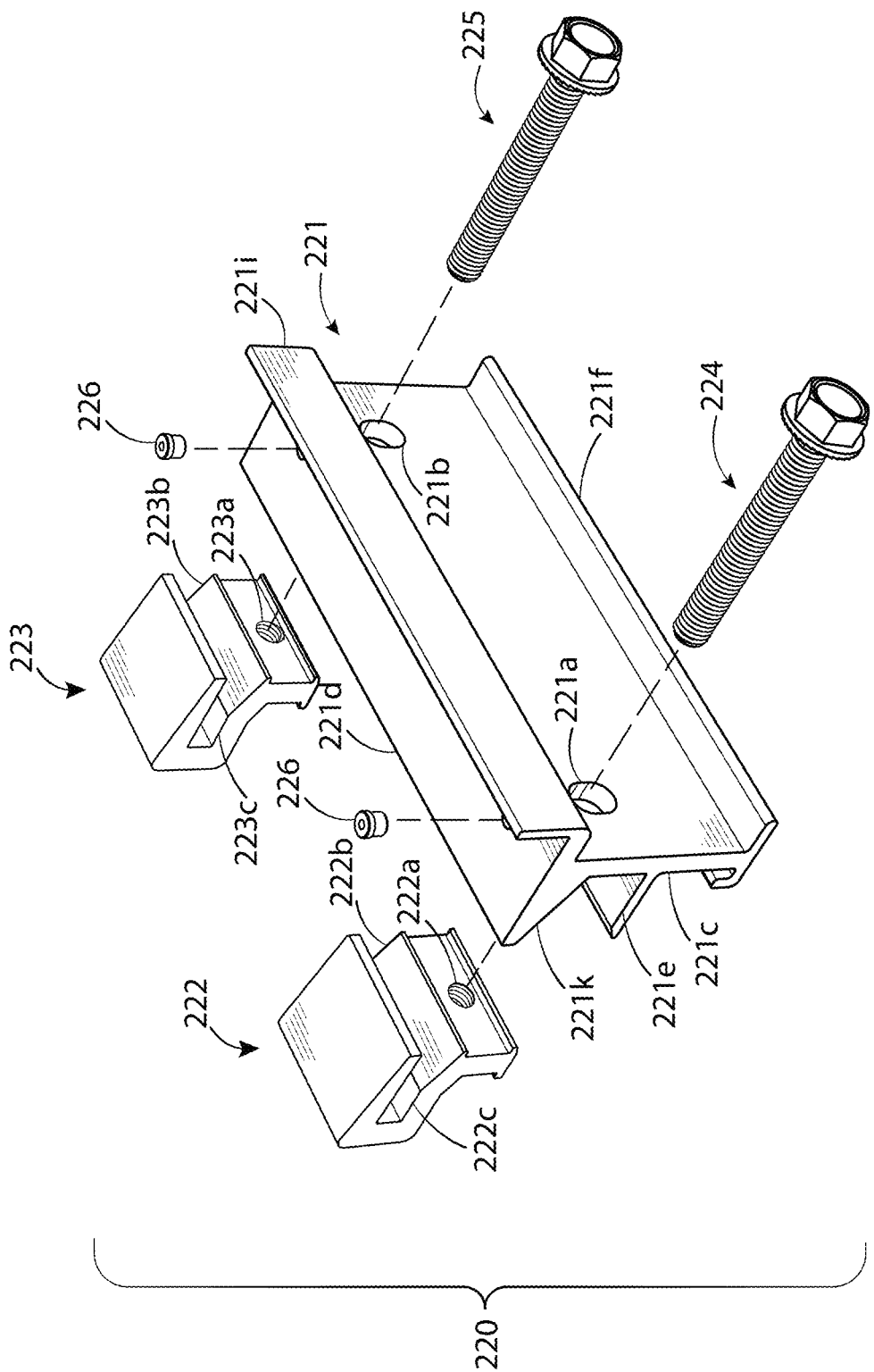
FIGS. 10-13 illustrate an edge splice in various views, with FIG. 11 illustrating section view of FIG. 12 taken along section lines 11-11.
Figure 11:
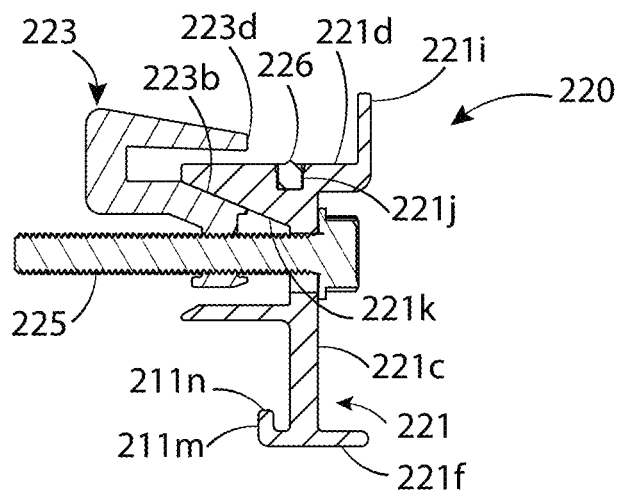
Figure 12:
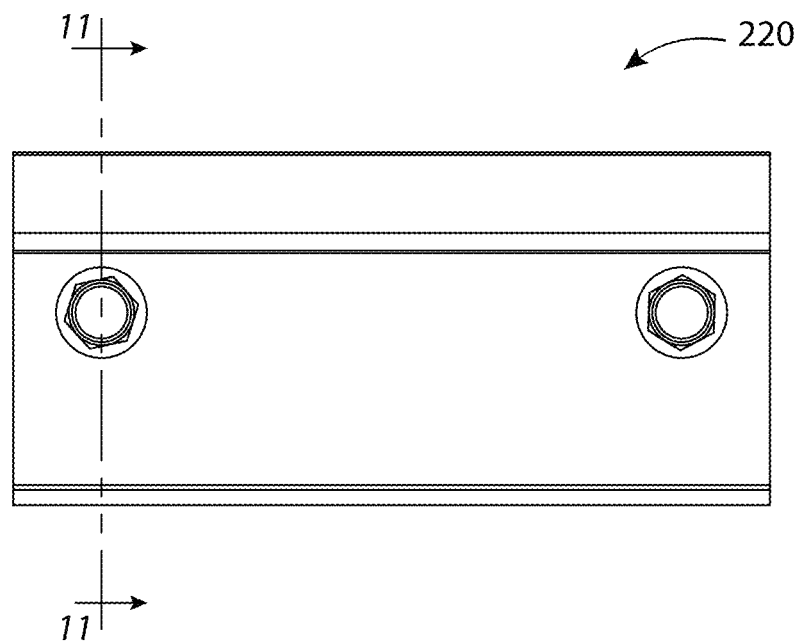

FIGS. 10-13 illustrate an edge splice 220 in various views with FIG. 11 illustrating section view of FIG. 12 taken along section lines 11-11. The edge splice 220 shares a common clamping structure as the loop splice 210 of FIGS. 5-9 and is structured to rigidly join adjacent modules within a row of modules. However, as the name suggests, the edge splice 220 is structured to engage the edges of the solar module assembly while the loop splice 210 can also engage and secure modules within adjacent rows.

Referring to FIG. 10 the edge splice 220 may include an edge splice body 221, a first clamp jaw 222, a second clamp jaw 223, a first threaded fastener 224, a second threaded fastener 225, and multiple instances of bonding pin 226. The first threaded fastener 224 passes through a slot-shaped aperture 221a in a splice body arm 221c and engages a threaded aperture 222a in the first clamp jaw 222. The second threaded fastener 225 passes through a slot-shaped aperture 221b in the splice body arm 221c and engages a threaded aperture 223a in the second clamp jaw 223. FIG. 11 illustrates, in section view, the second threaded fastener 225 threadedly engaging the second clamp jaw 223.

Figure 13:
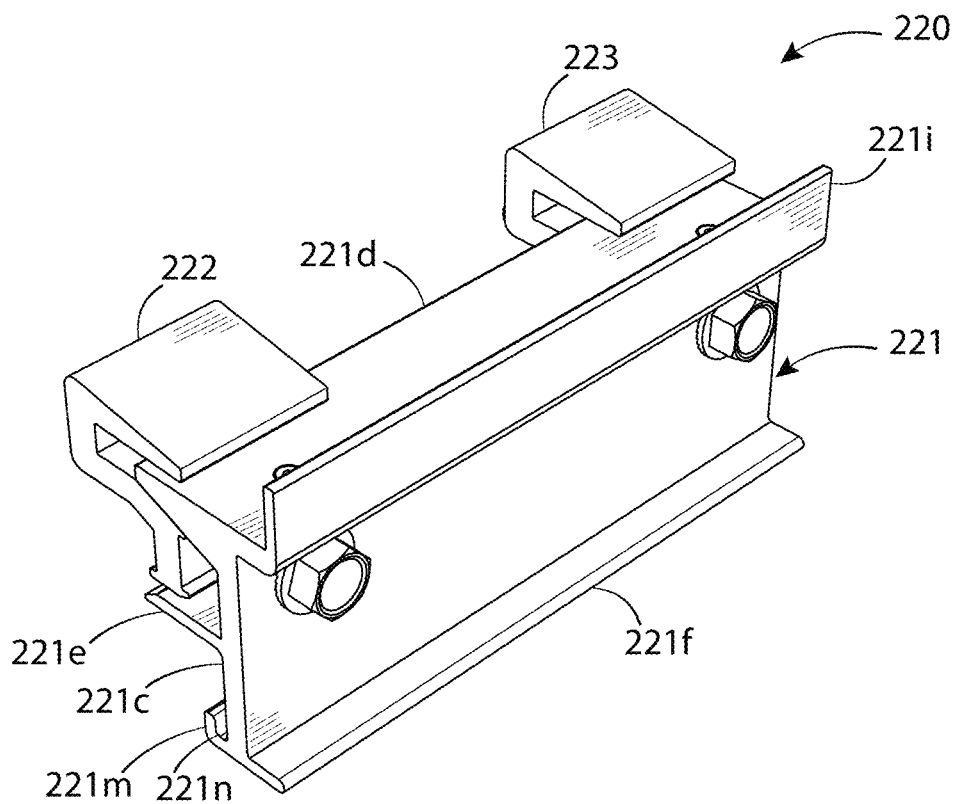

Referring to FIGS. 10 and 13, the edge splice body 221 includes an upper platform 221d and a lower platform 221e extending away from the splice body arm 221c toward the first clamp jaw 222 and second clamp jaw 223. The edge splice body 221 also includes a lower stop 221f extending away the splice body arm 221c in the opposite direction as the upper platform 221d and lower platform 221e.

Referring to FIGS. 10, 11, and 13, a backstop 221i extends upward from the upper platform 211d. The upper platform 211d is structured to seat a return flange of a solar module and the backstop 211i is structured to seat the outside perimeter side of the frame of the solar module. The first clamp jaw 222 of FIGS. 10 and 13, and the second clamp jaw 223 of FIGS. 10, 11, and 13, clamp the return flange of the solar module against the upper platform 221d.

The bonding pins provide electrical bonding between the edge splice 220 and adjacent modules within a row of modules. Referring to FIG. 11, the bonding pin 226 extends upward from a blind hole 221j in the upper platform 221d.

Referring to FIGS. 10 and 11, the upper platform 221d includes a wedge-shaped bottom surface 221k extending obliquely downward toward the splice body arm 221c. Referring to FIG. 10, the first clamp jaw 222 and second clamp jaw 223 include a wedge-engaging surface 222b and wedge-engaging surface 223b, respectively. The wedge-engaging surface 222b extends obliquely downward from a cavity 222c from within the first clamp jaw 222. The wedge-engaging surface 223b extends obliquely downward from a cavity 223c from within the second clamp jaw 223. Referring to FIG. 11, the wedge-engaging surface 223b is illustrated as having the same oblique angle as the wedge-shaped bottom surface 221k. This allows the wedge-engaging surface 223b to move up and down along the wedge-shaped bottom surface 221k. As the second threaded fastener 225 is tightened or loosened, the clamping surface 223d is drawn toward or away, respectively, from the upper platform 221d. Referring to FIG. 10, as the second threaded fastener 225 is loosened or tightened, the slot-shaped aperture 221b allows the second threaded fastener 225 to move up or down as the second clamp jaw 223 moves up or down. Similarly, as the first threaded fastener 224 is loosened or tightened, the slot-shaped aperture 221a allows the first threaded fastener 224 to move up or down as the first clamp jaw 222 moves up or down.

Referring to FIGS. 11 and 13, the edge splice body 221 includes a catch 221m extending lengthwise along the splice body arm 221c in a direction opposite the lower stop 221f. The catch 221m includes a groove 221n extending downward into and lengthwise along the catch 221m.

Figure 14:
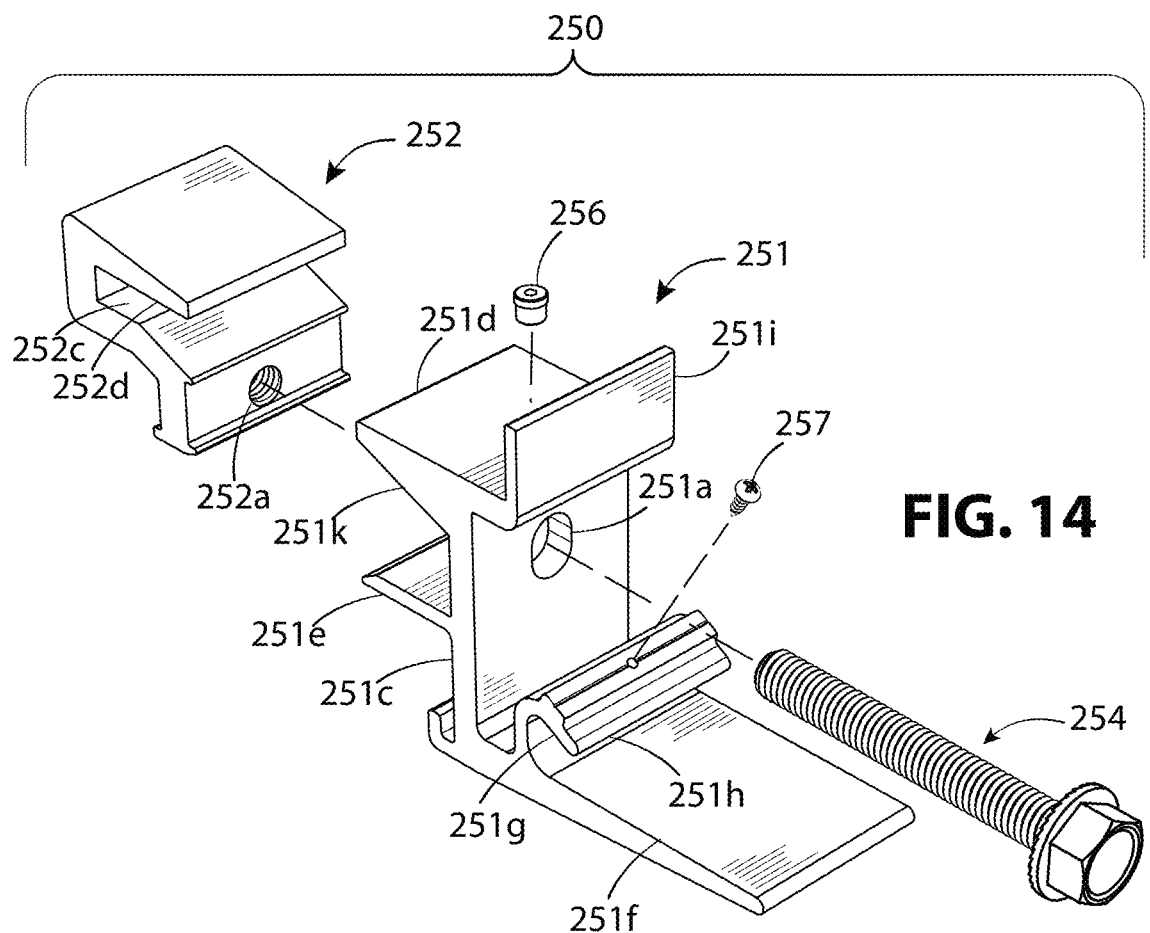
FIGS. 14-17 illustrate, in various views, the module hook bracket with FIG. 17 showing a section view of FIG. 16 taken along section lines 17-17.
Figure 15:
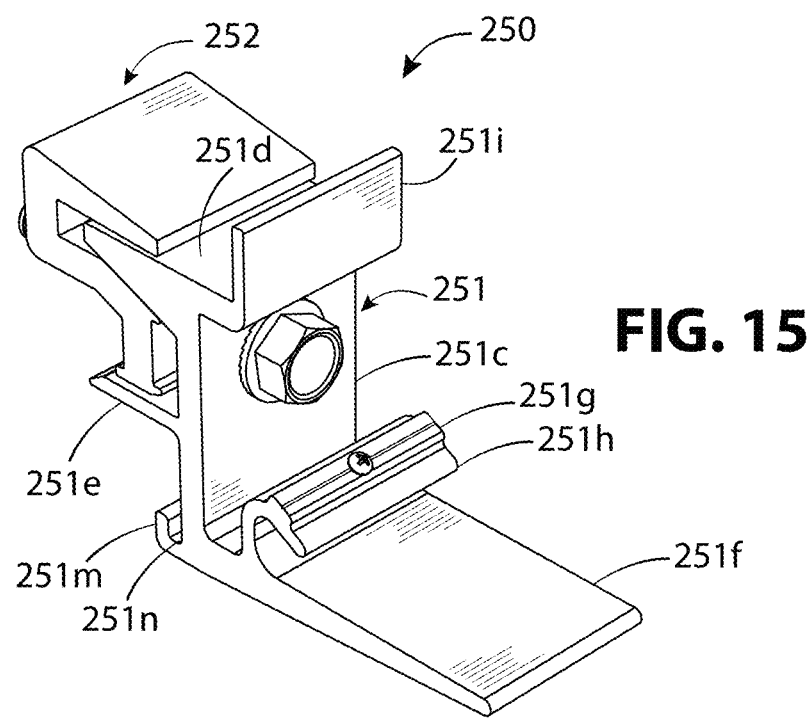
Figure 16:
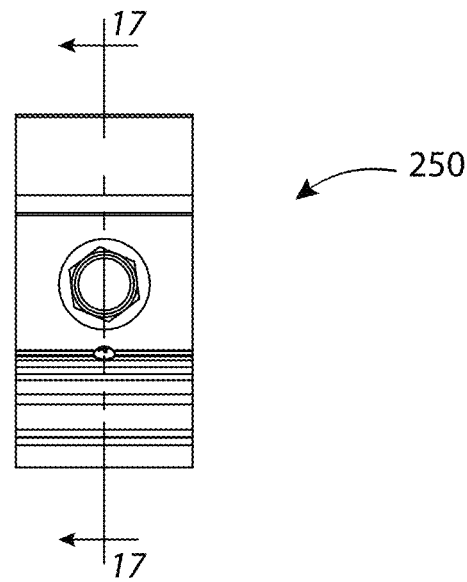
Figure 17:
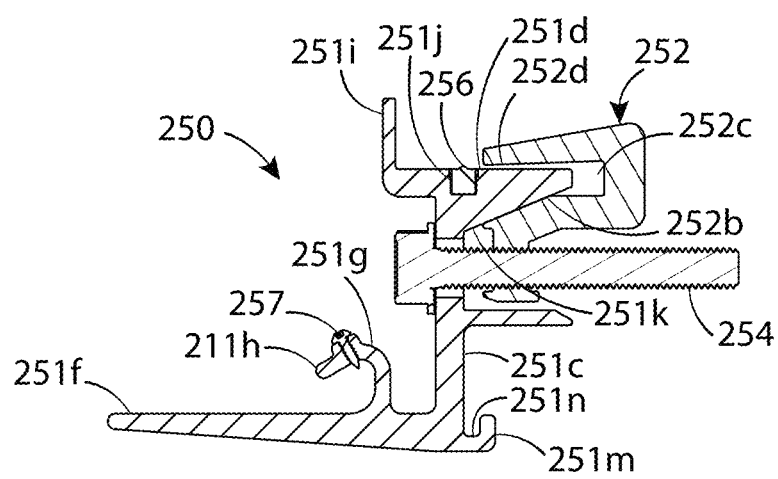

FIGS. 14-17 illustrate, in various views, the loop bracket 250 with FIG. 17 showing a section view of FIG. 16 taken along section lines 17-17. As illustrated in FIG. 2, the loop bracket 250 is positioned on the outside interior corner of the trailing-edge of the modules located on the outside perimeter of the solar module system. The loop bracket 250 shares similarities with the loop splice in that it rotationally engages a module hook bracket 260 secured to the leading-edge of a module in an adjacent row.

Referring to FIG. 14, the loop bracket 250 may include a loop bracket body 251, a clamp jaw 252, a threaded fastener 254, a bonding pin 256, and a bonding screw 257. The threaded fastener 254 passes through a slot-shaped aperture 251a in a bracket body arm 251c of the loop bracket body 251, and engages a threaded aperture 252a in the clamp jaw 252. FIG. 17 illustrates, in section view, the threaded fastener 254 threadedly engaging the clamp jaw 252.

Referring to FIGS. 14 and 15, the loop bracket body 251 includes an upper platform 251d and a lower platform 251e extending away from the bracket body arm 251c toward the clamp jaw 252. The loop bracket body 251 also includes a loop platform 251f extending away the bracket body arm 251c in the opposite direction as the upper platform 251d.

Referring to FIGS. 14, 15, and 17, open loop 251g extends upward from the loop platform 251f with an open end 251h that extends back toward the loop platform 251f. The loop platform 251f and open loop 251g are sized and shaped to capture and retain the module hook bracket 260 of FIGS. 18-22. In FIGS. 14, 15, and 17, a backstop 251i extends upward from the upper platform 251d. The upper platform 251d is structured to seat a return flange of a solar module. The backstop 251i is structured to seat the outside perimeter side of the frame of the solar module. The clamp jaw 252 clamps the return flange of the solar module against the upper platform 251d.

Referring to FIG. 17, the bonding screws and bonding pins together provide electrical bonding between the loop bracket 250, module hook bracket 260 of FIG. 18, and their associated solar modules. In FIG. 17, the bonding pin 256 extends upward from a blind hole 251j in the upper platform 251d. The bonding screw 257 extends through the open loop 251g toward the platform.

Referring to FIGS. 14 and 17, the upper platform 251d includes a wedge-shaped bottom surface 251k extending obliquely downward toward the bracket body arm 251c. The clamp jaw 252 includes a wedge-engaging surface 252b. The wedge-engaging surface 252b extends obliquely downward from a cavity 252c from within the clamp jaw 252. Referring to FIG. 17, the wedge-engaging surface 252b, is illustrated as at the same oblique angle as the wedge-shaped bottom surface 251k. Because of this, the wedge-engaging surface 252b moves up and down along the wedge-shaped bottom surface 251k. As the threaded fastener 254 is tightened or loosened, the clamping surface 252d is drawn toward or away, respectively, from the upper platform 251d.

Referring to FIGS. 15 and 17, the loop bracket body 251 includes a catch 251m extending lengthwise along the bracket body arm 251c in a direction opposite the loop platform 251f. The catch 251m includes a groove 251n. The groove extends downward into and extends lengthwise along the catch 251m. Sometimes the attachment-rafter falls over the loop bracket 250. The purpose of the catch 251m is to optionally attach the loop bracket 250 to the attachment-rafter via a splice link and roof-attachment bracket.

Figure 19:
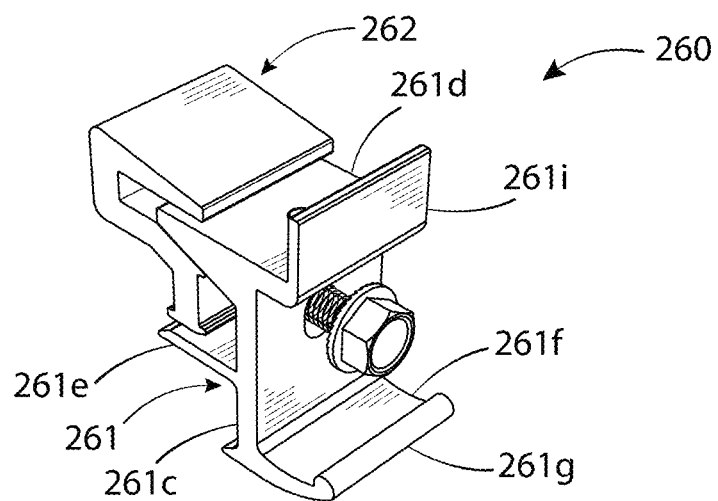
Figure 20:
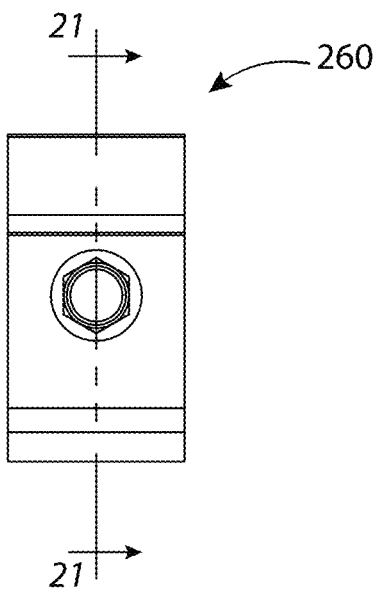
Figure 21:
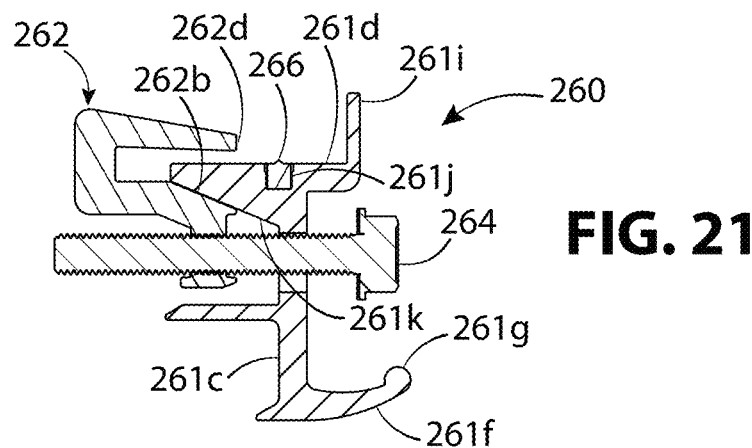
Figure 22:
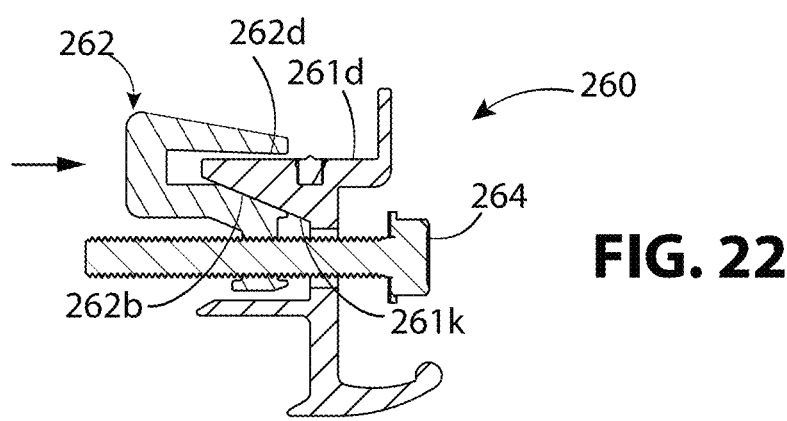

FIGS. 18-22 illustrate, in various views, the module hook bracket 260, with FIGS. 21 and 22 showing section views for FIG. 20 taken along section lines 21-21. As illustrated in FIG. 2, the module hook bracket 260 is positioned on the inside corners of the leading-edge of modules positioned subsequent to the first-row of modules.

Referring to FIG. 18, the module hook bracket 260 may include a module hook body 261, a clamp jaw 262, a threaded fastener 264, and a bonding pin 266. The threaded fastener 264 passes through a slot-shaped aperture 261a in a body arm 261c of the module hook body 261, and engages a threaded aperture 262a in the clamp jaw 262. FIGS. 21 and 22 illustrate, in section view, the threaded fastener 264 threadedly engaging the clamp jaw 262.

Referring to FIGS. 18 and 19, the module hook body 261 includes an upper platform 261d and a lower platform 261e extending away from the body arm 261c toward the clamp jaw 262, and a hook arm 261f extending away the body arm 261c in the opposite direction as the upper platform 261d. The hook arm 261f is also shown extending from the body arm 261c in FIG. 21.

Referring to FIGS. 18, 19, and 21, the hook arm may be curved, arcuate, or downwardly convex-shaped as to allow the attached solar module to rotate on the loop platform 211f of FIG. 5 and loop platform 251f of FIG. 14. In FIGS. 18, 19, and 21, the hook arm end 261g extends upward from the hook arm 261f. The hook arm 261f and hook arm end 261g are sized and shaped to be captured and retained in the open loop 251g of FIG. 14 and the open loop 211g of FIG. 5. In FIGS. 18, 19, and 21, the hook arm end 261g is illustrated as a ball catch hook, but could be other shapes that facilitate engagement with the open loop 251g of FIG. 14 and the open loop 211g of FIG. 5. Continuing to refer to FIGS. 18, 19, and 21, a backstop 261i extends upward from the upper platform 261d. The upper platform 261d is structured to seat a return flange of a solar module. The backstop 261i is structured to seat the outside perimeter side of the frame of the solar module. The clamp jaw 262 clamps the return flange of the solar module against the upper platform 261d.

The bonding pin provides electrical bonding to the attached solar module. Referring to FIG. 21, the bonding pin 266 extends upward from a blind hole 261j in the upper platform 261d.

Referring to FIG. 18, the upper platform 261d includes a wedge-shaped bottom surface 261k extending obliquely downward toward the body arm 261c. The clamp jaw 262 includes a wedge-engaging surface 262b. The wedge-engaging surface 262b extends obliquely downward from a cavity 262c from within the clamp jaw 262. Referring to FIGS. 21 and 22, the wedge-engaging surface 262b, has the same oblique angle as the wedge-shaped bottom surface 261k. This allows the wedge-engaging surface 262b to move up and down along the wedge-shaped bottom surface 261k. As the threaded fastener 264 is tightened (FIG. 22) or loosened (FIG. 21), the clamping surface 262d is drawn toward or away, respectively, from the upper platform 261d.

Figure 23:
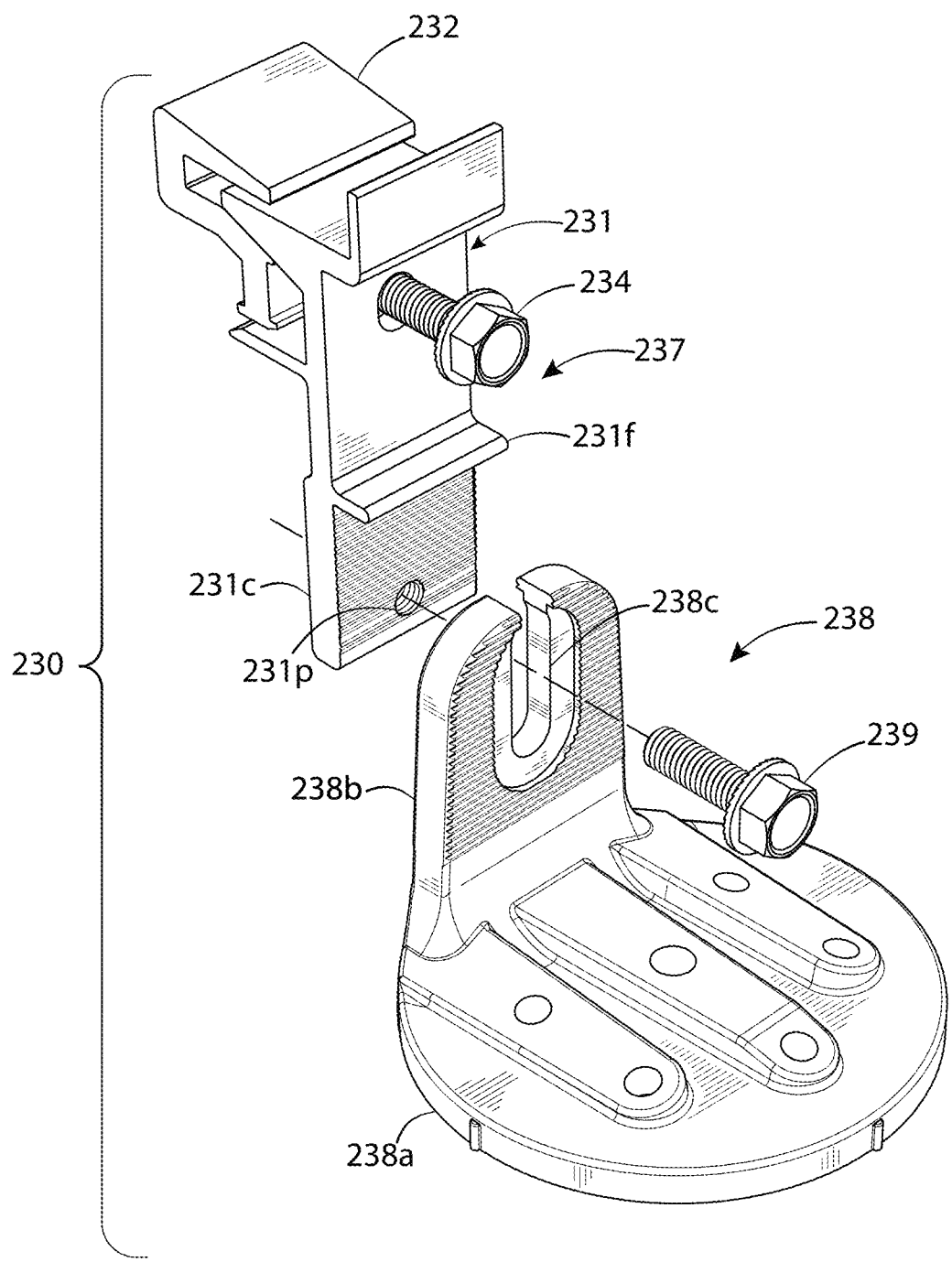
FIGS. 23-26 illustrate, in various views of the end clamp, or portions thereof, with FIG. 23 showing the end clamp, FIGS. 24-26, showing the module end bracket portion of the end clamp, and with FIG. 25 showing a section view of FIG. 24 taken along section lines 25-25.
Figure 24:
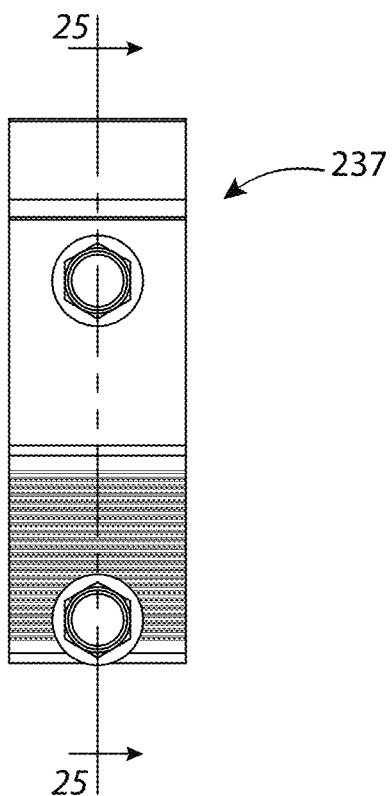
Figure 25:
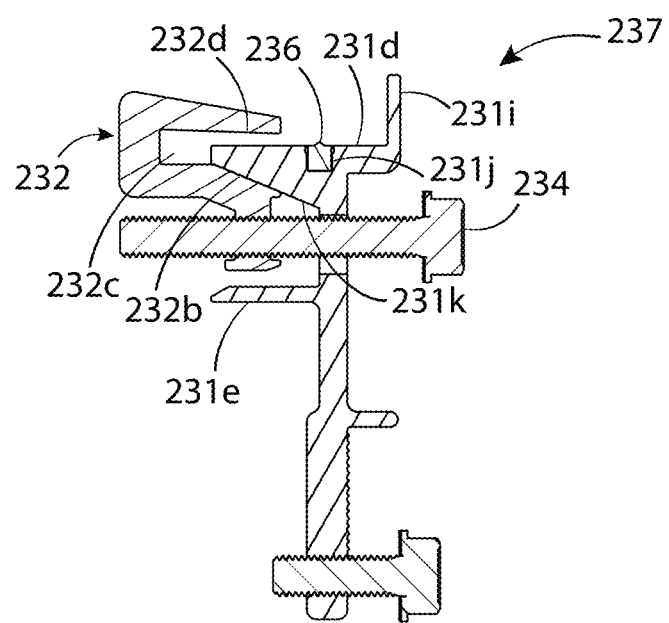
Figure 26:
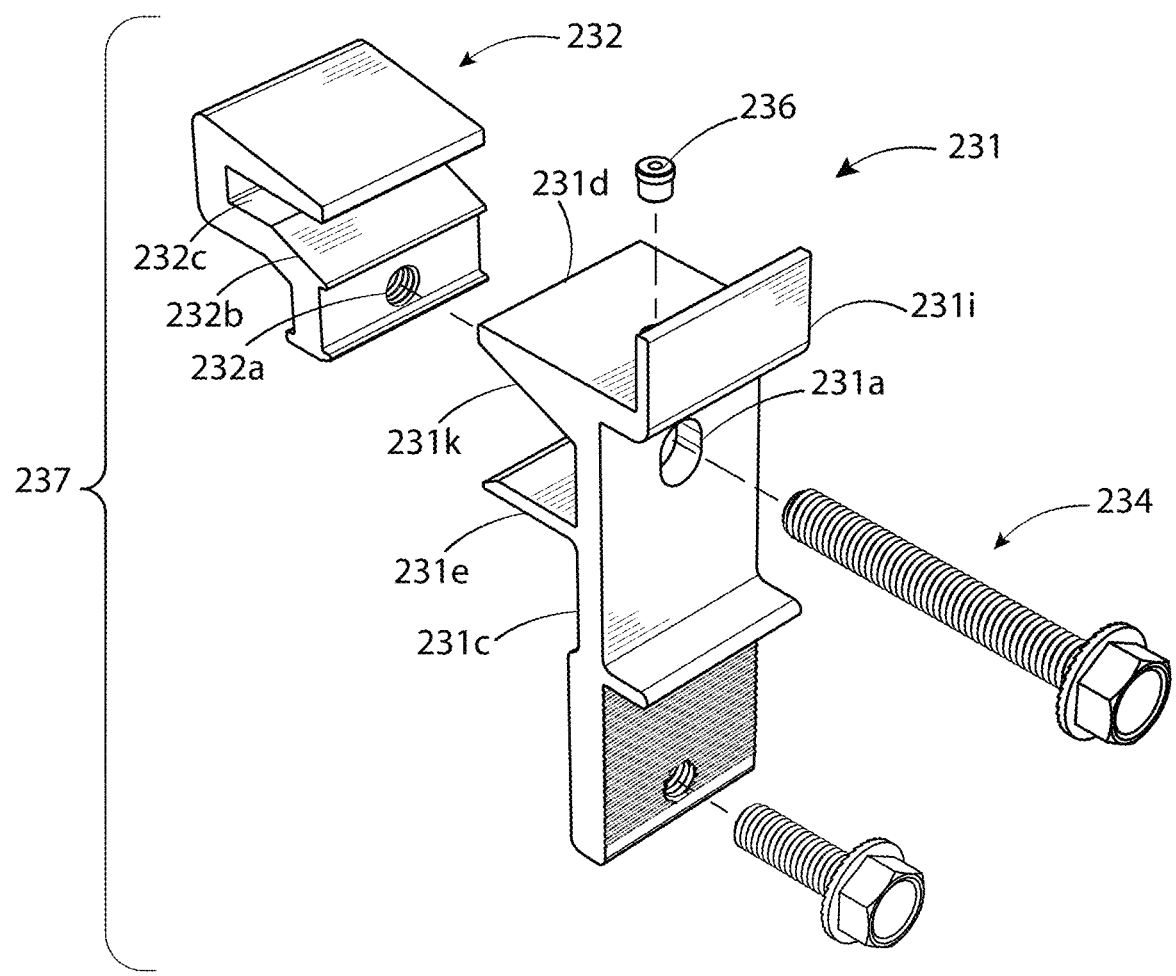

FIGS. 23-26 illustrate, in various views the end clamp 230, or portions thereof, with FIG. 23 showing the end clamp 230, FIGS. 24-26, showing the module end bracket 237 portion of the end clamp 230, and with FIG. 25 showing a section view of FIG. 24 taken along section lines 25-25. Referring to FIG. 2, the end clamp 230 is positioned on the trailing-edge of the solar modules and secures the solar module assembly to the roof rafters. Referring to FIG. 23, the end clamp 230 includes a module end bracket 237 assembly, a roof-attachment bracket 238, and a threaded fastener 239. The module end bracket 237 includes an end clamp body 231, a clamp jaw 232, a threaded fastener 234, and a bonding pin (hidden from view). The roof-attachment bracket 238 includes a roof bracket base 238a and a roof bracket riser 238b extending upward from the base. The roof bracket base 238a is structured to seat against the roof surface. It may include a hollow recess extending upward from the bottom. The hollow recess is structured to receive a gasket or a combination of a gasket and sealant. Examples of suitable gaskets include EDPM (Ethylene Propylene Diene Monomer) rubber, or Butyl rubber. The threaded fastener 239 secures the roof-attachment bracket 238 to the module end bracket 237. The threaded fastener 239 passes through a slot-shaped opening 238c in the roof bracket riser 238b, and engages threaded aperture 231p in the end clamp body arm 231c. The stop 231f creates a downward limit of the movement of the module end bracket 237 relative to the end clamp body 231.

FIGS. 25 and 26 illustrate the module end bracket 237 in more detail. Referring to FIG. 26, the module end bracket 237 includes the end clamp body 231, a clamp jaw 232, a threaded fastener 234, and a bonding pin 236. The threaded fastener 234 passes through a slot-shaped aperture 231a in the end clamp body arm 231c and engages a threaded aperture 232a in the clamp jaw 232. FIG. 25 illustrates, in section view, the threaded fastener 234 threadedly engaging the clamp jaw 232.

Referring to FIGS. 25 and 26, the end clamp body 231 includes an upper platform 231d and a lower platform 231e extending away from the end clamp body arm 231c toward the clamp jaw 232. A backstop 231i extends upward from the upper platform 231d. The upper platform 231d is structured to seat a return flange of a solar module. The backstop 231i is structured to seat the outside perimeter side of the frame of the solar module. The clamp jaw 232 clamps the return flange of the solar module against the upper platform 231d. Referring to FIG. 25, the bonding pin 236 extends upward from a blind hole 231j in the upper platform 231d.

Referring to FIGS. 25 and 26, the upper platform 231d includes a wedge-shaped bottom surface 231k extending obliquely downward toward the end clamp body arm 231c. The clamp jaw 232 includes a wedge-engaging surface 232b. The wedge-engaging surface 232b extends obliquely downward from a cavity 232c from within the clamp jaw 232. Referring to FIG. 25, the wedge-engaging surface 232b, is illustrated at the same oblique angle as the wedge-shaped bottom surface 231k. This allows the wedge-engaging surface 232b to move up and down along the wedge-shaped bottom surface 231k. As the threaded fastener 234 is tightened or loosened, the clamping surface 232d is drawn toward or away, respectively, from the upper platform 231d.

Figure 27:
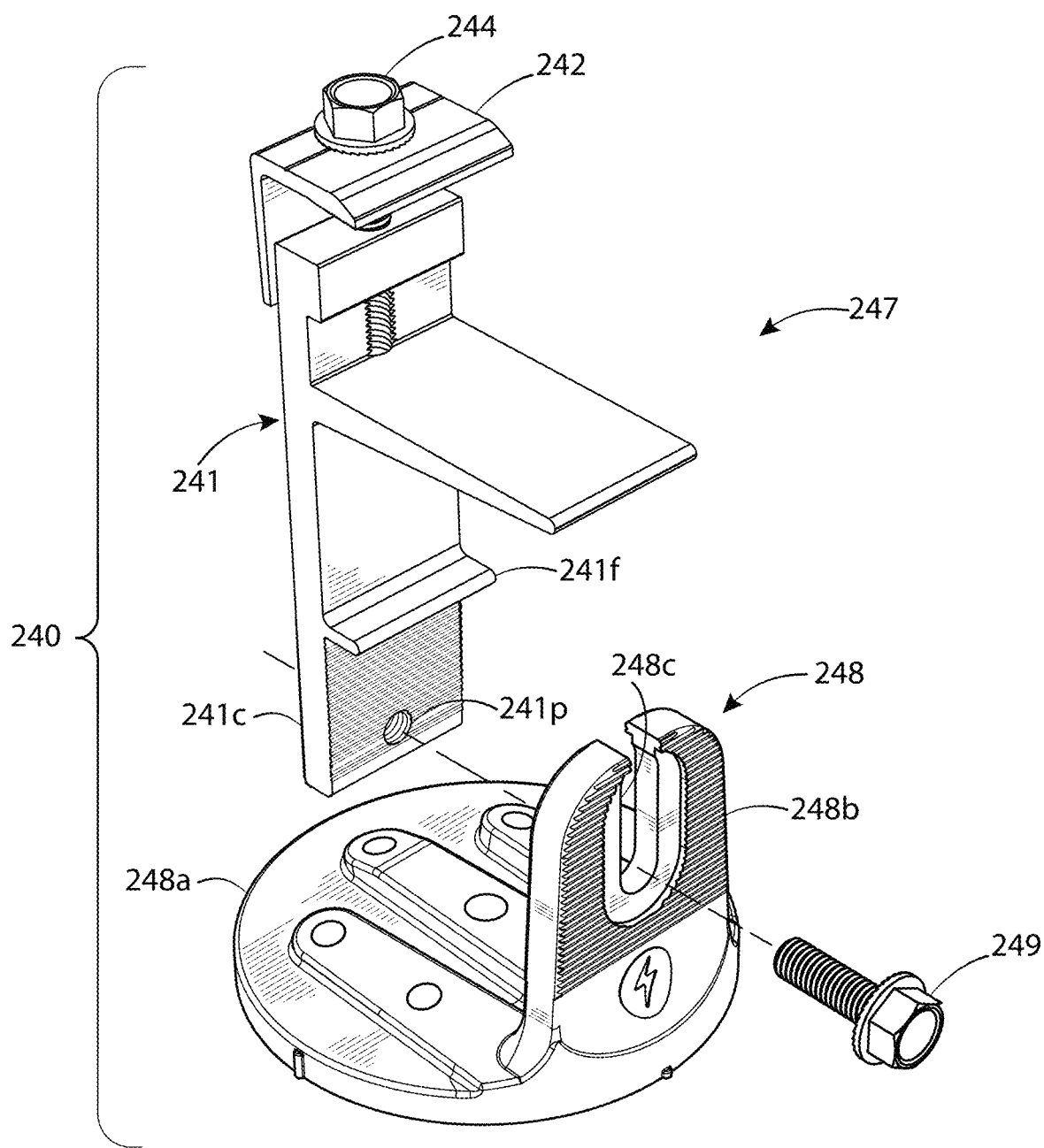
FIGS. 27-30 illustrate, in various views the edge clamp, or portions thereof, with FIG. 27 showing the edge clamp, FIGS. 28-30 showing the module edge bracket portion of the edge clamp, and with FIG. 29 showing a section view of FIG. 28 taken along section lines 29-29.
Figure 28:
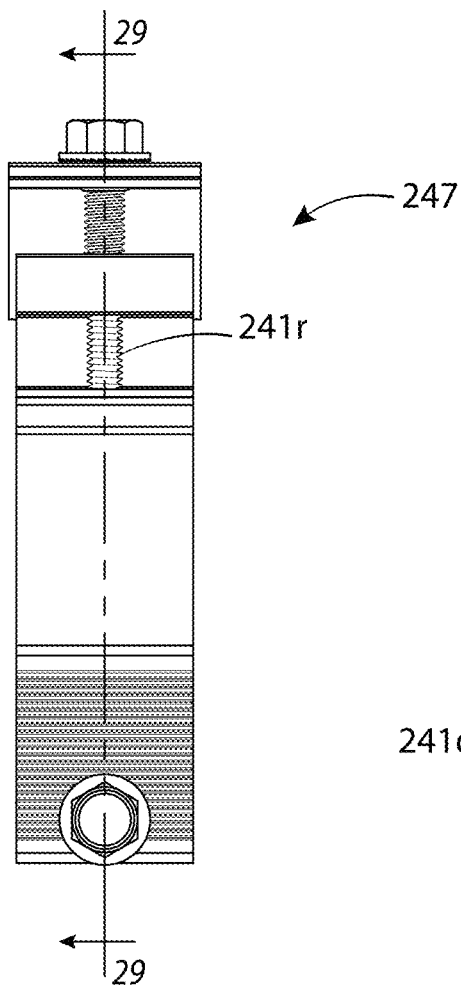
Figure 29:
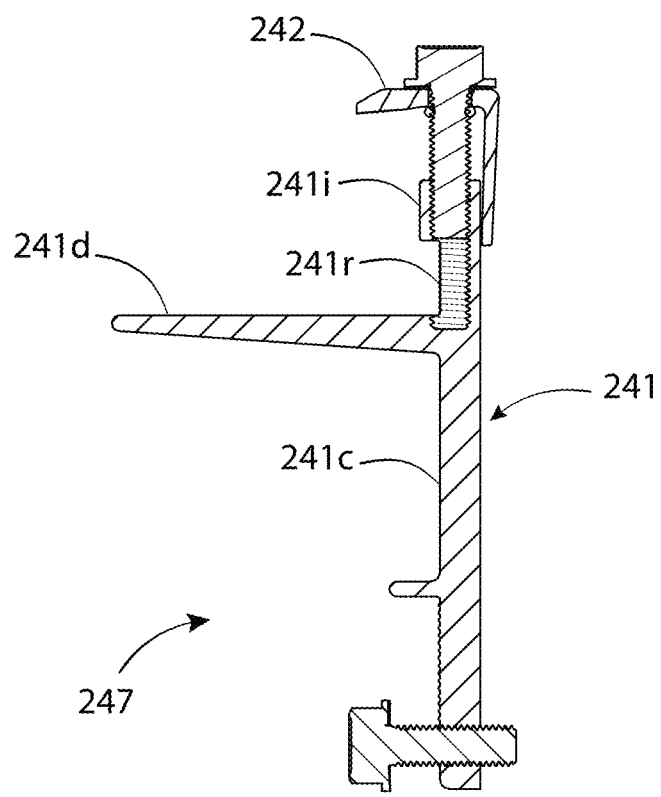
Figure 30:
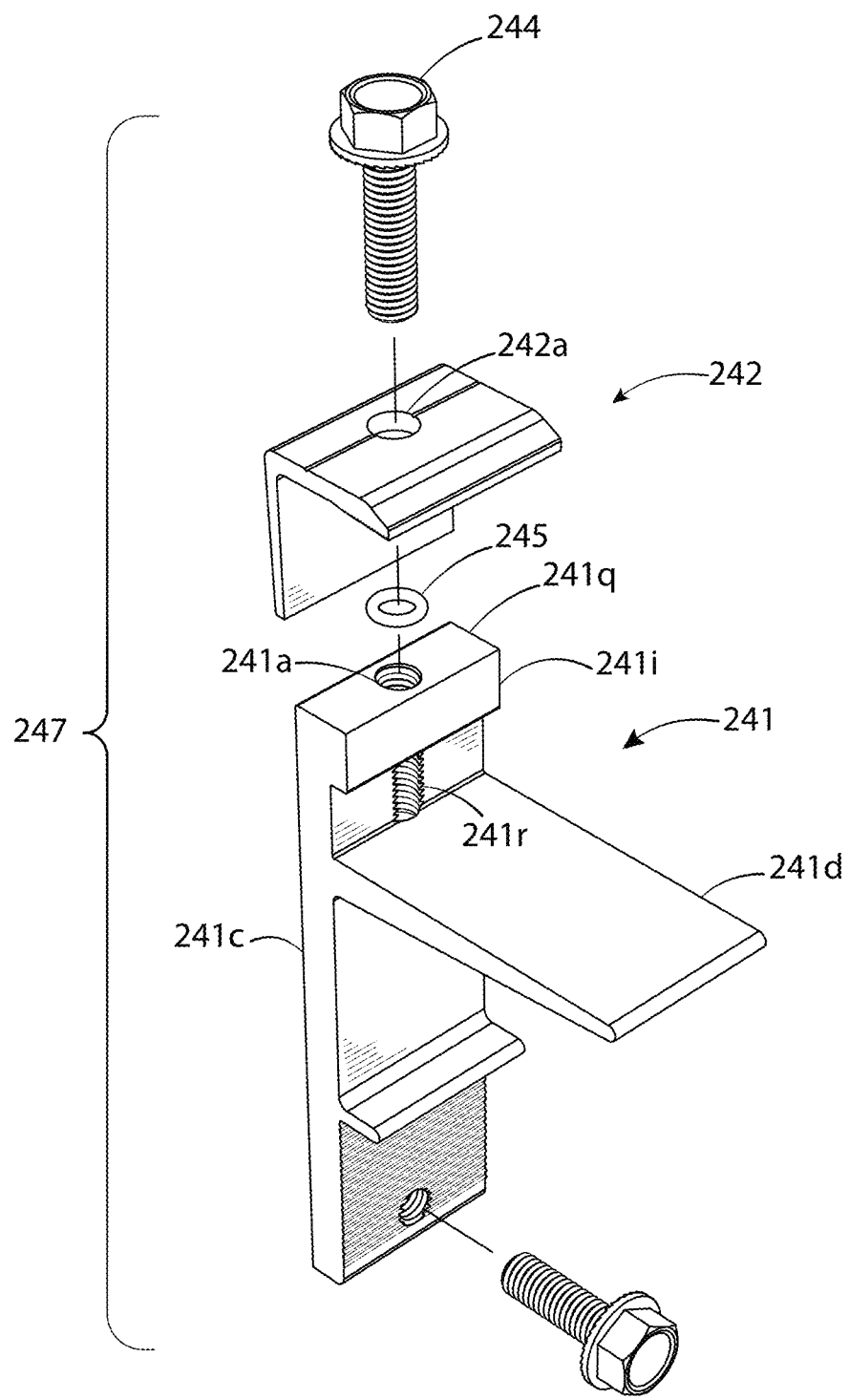

FIGS. 27-30 illustrate, in various views the edge clamp 240, or portions thereof, with FIG. 27 showing the edge clamp 240, FIGS. 28-30 showing the module edge bracket 247 portion of the edge clamp 240, and with FIG. 29 showing a section view of FIG. 28 taken along section lines 29-29. Referring to FIG. 2, the edge clamp 240 is positioned on the leading-edge of the first-row of modules. This forms the leading-edge outside boundary of the solar module system 200. The edge clamp 240 secures the leading-edge row of modules to the roof rafters.

Referring to FIG. 27, the edge clamp 240 includes a module edge bracket 247 assembly, a roof-attachment bracket 238, and a threaded fastener 249. The module edge bracket 247 includes an edge clamp body 241, a clamp jaw 242, and a threaded fastener 244. The roof-attachment bracket 248 includes a roof bracket base 248a and a roof bracket riser 248b extending upward from the base. The roof bracket base 248a is structured to seat against the roof surface as previously described for roof bracket base 238a of FIG. 23. Continuing to refer to FIG. 27, the threaded fastener 249 passes through a slot-shaped opening 248c in the roof bracket riser 248b. The threaded fastener 249 engages threaded aperture 241p in the edge clamp body arm 241c to secure the roof-attachment bracket 248 to the module edge bracket 247. Stop 241f creates a downward limit of the movement of the module edge bracket 247 relative to the roof-attachment bracket 248.

FIGS. 28-30 illustrate the module edge bracket 247 in more detail. Referring to FIG. 30, the module edge bracket 247 includes the edge clamp body 241, the clamp jaw 242, and the threaded fastener 244. The threaded fastener 244 passes through an aperture 242a in the clamp jaw 242, and engages a threaded aperture 241a in the top surface 241q in the edge clamp body 241. The threaded fastener may optionally pass through a gasket 245. Gasket 245 is illustrated as an O-ring, but may be any gasket, or spring, that is suitable for seating the clamp jaw 242 against the top surface 241q, and that provides cushioning. Referring to FIGS. 28-30, the threaded aperture 241a of FIG. 30, may include an open portion 241r, for example, as illustrated.

Referring to FIGS. 29 and 30, the edge clamp body 241 includes a platform 241d extending away from the edge clamp body arm 241c, and with a portion seated under the clamp jaw 242. A backstop 241i extends outward from the edge clamp body arm 241c in the same direction as the platform 241d. The platform 241d is structured to seat a return flange of a solar module. The backstop 241i is structured to seat the outside perimeter side of the frame of the solar module. As the threaded fastener 244 is tightened, the clamp jaw 242 clamps against the top of frame of the solar module and pushes the solar module against the platform 241d.

Assembly Method: First Embodiment

One unique aspect of the present system is the separation of the roof-securing structure from the structure that secures modules to each other. Conventional solar module systems use end clamps to secure the outside module system boundaries to the roof and mid clamps to secure adjacent modules to each other and also to the roof. In contrast, the present system primarily uses instances of end clamp 230 (FIG. 23) and instances of edge clamp 240 (FIG. 27) to secure modules to the roof and loop splices and edge splices to secure adjacent modules to one another. Loop splice 210 (FIG. 5) and edge splice 220 (FIG. 10) secure adjacent modules within a row. Loop splice 210, loop bracket 250 (FIG. 14) and module hook bracket 260 (FIG. 18) secure adjacent rows of modules together.

The Inventors observed that many efficient installation crews initially have some members working on the ground ("ground crew") while others are doing roof preparation ("roof crew"). Based on this observation, the assembly method disclosed herein, can take advantage of this. As a non-limiting example, FIGS. 31-35 provide a general assembly method that can be applied to both solar module assembly examples within this disclosure. FIGS. 36-79 apply the assembly method to the first embodiment, solar module system 200 of FIGS. 1 and 2.

Figure 31:
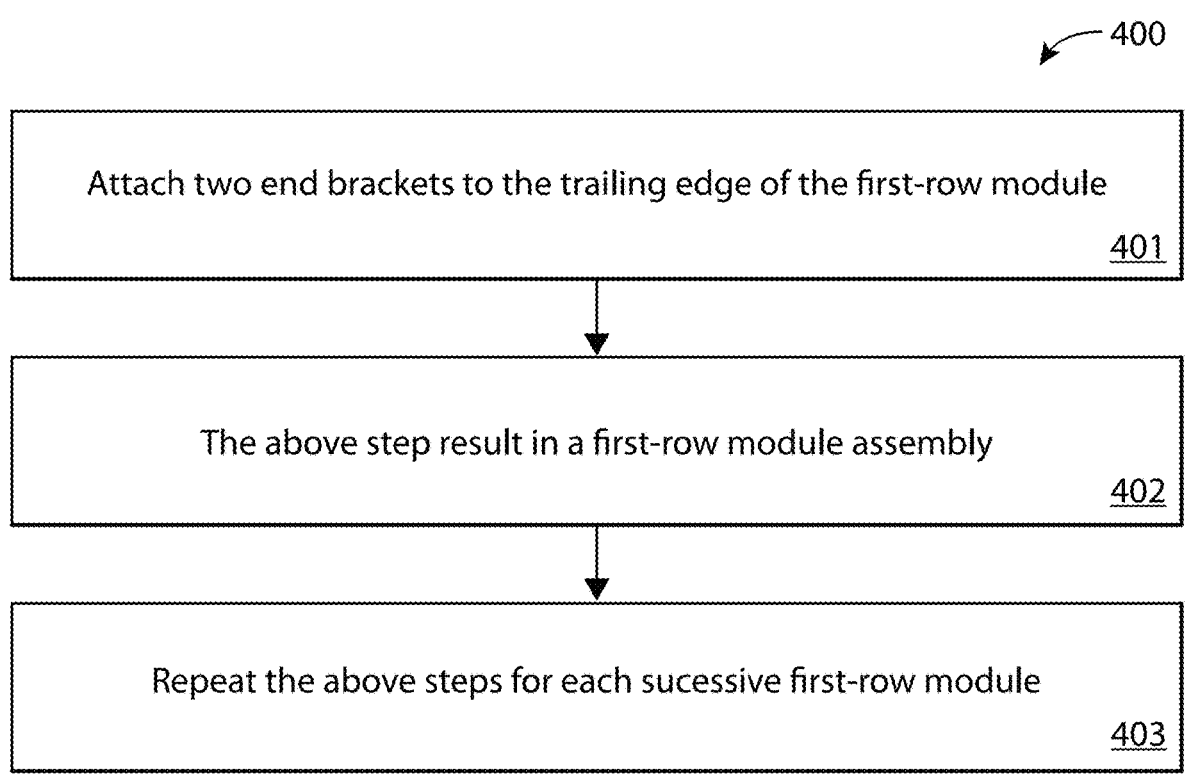
Figure 32:
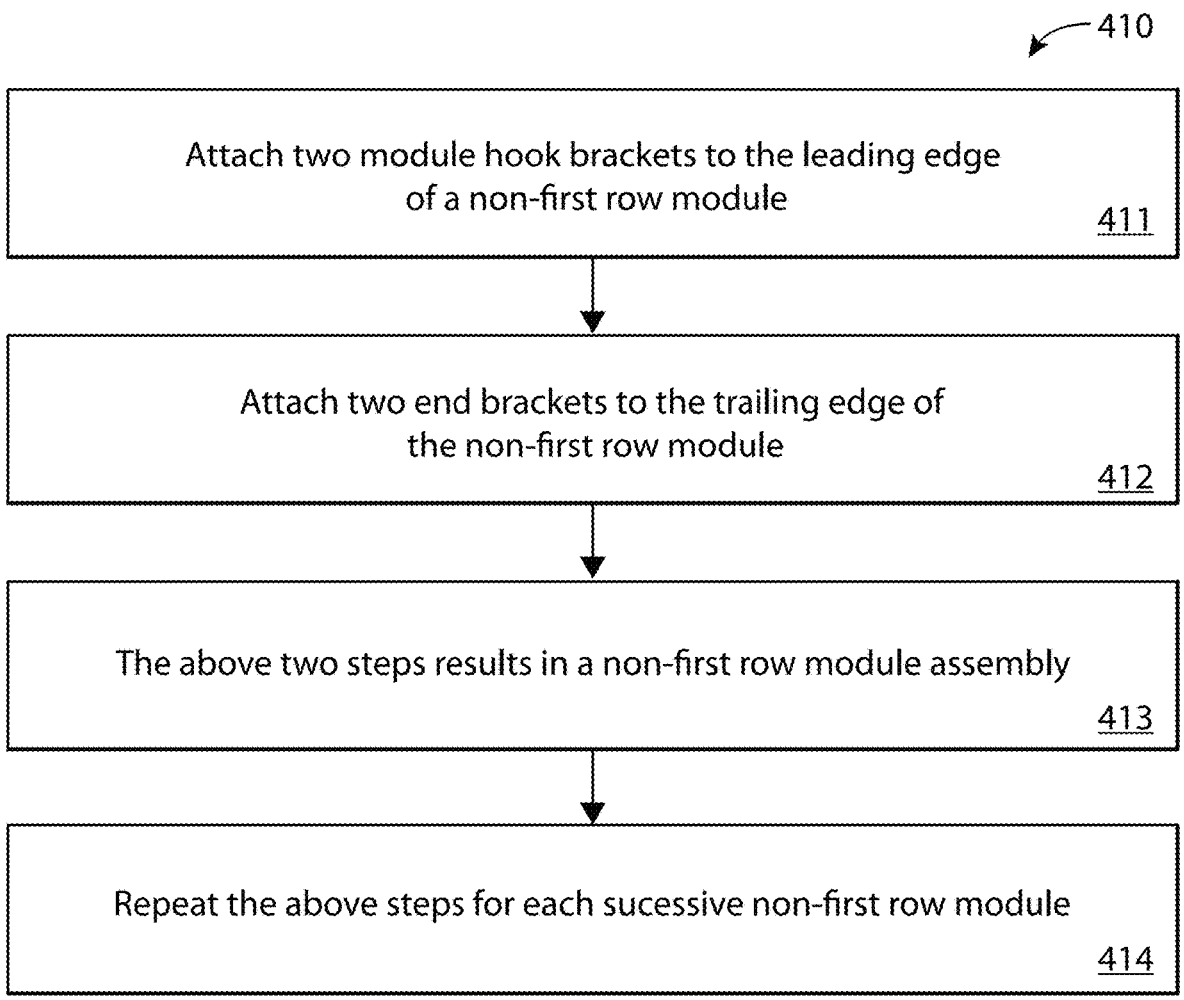

FIG. 31 shows in flow chart 400, shows the steps that a crew might take to pre-assemble the first-row solar module assemblies. FIG. 32 shows in flow chart 410, the steps that a crew might take to pre-assemble the non-first-row solar module assemblies. The Inventors envision that project managers might opt to have their ground crew perform these steps. Referring to FIG. 31, in step 401, an installer attaches two end clamps (for example, FIG. 23), to a solar module intended to be used in the first-row of the solar module system (i.e., a first-row module). In step 402, step 401 results in a first-row module pre-assembly ready for installation. In step 403, the installer may repeat these steps to assemble the remaining first-row module pre-assemblies.

Referring to FIG. 32, in step 411, the installer attaches two module hook brackets (for example, FIG. 19) to the leading-edge of a non-first-row module. In step 412, the installer attaches two end clamps (for example, FIG. 23) to the trailing-edge of the non-first-row module. In step 413, step 411 and step 412 result in a non-first-row module pre-assembly. Note that the order of performing step 411 and step 412 does not matter.

Note that for both the first-row module of flow chart 400 and the non-first-row module of flow chart 410, the install may opt to also pre-wire the modules. For example, the could install MLPE (Module Level Power Equipment), such as micro-invertors, power conditioners, or rapid shutdown devices.

The Inventor's conceive the steps in flow chart 400 and flow chart 410 being carried out on the jobsite by a ground crew. For example, a ground crew member may pre-attach the end clamps and module hook brackets to the solar modules on the ground, a work surface, or against building surfaces, such as a wall. For example, an installer may preinstall the module-roof-attachment assemblies and module hook brackets to their respective solar modules with the solar module placed face-down on the work surface or ground. The installer might lean the solar module against the side of the building and install the end clamps and module hook brackets. In either case, the installer would then carry or lift, by hand, or by mechanical assistance, the resultant solar module assemblies to the roof. While the Inventors conceive these steps being carried out on the ground of the jobsite to help divide the labor between roof crew and ground crew, in some instances, an installer might opt to pre-attach some or all of the end clamp assemblies and module hook brackets to their respective solar modules on the roof. In this example, the installer would typically place the solar module face-down on the roof during assembly.

FIGS. 36-40 illustrate, in various views, an example of carrying out the steps in flow chart 400 of FIG. 31. FIGS. 41-45, illustrate, in various views, an example of carrying out the steps in flow chart 410 of FIG. 32.

Figure 36:
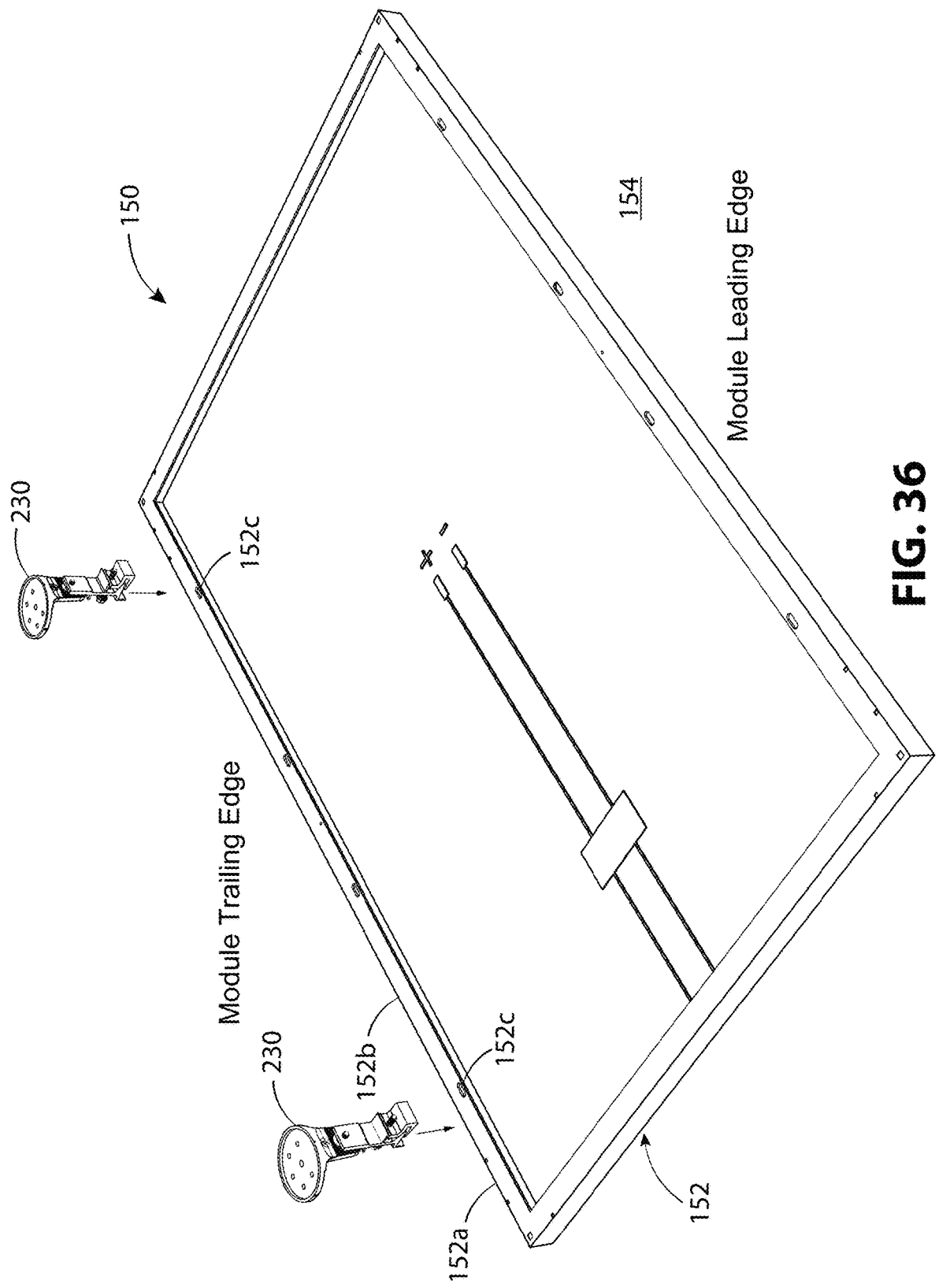
FIGS. 36-40 illustrate, in various views, an example of carrying out the steps in the flow method of FIG. 31.
Figure 37:
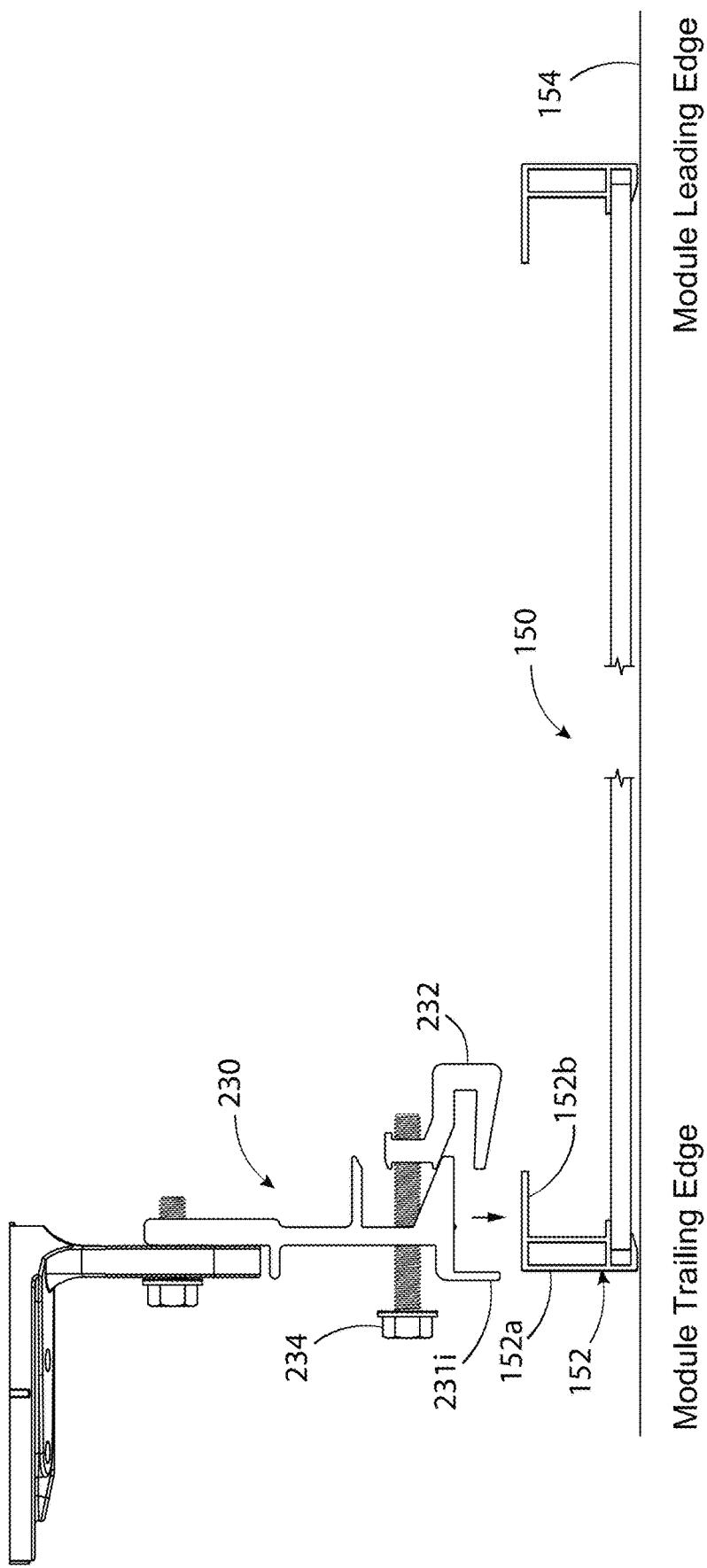

Referring to FIG. 36, the installer attaches two instances of the end clamp 230 to the outer side 152*a* and the return flange 152*b* of frame 152 of solar module 150. The end clamp 230 are secured to the trailing-edge of the frame 152. For consistency, the installer may align the instances of the end clamp 230 to indicia on the return flange 152*b*, such as manufacturer-provided mounting holes 152*c*. The position of the instances of the end clamp 230 is not critical as they initially provide temporary support and will be adjusted to their final positions by the roof crew. FIG. 37 shows the installation of one instance of the end clamp 230, in side view, with part of the frame 152 of the solar module 150 is cutaway to reveal details on how the end clamp 230 mounts to the frame 152. In FIG. 37, the threaded fastener 234 of the end clamp 230 is sufficiently loosened to allow the end of the clamp jaw 232 to clear the end of the return flange 152*b*. The threaded fastener 234 is also sufficiently loosened to allow the backstop 231*i* to clear the outer side 152*a* of the frame 152.

Figure 38:
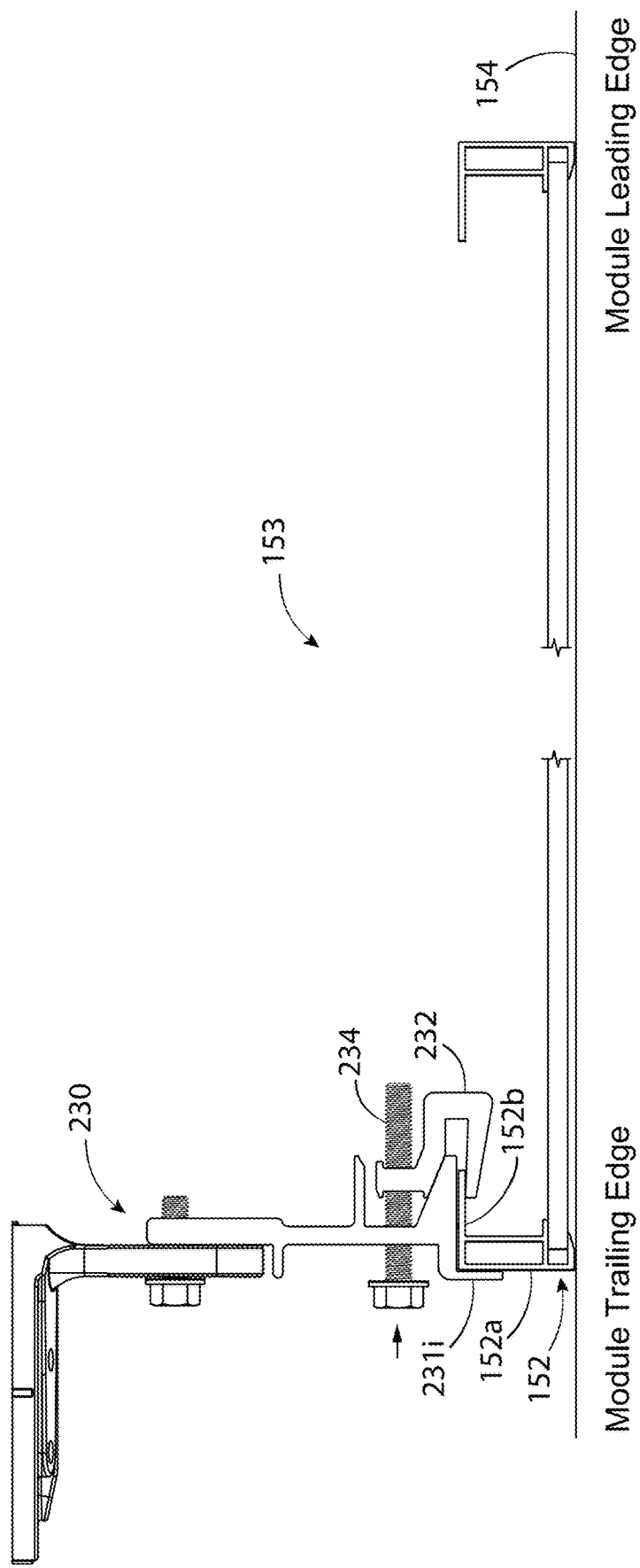
Figure 39:
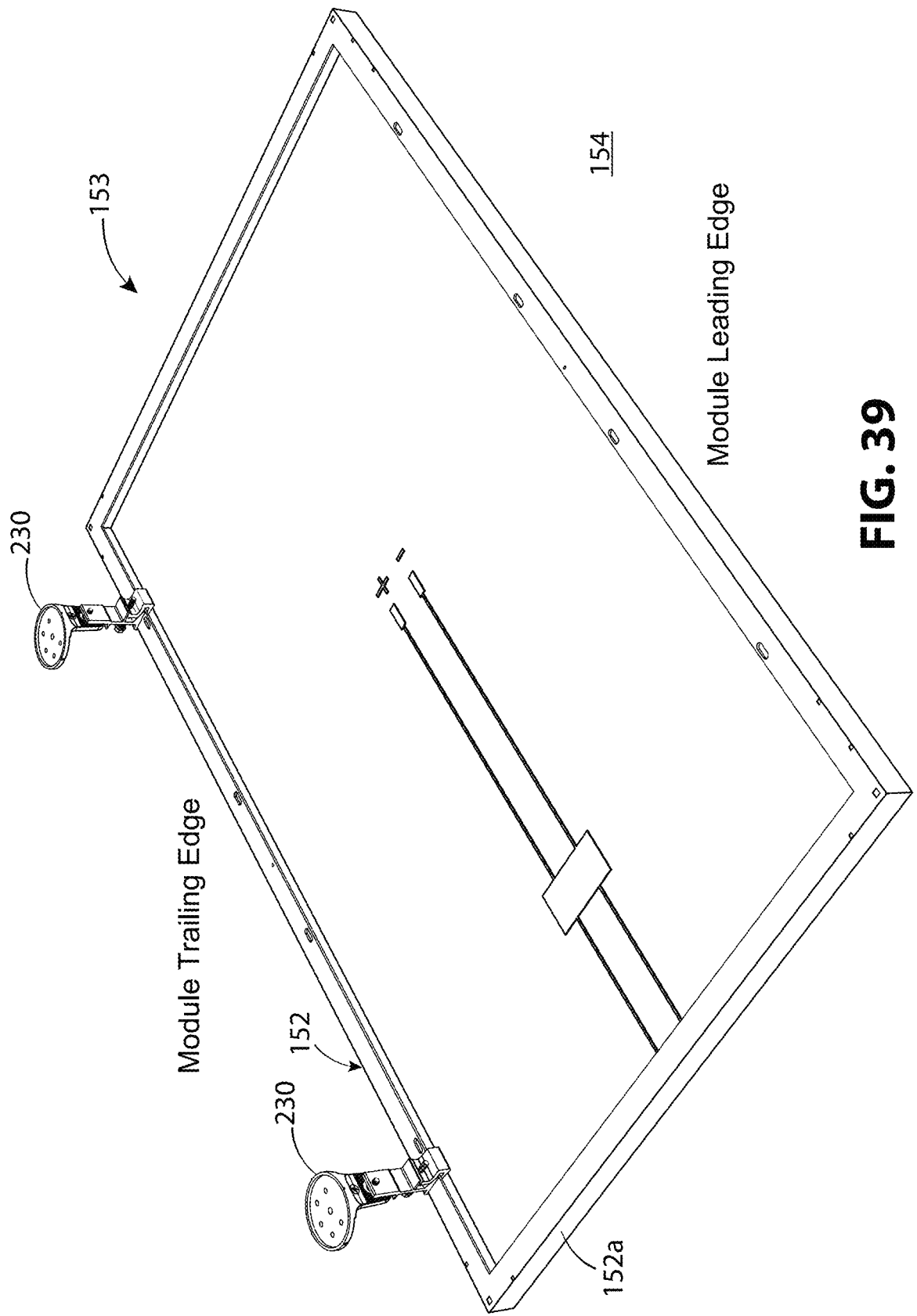
Figure 40:
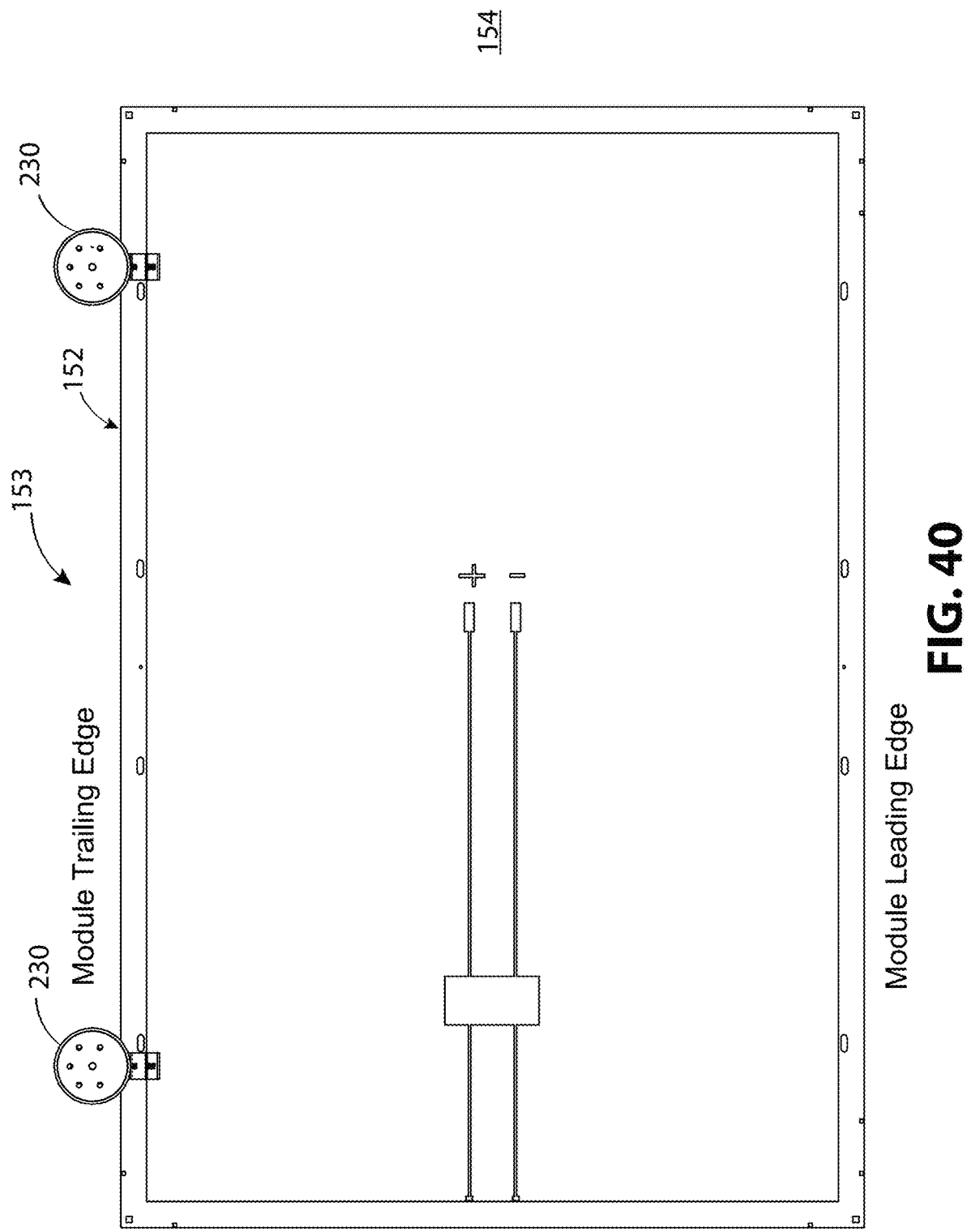

FIGS. 38, 39 and 40, shows the completed assembly, the first-row module assembly 153, with the end clamp 230 secured to the frame 152, ready for installation and attachment to the roof. In FIG. 38, the installer has tightened the threaded fastener 234 to draw the clamp jaw 232 inward over the return flange 152*b* and upward against the return flange 152*b*. The backstop 231*i* is pressed against the outer side 152*a* of the frame 152. The outer side 152*a* relative to the end clamp 230 is also shown in FIG. 39.

Figure 41:
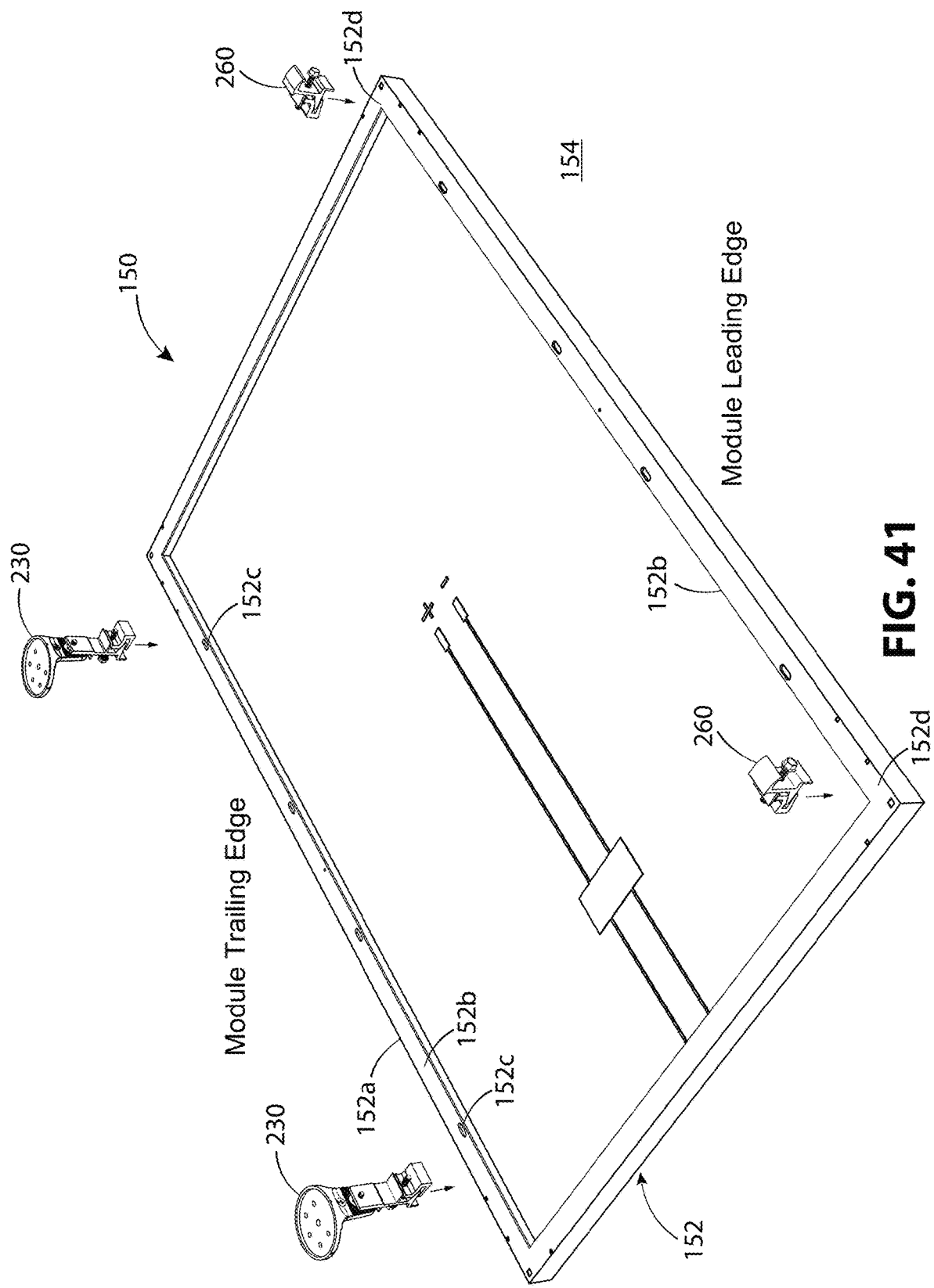
FIGS. 41-45, illustrate, in various views, an example of carrying out the steps in flow chart of FIG. 32.
Figure 42:
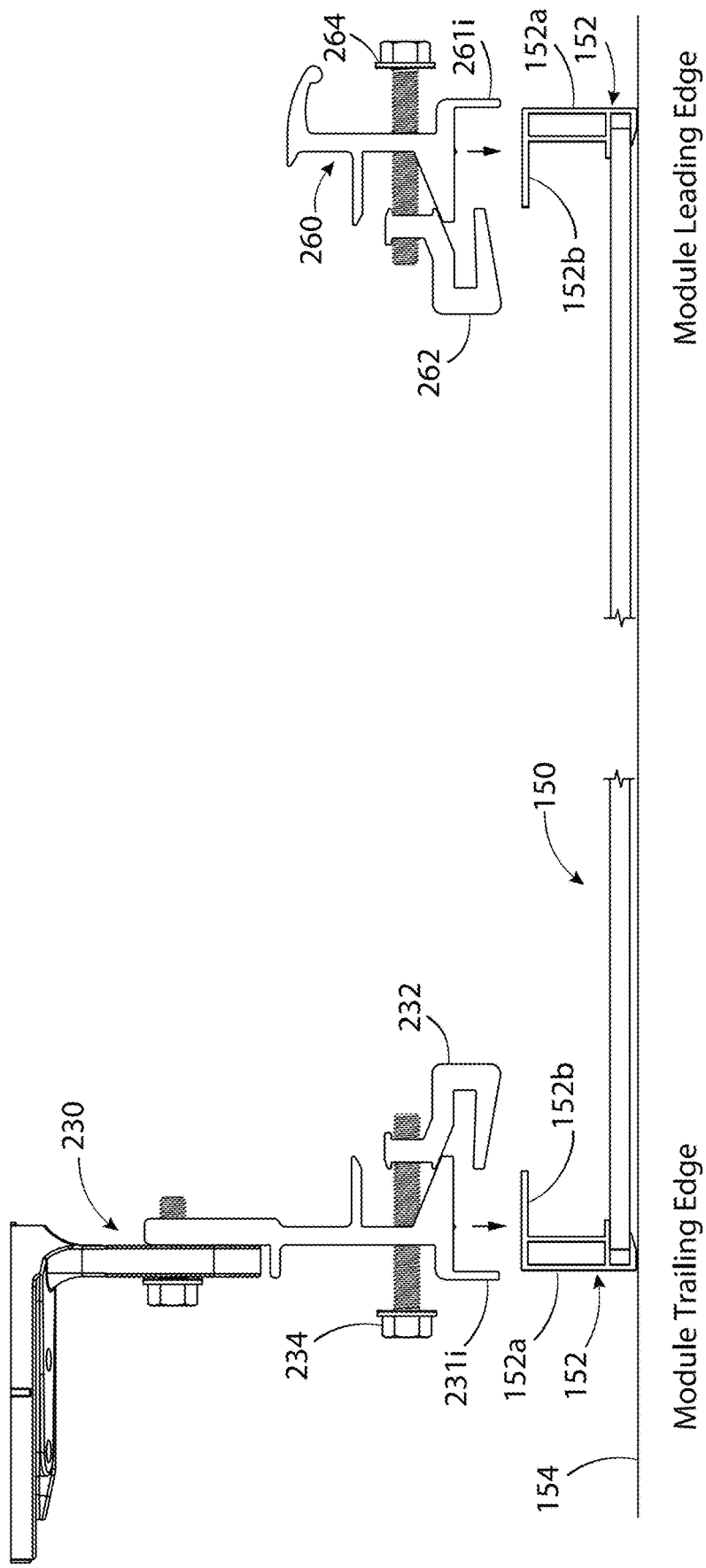

FIGS. 41-45 illustrate the pre-assembly procedure for non-first row modules. Referring to FIG. 41, the installer attaches two instances of the end clamp 230 to the outer side 152*a*, and the return flange 152*b* of frame 152 of solar module 150. The end clamp 230 are secured to the trailing-edge of the frame 152. For consistency, the installer may align the instances of the end clamp 230 to indicia on the return flange 152*b*, such as manufacturer-provided mounting holes 152*c*. The position of the instances of the end clamp 230 is not critical as they initially provide temporary support and will be adjusted to their final positions by the roof crew. The installer also attaches two instances of the module hook bracket 260 to opposite inside corners 152*d* of the return flange 152*b* on the leading-edge of the frame 152. FIG. 42 shows the installation of one instance of the end clamp 230 and module hook bracket 260, and one instance of the module hook bracket 260, in side view. Part of the frame 152 of the solar module 150 is cutaway to reveal details on how the end clamp 230 and module hook bracket 260 mounts to the frame 152. In FIG. 42, the threaded fastener 234 of the end clamp 230 is sufficiently loosened to allow the end of the clamp jaw 232 to clear the end of the return flange 152*b*. The threaded fastener 234 is also sufficiently loosened to allow the backstop 231*i* to clear the outer side 152*a* of the frame 152. Similarly, the threaded fastener 264 of the module hook bracket 260 is sufficiently loosened to allow the end of the clamp jaw 262 to clear the end of the return flange 152*b*, and the backstop 261*i* to clear the outer side 152*a* of the frame 152.

Figure 43:
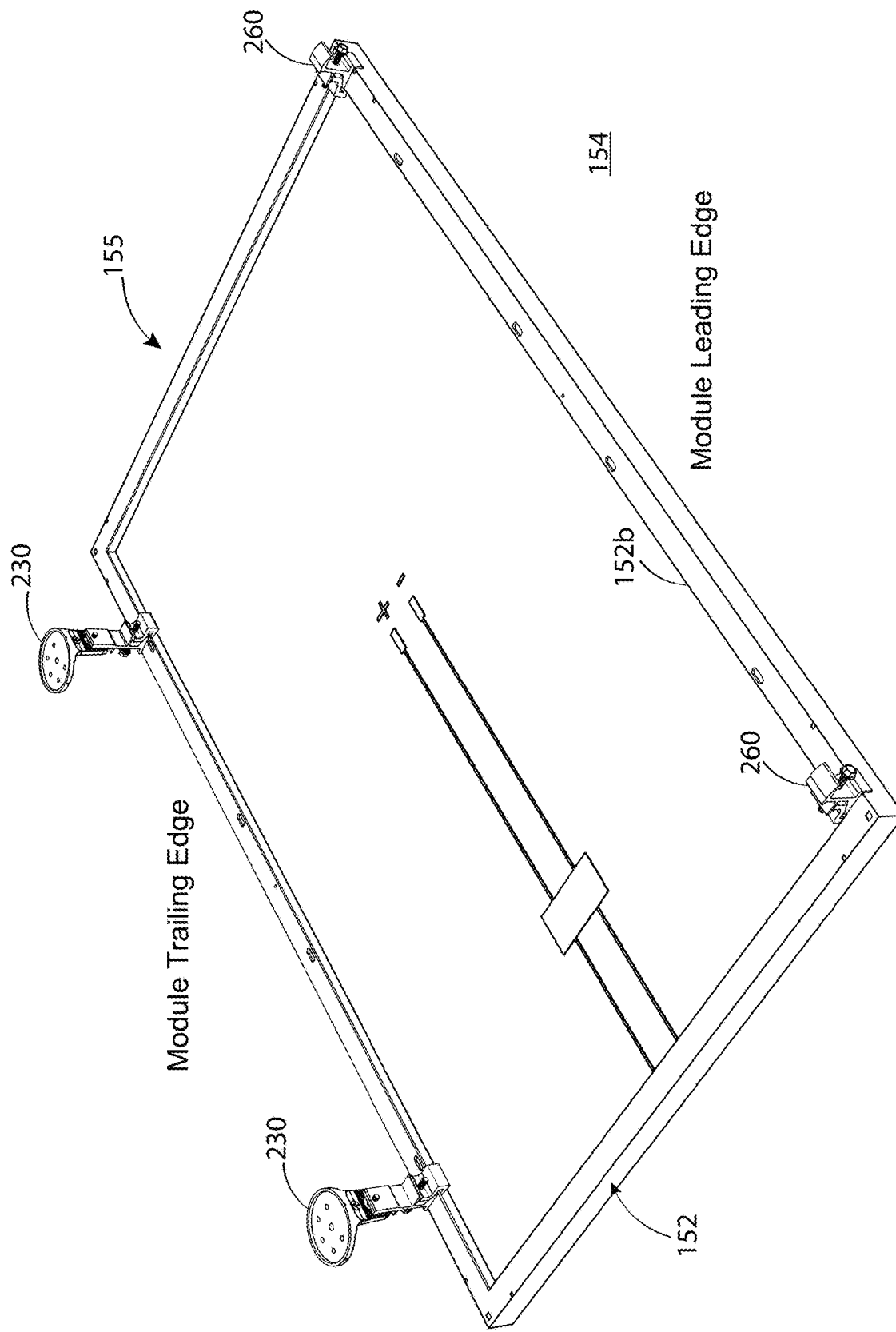
Figure 44:
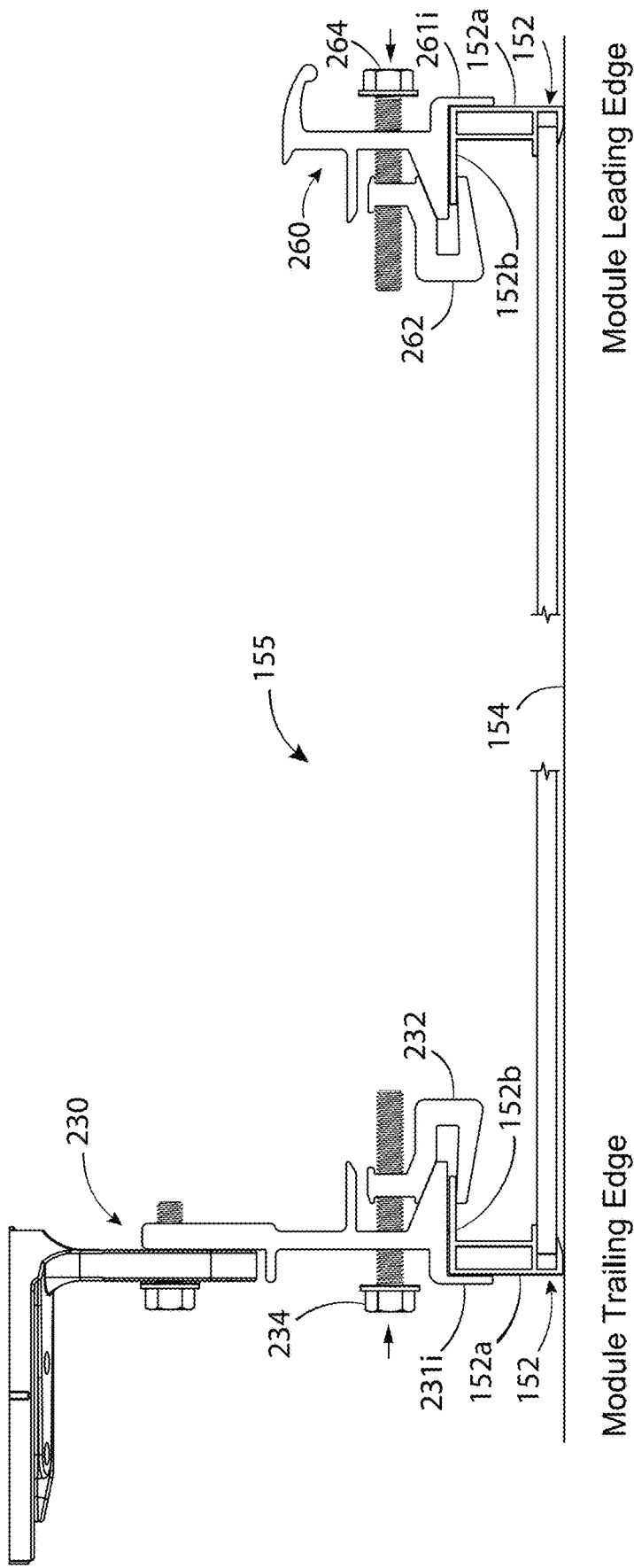
Figure 45:
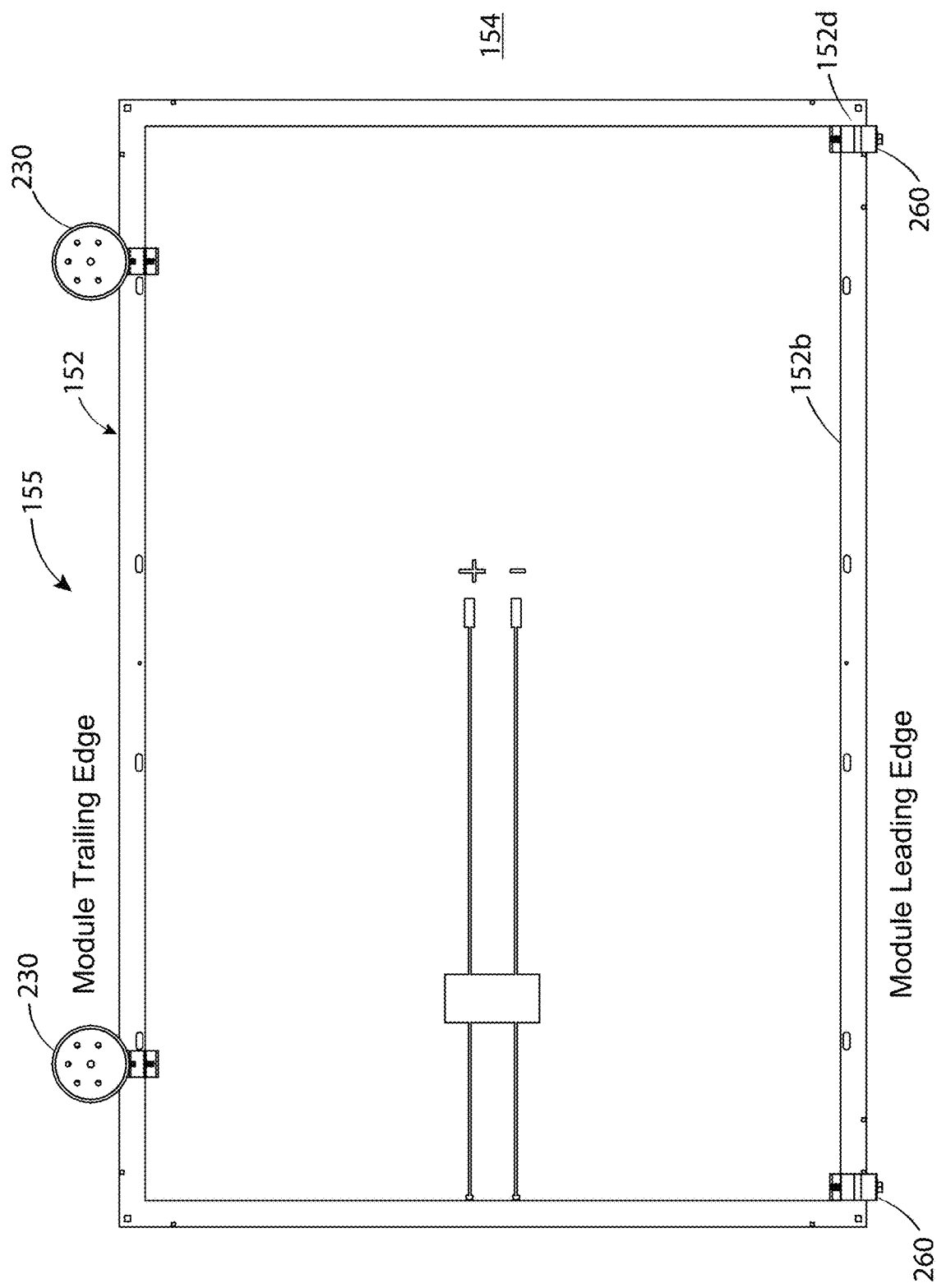

FIGS. 43, 44 and 45, shows the completed assembly, the non-first-row module assembly 155, with instances of the end clamp 230 and the module hook bracket 260 secured to the frame 152, ready for installation and attachment to the roof. In FIG. 44, to install end clamp 230, the installer has tightened the threaded fastener 234 to draw the clamp jaw 232 inward over the return flange 152*b* and upward against the return flange 152*b*. The backstop 231*i* is pressed against the outer side 152*a* of the frame 152. To install module hook bracket 260, the installer has tightened the threaded fastener 264 to draw the clamp jaw 262 inward over the return flange 152*b* and upward against the return flange 152*b*. The backstop 261*i* is pressed against the outer side 152*a* of the frame 152. FIGS. 43 and 45 illustrates the module hook bracket 260 positioned against the opposite corners of the return flange 152*b* on the leading-edge of the non-first-row module assembly 155.

FIGS. 36 and 37 illustrate the solar module 150 and FIGS. 38-40 illustrate the first-row module assembly 153 positioned face-down on a work surface 154. FIGS. 41 and 42 illustrate the solar module positioned face-down on a work surface 154. FIGS. 43-45 illustrate the non-first-row module assembly 155 also positioned face-down on a work surface 154. A non-limiting example of a work surface may include the ground, a work bench, work vehicle, table, saw horse, or other jobsite work surface. As previously discussed, the solar module 150, first-row module assembly 153, or non-first-row module assembly 155, could also be pre-assembled against a wall or other surface of the building structure.

Figure 46:
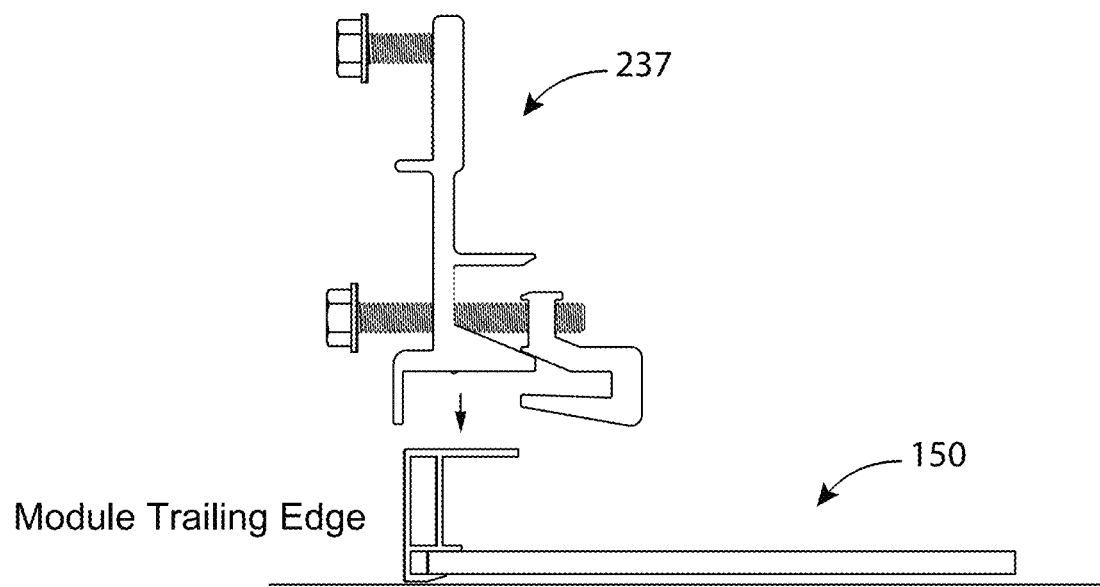
FIGS. 46-49 illustrate an alternative sequence of attaching the end clamp to the frame of the solar module.
Figure 47:
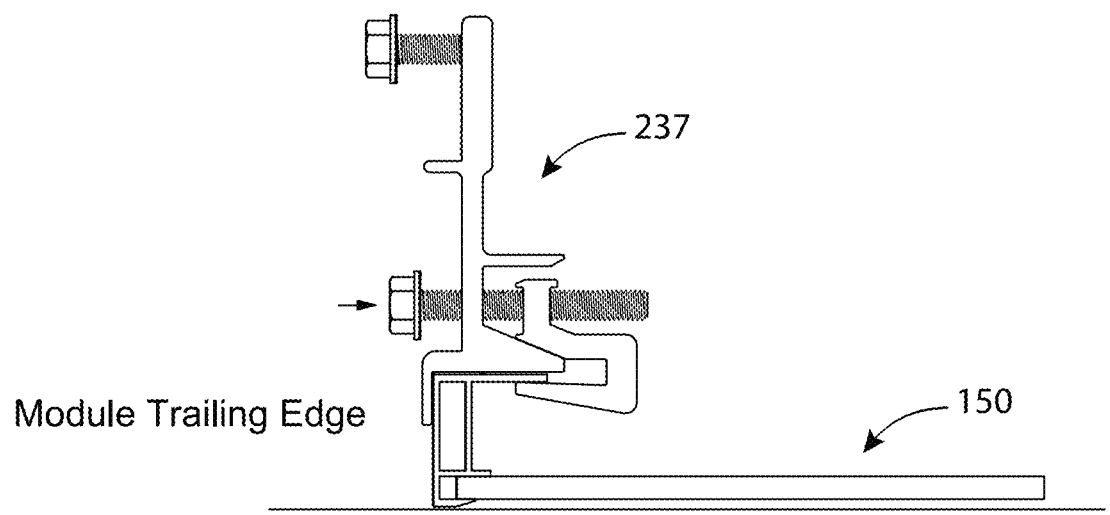
Figure 48:
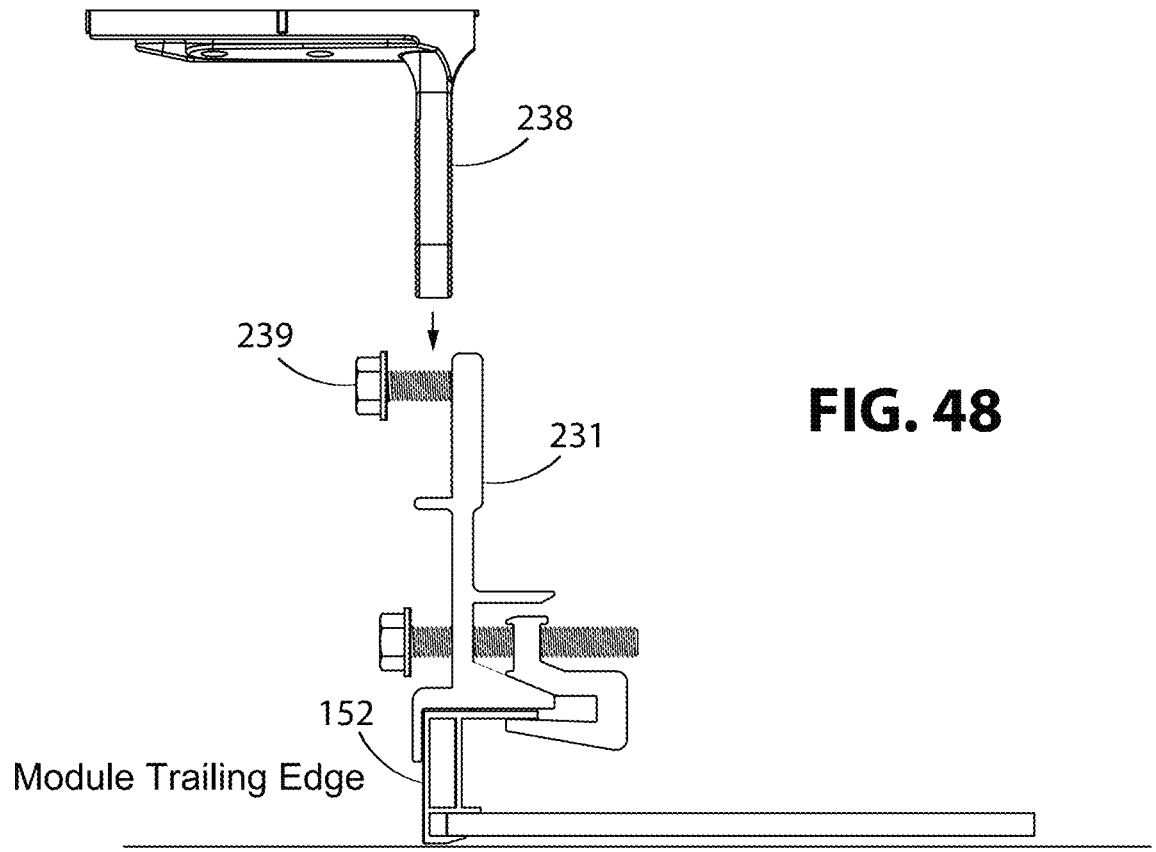
Figure 49:
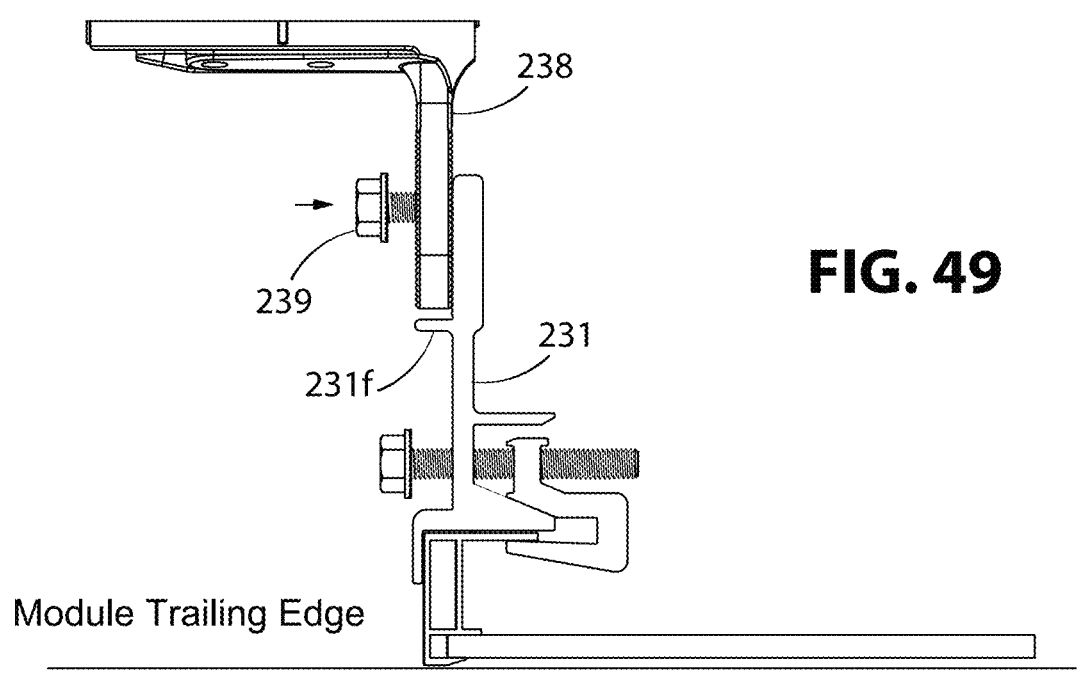

FIGS. 36, 37, 41, and 42 show instances of end clamp 230 being secured to the frame 152 as a unit. An installer could opt to install the module end bracket 237 first and then install the roof-attachment bracket 238. FIGS. 46-49 illustrate this sequence. In FIGS. 46 and 47 the module end bracket 237 is secured to a solar module 150 as previously discussed for the end clamp 230 in FIGS. 37, 38, 42, and 44. Referring to FIG. 48, with the end clamp body 231 secured to the frame 152, the installer may then slide the roof-attachment bracket 238 over the threaded fastener 239, which is loosened. Referring to FIG. 49, with the roof-attachment bracket 238 slid over the threaded fastener 239, the installer tightens the threaded fastener 239 to secure the roof-attachment bracket 238 to the end clamp body 231. The stop 231f can be used as a reference to adjust multiple instances of the roof-attachment bracket 238 to the same height.

Figure 33:
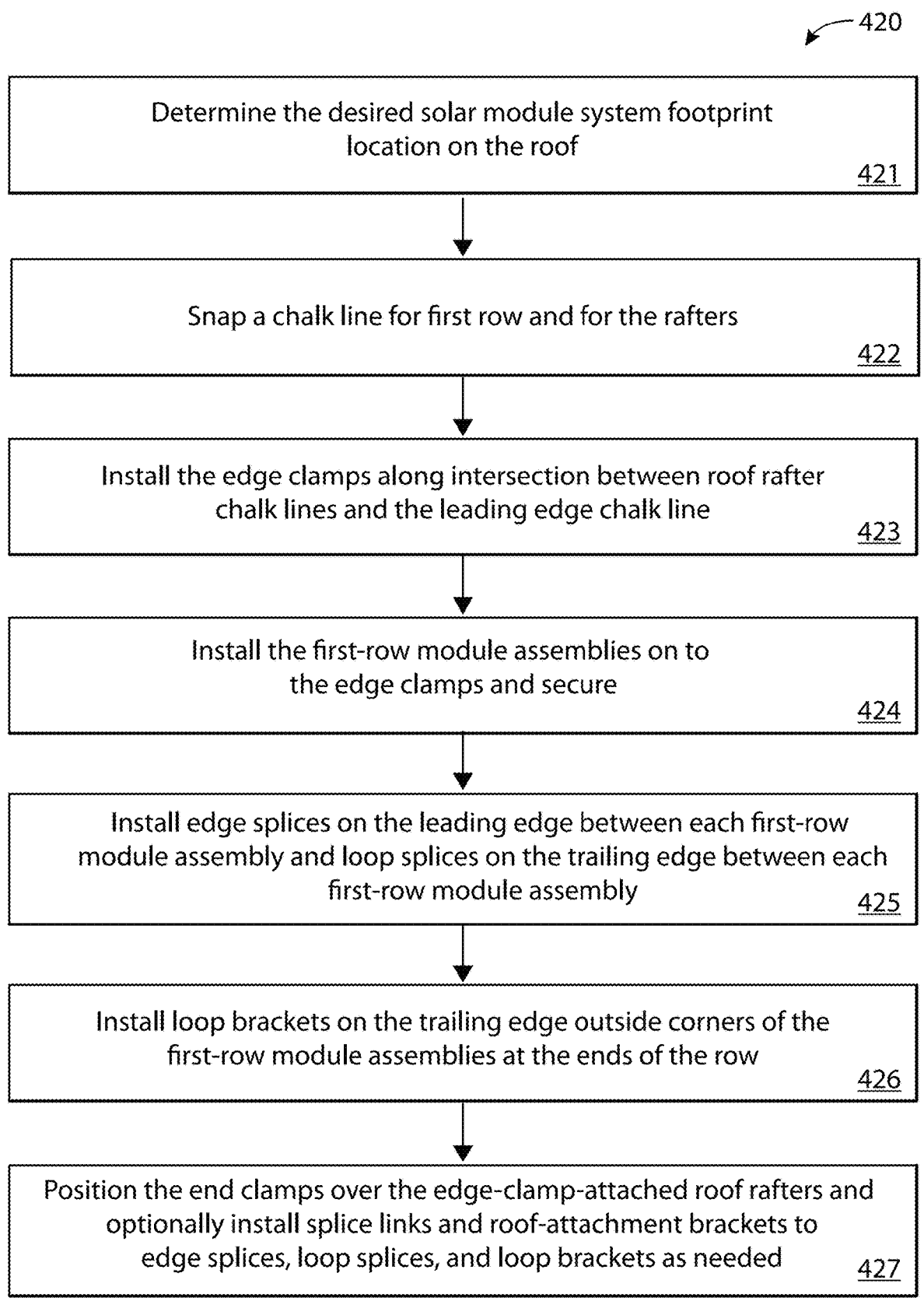
Figure 34:
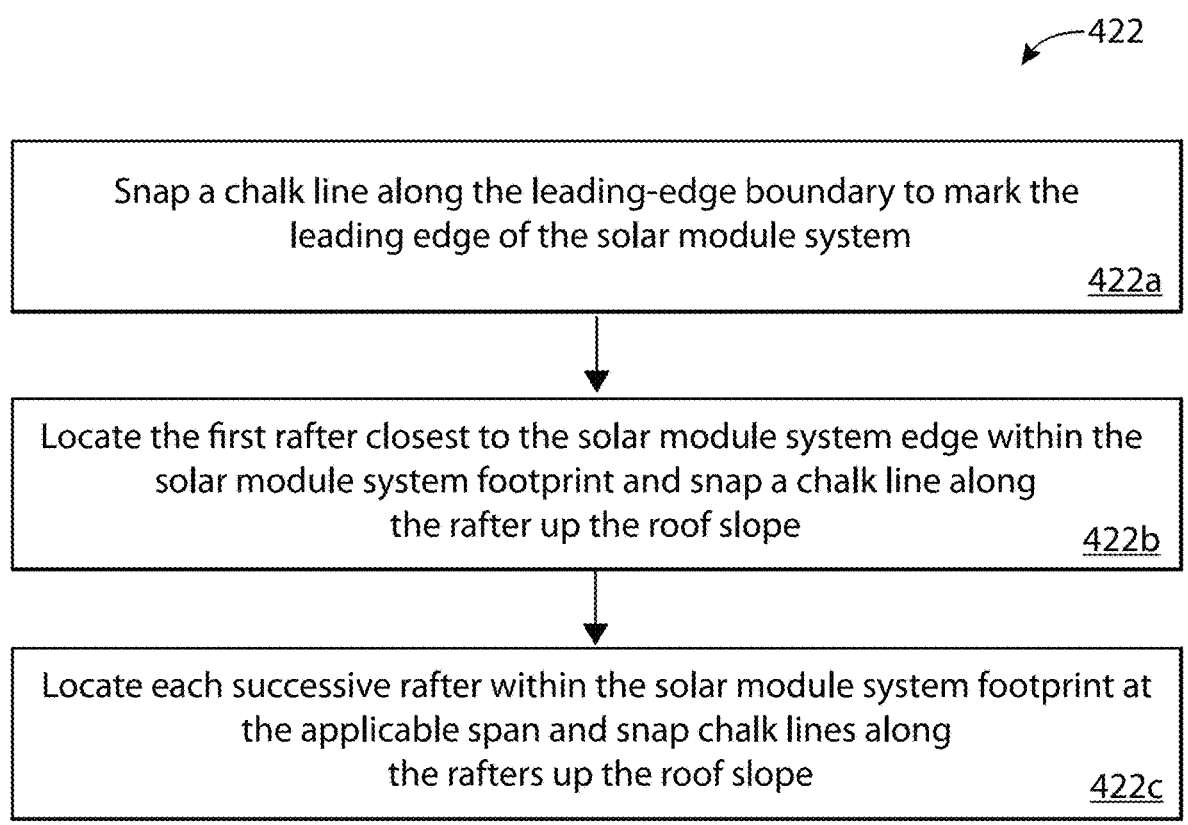

Referring to flow chart 420 in FIG. 33, in step 421, an installer would determine the solar module system footprint on the roof. With the boundaries of the solar module system established, in step 422, an installer snaps chalk lines or otherwise marks the first-row and roof rafters. Referring to FIG. 34, which shows step 422 in more detail, in step 422a, the installer snaps a chalk line or otherwise indicates the solar module system leading-edge boundary. Typically, this will be parallel to the front edge of the roof. In step 422b, the installer locates the position of the first roof rafter that is closest to the edge of the solar module system boundary. With the roof rafter located, the installer marks a chalk line or some other indication, to mark the location of the roof rafter. In step 422c, the installer then marks the location of each subsequent roof rafter that is located at the desired support span. For example, if the system is to be supported at a span of 6 feet (1.83 meters), then the installer would locate the roof rafters located 6 feet (1.83 meters) apart and mark them with a chalk line or some other indication. Referring to FIG. 33, in step 423, the installer installs edge clamps along the intersection of each roof rafter chalk line and the leading-edge chalk line within the solar module system boundary.

Figure 50:
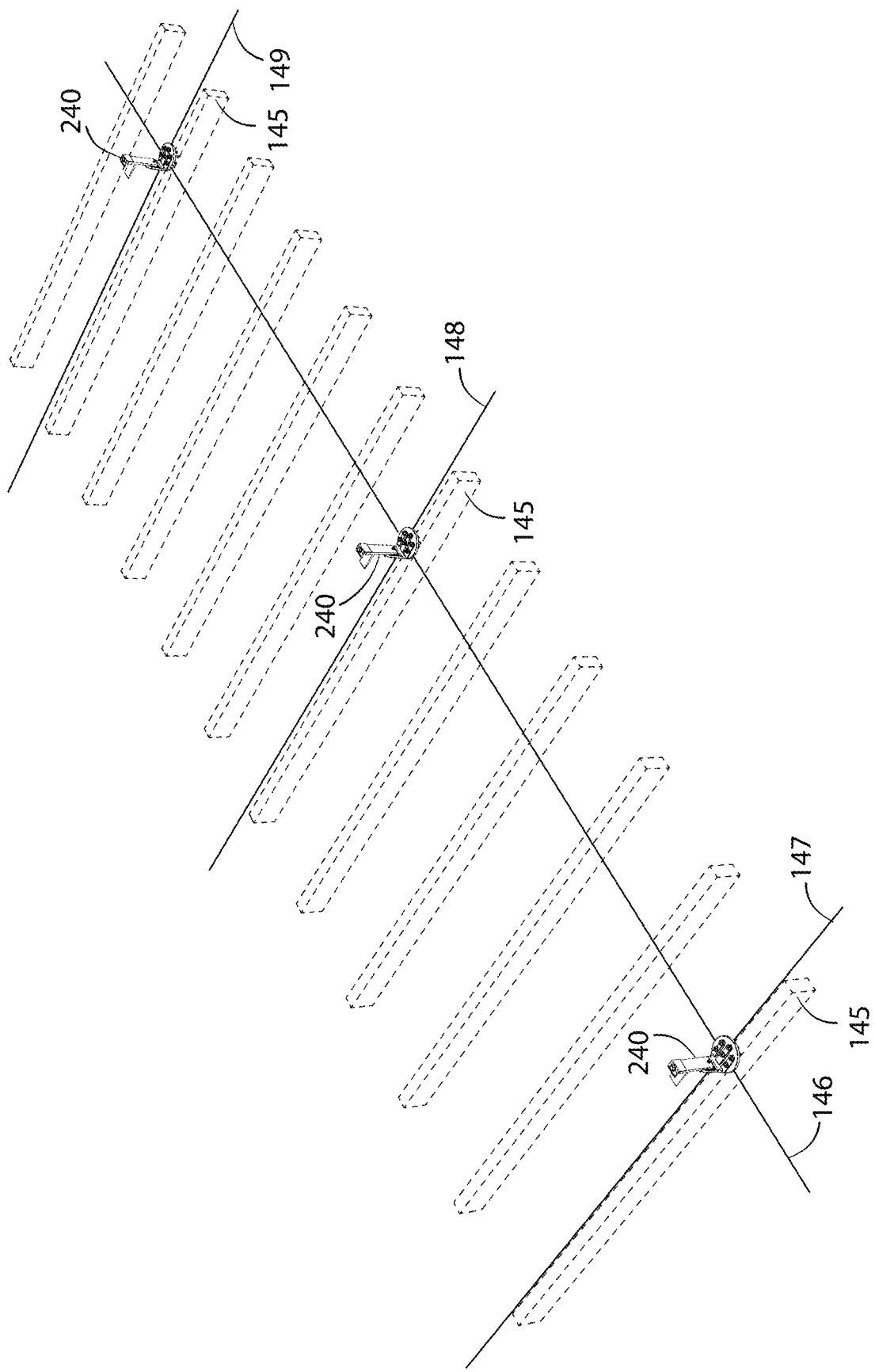

FIG. 50 illustrates the results of step 422 and step 423. Instances of roof rafter 145 are shown in dashed lines indicating that they are hidden from view. Referring to FIG. 50, chalk line 146 marks the leading-edge, or front edge of the solar module boundary. Chalk line 147, chalk line 148, and chalk line 149 are drawn over the center line of instances of roof rafter 145 that are spaced apart at the desired pre-determined spacing. The installer positioned instances of the edge clamp 240 where the roof rafter chalk lines, chalk line 147, chalk line 148, and chalk line 149 cross the leading-edge chalk line, chalk line 146.

Figure 53:
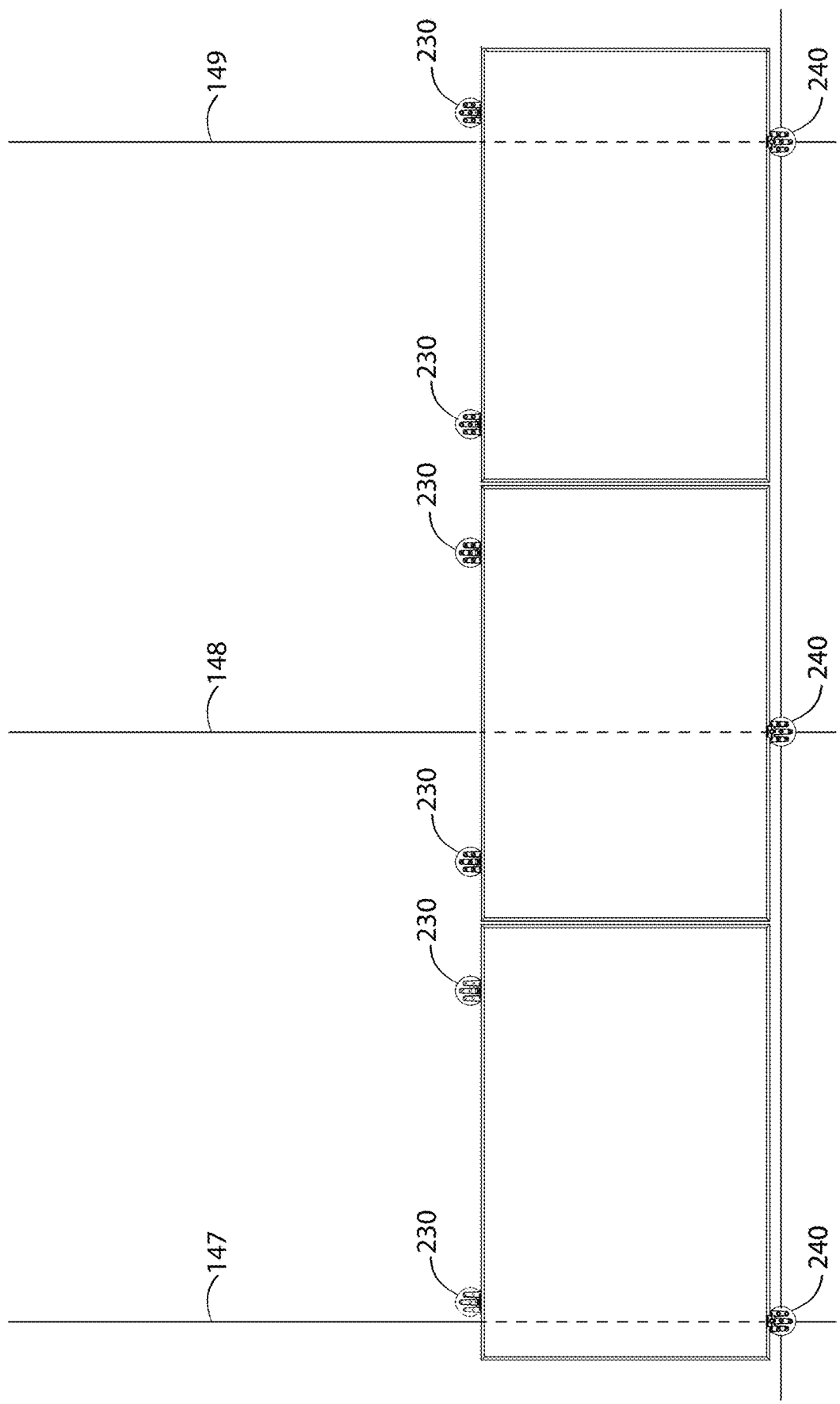

Referring to FIG. 33, in step 424, with the edge clamps secured to the roof, the installer secures each first-row module assembly to corresponding edge clamps. FIGS. 51-53, illustrate an example of how an installer may carry out this step. Referring to FIG. 51, the installer places the first-row module assembly 153, face up, with the end clamp 230 against or near the roof surface, and the installer slides, or otherwise moves, the assembly toward the edge clamp 240 between the platform 241d and clamp jaw 242. Referring to FIG. 52, with the solar module 150 positioned between the clamp jaw 242 and platform 241d, the installer tightens threaded fastener 244 to secure the solar module 150 to the edge clamp 240. Referring to FIG. 53, while the installed instances of edge clamp 240 are installed over the roof rafter chalk lines, chalk line 147, chalk line 148, and chalk line 149, instances of end clamp 230 are temporarily positioned to help create stability during the installation process.

Referring to FIG. 33, in step 425, with first-row module assemblies secured to the installed instances of the edge clamp, the installer secures edge splices on the leading-edge between each first-row module assembly. The installer installs loop splices on the trailing-edge between each first-row module assembly. The edge splices provide rigidity between the front portions of adjacent modules. The loop splices provide rigidity between the rear portions of adjacent modules and also provide an attachment interface for the subsequent row of modules. In step 426, the installer installs loop brackets on the trailing-edge outside corners of the first-row module assembly at the ends of the row. Looking toward the front of the solar module assembly, the loop brackets are positioned at the left-most and right-most inside corners of the trailing-edge of the first-row.

In step 427, the installer moves some of the end clamps from their temporary position and positions them over the edge-clamp-attached roof rafters and secures them to the roof rafters. The installer may then remove the remaining temporarily-positioned end clamps for reuse. If any of the loop splices, edge splices, or loop brackets fall over one of the edge-clamp-attached roof rafters, this would prevent the installer from installing and securing an end clamp in that position because the other component is already there. The installer may instead attach the loop splice, edge splice, or loop bracket to the roof using a splice link and loop attachment bracket.

Figure 54:
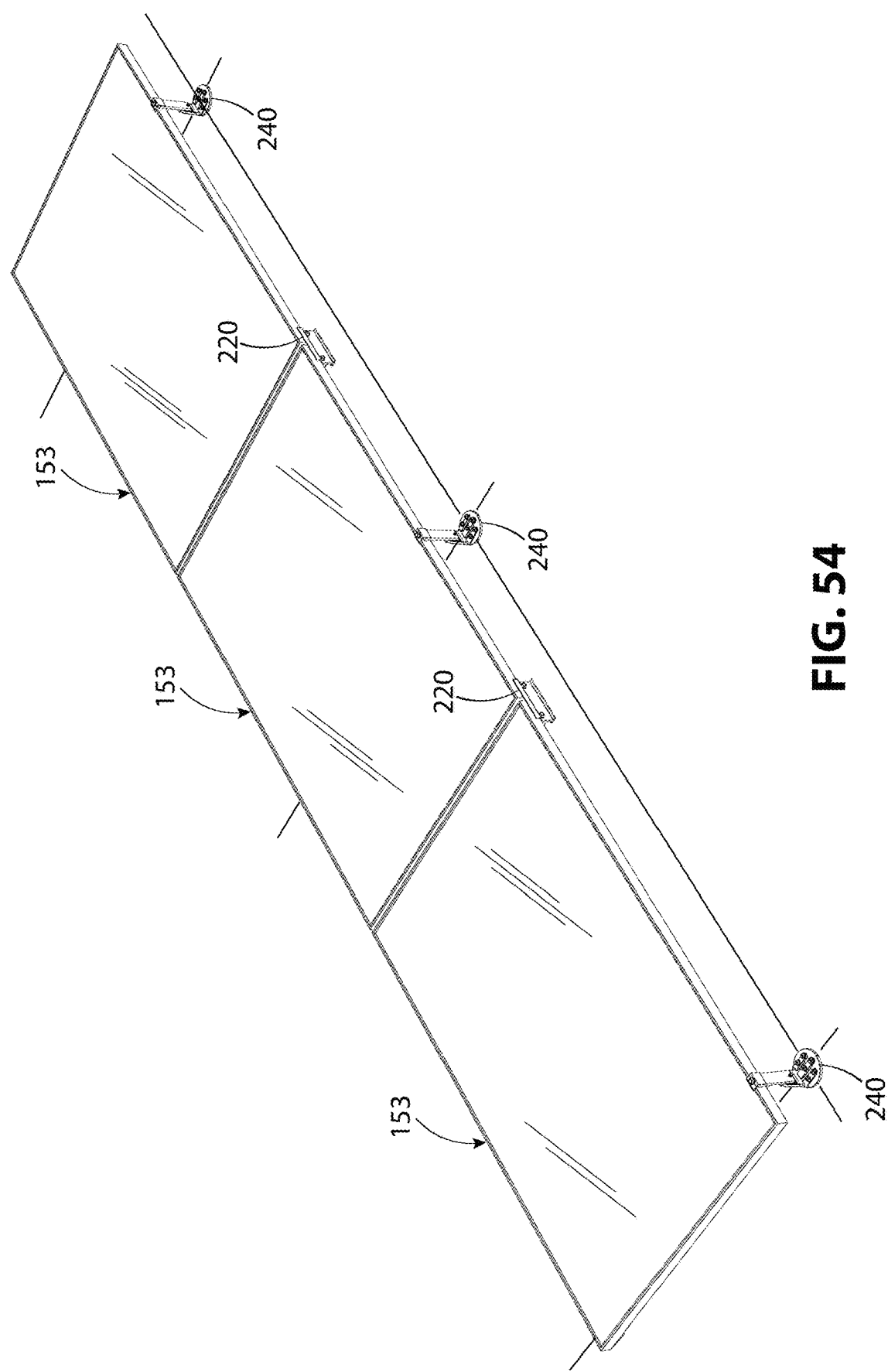
Figure 55:
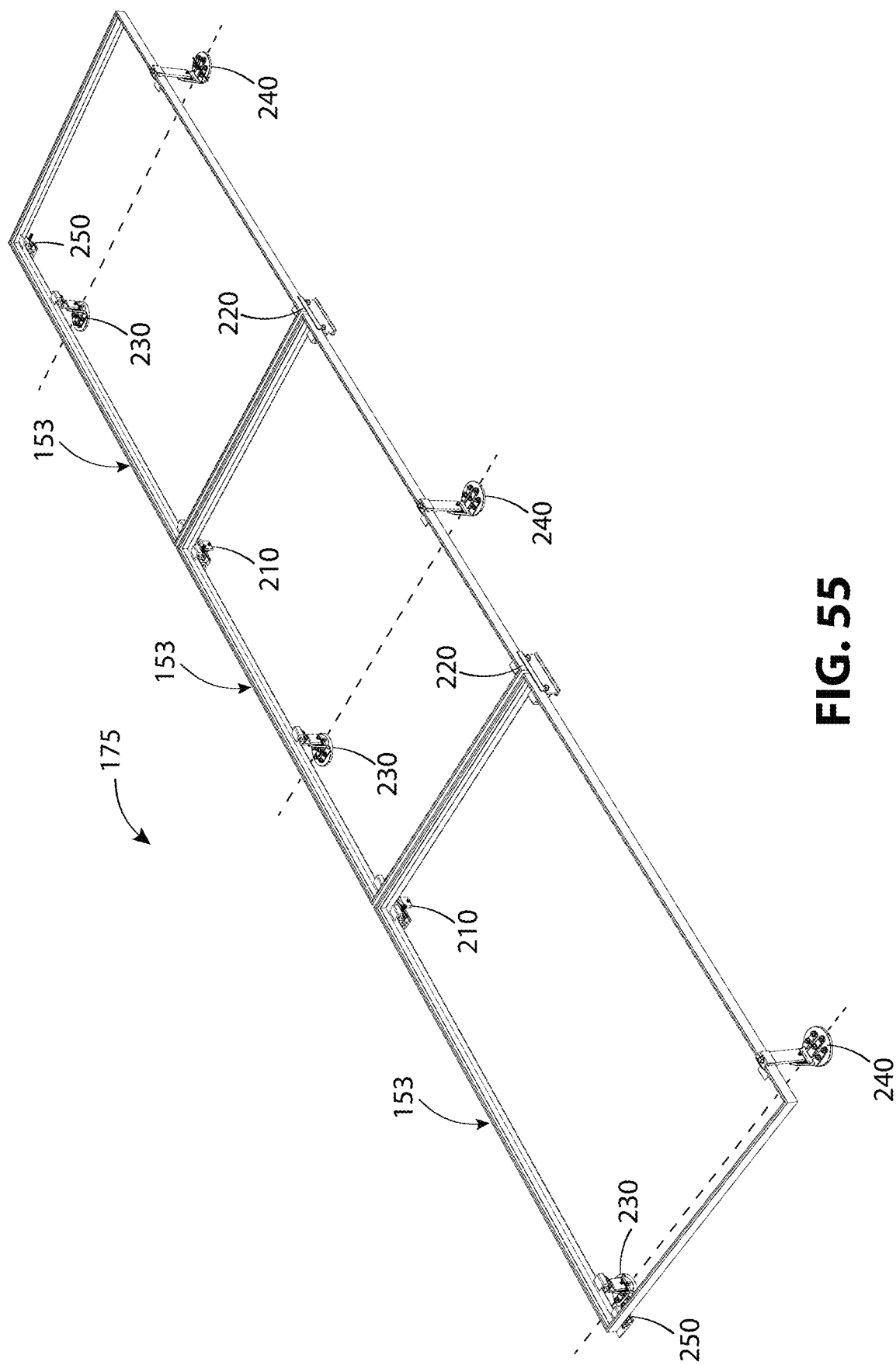

FIGS. 54-61 illustrate an example of how an installer might carry out step 425, step 426, and step 427 with FIG. 54 showing the completion of these steps. FIG. 54 illustrates instances of first-row module assembly 153 secured to edge clamp 240 and with instances of edge splice 220 positioned between the instances of first-row module assembly 153. FIGS. 55 and 56 illustrates, in perspective view and top view, respectively, the completed first-row, first-row 175, with the module bodies of the solar modules made transparent (i.e., x-ray view) to reveal the structure beneath. FIGS. 55 and 56 illustrate instances of the end clamp 230 aligned with corresponding instances of edge clamp 240. These instances of end clamp 230 are secured to edge-clamp-secured roof rafters. The location of the edge-clamp-secured roof rafters are indicated by the dashed lines. FIGS. 55 and 56 also show the position of the loop bracket 250 on the outside corners of the trailing-edge of the first-row 175. Instances of the loop splice 210 are secured on the trailing-edge of the row between adjacent instances of the first-row module assembly 153 in line with instances of the edge splice 220.

FIG. 57 shows an enlarged portion of FIG. 56 illustrating the edge splice 220 mounted between adjacent instances of solar module 150 with the first clamp jaw 222 secured to one of frame 152 and second clamp jaw 223 secured to the other of frame 152. FIG. 58 similarly illustrates the loop splice 210 with first clamp jaw 212, securing the loop splice 210 to one instance of frame 152, and second clamp jaw 213 securing the loop splice 210 to the other instance of frame 152. FIG. 59 shows an enlarged portion of FIG. 56 illustrating the loop bracket 250 positioned at the back corner of the return flange 152b. The clamp jaw 252 is secured to the return flange 152b of the frame 152.

Figure 60:
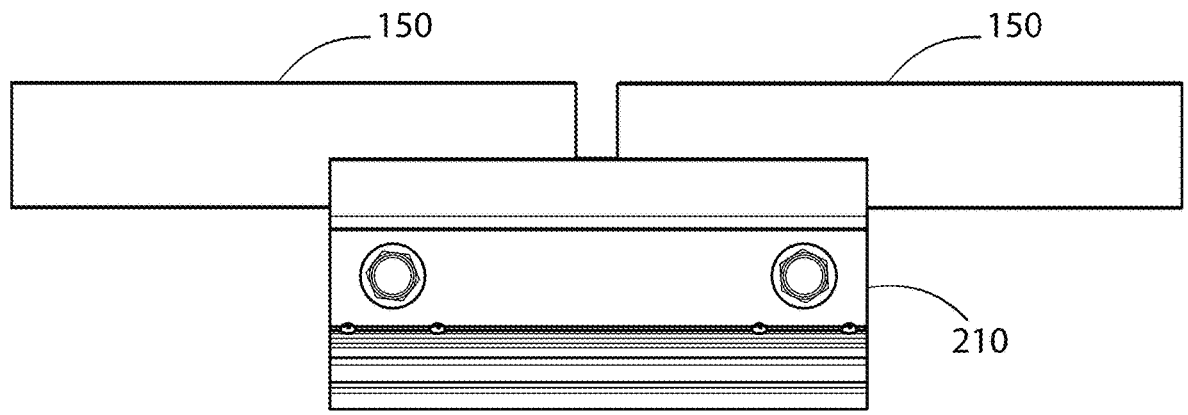
Figure 61:
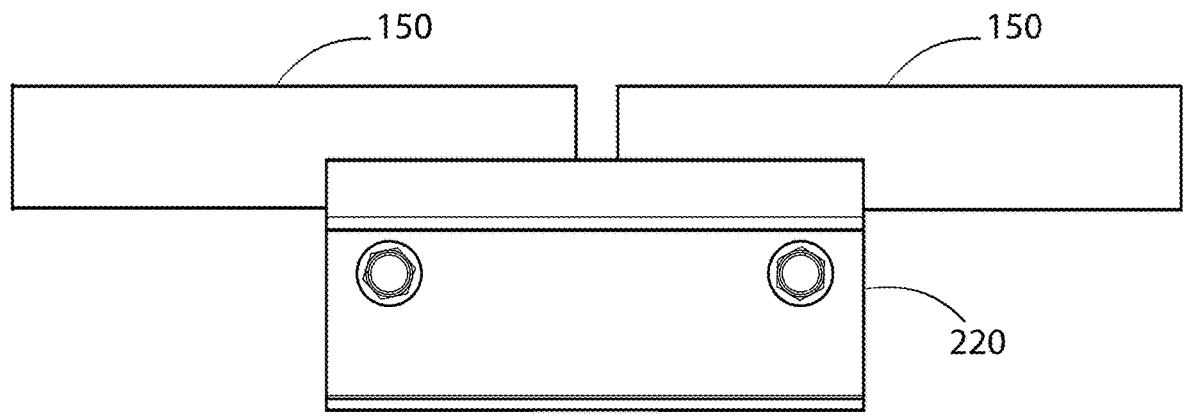

FIG. 60 shows in rear view, the loop splice 210 secured to two adjacent instances of solar module 150. FIG. 61 similarly shows, in front view, a section of FIG. 56, illustrating the edge splice 220 secured to two adjacent instances of solar module 150.

Figure 62:
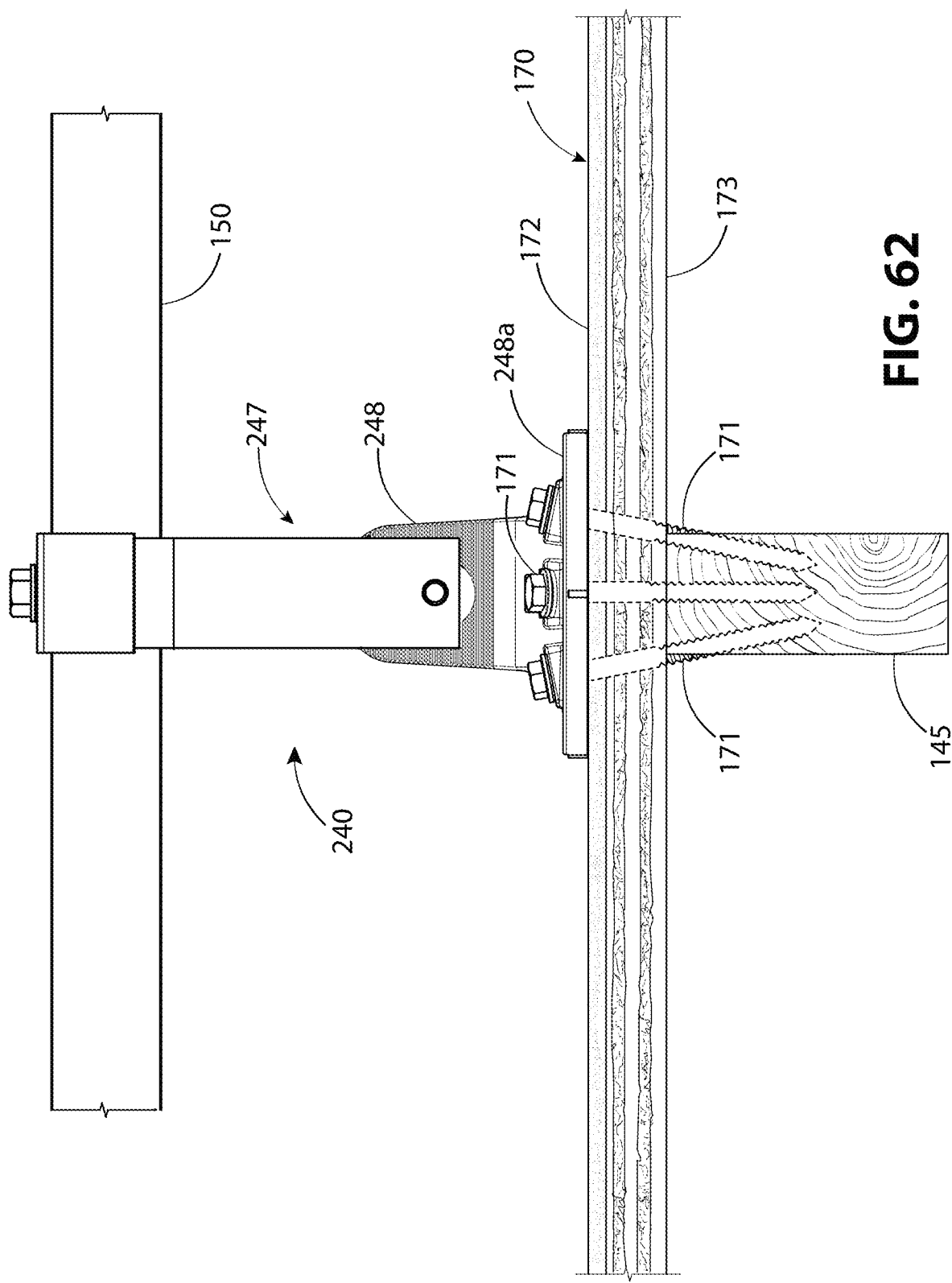
FIGS. 62 and 63 illustrate the edge clamp and the end clamp, respectively, secured to the roof rafter and to the solar module; the roof is cutaway to reveal the roof structure.
Figure 63:
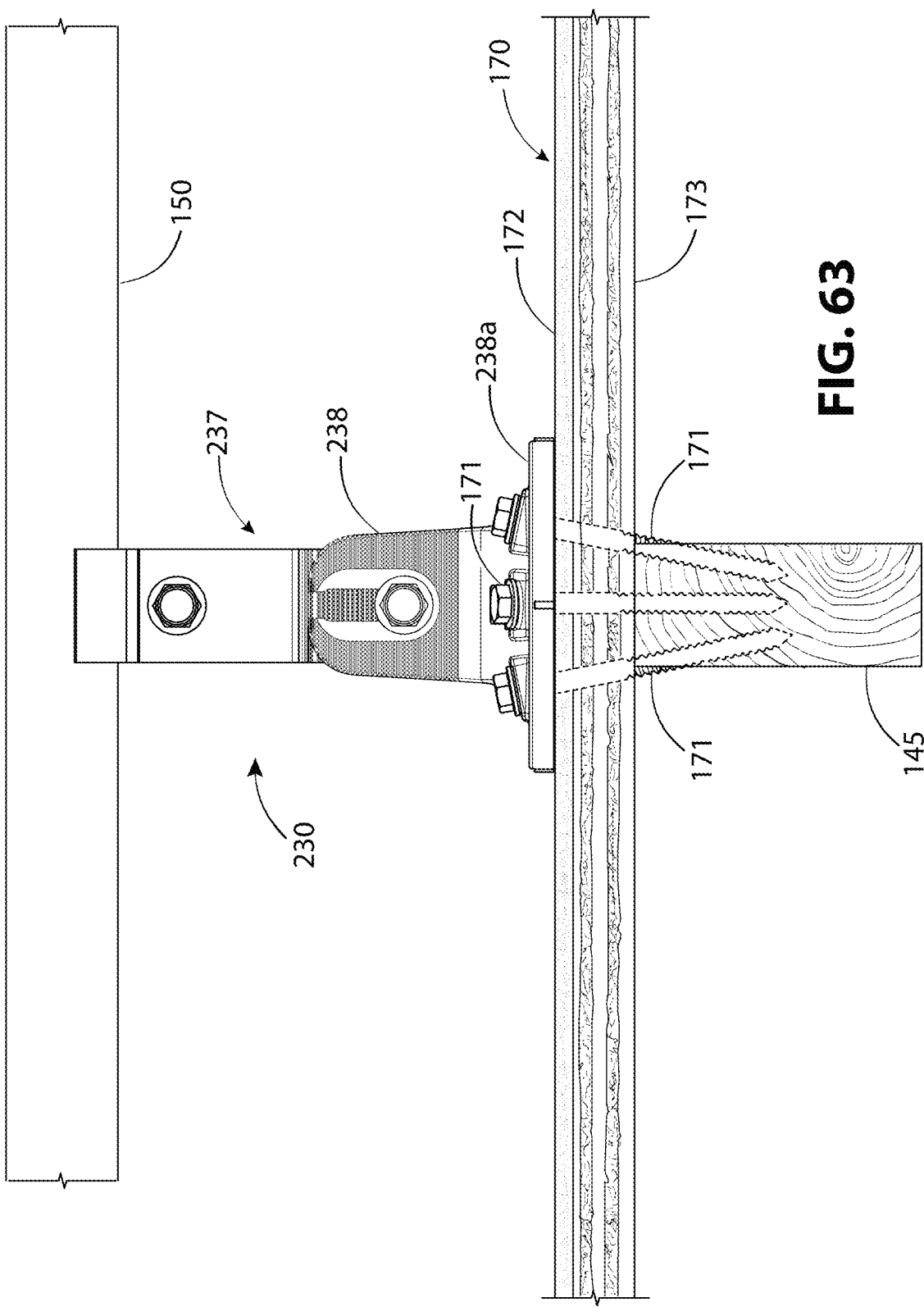

FIGS. 62 and 63 illustrate the edge clamp 240 in front view, and the end clamp 230 in rear view, respectively, secured to the roof rafter 145 and the solar module 150 with the roof 170 cutaway to reveal the roof structure. Referring to FIG. 62, module edge bracket 247 is secured to both the solar module 150 and roof-attachment bracket 248, as previously discussed. The roof-attachment bracket 248 is secured to the roof 170 by one or more of a roof-attachment fastener 171. As an example, three instances of roof-attachment fastener 171 extend from the roof bracket base 248a, through roof covering 172, through the roof deck 173, and into the roof rafter 145. Similarly, in FIG. 63, module end bracket 237 is secured to both the solar module 150 and roof-attachment bracket 238. As an example, three instances of roof-attachment fastener 171 extend from the roof bracket base 238a, through roof covering 172, through the roof deck 173, and into the roof rafter 145.

Figure 64:
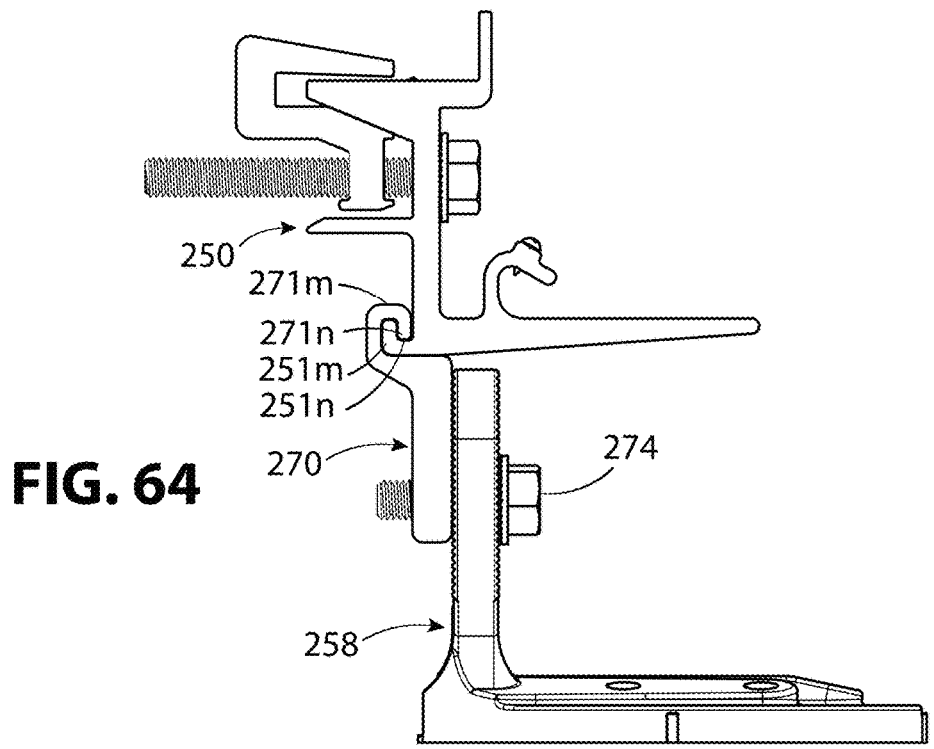
FIGS. 64 and 65 illustrate, in side view and perspective view, respectively, the loop bracket secured to a roof-attachment bracket via a splice link.
Figure 65:
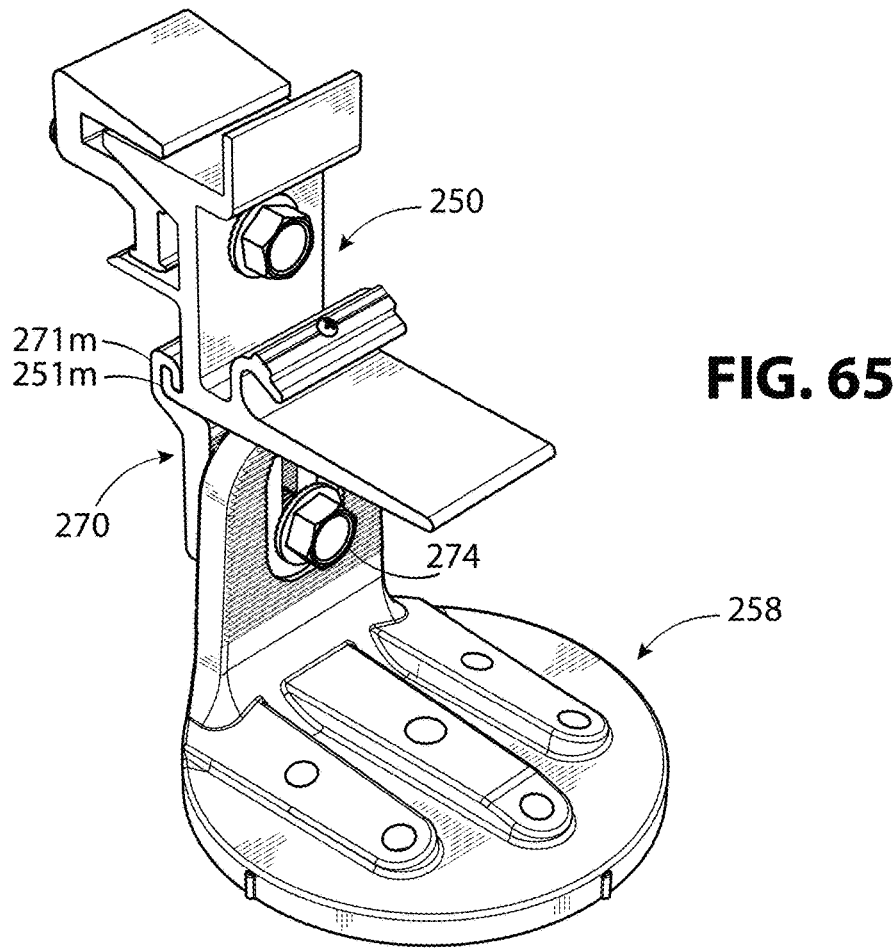
Figure 66:
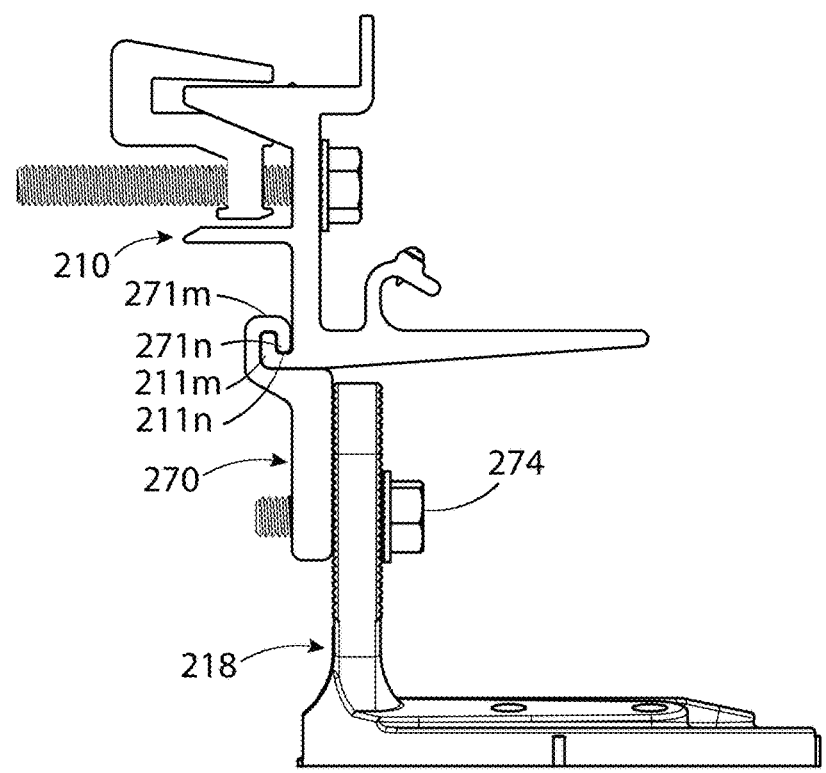
FIGS. 66 and 67 illustrate, in side view and rear perspective view, respectively, the loop splice secured to a roof-attachment bracket via the splice link.
Figure 67:
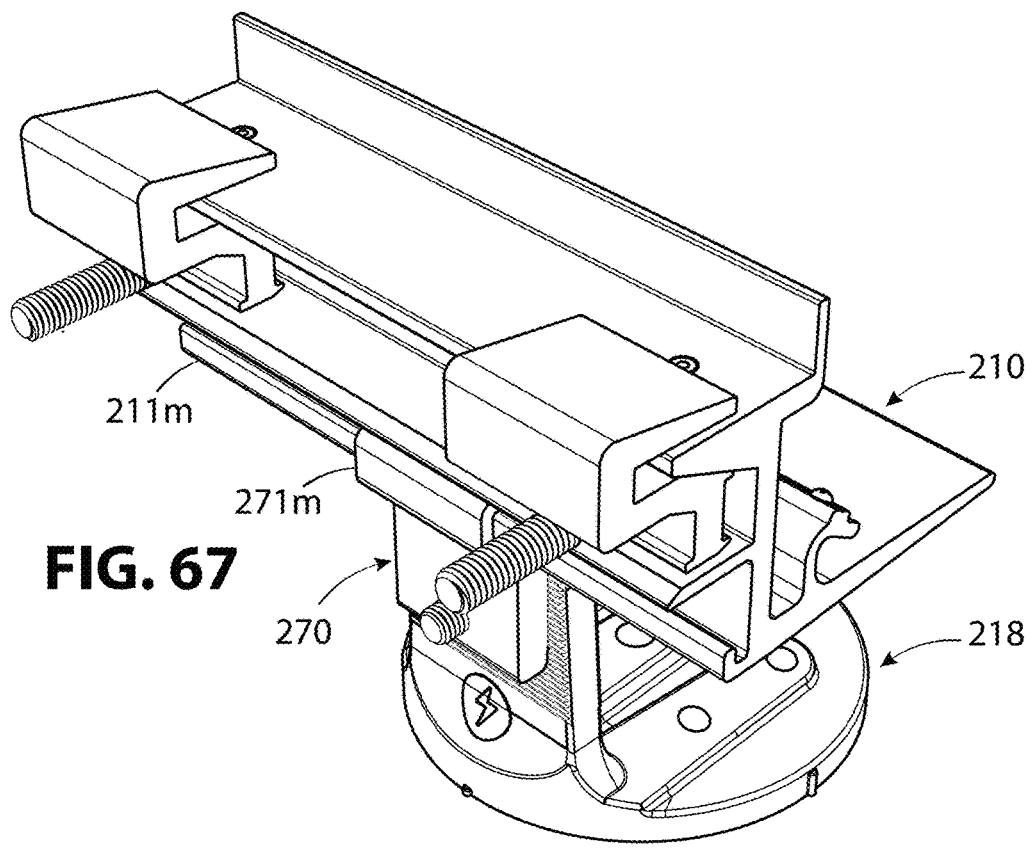
Figure 68:
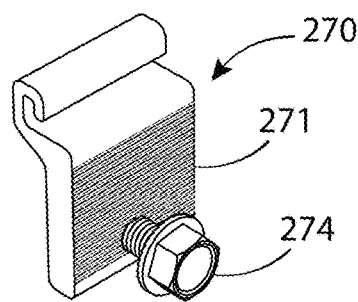
FIGS. 68-71 illustrate, in various views, the splice link, with FIG. 71 showing a section of FIG. 70 taken along section lines 71-71.
Figure 70:
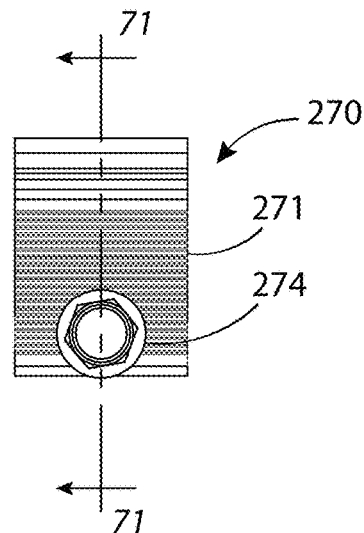
Figure 71:
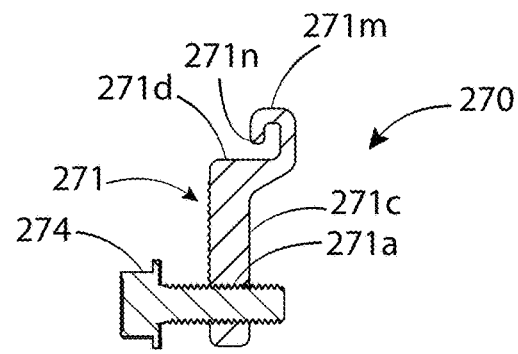

As discussed in step 427, in FIG. 33, the installer may optionally attach the loop splice, edge splice, or loop bracket to the roof using a splice link and loop attachment bracket. FIGS. 64 and 65 illustrate, in side view and perspective view, respectively, the loop bracket 250 secured to a roof-attachment bracket 258 via the splice link 270. FIGS. 66 and 67 illustrate, in side view and rear perspective view, respectively, the loop splice 210 secured to a roof-attachment bracket 218 via the splice link 270. FIGS. 68-71 illustrate, in various views, the splice link 270 with FIG. 71 showing a section of FIG. 70 taken along section lines 71-71.

Figure 69:
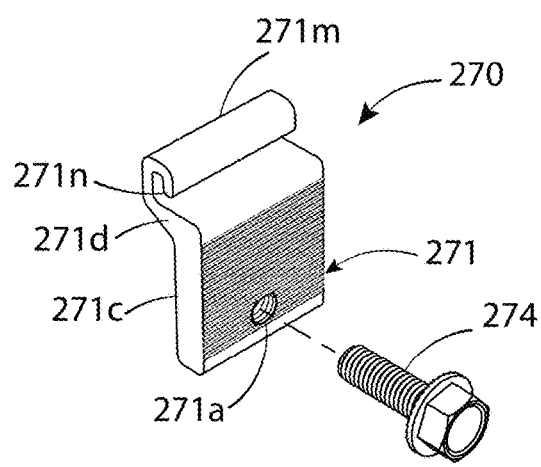

Referring to FIG. 68-71, the splice link 270 includes a link body 271 and a threaded fastener 274. Referring to FIGS. 69 and 71, the threaded fastener 274 engages a threaded aperture 271a. Referring to FIGS. 69 and 71, the splice link 270 includes a link body arm 271c and a platform 271d that extends rearward from the link body arm 271c. A hook 271m extends upward from the end of the platform 271d with a hook end 271n that extends downward toward the platform.

Referring to FIGS. 64 and 65, the hook 271m of the splice link 270 engages the catch 251m of the loop bracket 250. Referring to FIG. 64, hook end 271n engages the groove 251n in the catch 251m. Referring to FIGS. 64 and 65, threaded fastener 274 secures the roof-attachment bracket 258 to the splice link 270.

Referring to FIGS. 66 and 67, the hook 271m of the splice link 270 engages the catch 211m of the loop splice 210. Referring to FIG. 66, the hook end 271n engages the groove 211n in the catch 211m. The threaded fastener 274 secures the roof-attachment bracket 218 to the splice link 270.

Figure 74:
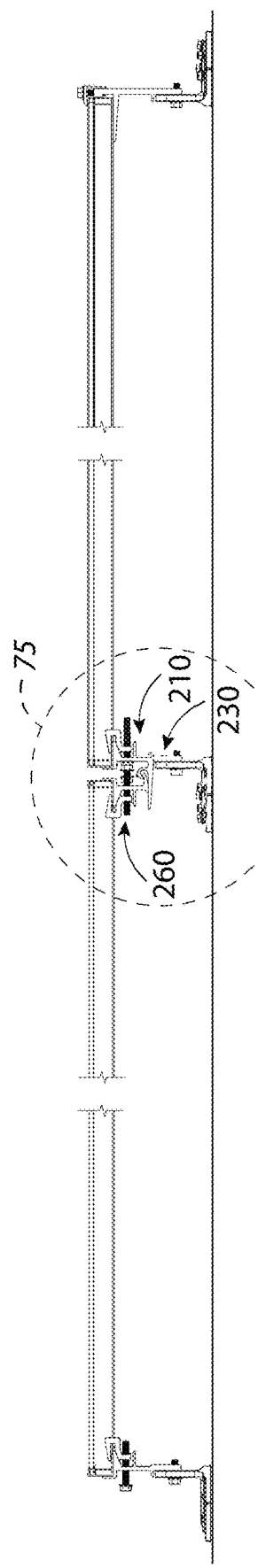
Figure 75:
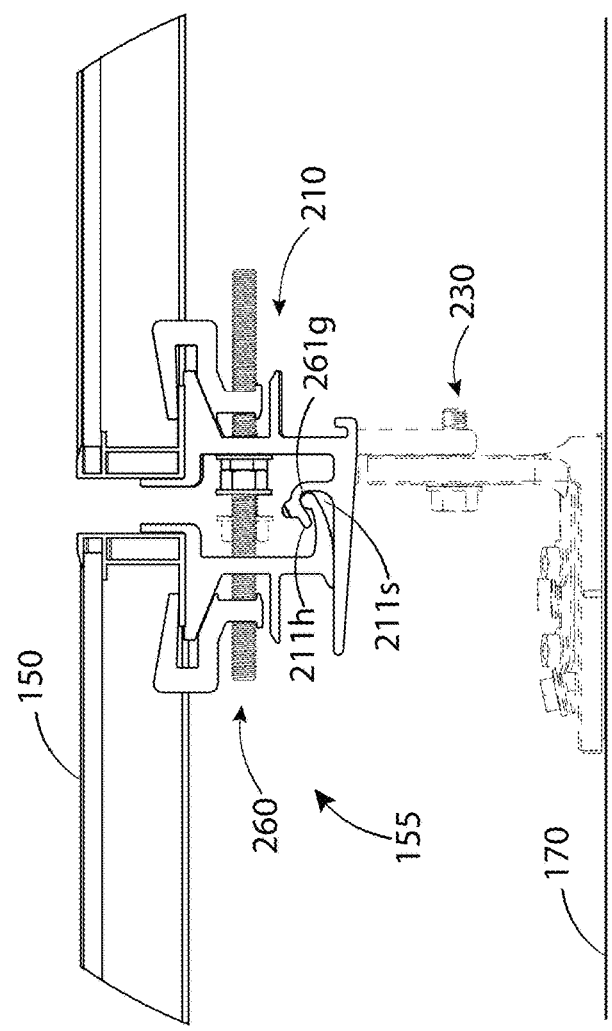

With the first-row secure and complete, the installer may install the second row. The flow chart 430 of FIG. 35 gives an example of how any installer might install the second row and each subsequent row. FIGS. 72-77 illustrate an example, in various views, of carrying out the steps in the flow chart 430 of FIG. 35 with FIG. 73 showing an enlarged view of a portion of FIG. 72 and FIG. 75 illustrating an enlarged view of a portion of FIG. 74. In FIGS. 72-74, the side of the solar module is cutaway to reveal the structure underneath. Referring to FIG. 35, in step 431, The installer secures a non-first-row module assembly to a corresponding module in a module assembly in an immediately adjacent subsequent row. In this case, the installer secures a non-first-row module to a module in the same column in the first-row. They accomplish this by engaging the module hook brackets secured to the leading-edge of the non-first-row module assembly, with corresponding loop brackets and optionally, loop splices that are secured to the trailing-edge of the first-row module assembly. The installer would insert the module hook brackets at an oblique angle with respect to the installed module and rotating the non-first-row module assembly in place.

FIGS. 72 and 73 illustrates an example, in side view, of engaging the module hook bracket 260 of a non-first-row module assembly 155, with the loop splice 210 (or loop bracket) of a module assembly in the previously adjacent row. In this case the previously adjacent row is the first-row, so the module assembly would be a first-row module assembly 153. Note that in FIGS. 72-75, the end clamp 230 is in the background behind the module hook bracket 260 and loop splice 210. For clarity, it is shown lightened and in dashed lines. Referring to FIG. 73, the bottom surface of the hook arm 261f, of the module hook bracket 260, engages the top surface of the loop platform 211f of the loop splice 210. In addition, the hook arm end 261g of the hook arm 261f engages the open loop 211g of the loop splice 210. As the non-first-row module assembly 155 is rotated, the hook arm 261f pivots on the loop platform 211f, and the hook arm end 261g is captured within the cavity 211s between the open loop 211g and loop platform 211f. Referring to FIG. 75, as the solar module 150 of the non-first-row module assembly 155 becomes parallel to the roof 170, the hook arm end 261g becomes hooked within the cavity 211s. The hook arm end 261g becomes hooked because the open end 211h is pointed downward.

Referring to FIG. 35, in step 432, the installer installs and secures loop splices on the trailing-edge between each of the non-first-row modules. In step 433, the installer installs loop brackets on the trailing-edge return flange corners on the modules located at the outside edges of the solar module assembly. In step 434, the installer positions and secures end clamps over the edge-clamp-secured roof rafters. In step 435, in those instances where a loop splice or loop bracket falls over a roof rafter at the pre-determined span, the installer may secure the loop splice or loop bracket to the roof using a combination of splice links and roof-attachment brackets.

Figure 76:
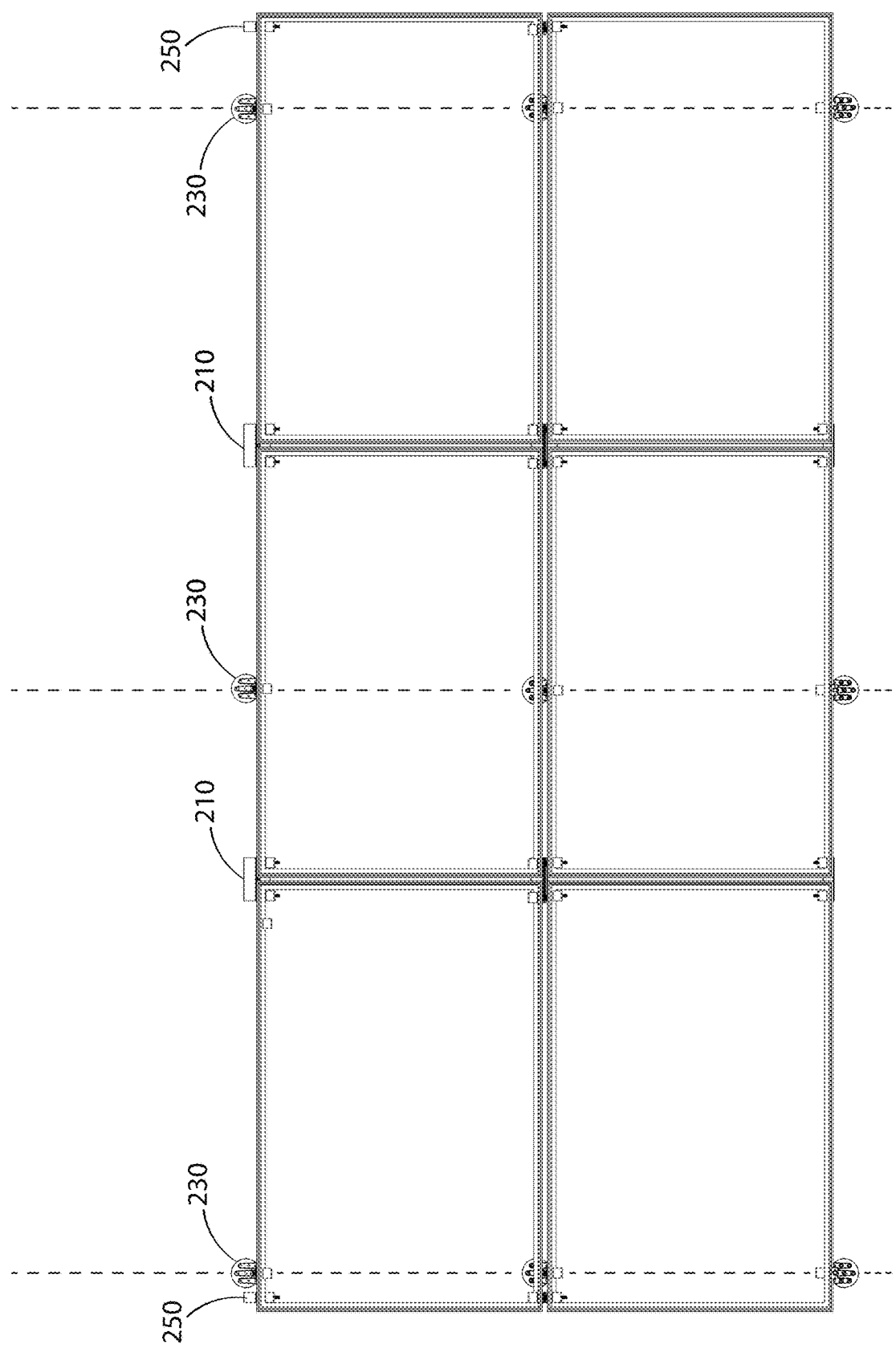

FIG. 76 illustrates the resultant two-row assembly with the solar module body shown as transparent (i.e., x-ray view) to reveal the structure beneath. FIG. 76 shows the loop bracket 250, loop splice 210, and end clamp 230 installed on the trailing-edge of the second row. The end clamp 230 are installed along the edge-clamp-secured roof rafters. The edge clamp-secure roof rafters are hidden from view and illustrated as dashed lines.

Figure 78:
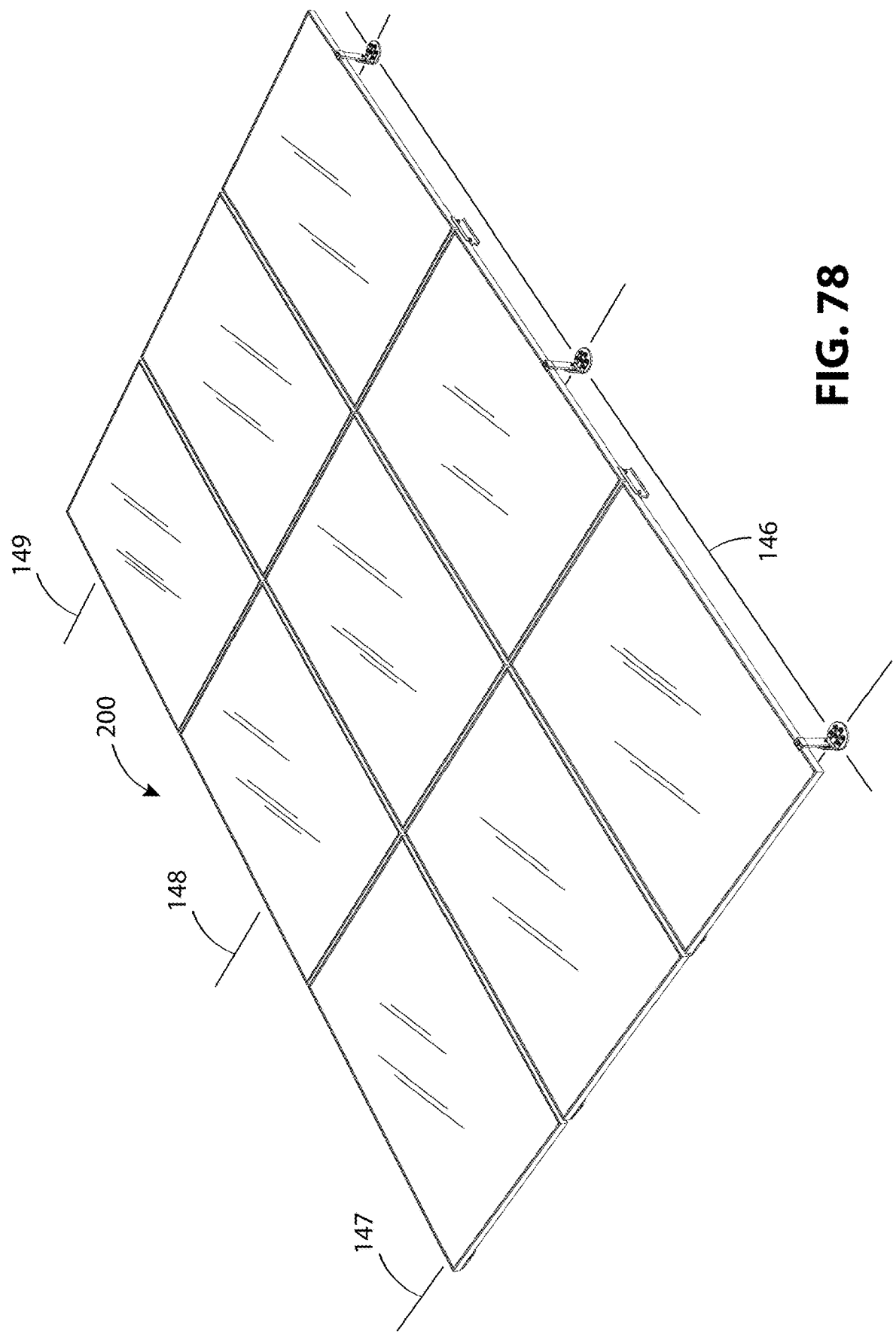
FIG. 78 illustrates, in perspective view, an example of a solar module system that results from following the steps in FIGS. 31-35.

Referring to FIG. 35, in step 436, the installer repeats the previous steps in flow chart 430 for each successive row. FIG. 78 illustrates, in perspective view, the resultant three row x three column solar module system, solar module system 200 showing the chalk lines, chalk line 146, chalk line 147, chalk line 148, and chalk line 149 that were used by the installer to layout the system. FIG. 79 illustrates in top view, the solar module system 200 of FIG. 78 with the solar module bodies shown as transparent (x-ray view) to reveal the structure beneath. FIG. 79 shows the loop bracket 250, loop splice 210, and end clamp 230 installed on the trailing-edge of the third row. The instances of end clamp 230 are installed along the edge-clamp-secured roof rafters. The edge clamp-secure roof rafters are hidden from view and illustrated as dashed lines.

Figure 77:
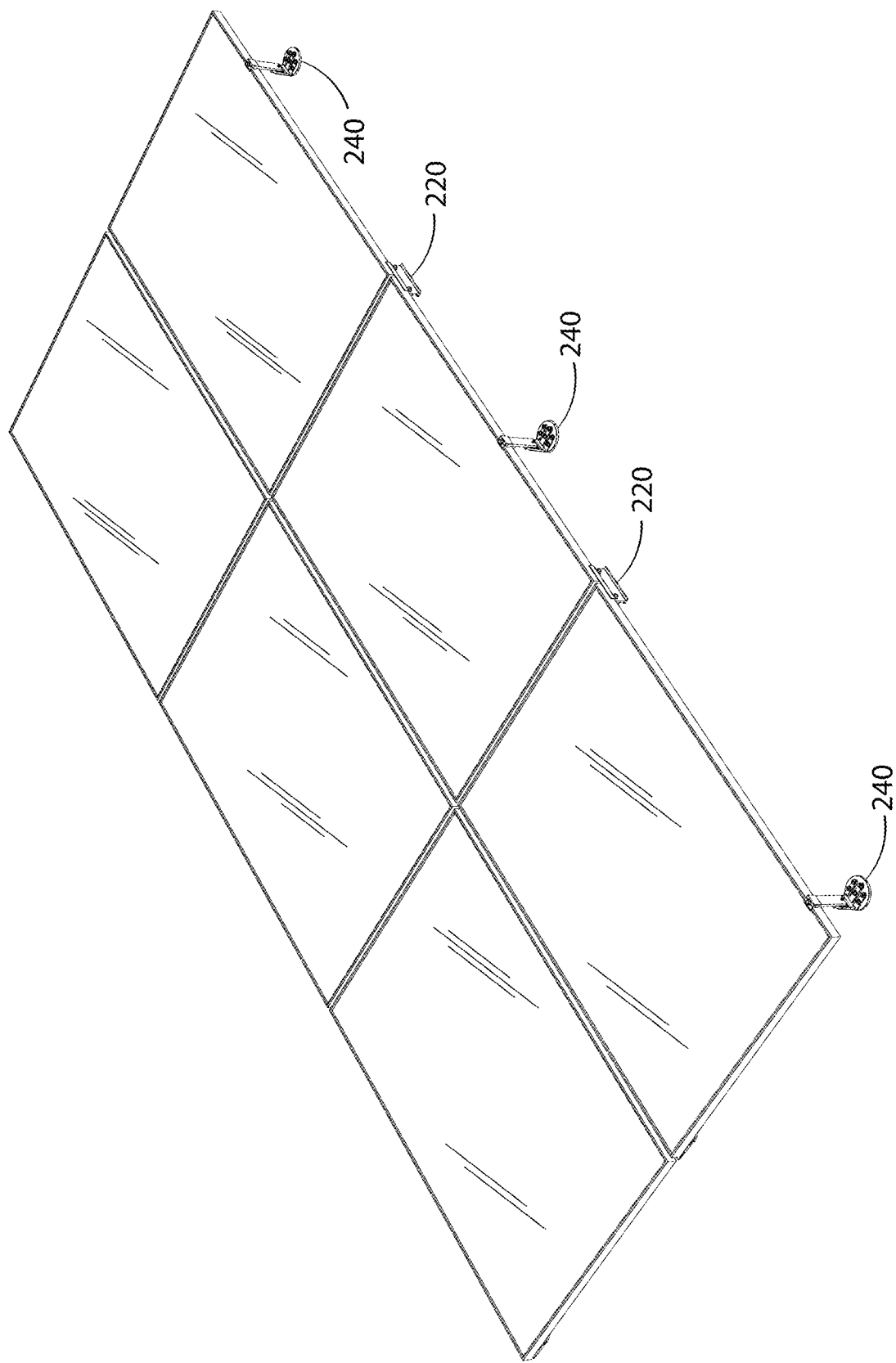

FIG. 77 shows a completed two-row assembly showing instances of the edge clamp 240 and instances of edge splice 220. Other the loop splices, loop brackets, module hook brackets, and end clamps are hidden from view.

Second Embodiment

Figure 81:
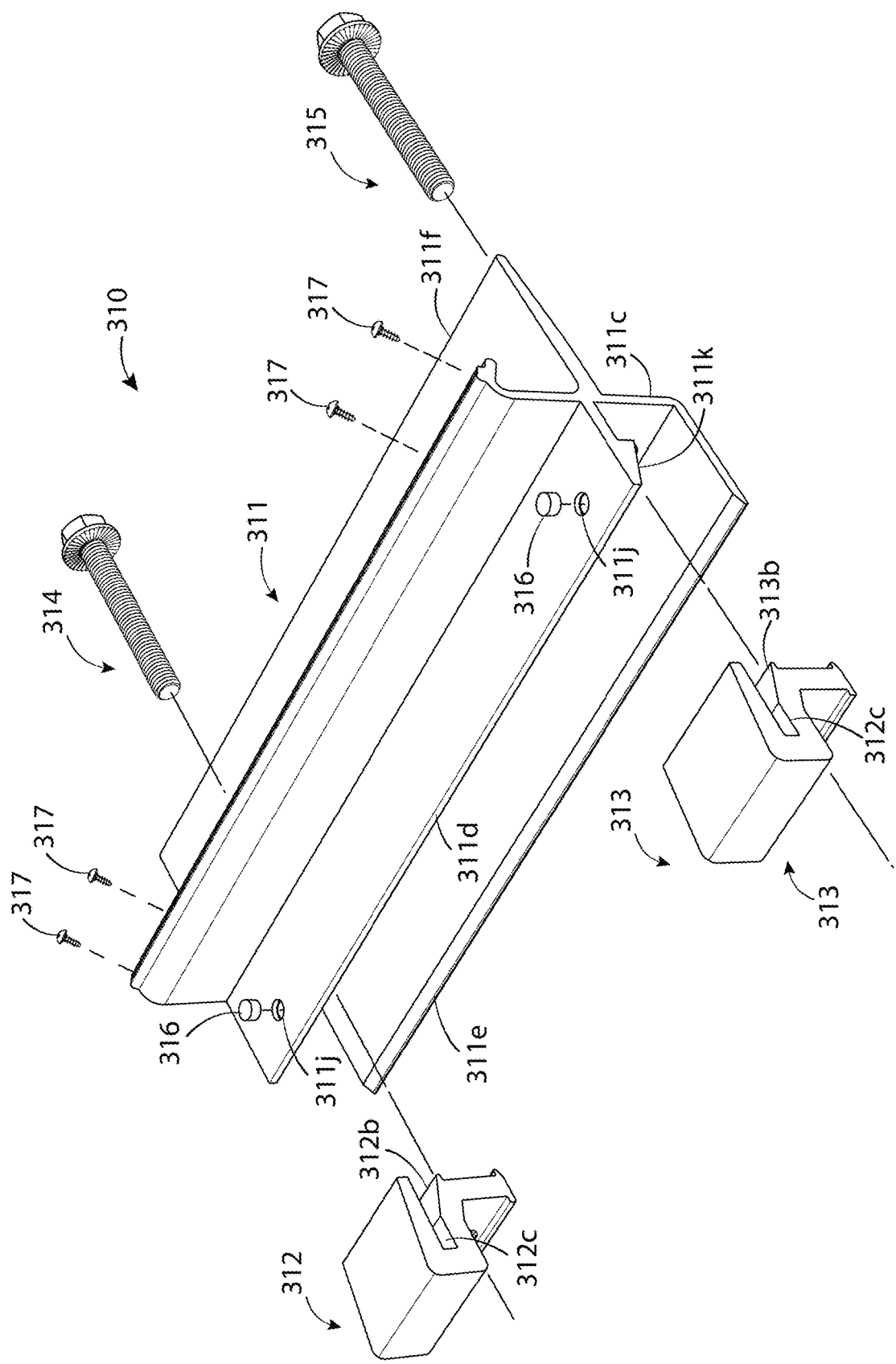
Figure 82:
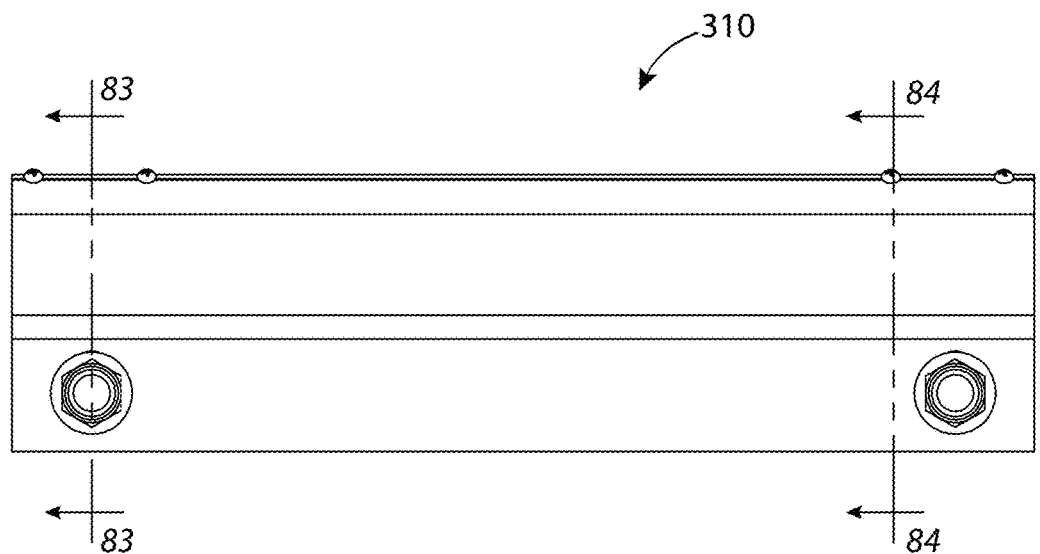
Figure 83:
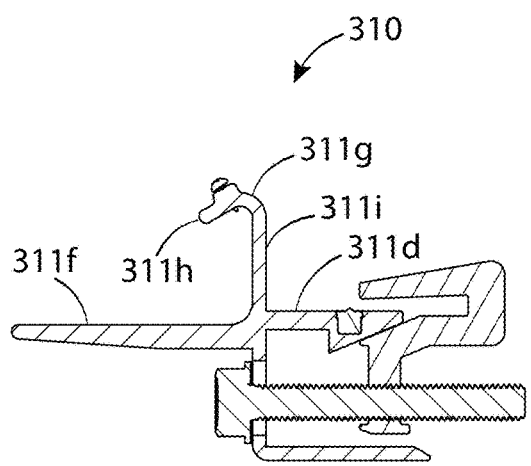
Figure 84:
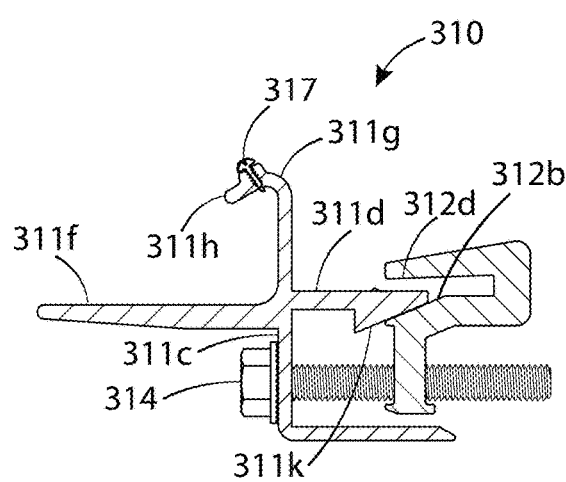
Figure 85:
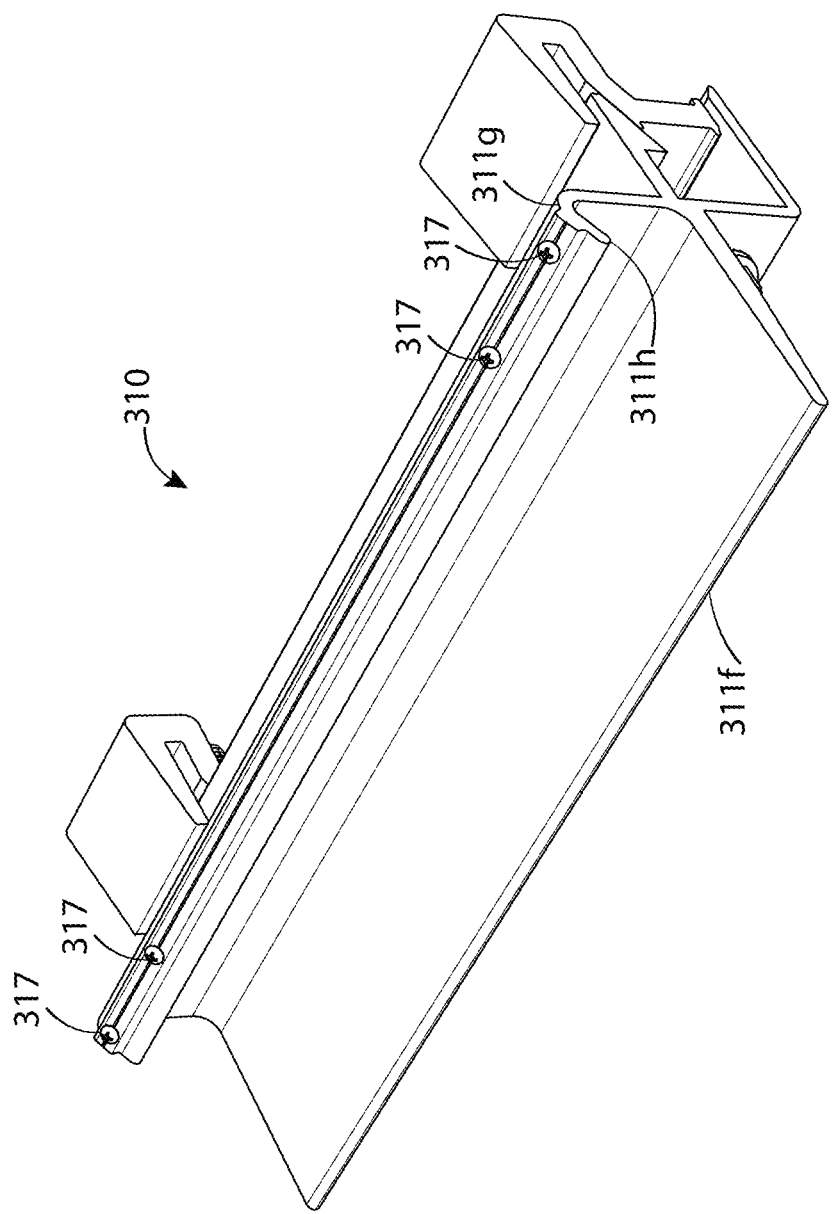

FIGS. 80-86 illustrate the loop splice 310 in various views, with FIGS. 83 and 84 illustrating section views of FIG. 82 taken along section lines 83-83 and 84-84, respectively. Referring to FIGS. 80 and 81, the loop splice 310 may include a loop splice body 311, a first clamp jaw 312, a second clamp jaw 313, a first threaded fastener 314, and a second threaded fastener 315. Referring to FIG. 81, the loop splice 310 also includes multiple instances of bonding pin 316, and multiple instances of bonding screw 317. The multiple instances of bonding screw 317 is also illustrated in FIG. 85. Referring to FIG. 80, the first threaded fastener 314 passes through a slot-shaped aperture 311a in a splice body arm 311c of the loop splice body 311, and engages a threaded aperture 312a in the first clamp jaw 312. The second threaded fastener 315 passes through a slot-shaped aperture 311b in the splice body arm 311c, and engages a threaded aperture 313a in the second clamp jaw 313.

Figure 86:
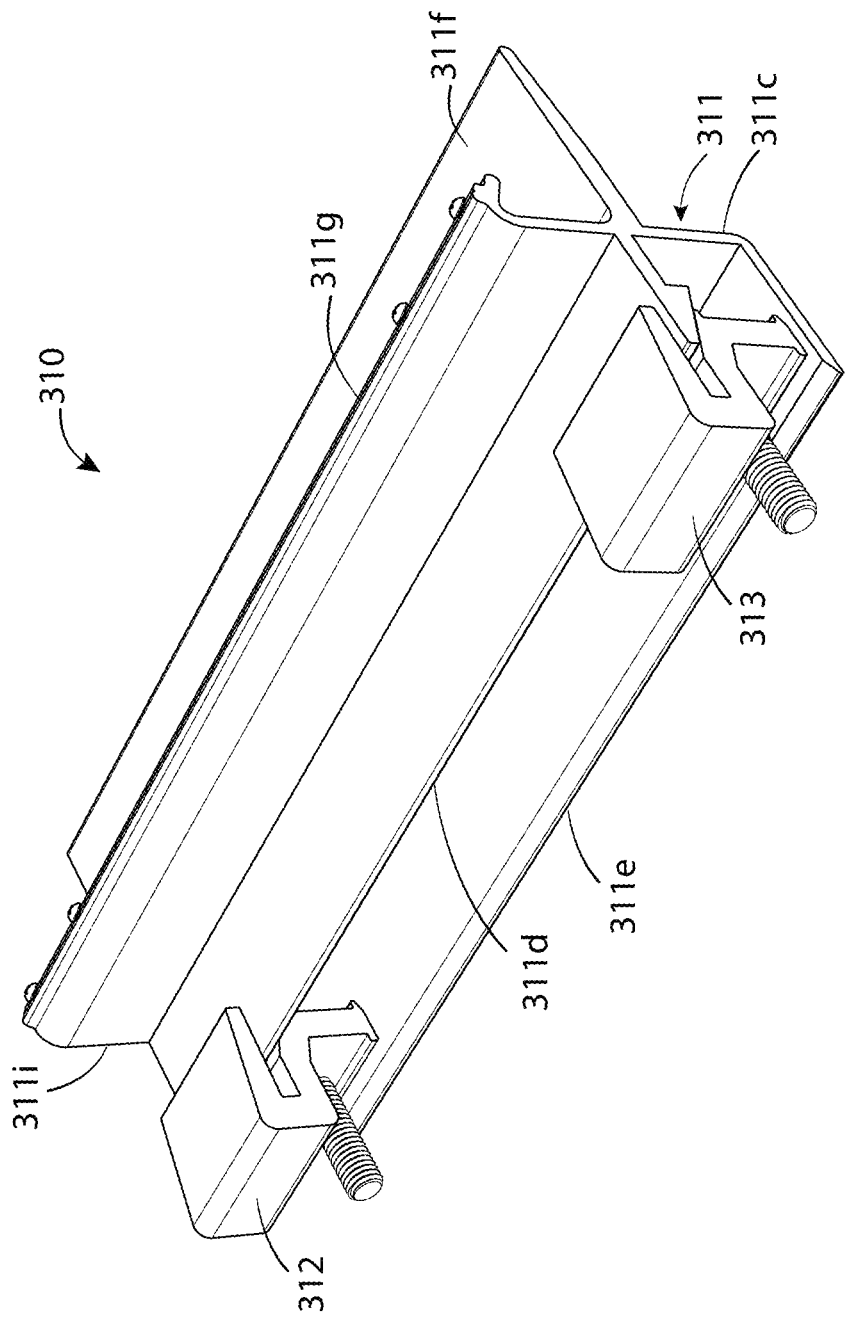

Referring to FIGS. 81 and 86, the loop splice body 311 includes an upper platform 311d and a lower platform 311e. The upper platform 311d and lower platform 311e extend away from the splice body arm 311c toward the first clamp jaw 312 and second clamp jaw 313. The loop splice body also includes a loop platform 311f that extends away from the splice body arm 311c in the opposite direction as the upper platform 311d and lower platform 311e.

Referring to FIGS. 83 and 85, an open loop 311g extends upward from the loop platform 311f with an open end 311h that extends back toward the loop platform 311f. The loop platform 311f and open loop 311g are sized and shaped to capture and retain the module hook bracket 360 of FIG. 100. Referring to FIGS. 83 and 86, the back of the open loop 311g forms a backstop 311i that extends upward from the upper platform 311d. The upper platform 311d is structured to seat a return flange of a solar module. The backstop 311i is structured and positioned to seat the outside perimeter side of the frame of the solar module. Referring to FIG. 86, the first clamp jaw 312 and the second clamp jaw 313, clamp the return flange of the solar module against the upper platform 311d.

The bonding screws and bonding pins together provide electrical bonding between the loop splice 310 (FIG. 81), module hook bracket 360 (FIG. 100), and their associated solar modules. Referring to FIG. 81, instances of the bonding pin 316 extends upward from corresponding instances of a blind hole 311j in the upper platform 311d. Referring to FIG. 84, the bonding screw 317 extends through the open loop 311g toward the loop platform 311f. As with the first embodiment, the bonding pins and bonding screws include sharpened ends that break through non-conductive oxide, anodizing, or paint layers to create an electrical bond between components.

Referring to FIGS. 81 and 84, the upper platform 311d includes a wedge-shaped bottom surface 311k extending obliquely downward toward the splice body arm 311c. Referring to FIG. 81, the first clamp jaw 312 and second clamp jaw 313 include a wedge-engaging surface 312b and wedge-engaging surface 313b, respectively. The wedge-engaging surface 312b extends obliquely downward from a cavity 312c from within the first clamp jaw 312. The wedge-engaging surface 313b extends obliquely downward from a cavity 313c from within the second clamp jaw 313. Referring to FIG. 84, the wedge-engaging surface 312b is at the same oblique angle as the wedge-shaped bottom surface 311k. This causes the wedge-engaging surface 312b to move up and down along the wedge-shaped bottom surface 311k. As the first threaded fastener 314 is tightened or loosened, the clamping surface 312d is drawn toward or away, respectively, from the upper platform 311d. Referring to FIG. 80, as the first threaded fastener 314 is loosened or tightened, the slot-shaped aperture 311a allows the first threaded fastener 314 to move up or down as the first clamp jaw 312 moves up or down. Similarly, as the second threaded fastener 315 is loosened or tightened, the slot-shaped aperture 311b allows the second threaded fastener 315 to move up or down as the second clamp jaw 313 moves up or down.

Figure 87:
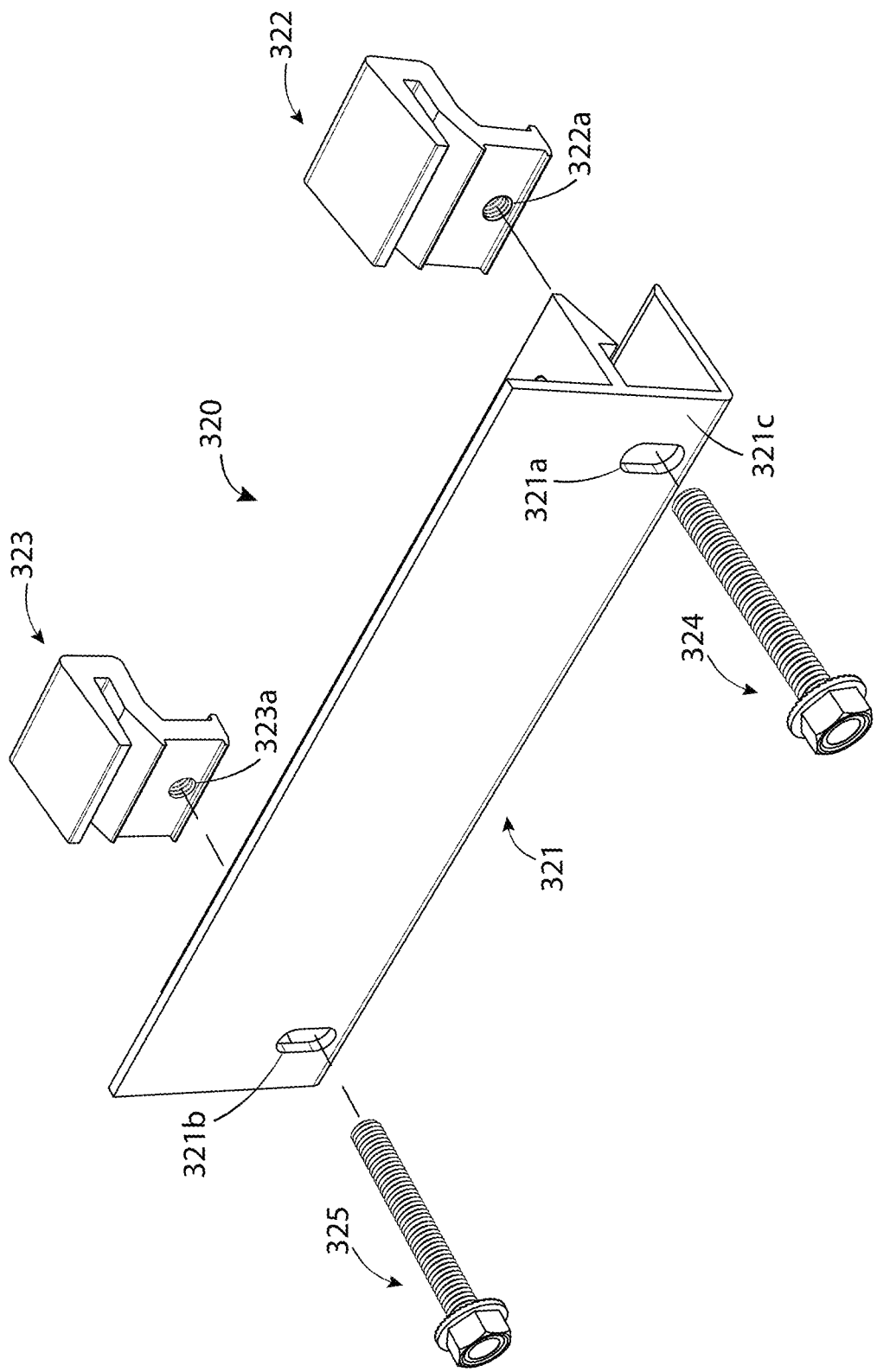
FIGS. 87-92 illustrate an edge splice in various views, with FIG. 90 illustrating section view of FIG. 89 taken along section lines 90-90.
Figure 88:
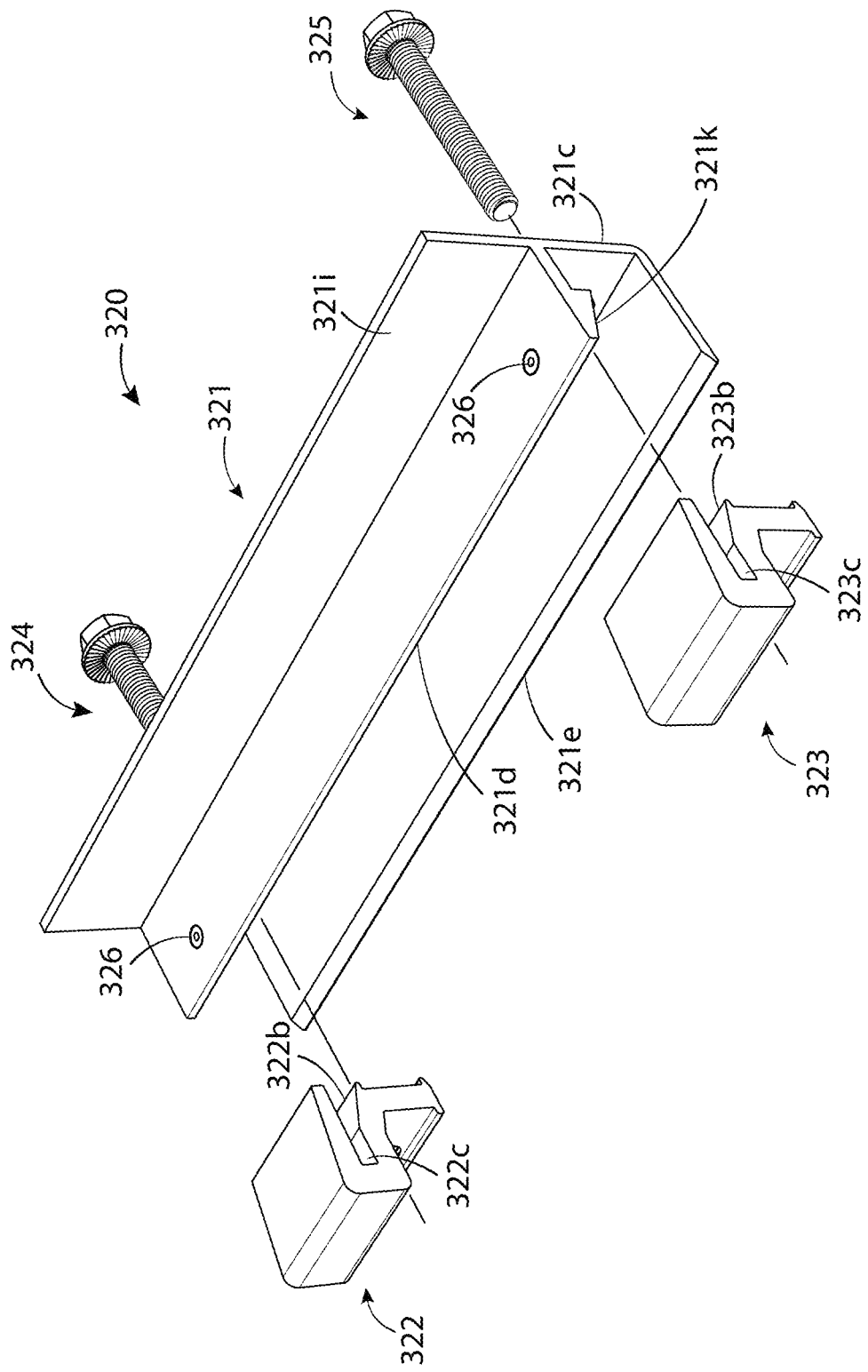
Figure 89:
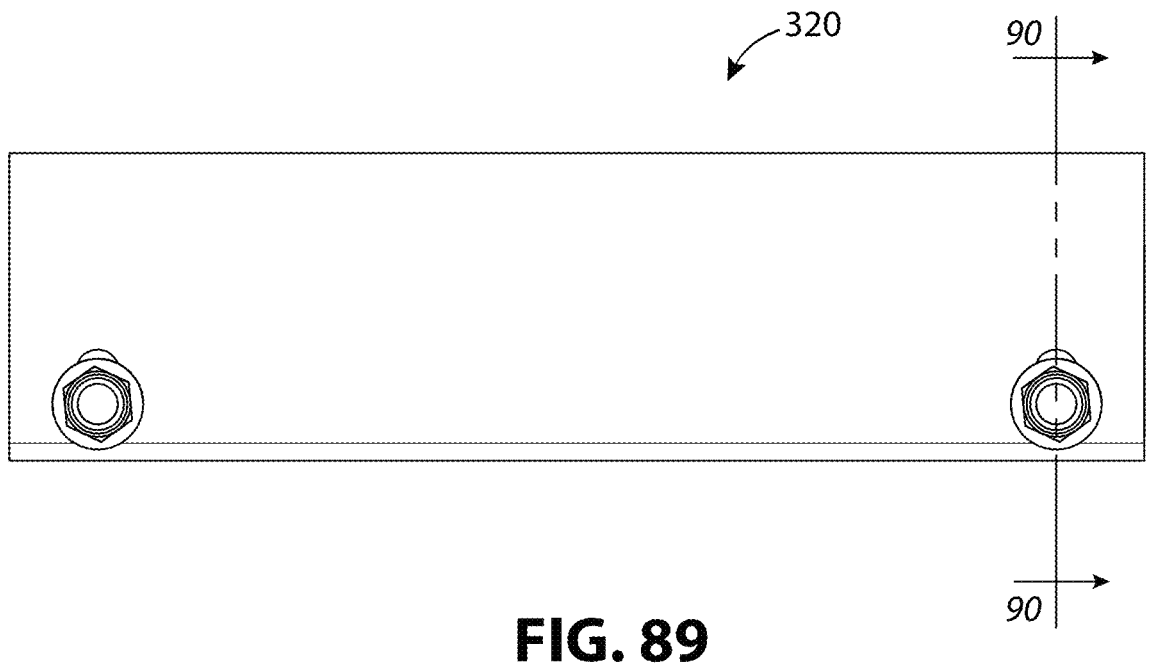
Figure 90:
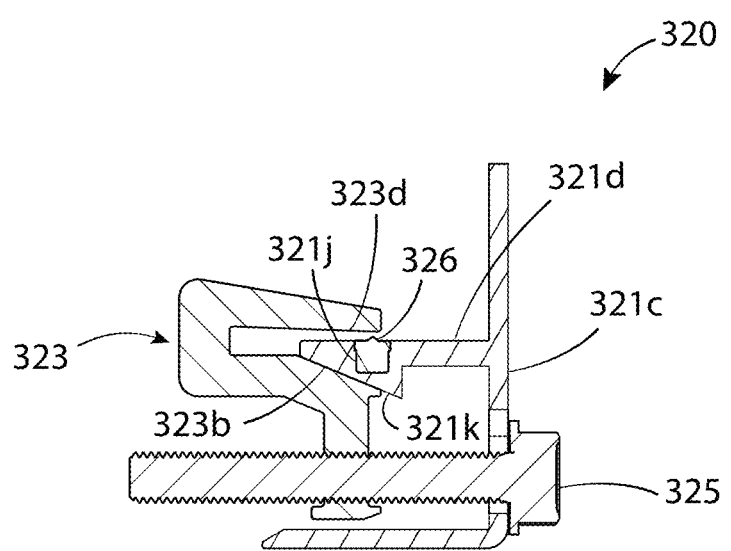

FIGS. 87-92 illustrate an edge splice 320 in various views with FIG. 90 illustrating section view of FIG. 89 taken along section lines 90-90. The edge splice 320 shares a common clamping structure as the loop splice 310 of FIGS. 80-86 and is structured to rigidly join adjacent modules with a row of modules. However, as the name suggests, the edge splice 320 is structured to engage the edges of the solar module assembly while the loop splice 310 can also engage and secures modules within adjacent rows.

Referring to FIGS. 87 and 88, the edge splice 320 may include an edge splice body 321, a first clamp jaw 322, a second clamp jaw 323, a first threaded fastener 324, a second threaded fastener 325, and multiple instances of bonding pin 326 (FIG. 88). Referring to FIG. 87, the first threaded fastener 324 passes through a slot-shaped aperture 321a in a splice body arm 321c and engages a threaded aperture 322a in the first clamp jaw 322. The second threaded fastener 325 passes through a slot-shaped aperture 321b in the splice body arm 321c and engages a threaded aperture 323a in the second clamp jaw 323.

Figure 91:
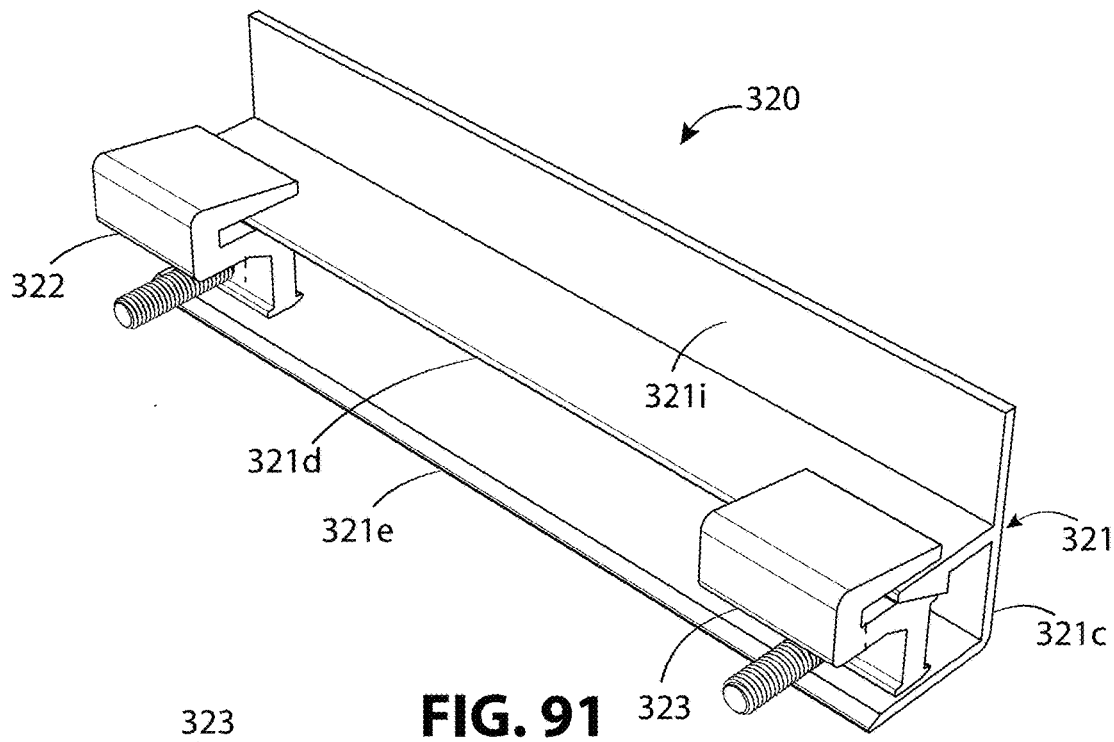
Figure 92:
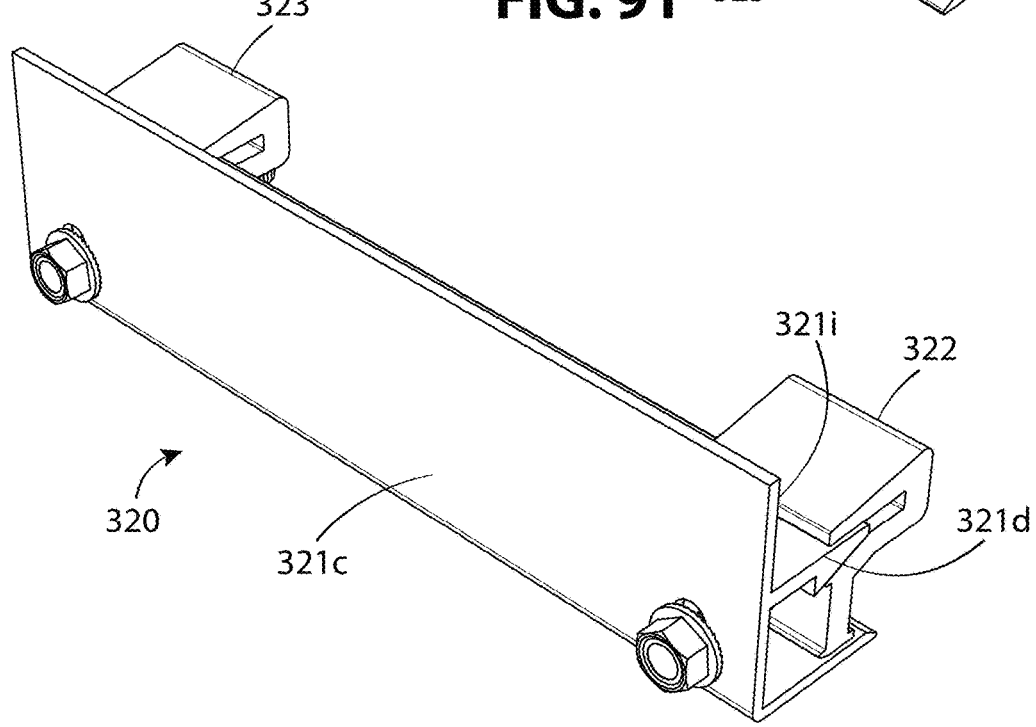

Referring to FIGS. 88 and 91, the edge splice body 321 includes an upper platform 321d and a lower platform 321e extending away from the splice body arm 321c toward the first clamp jaw 322 and second clamp jaw 323. Referring to FIGS. 88, 91, and 92, an upper portion of the splice body arm 321c above the upper platform 321d forms a backstop 321i to the upper platform 311d. The upper platform 321d is structured to seat a return flange of a solar module, and the backstop 321i is structured and positioned to seat the outside perimeter side of the frame of the solar module. The first clamp jaw 322 and the second clamp jaw 323 clamp the return flange of the solar module against the upper platform 321d.

The bonding pins provide electrical bonding between the edge splice 320 and adjacent modules within a row of modules. Referring to FIG. 90, the bonding pin 326 extends upward from a blind hole 321j in the upper platform 321d.

Referring to FIGS. 88 and 90, the upper platform 321d includes a wedge-shaped bottom surface 321k extending obliquely downward toward the splice body arm 321c. Referring to FIG. 88, the first clamp jaw 322 and second clamp jaw 323 include a wedge-engaging surface 322b and wedge-engaging surface 323b, respectively. The wedge-engaging surface 322b extends obliquely downward from a cavity 322c from within the first clamp jaw 322. The wedge-engaging surface 323b extends obliquely downward from a cavity 323c from within the second clamp jaw 323. Referring to FIG. 90, the wedge-engaging surface 323b is at the same oblique angle as the wedge-shaped bottom surface 321k. Because of this, the wedge-engaging surface 323b can move up and down along the wedge-shaped bottom surface 321k. As the second threaded fastener 325 is tightened or loosened, the clamping surface 323d is drawn toward or away, respectively, from the upper platform 321d. Referring to FIG. 87, as the second threaded fastener 325 is loosened or tightened, the slot-shaped aperture 321b allows the second threaded fastener 325 to move up or down as the second clamp jaw 323 moves up or down. Referring to FIG. 88, similarly, as the first threaded fastener 324 is loosened or tightened, the slot-shaped aperture 321a allows the first threaded fastener 324 to move up or down as the first clamp jaw 322 moves up or down.

Figure 93:
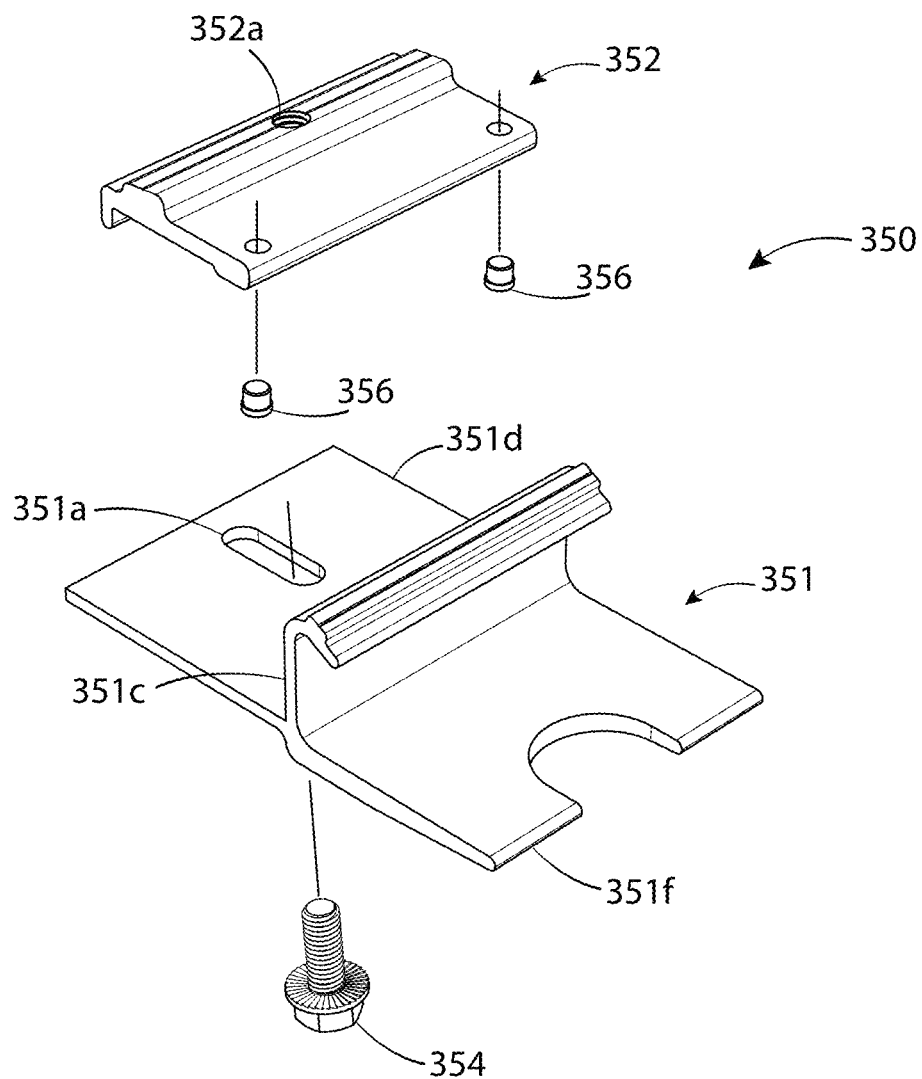
FIGS. 93-99 illustrate, the loop bracket, in various views, with FIGS. 95 and 96 showing a section view of FIG. 94 taken along section lines 95-95 and 96-96, respectively.
Figure 94:
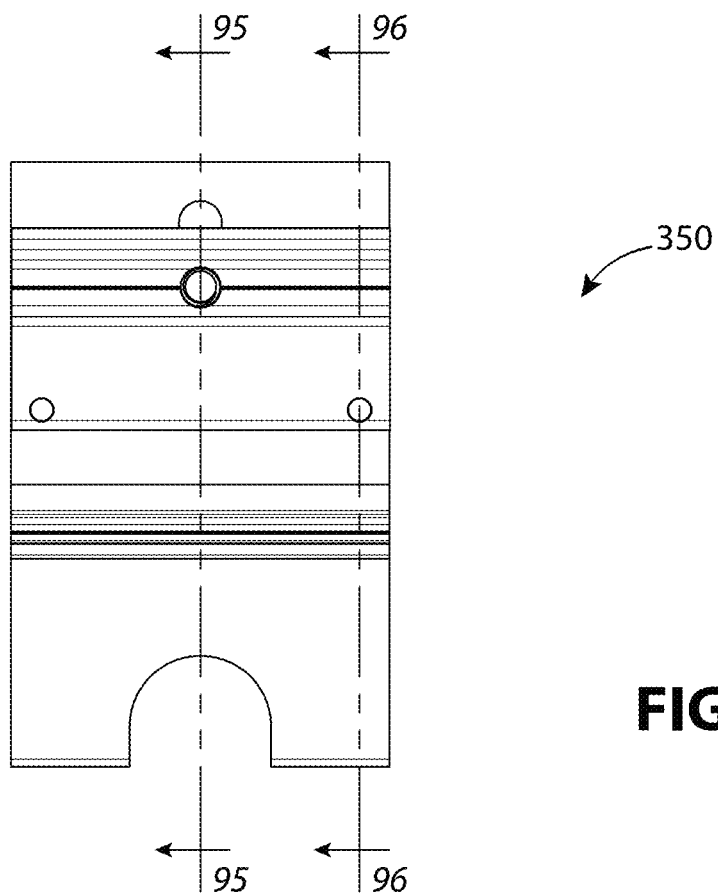
Figure 95:
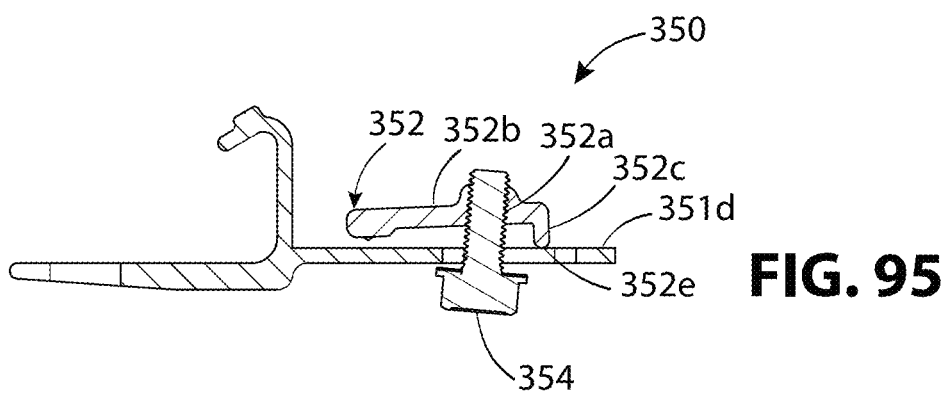
Figure 96:
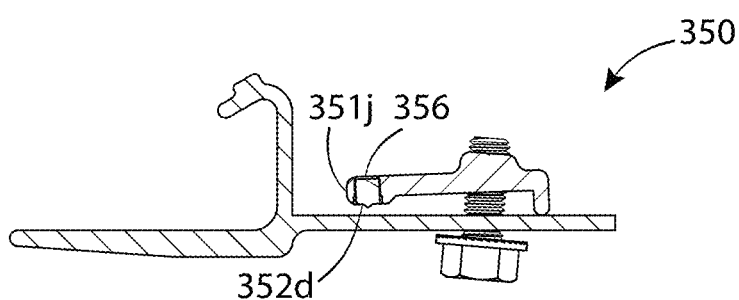

FIGS. 93-99 illustrate, in various views, the loop bracket 350 with FIGS. 95 and 96 showing a section view of FIG. 94 taken along section lines 95-95 and 96-96, respectively. As illustrated in FIG. 3, the loop bracket 350 is positioned on the outside interior corner of the trailing-edge of modules located on the outside perimeter of the solar module system. The loop bracket 350 shares similarities with the loop splice. Like the module loop splice, the loop bracket 350 rotationally engages a module hook bracket 360 (FIG. 100) in an adjacent row.

Referring to FIG. 93, the loop bracket 350 may include a loop bracket body 351, a clamp jaw 352, a threaded fastener 354, and multiple instances of a bonding pin 356. The threaded fastener 354 passes through a slot-shaped aperture 351a in a bracket body arm 351c of the loop bracket body 351 and engages a threaded aperture 352a in the clamp jaw 352. FIG. 95 illustrates, in section view, the threaded fastener 354 threadedly engaging the clamp jaw 352.

Referring to FIGS. 93 and 97-99, the loop bracket body 351 includes an upper platform 351d extending away from the bracket body arm 351c toward the clamp jaw 352, and a loop platform 351f extending away from the bracket body arm 351c in the opposite direction as the upper platform 351d.

Figure 97:
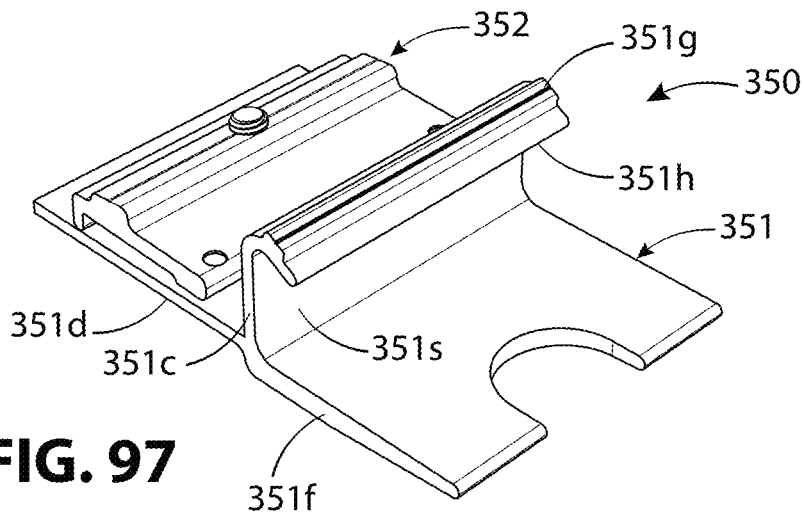
Figure 98:
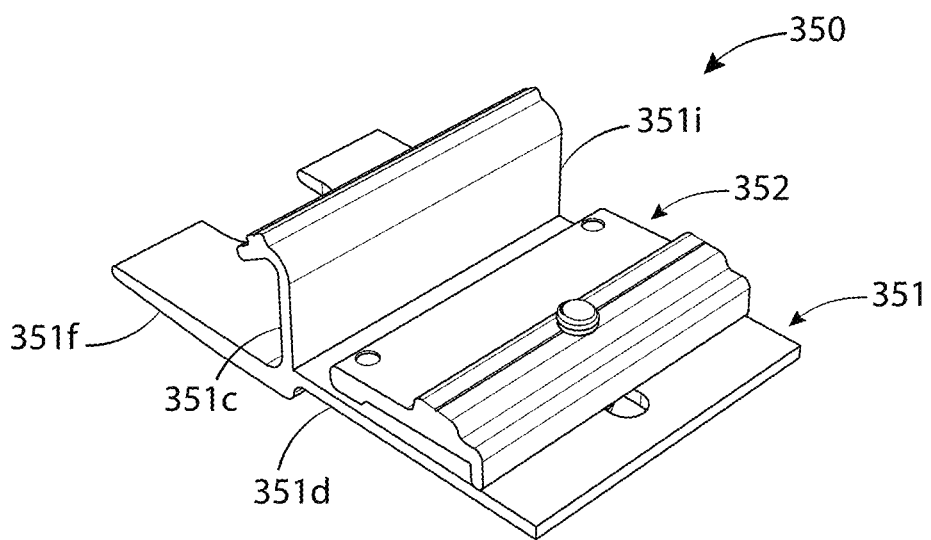
Figure 99:
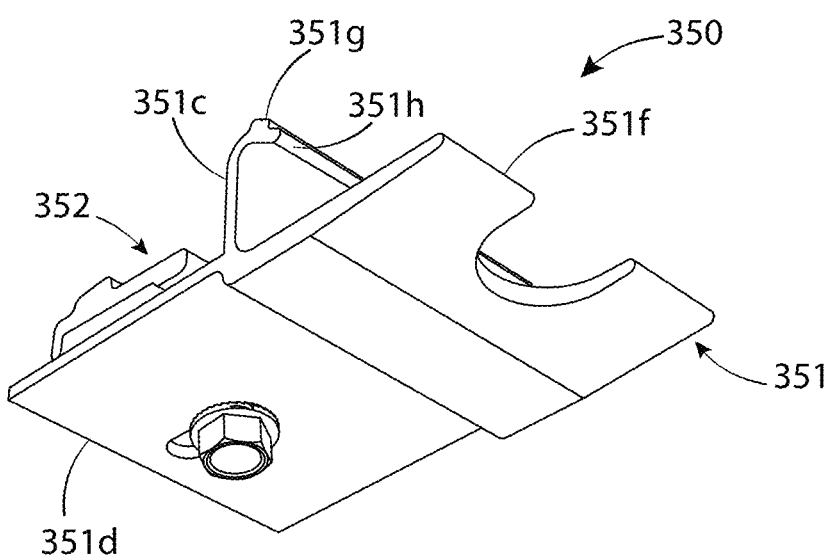

Referring to FIGS. 97, and 99, open loop 351g extends upward from the loop platform 351f with an open end 351h that extends back toward the loop platform 351f. The loop platform 351f and open loop 351g are sized and shaped to capture and retain the module hook bracket 360 of FIGS. 100-105. Referring to FIG. 98, the side of the bracket body arm 351c facing the loop platform 351f forms a backstop 351i that extends upward from the upper platform 351d. The upper platform 351d is structured to seat a return flange of a solar module. The backstop 351i is structured to seat the outside perimeter side of the frame of the solar module. The clamp jaw 352 clamps the return flange of the solar module against the upper platform 351d.

Referring to FIG. 95, the threaded fastener 354 extends obliquely through the threaded aperture 352a in a main arm 352b of the clamp jaw 352. As the threaded fastener 354 is tightened, the clamp jaw 352 pivots on a pivot arm end 352e against the upper platform 351d, and will clamp the return flange of a solar module seated on upper platform 351d. The pivot arm end 352e is located on an open end of the pivot arm 352c. The pivot arm 352c extends downward from the main arm 352b. The pivot arm end 352e may be generally rounded, or radiused.

The bonding pins together provide electrical bonding between the loop bracket 350 (FIG. 95), module hook bracket 360 (FIG. 103) and their associated solar modules. Referring to FIG. 96, the bonding pin 356 extends downward from a blind hole 351j in the clamping surface 352d of the clamp jaw 352.

Figure 100:
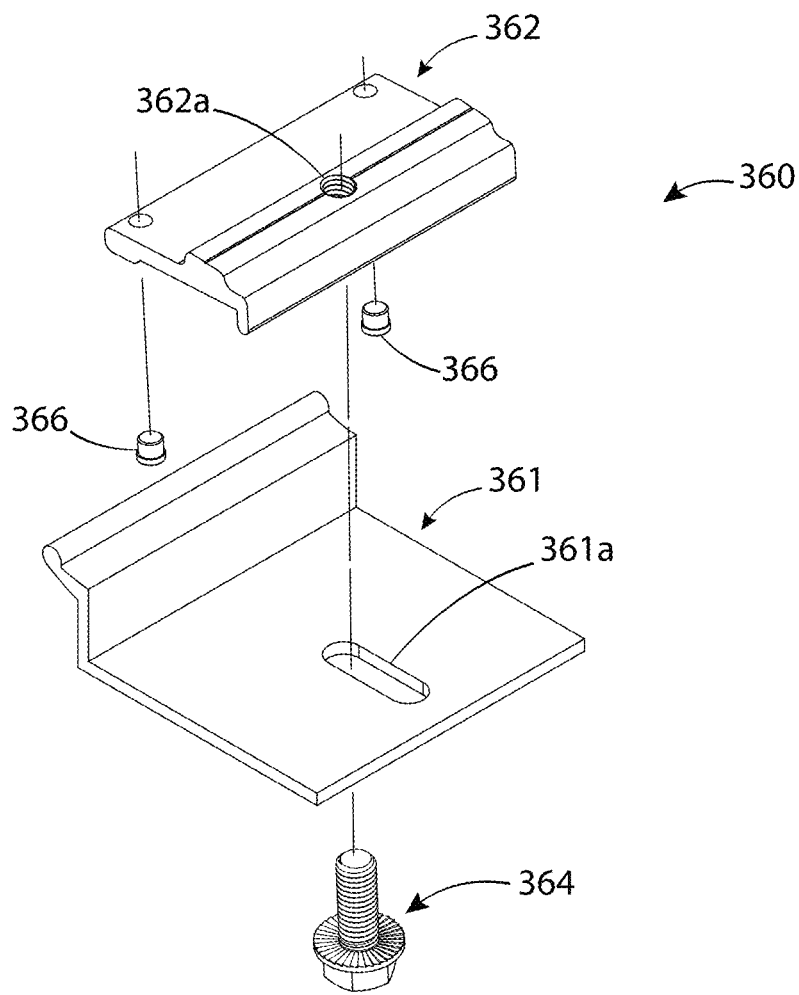
FIGS. 100-105 illustrate, in various views, the module hook bracket, with FIGS. 102 and 103 showing section views for FIG. 101 taken along section lines 102-102 and 103-103, respectively.
Figure 101:
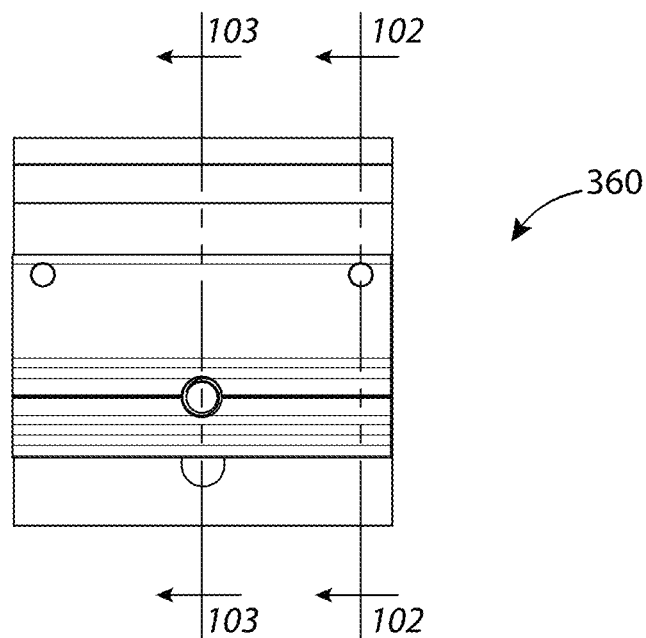
Figure 102:
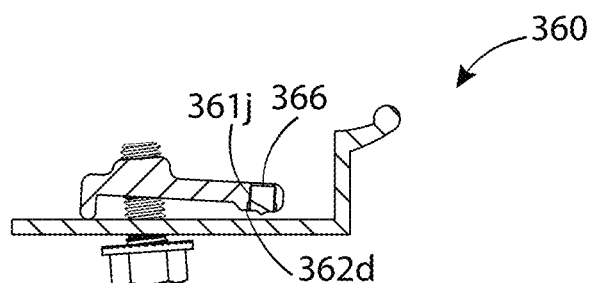
Figure 103:
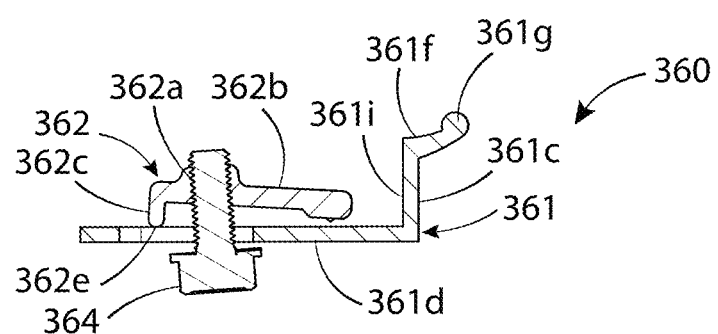

FIGS. 100-105 illustrate, in various views, the module hook bracket 360, with FIGS. 102 and 103 showing section views for FIG. 101 taken along section lines 102-102 and 103-103, respectively. As illustrated in FIG. 3, the module hook bracket 360 is positioned on the inside corners of the leading-edge of modules positioned subsequent to the first-row of modules.

Referring to FIG. 100, the module hook bracket 360 may include a module hook body 361, a clamp jaw 362, a threaded fastener 364, and multiple instances of bonding pin 366. The threaded fastener 364 passes through a slot-shaped aperture 361a in a body arm 361c of the module hook body 361, and engages a threaded aperture 362a in the clamp jaw 362.

Figure 104:
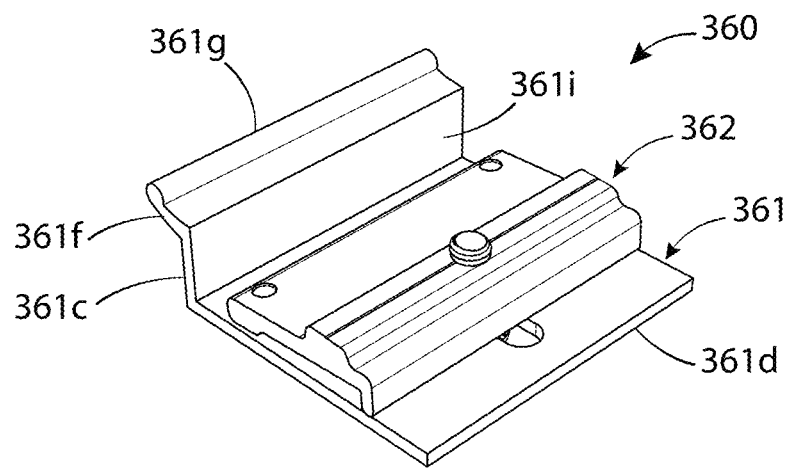

Referring to FIGS. 103, and 104, the module hook body 361 includes a platform 361d extending away from the body arm 361c toward the clamp jaw 362, and a hook arm 361f extending away the top of the body arm 361c in the opposite direction as the platform 361d.

Figure 105:
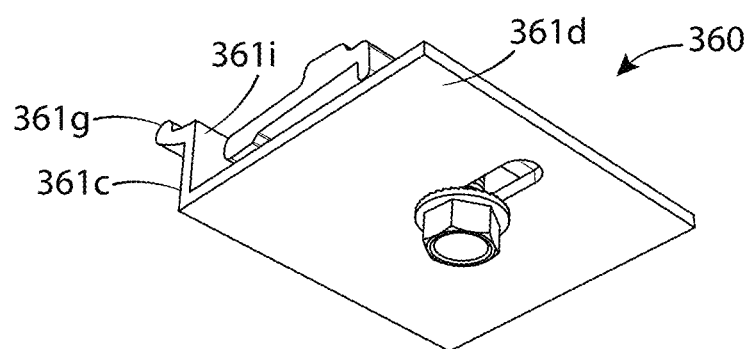

Referring to FIGS. 103 and 104, the hook arm 361f includes an upper surface that may be curved, arcuate, or upwardly concave-shaped as to allow the attached solar module to rotate within the cavity 351s of FIG. 97 between the loop platform 351f and the open loop 351g. A hook arm end 361g extends upward from the hook arm 361f. The hook arm 361f and hook arm end 361g are sized and shaped to be captured and retained in the open loop 351g of FIG. 97 and the open loop 311g of FIG. 84. Referring to FIGS. 103-105, the hook arm end 361g is illustrated as a ball catch hook, but could be other shapes that facilitate engagement with the open loop 351g of FIG. 97 and the open loop 311g of FIG. 84. Continuing to refer to FIGS. 103-105, the side of the body arm 361c facing the platform 361d forms a backstop 361i extends upward from the platform 361d. Referring to FIGS. 103 and 104, the platform 361d is structured to seat a return flange of a solar module, and the backstop 361i is structured to seat the outside perimeter side of the frame of the solar module. The clamp jaw 362 clamps the return flange of the solar module against the platform 361d.

Referring to FIG. 103, the threaded fastener 364 extends obliquely through the threaded aperture 362a in a main arm 362b of the clamp jaw 362. As the threaded fastener 364 is tightened, the clamp jaw 362 pivots on a pivot arm end 362e against the platform 361d and will clamp the return flange of a solar module seated on platform 361d. The pivot arm end 362e is located on an open end of the pivot arm 362c. The pivot arm 362c extends downward from the main arm 362b. The pivot arm end 362e may be generally rounded, or radiused.

Figure 106:
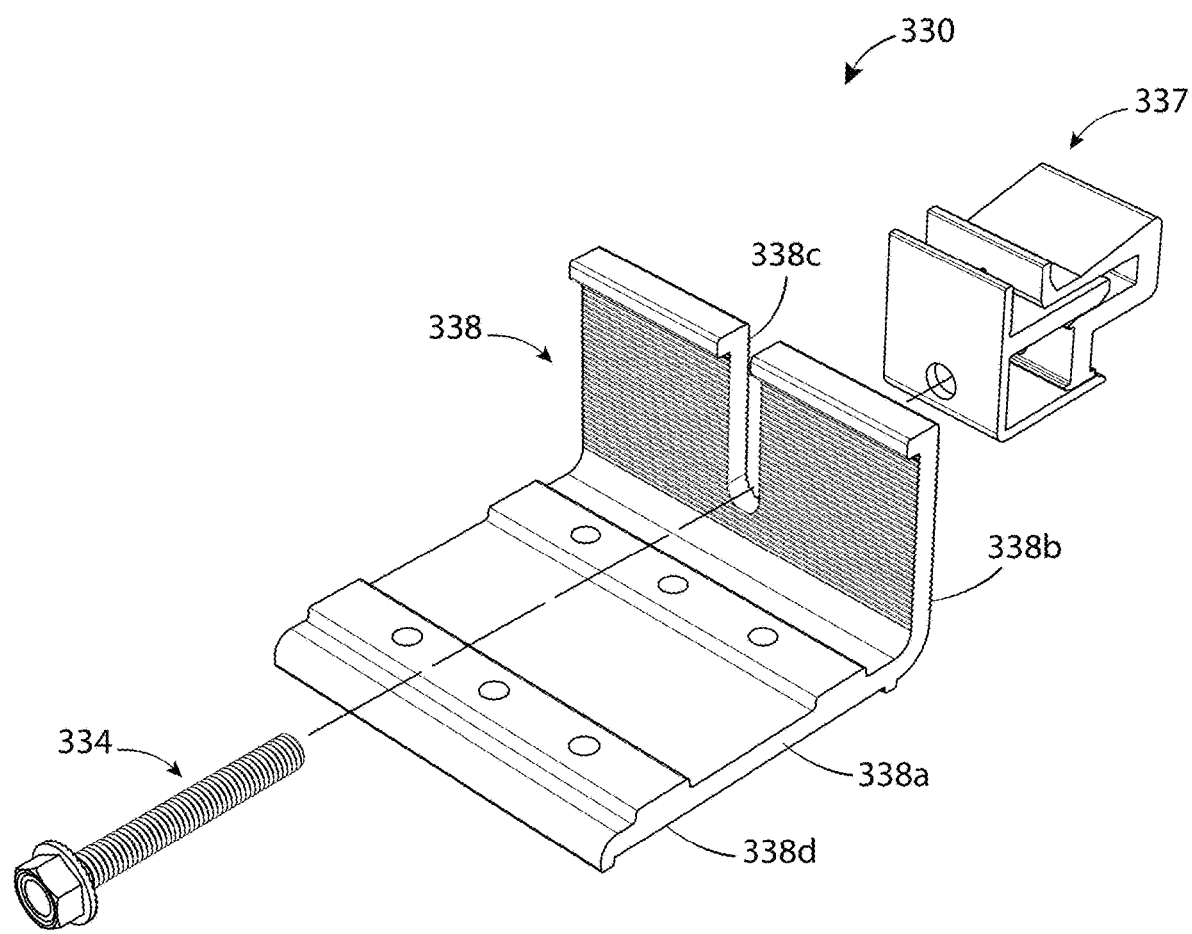
FIGS. 106-112 illustrate, in various views the end clamp, or portions thereof, with FIGS. 106-108 showing the end clamp, FIGS. 109-112, showing the module end bracket portion of the end clamp, and with FIG. 108 showing a section view of FIG. 107 taken along section lines 108-108.
Figure 107:
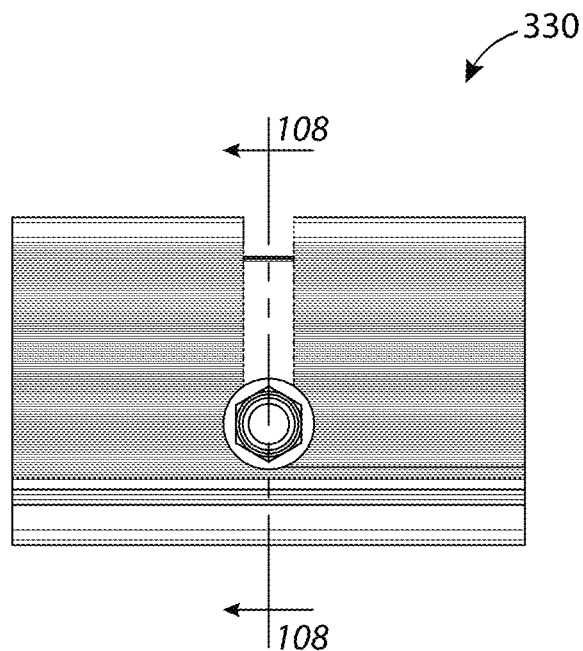
Figure 108:
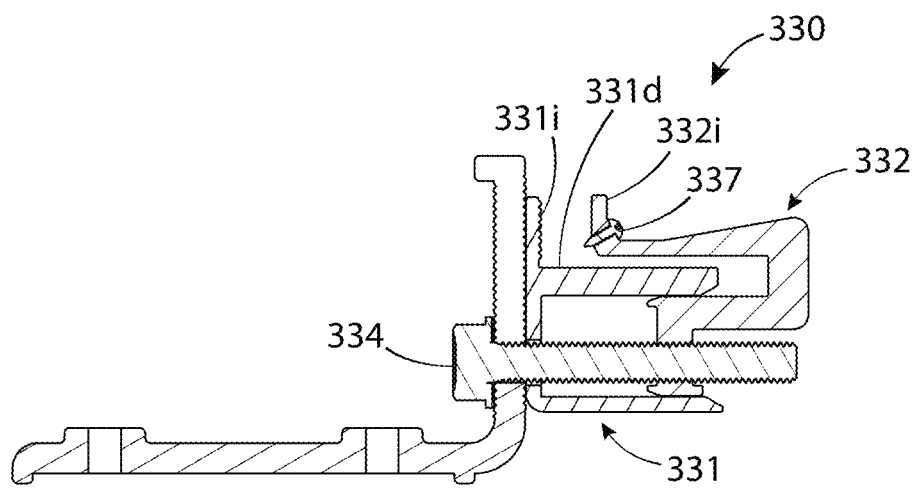
Figure 109:
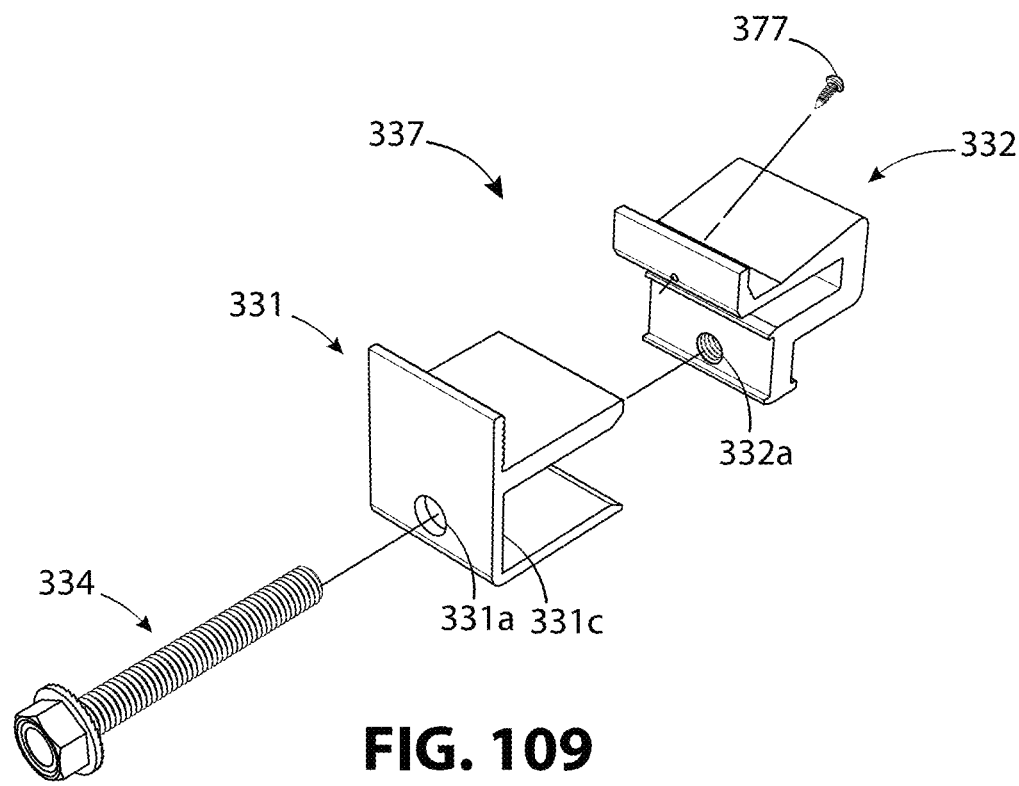
Figure 110:
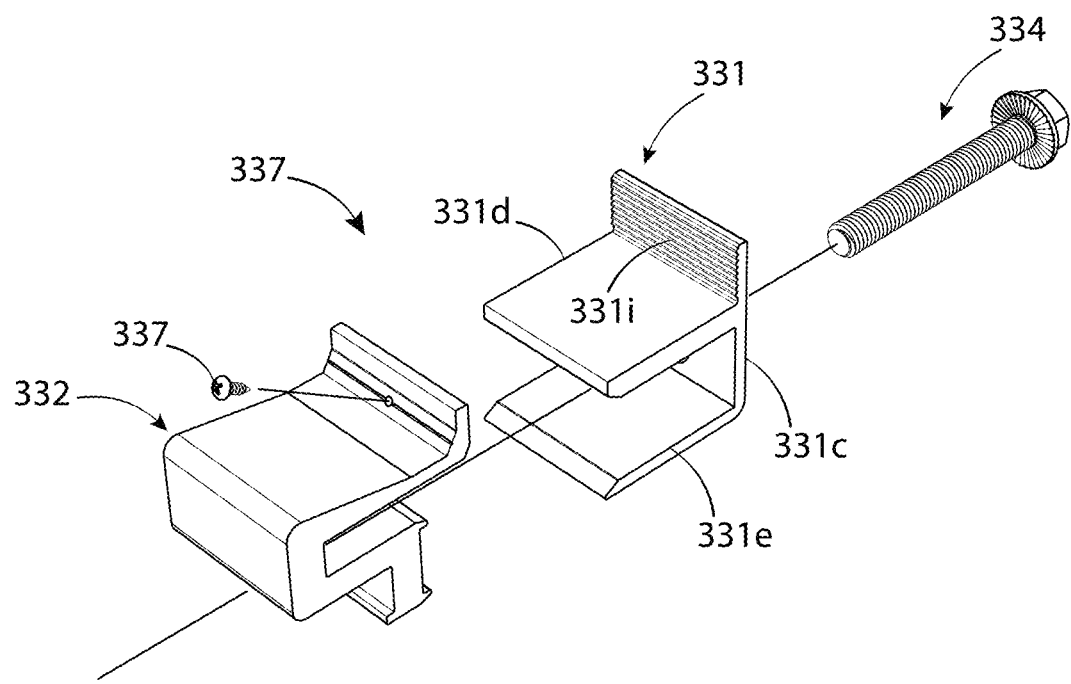

The bonding pin provides electrical bonding to the attached solar module. Referring to FIG. 102, the bonding pin 366 extends downward from a blind hole 361j in the clamping surface 362d of the clamp jaw 362 FIGS. 106-112 illustrate, in various views the end clamp 330, or portions thereof, with FIGS. 106-108 showing the end clamp 330, FIGS. 109-112, showing the module end bracket 337 portion of the end clamp 330, and with FIG. 108 showing a section view of FIG. 107 taken along section lines 108-108. Referring to FIG. 3, the end clamp 330 is positioned on the trailing-edge the solar modules and secure the solar module assembly to the roof rafters. Referring to FIG. 106, the end clamp 330 includes a module end bracket 337 assembly, a roof-attachment bracket 338, and a threaded fastener 334. Referring to FIGS. 109 and 110, the module end bracket 337 includes an end clamp body 331, a clamp jaw 332, a threaded fastener 334, and a bonding screw 377. Referring to FIG. 106, the roof-attachment bracket 338 includes a roof bracket base 338a and a roof bracket riser 338b extending upward from the roof bracket base 338a. The roof bracket base 338a is structured to seat against the roof surface. It may include a hollow recess 338d extending upward from the bottom to receive a gasket or a combination of a gasket and sealant. Examples of suitable gaskets include EDPM (Ethylene Propylene Diene Monomer) rubber, or Butyl rubber. The threaded fastener 334 passes through a slot-shaped opening 338c in the roof bracket riser 338b. Referring to FIG. 109, the threaded fastener 334 passes through slot-shaped aperture 331a in the end clamp body arm 331c. The threaded fastener 334 engages threaded aperture 332a in the clamp jaw 332.

Referring to FIG. 110, the end clamp body 331 includes an upper platform 331d and a lower platform 331e extending away from the end clamp body arm 331c toward the clamp jaw 332. Referring to FIGS. 108 and 110, a backstop 331i extends upward from the upper platform 331d. The upper platform 331d is structured to seat a return flange of a solar module. The backstop 331i is structured to seat the outside perimeter side of the frame of the solar module. The clamp jaw 332 clamps the return flange of the solar module against the upper platform 331d.

Figure 111:
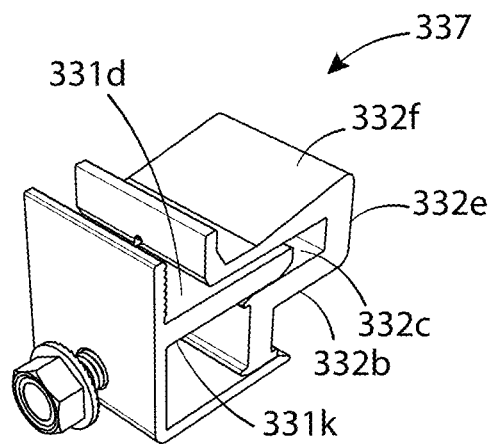
Figure 112:
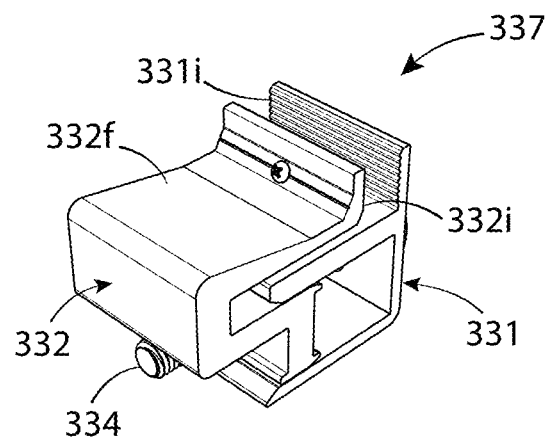

Referring to FIG. 111, the upper platform 331d includes a bottom surface 331k shaped to engage a lower arm 332b of the clamp jaw 332. The lower arm 332b extends away from the clamp jaw back 332e, and is positioned under the upper arm 332f of clamp jaw 332 to form a cavity 332c therebetween. Referring to FIG. 112, the clamp jaw 332 includes a front stop 332i extending upward from the upper arm 332f. Referring to FIGS. 108 and 112, as the threaded fastener 334 is tightened, it draws the clamp jaw 332 toward the end clamp body 331. The front stop 332i is drawn toward the backstop 331i. With a solar module seated against upper platform 331d and the outside of the frame of the solar module seated against the backstop 331i, front stop 332i would clamp against the inside of the frame and press the outside of the frame against the backstop 331i as the threaded fastener 334 is tightened. Referring to FIG. 108, bonding screw 377 would be pressed against the inside of the frame of the solar module.

Figure 113:
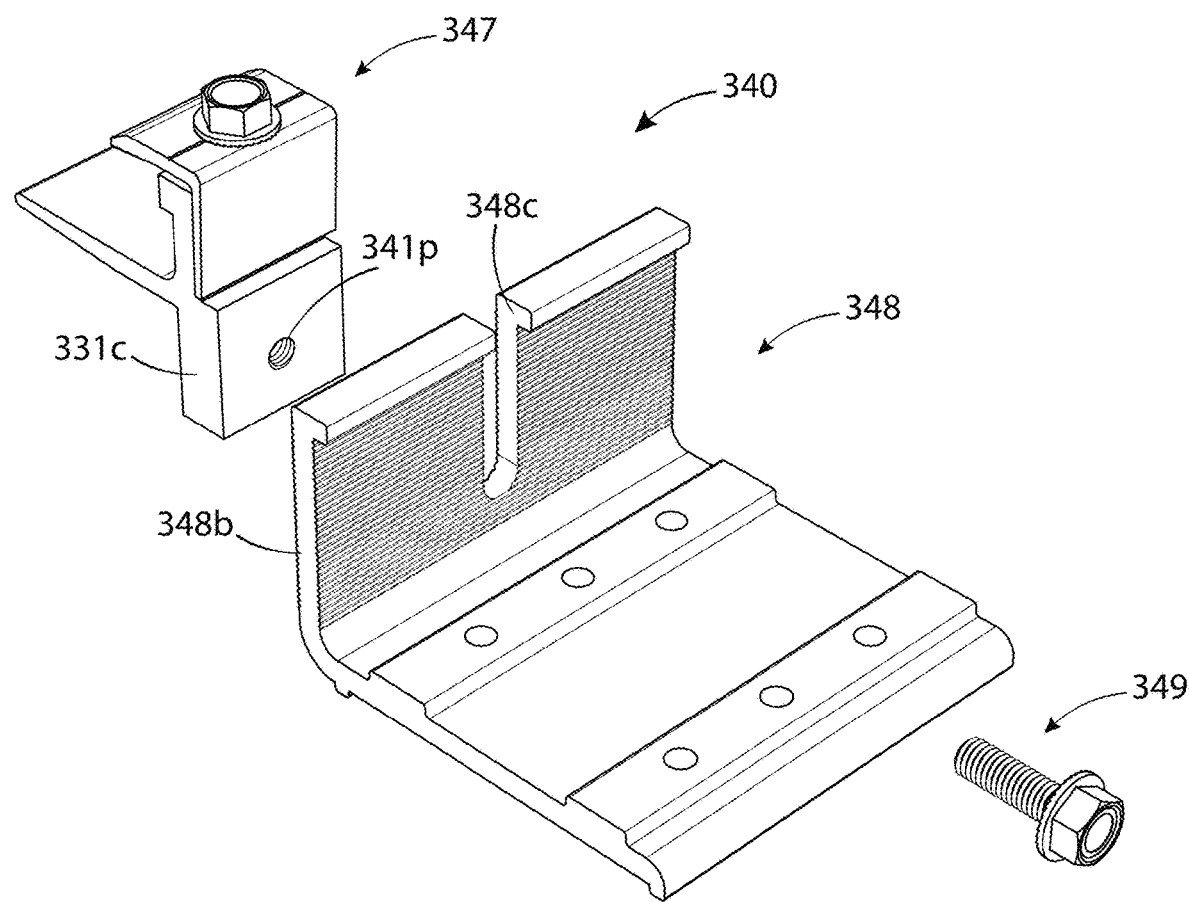
FIGS. 113-119 illustrate, in various views the edge clamp, or portions thereof, with FIGS. 113-115, 118, and 119, showing the edge clamp, FIGS. 116 and 117 showing the module edge bracket portion of the edge clamp, and with FIG. 115 showing a section view of FIG. 114 taken along section lines 115-115.
Figure 114:
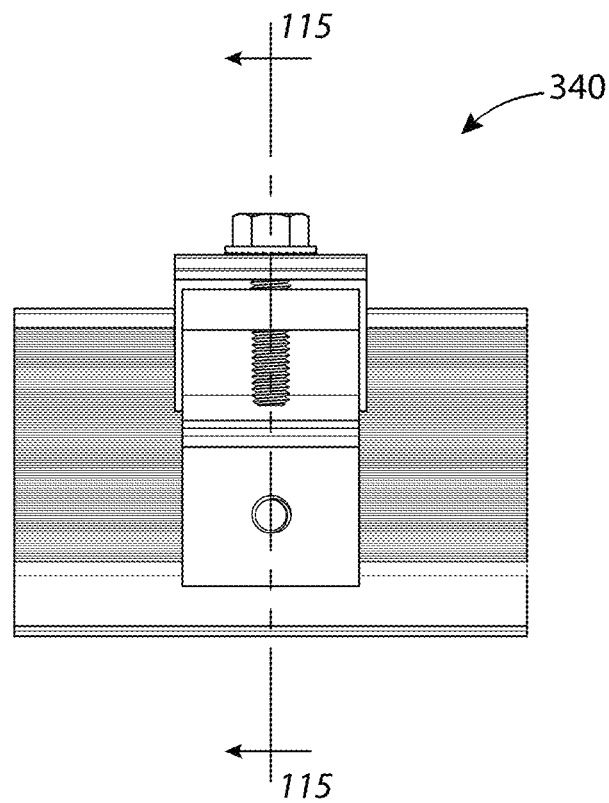
Figure 115:
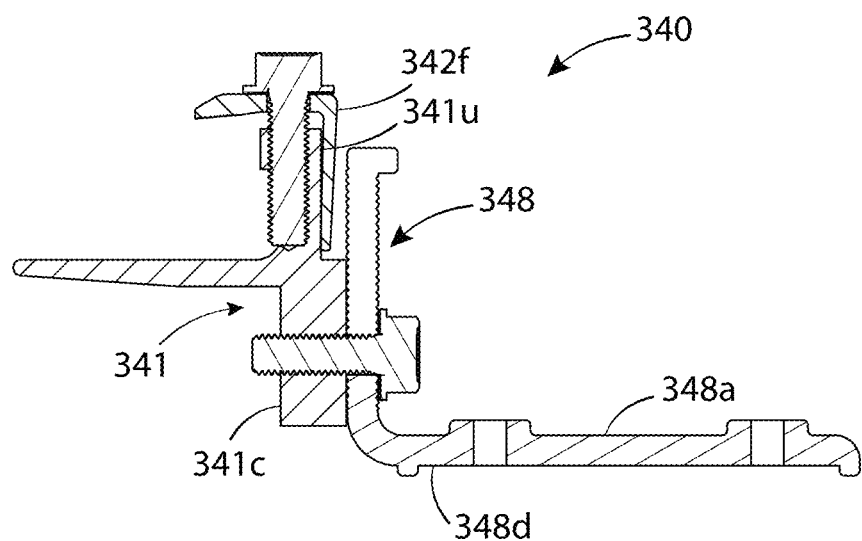
Figure 116:
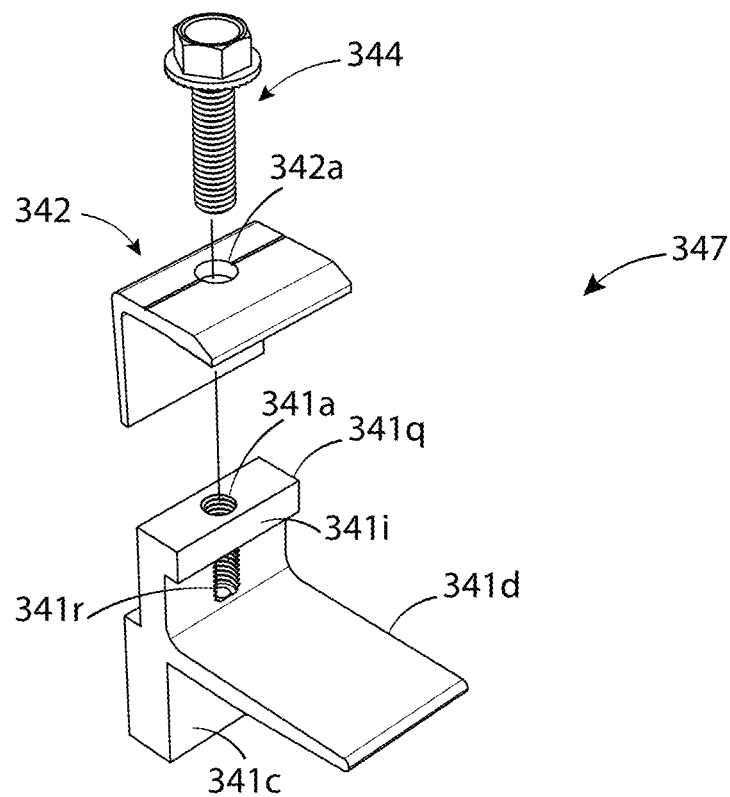
Figure 117:
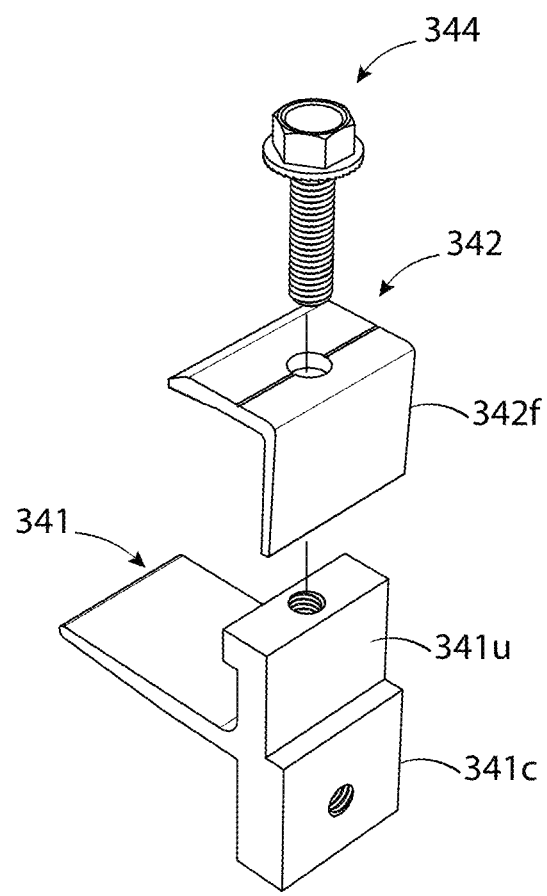

FIGS. 113-119 illustrate, in various views the edge clamp 340, or portions thereof, with FIGS. 113-115, 118, and 119, showing the edge clamp 340, FIGS. 116-117 showing the module edge bracket 347 portion of the edge clamp 340, and with FIG. 115 showing a section view of FIG. 114 taken along section lines 115-115. Referring to FIG. 3, the edge clamp 340 is positioned on the leading-edge of the first-row of modules. This forms the leading-edge outside boundary of the solar module system 300. The edge clamp 340 secures the leading-edge row of modules to the roof rafters.

Figure 118:
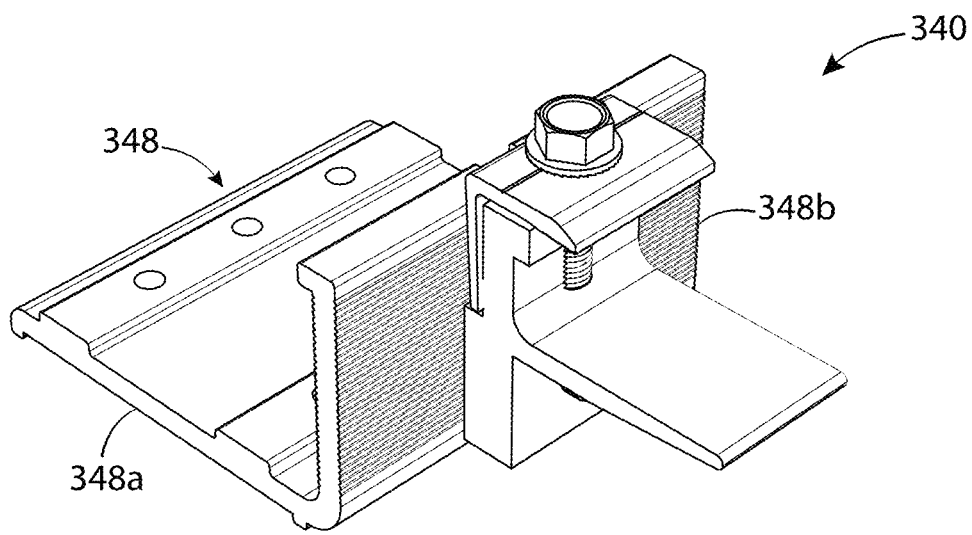
Figure 119:
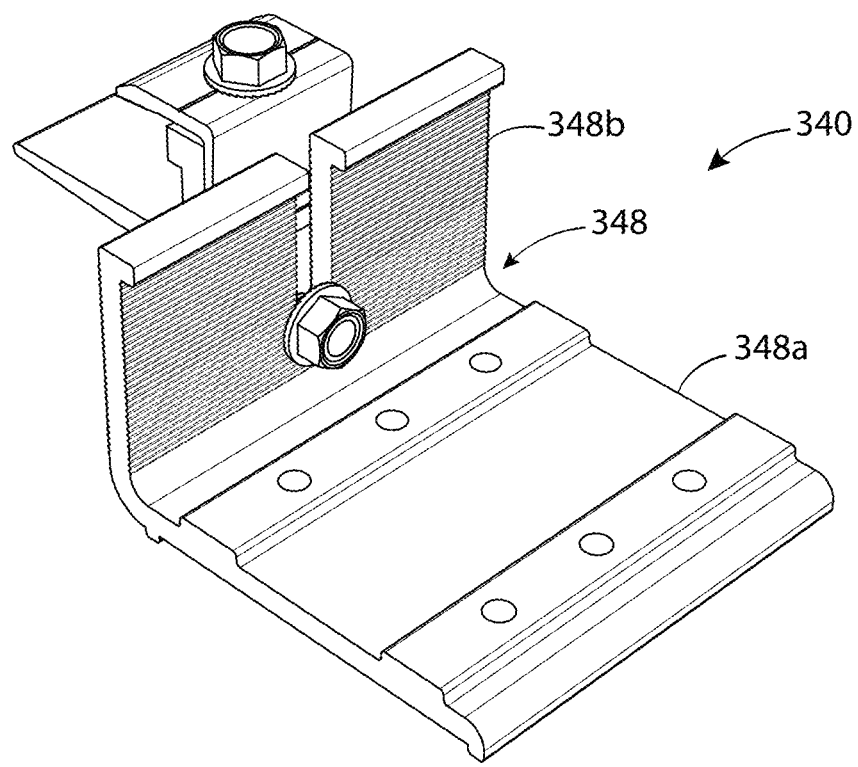

Referring to FIG. 113, the edge clamp 340 includes a module edge bracket 347 assembly, a roof-attachment bracket 348, and a threaded fastener 349. Referring to FIGS. 118 and 119, the roof-attachment bracket 348 includes, a roof bracket base 348a, and a roof bracket riser 348b extending upward from the roof bracket base 348a. The roof bracket base 348a is structured to seat against the roof surface as previously described for roof bracket base 338a of FIG. 106. Referring to FIG. 113, the threaded fastener 349 passes through a slot-shaped opening 348c in the roof bracket riser 348b, and engages threaded aperture 341p in the edge clamp body arm 341c, to secure the roof-attachment bracket 348 to the module edge bracket 347.

FIGS. 116 and 117 illustrate the module edge bracket 347 in more detail. Referring to FIGS. 116 and 117, the module edge bracket 347 includes the edge clamp body 341, the clamp jaw 342, and the threaded fastener 344. Referring to FIG. 116, the threaded fastener 344 passes through an aperture 342a in the clamp jaw 342. The threaded fastener 344 engages a threaded aperture 341a in the top surface 341q in the edge clamp body 341. The threaded aperture 341a of FIG. 30, may include an open portion 341r, for example, as illustrated.

The edge clamp body 341 includes a platform 341d extending away from the edge clamp body arm 341c. A backstop 341i extends outward from the edge clamp body arm 341c in the same direction as the platform 341d. The platform 341d is structured to seat a return flange of a solar module and the backstop 331i is structured to seat the outside perimeter side of the frame of the solar module. As the threaded fastener 344 is tightened, the clamp jaw 342 clamps against the top of the frame of the solar module and pushes the solar module against the platform 341d. Referring to FIGS. 115 and 117, the edge clamp body arm 341c includes a recessed portion 341u that extends inward from the outer surface of the edge clamp body arm 341c. The recessed portion 341u is structured to receive the lower arm 342f of the clamp jaw 342. Referring to FIG. 115, the recessed portion 341u allows space for the lower arm 342f to move up and down between the edge clamp body 341 and the roof-attachment bracket 348. As previously discussed for FIG. 106, in FIG. 115, the roof bracket base 348a includes a hollow recess 348d extending upward from the bottom of the roof bracket base 348a. The hollow recess 348d is structured to receive a watertight gasket that seats against the roof.

Assembly Method: Second Embodiment

Using the components of FIGS. 80-119, an installer may apply, as a non-limiting example, the assembly method of FIGS. 31-35. FIGS. 120-123 illustrate, in various views, an example of carrying out the steps in flow chart 400 of FIG. 31. FIGS. 124-127, illustrate, in various views, an example of carrying out the steps in flow chart 410 of FIG. 32.

Figure 120:
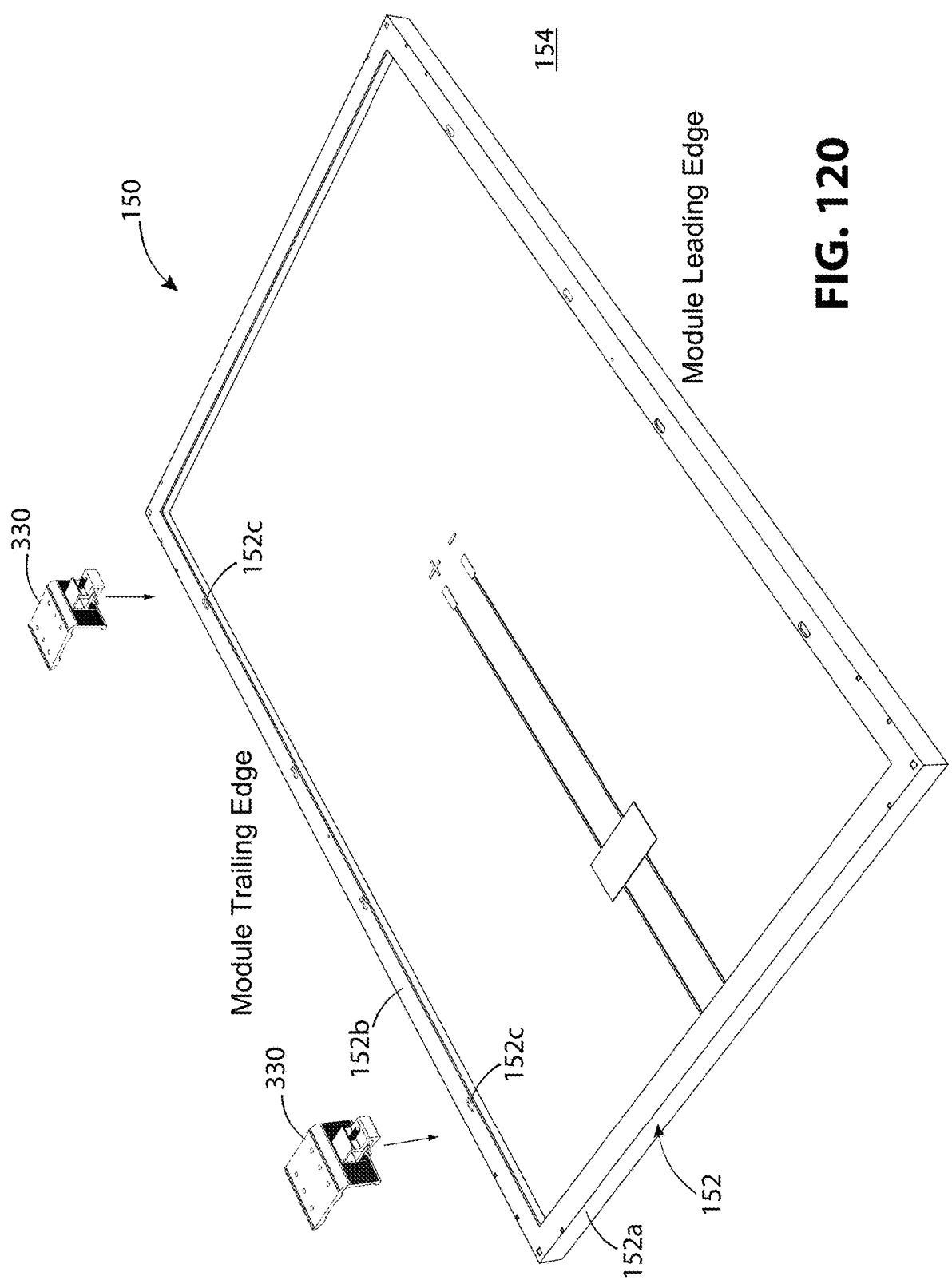
FIGS. 120-123 illustrate, in various views, an example of carrying out the steps in flow chart of FIG. 31.
Figure 122:
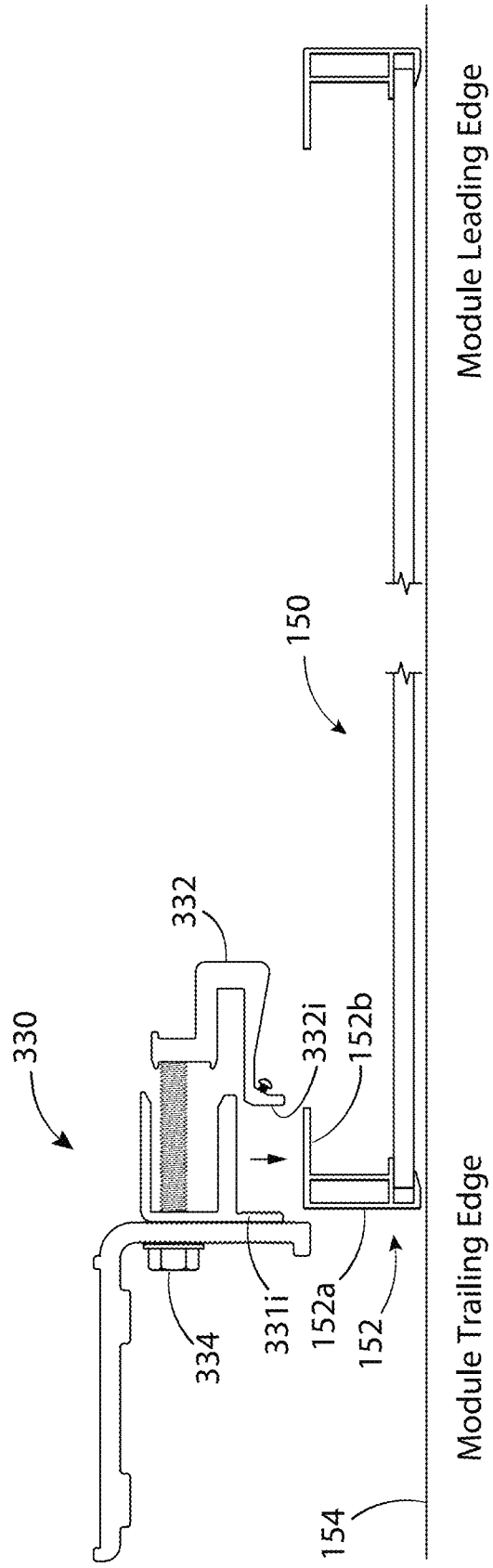

Referring to FIG. 120, the installer attaches two instances of the end clamp 330 to the outer side 152a, and the return flange 152b of frame 152 of solar module 150. The instances of the end clamp 330 are secured to the trailing-edge of the frame 152. For consistency, the installer may align the instances of the end clamp 330 to indicia on the return flange 152b, such as manufacturer-provided mounting holes 152c. The position of the instances of the end clamp 330 is not critical as they initially provide temporary support and will be adjusted to their final positions by the roof crew. FIG. 122 shows the installation of one instance of the end clamp 330, in side view, with part of the frame 152 of the solar module 150, cutaway to reveal details on how the end clamp 330 mounts to the frame 152. The threaded fastener 334 of the end clamp 330 is sufficiently loosened to allow the front stop 332i of the clamp jaw 332 to clear the end of the return flange 152b, and the backstop 331i to clear the outer side 152a of the frame 152.

Figure 121:
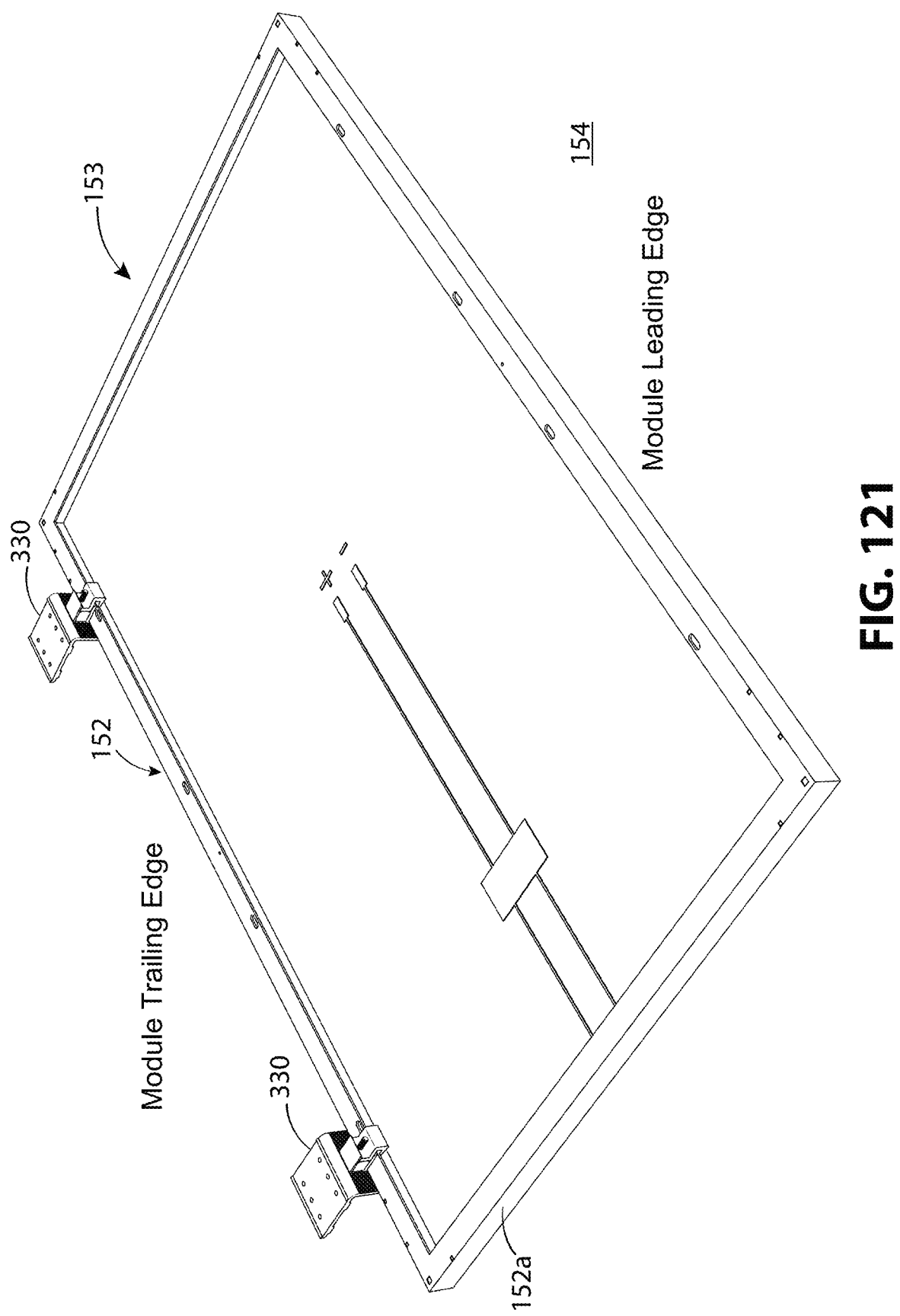
Figure 123:
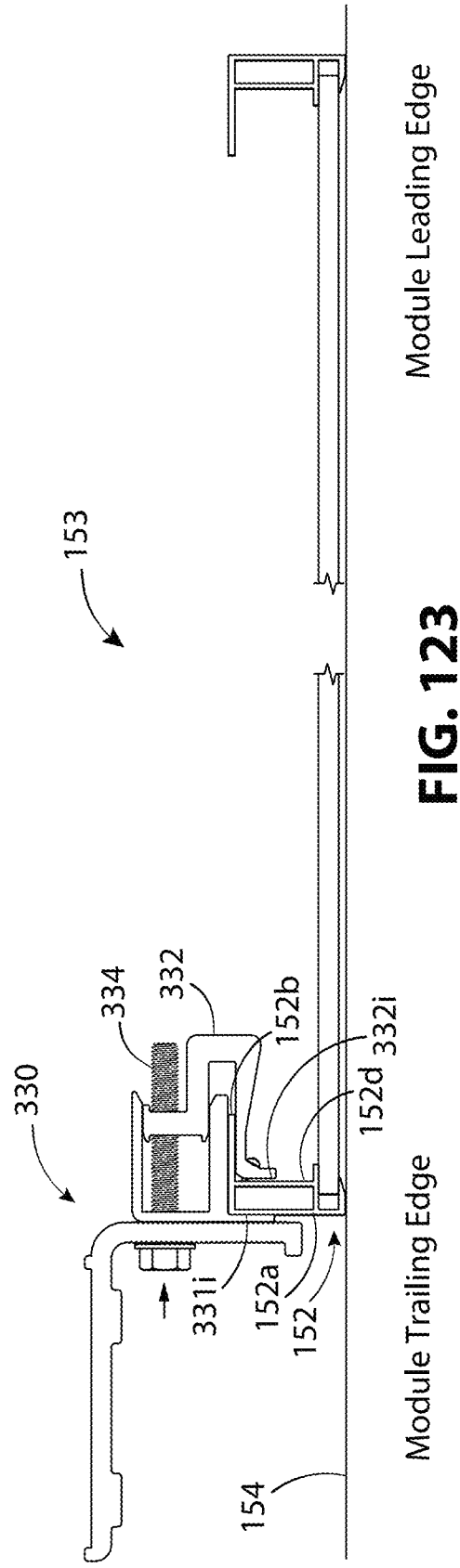

FIGS. 121 and 123, show the completed assembly, the first-row module assembly 153, with the end clamp 330 secured to the frame 152, ready for installation and attachment to the roof. In FIG. 123, the installer has tightened the threaded fastener 334 to draw the clamp jaw 332 inward over the return flange 152b and the front stop 332i against the inside 152e of the frame 152. The backstop 331i is pressed against the outer side 152a of the frame 152.

Figure 124:
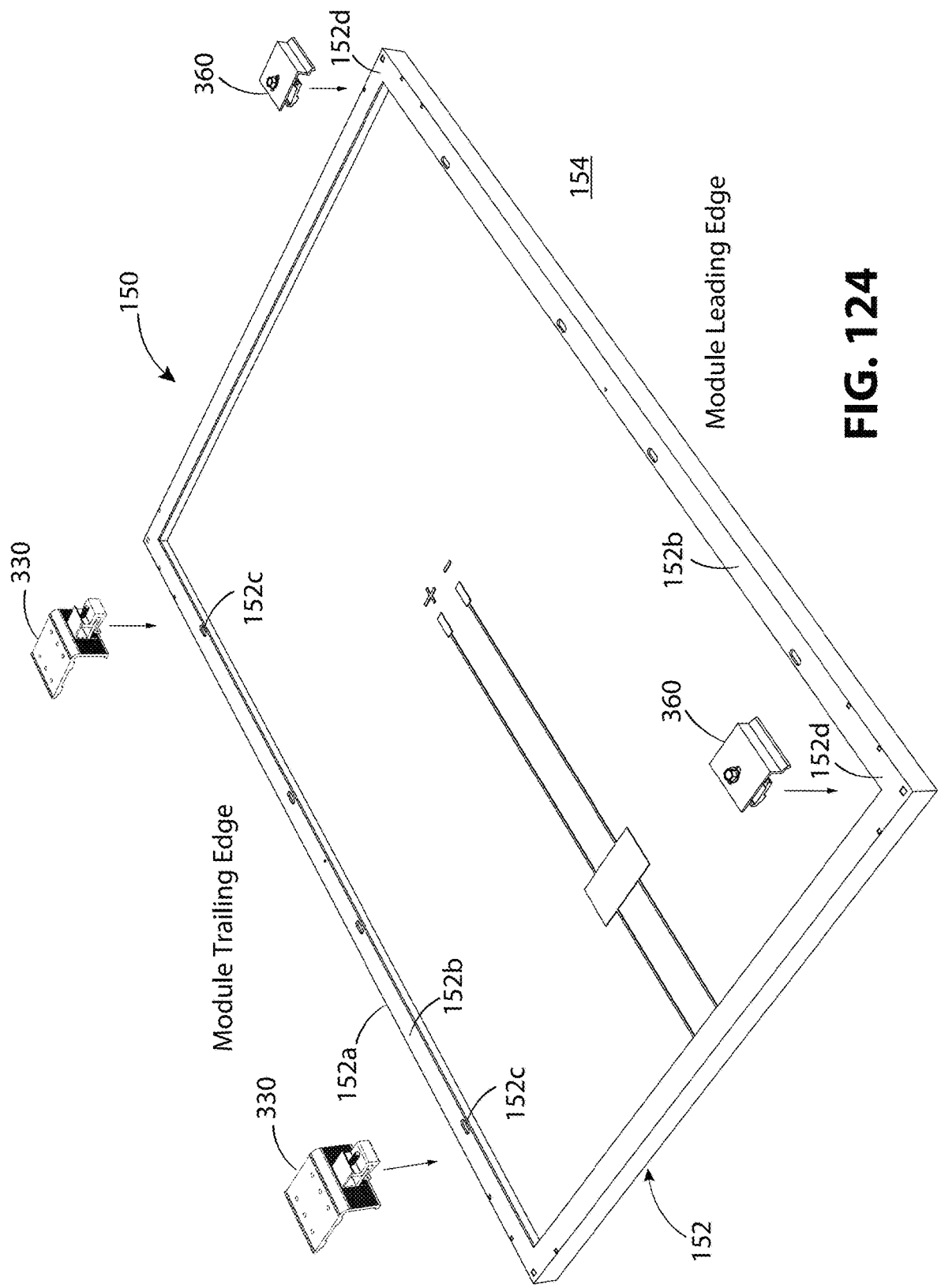
FIGS. 124-127 illustrate, in various views, an example of carrying out the steps in flow chart of FIG. 32.
Figure 126:
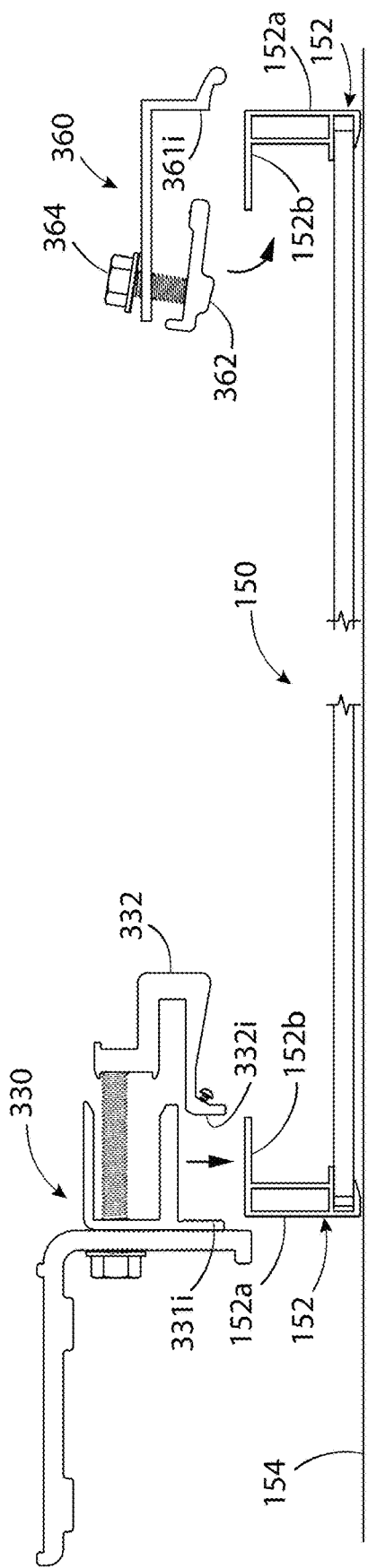

Referring to FIG. 124, the installer attaches two instances of the end clamp 330 to the outer side 152a and the return flange 152b of the frame 152 of an instance of the solar module 150. This instance of the solar module 150 is intended for a row of modules other than the first-row. The instances of the end clamp 330 are secured to the trailing-edge of the frame 152. For consistency, the installer may align the instances of the end clamp 330 to indicia on the return flange 152b, such as manufacturer-provided mounting holes 152c. The position of the instances of the end clamp 330 is not critical as they initially provide temporary support and will be adjusted to their final positions by the roof crew. The installer also attaches two instances of the module hook bracket 360 to opposite inside corners 152d of the return flange 152b on the leading-edge of the frame 152. FIG. 126 shows the installation of one instance of the end clamp 330 and one instance of the module hook bracket 360, in side view. Part of the frame 152 of the solar module 150 is cutaway to reveal details on how the end clamp 330 and module hook bracket 360 mount to the frame 152. The threaded fastener 334 of the end clamp 330 is sufficiently loosened to allow the front stop 332i of the clamp jaw 332 to clear the end of the return flange 152b. The threaded fastener is also sufficiently loosened to allow backstop 331i to clear the outer side 152a of the frame 152. The threaded fastener 364 of the module hook bracket 360 is sufficiently loosened to allow the end of the clamp jaw 362 to clear the end of the return flange 152b. The backstop 361i is also sufficiently loosened to clear the outer side 152a of the frame 152.

Figure 125:
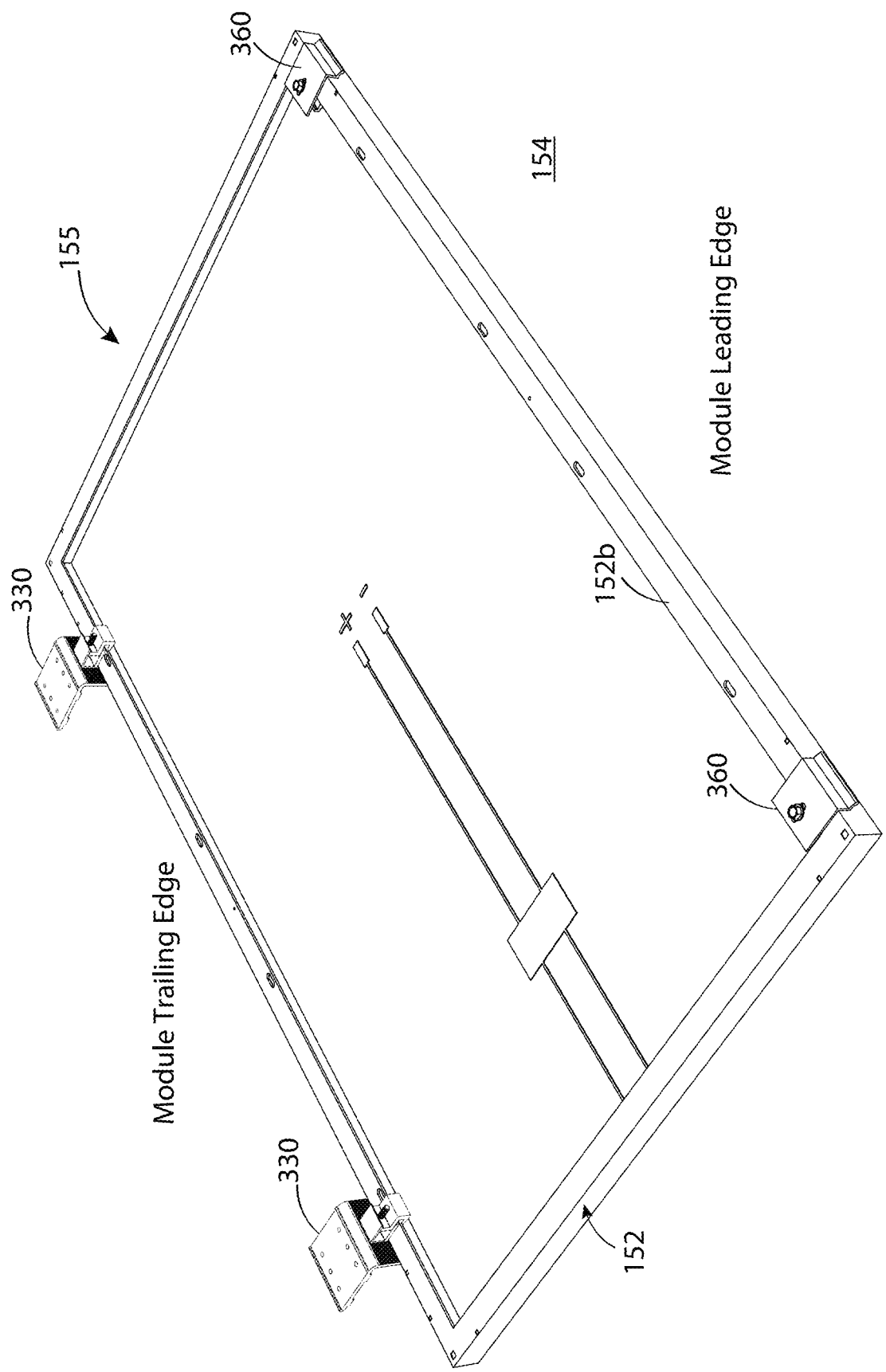
Figure 127:
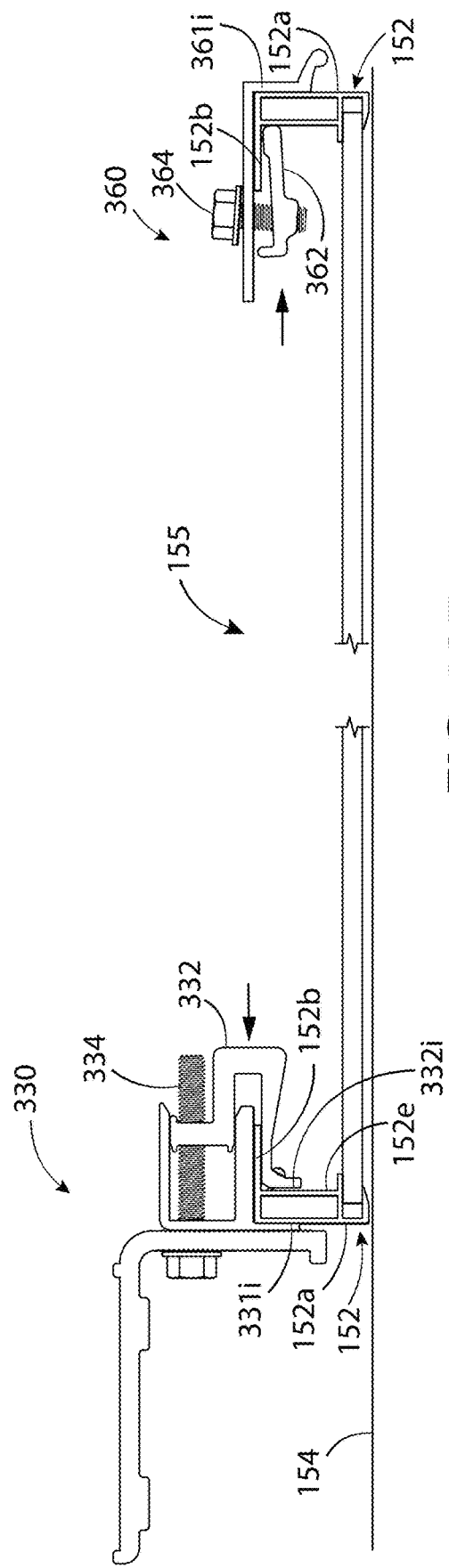

FIGS. 125 and 127, show the completed assembly, the non-first-row module assembly 155, with instances of the end clamp 330 and the module hook bracket 360 secured to the frame 152, ready for installation and attachment to the roof. In FIG. 127, to install end clamp 330, the installer has tightened the threaded fastener 334 to draw the clamp jaw 332 inward over the return flange 152b and to draw the front stop 332i against the inside 152e of the frame 152. The backstop 331i is pressed against the outer side 152a of the frame 152. To install module hook bracket 360, the installer has tightened the threaded fastener 364 to draw the clamp jaw 362 upward over the return flange 152b. The backstop 361i is pressed against the outer side 152a of the frame 152. FIG. 125 illustrates the module hook bracket 360 positioned against the opposite corners of the return flange 152b on the leading-edge of the non-first-row module assembly 155.

FIGS. 120 and 122 illustrate the solar module 150 and FIGS. 121 and 123 illustrate the first-row module assembly 153 positioned face-down on a work surface 154. FIGS. 124 and 126 illustrate the solar module 150 and FIGS. 125 and 127 illustrate the non-first-row module assembly 155 also positioned face-down on a work surface 154. Non-limiting examples of work surfaces include: the ground, a workbench, a work vehicle, a saw horse, a table, a building floor, or other jobsite work surface. As previously discussed, the solar module 150, first-row module assembly 153, or non-first-row module assembly 155, could also be pre-assembled against a wall or other surface of the building structure.

FIGS. 120, 122, 124, and 126 show instances of end clamp 330 being secured to the frame 152 as a unit. Referring to FIG. 106, an installer could opt to install the module end bracket 337 first and then install the roof-attachment bracket 338.

Figure 128:
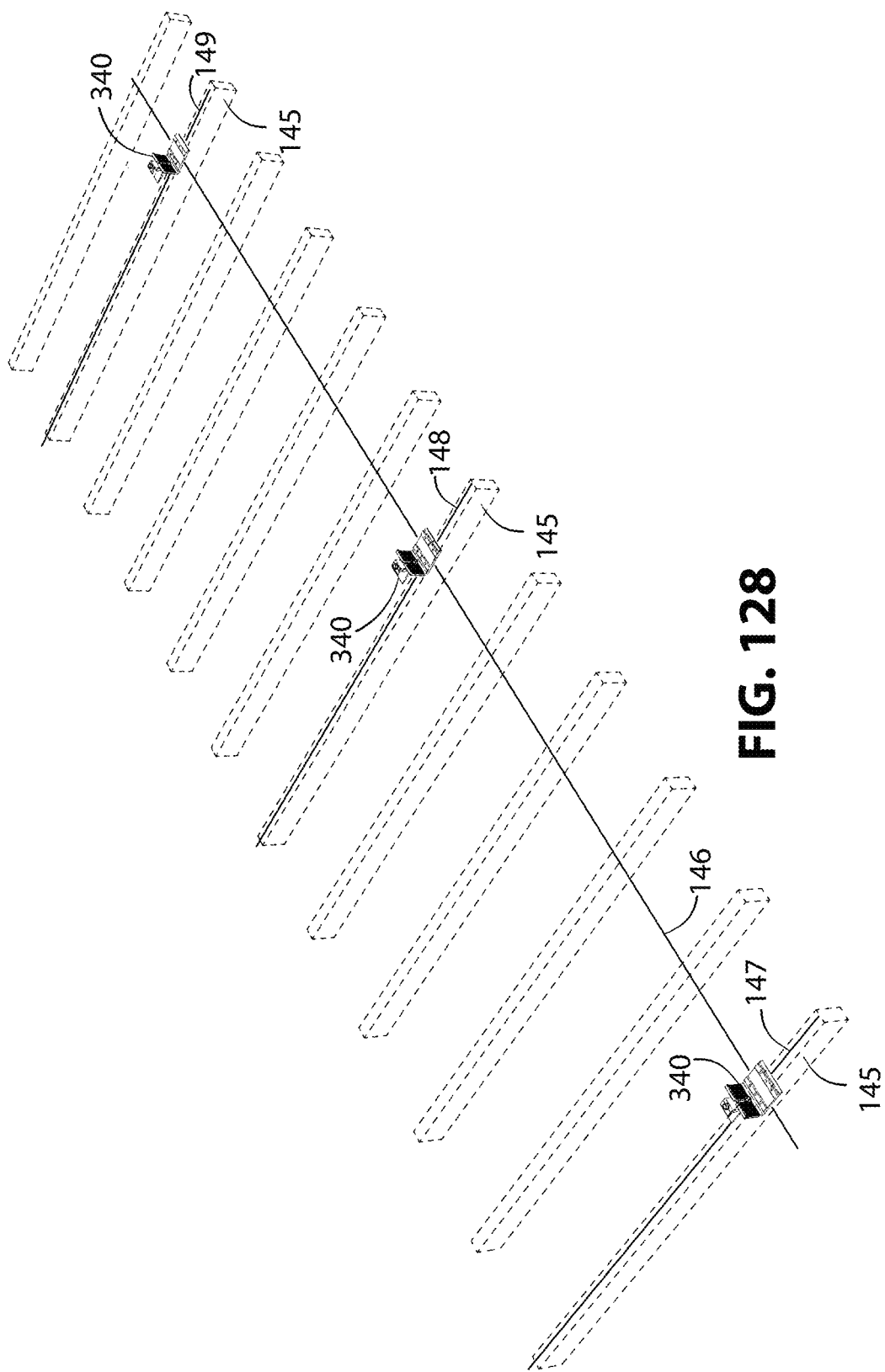

FIG. 128 illustrates the results of step 422 and step 423 of FIG. 33. Instances of roof rafter 145 are shown in dashed lines indicating that they are hidden from view. Referring to FIG. 128, chalk line 146 marks the leading-edge, or front edge of the solar module boundary. Chalk line 147, chalk line 148, and chalk line 149 are drawn over the center line of instances of the roof rafter 145 that are spaced apart at the desired pre-determined spacing for roof bracket securement. The installer positioned instances of the edge clamp 340 where the roof rafter chalk lines, chalk line 147, chalk line 148, and chalk line 149 cross the leading-edge chalk line, chalk line 146.

Referring to FIG. 33, in step 424, with the edge clamps secured to the roof, the installer secures each first-row module assembly to corresponding edge clamps. FIGS. 129 and 130 illustrate an example of how an installer may carry out this step. Referring to FIG. 129, the installer places the first-row module assembly 153, face up, with the end clamp 330 against or near the roof, and slides the assembly toward the edge clamp 340, between the platform 341d and the clamp jaw 342. Referring to FIG. 130, with the solar module 150 positioned between the clamp jaw 342 and platform 341d, the installer tightens threaded fastener 344 to secure the solar module 150 to the edge clamp 340.

Figure 131:
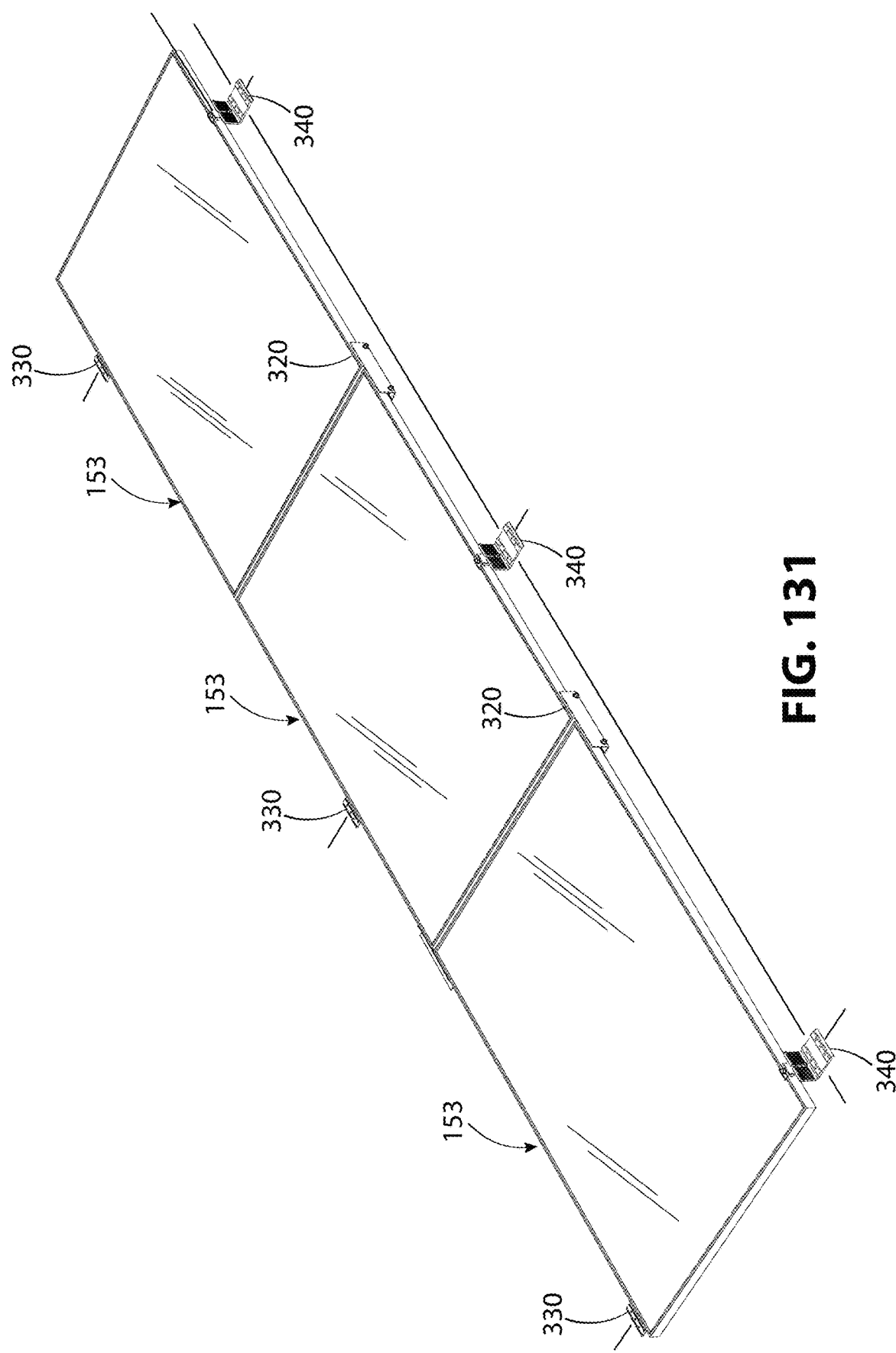
Figure 132:
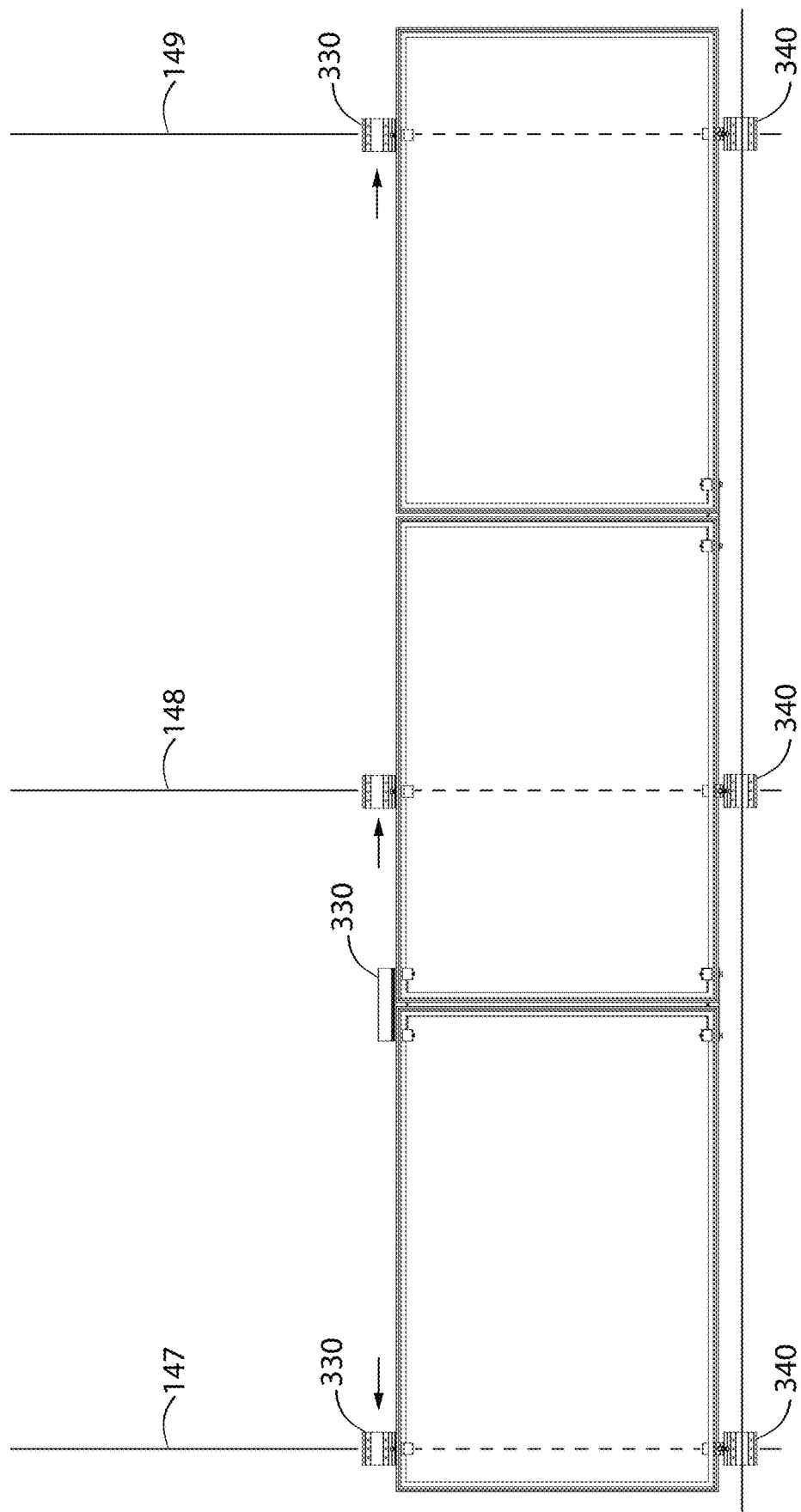

FIGS. 133-136 illustrate an example of how an installer might carry out step 425, step 426, and step 427 of FIG. 33 with FIG. 131 showing the completion of these steps. FIG. 131 illustrates instances of first-row module assembly 153 secured instances of the edge clamp 340 and instances of the end clamp 330. FIG. 131 also illustrates instances of edge splice 320 positioned between the instances of first-row module assembly 153. FIGS. 132 and 133 illustrate, in perspective view and top view, respectively, the completed first-row. The module bodies of the solar modules are shown as transparent (i.e., x-ray view) to reveal the structure beneath. FIG. 133 illustrates instances of the end clamp 330 aligned with corresponding instances of the edge clamp 340. These instances of end clamp 330 are secured to edge-clamp-secured roof rafters. The location of the edge-clamp-secured roof rafters are indicated by the dashed lines.

Referring to FIG. 132, the installed instances of the edge clamp 340 are installed over the roof rafter chalk lines, chalk line 147, chalk line 148, and chalk line 149. Instances of the end clamp 330 are temporarily positioned to help create stability during the installation process. The installer moves instances of the end clamp 330 to the corresponding chalk lines: chalk line 147, chalk line 148, and chalk line 149, and secures them to the roof rafters. The installer removes the unused instances of the end clamp 330 for reuse.

FIG. 133 shows the position of the loop bracket 350 on the outside corners of the trailing-edge of the first-row. Instances of the loop splice 310 are secured on the trailing-edge of the row between adjacent instances of the first-row module assembly 153 in line with instances of the edge splice 320.

FIG. 134 shows an enlarged portion of FIG. 133 illustrating the edge splice 320 mounted between adjacent instances of solar module 150. The first clamp jaw 322 is secured one instance of the frame 152. The second clamp jaw 323 is secured to the other instance of the frame 152. FIG. 135 similarly illustrates the loop splice 310 mounted between adjacent instances of the solar module 150. The first clamp jaw 312 secures the loop splice 310 to one instance of the frame 152. The second clamp jaw 313 secures the loop splice 310 to the other instance of the frame 152. FIG. 136 shows an enlarged portion of FIG. 133 illustrating the loop bracket 350 positioned at the back corner of the return flange 152b. The clamp jaw 352 is secured to the return flange 152b of the frame 152.

Figure 137:
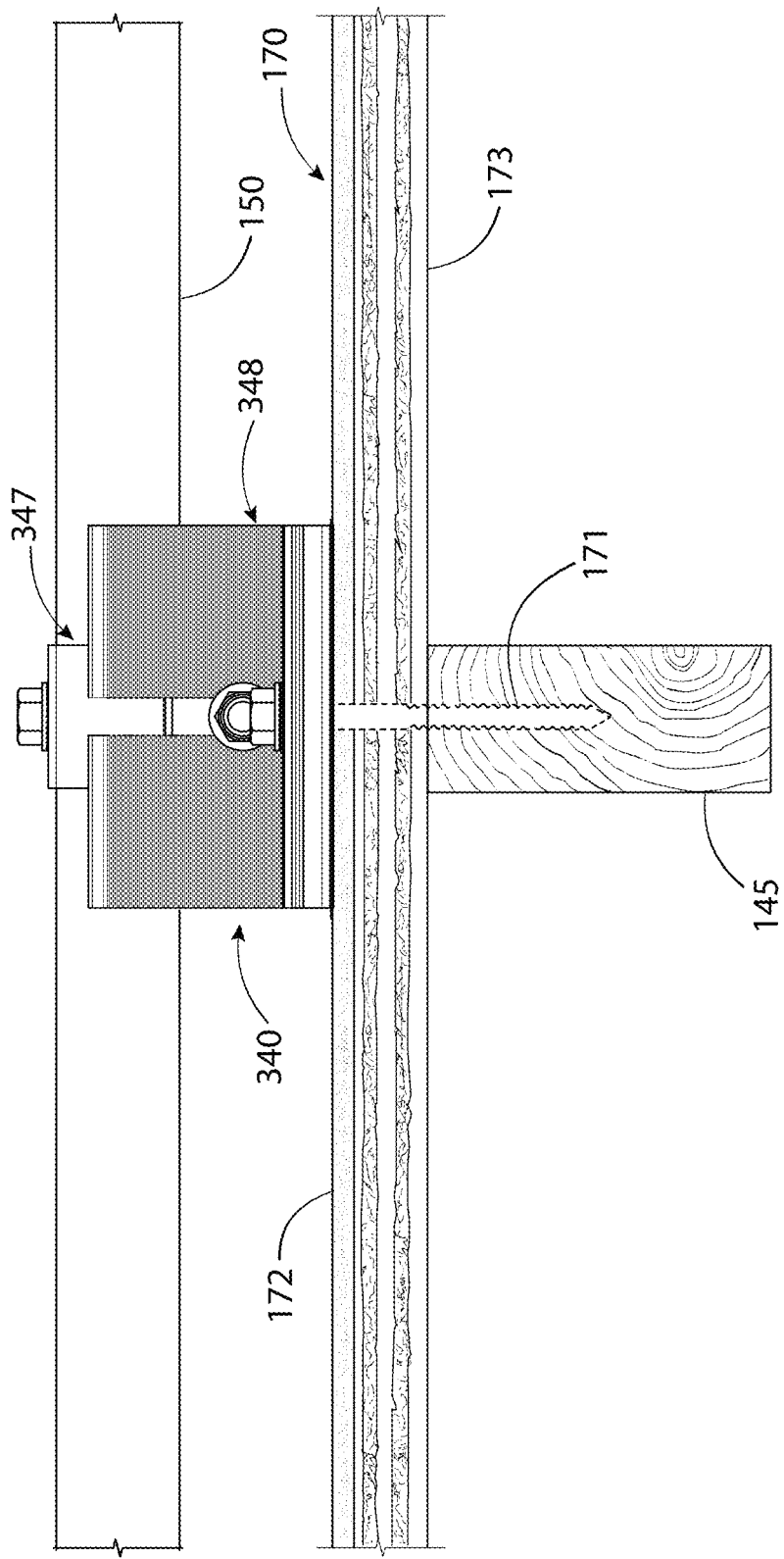
FIG. 137 illustrates, in front view, the edge clamp of the second embodiment, secured to the roof; the front of the roof is cutaway to reveal the detail of the roof structure.

FIG. 137 illustrates the edge clamp 340 in front view, secured to the roof rafter 145 and the solar module 150. The roof 170 is cutaway to reveal the roof structure. Referring to FIG. 137, the module edge bracket 347 is secured to both the solar module 150 and roof-attachment bracket 348 as previously discussed. The roof-attachment bracket 348 is secured to the roof 170 by one or more of a roof-attachment fastener 171. As an example, one instance of roof-attachment fastener 171, shown as a lag screw, extends from the roof bracket base 348a, through the roof covering 172, and through the roof deck 173.

With the first-row secure and complete, the installer may install the second row. The flow chart 430 of FIG. 35 gives an example of how any installer might install the second row and each subsequent row. FIGS. 138-142 illustrate an example, in various views, of carrying out the steps in the flow chart 430 of FIG. 35. In FIGS. 138-141, the side of the solar module is cutaway to reveal the structure underneath.

Figure 138:
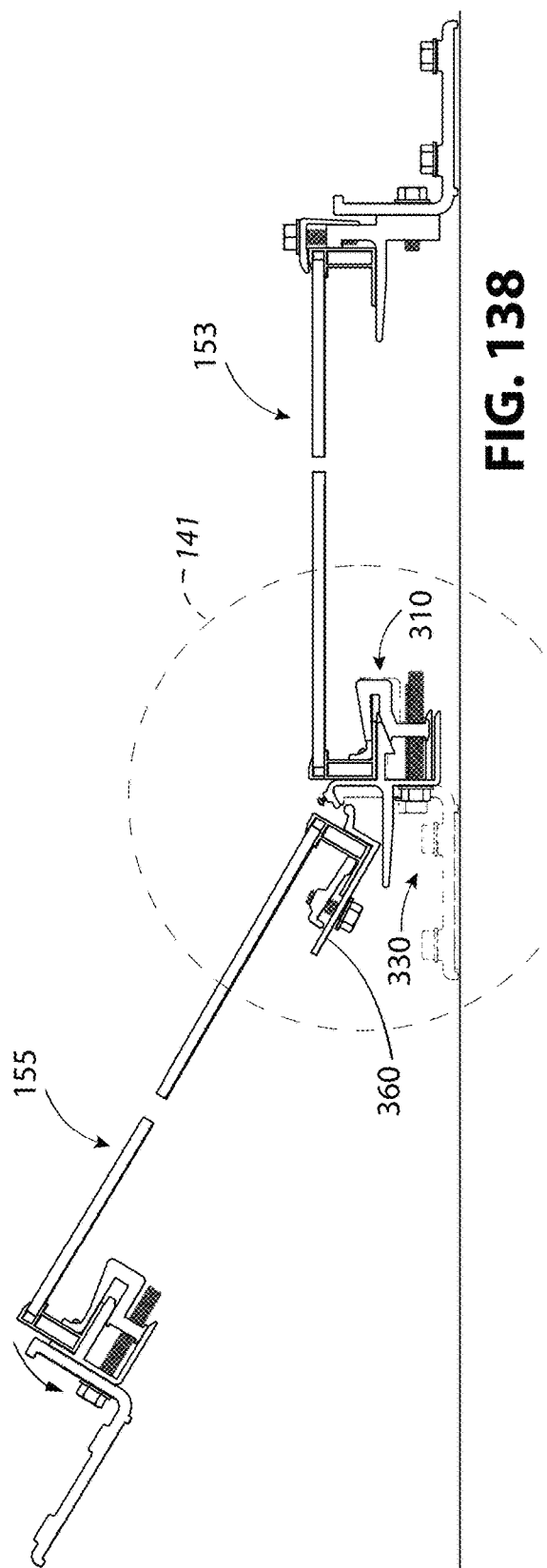
FIGS. 138-141 illustrate, in side view, attaching a second-row module assembly to an installed first-row module assembly, with FIGS. 140 and 141 illustrating an enlarged portion of FIGS. 138 and 139, respectively.
Figure 139:
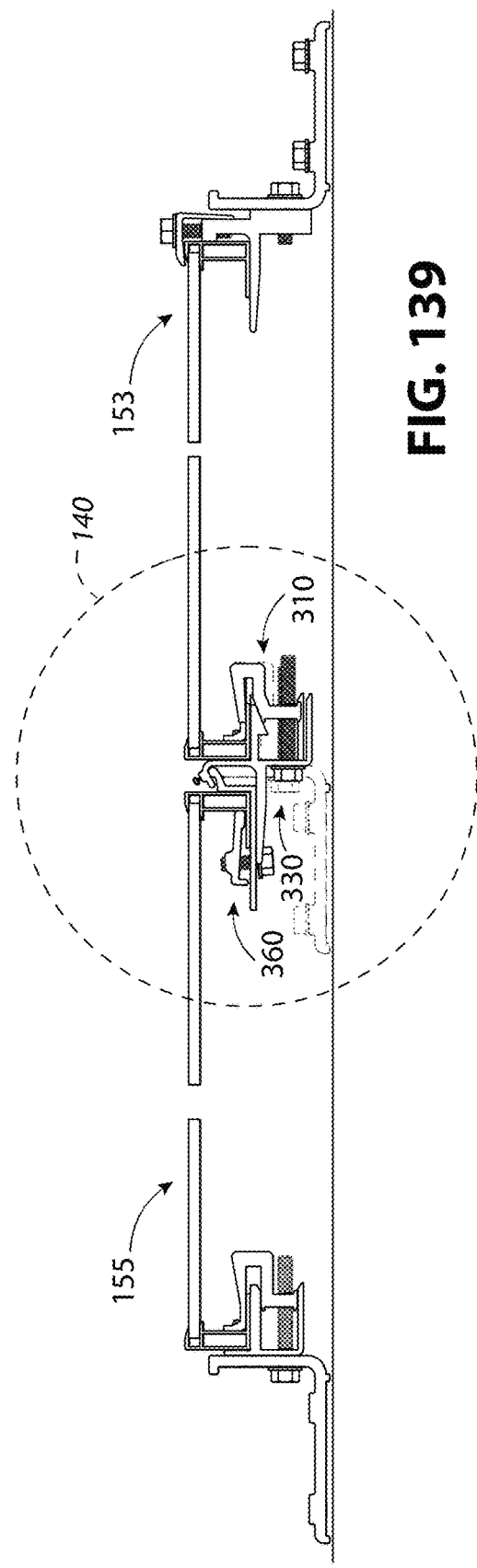
Figure 140:
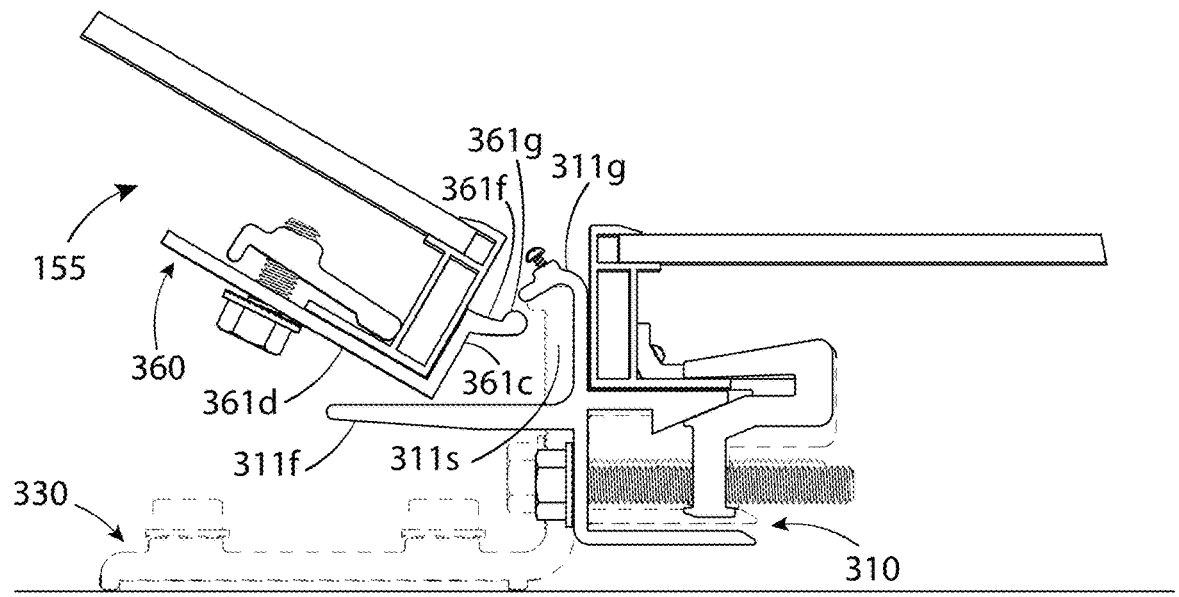
Figure 141:
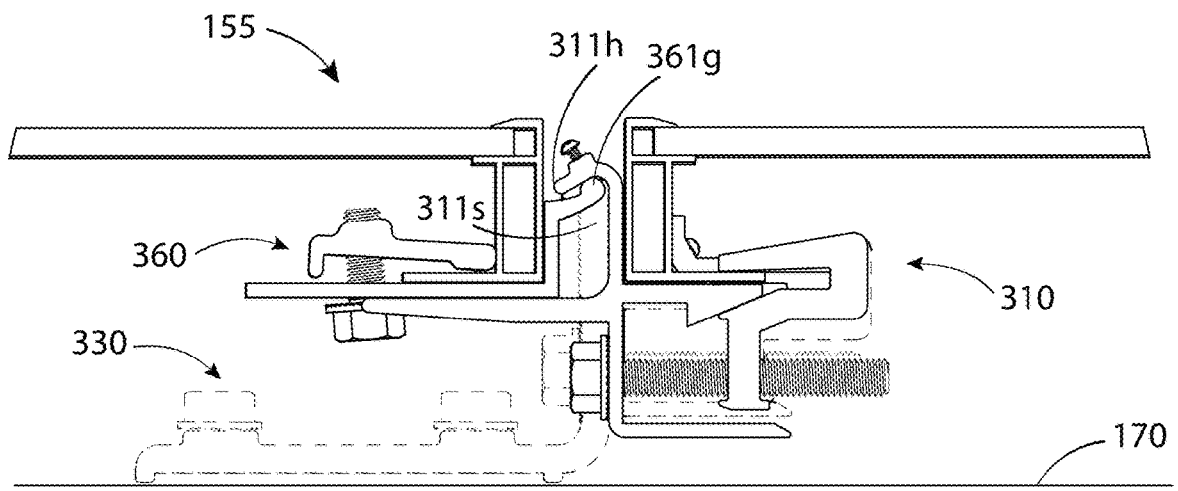

FIGS. 138 and 139 illustrate an example, in side view, of engaging the module hook bracket 360 with a loop splice 310 (or loop bracket). The loop splice is secured to a first-row module assembly 153. The module hook bracket 360 is secured to a non-first-row module assembly 155. In this case, the previously adjacent row is the first-row, so the module assembly would be a first-row module assembly 153. However, if the previously adjacent row was not the first row the previously adjacent row would be a non-first-row module assembly 155. Note that in FIGS. 138-141, the end clamp 330 is in the background behind the module hook bracket 360 and loop splice 310. For clarity, the end clamp 330 is shown lightened and in dashed lines as to not detract from module hook bracket 360 and the loop splice 310. Referring to FIG. 140, the corner between the platform 361d and body arm 361c engages the top surface of the loop platform 311f. In addition, the hook arm end 361g engages the open loop 311g. As the non-first-row module assembly 155 is rotated, the corner between platform 361d and body arm 361c engages the loop platform 311f. The hook arm 361f engages the open loop 311g. The hook arm end 361g is captured within the cavity 311s between the open loop 311g and loop platform 311f. Referring to FIG. 141, because the open end 311h is pointed downward, as the solar module 150 of the non-first-row module assembly 155 becomes parallel to the roof 170, the hook arm end 361g becomes hooked within the cavity 311s.

Referring to FIG. 35, in step 436, the installer repeats the previous steps in flow chart 430 for each successive row. FIG. 142 illustrates in top view, the resulting solar module system, the solar module system 300. Referring to FIG. 142, the solar module bodies are shown as transparent (x-ray view) to reveal the structure beneath. FIG. 142 shows the loop bracket 350, loop splice 310, and end clamp 330 installed on the trailing-edge of the third row. The instances of the end clamp 330 are installed along the edge-clamp-secured roof rafters. The edge clamp-secured roof rafters are hidden from view and are illustrated as dashed lines.

CONCLUSION AND VARIATIONS

The Summary, Detailed Description, and figures describe systems, methods, and devices for attaching solar module assemblies to roofs. This disclosure provides examples of devices, components, and configurations to help the reader understand the described general principles. The following are examples of variations and combinations of different components, structures, and features that still adhere to the general principles.

As discussed earlier in this disclosure, the components in the first embodiment of FIGS. 5-30 and the second embodiment of FIGS. 80-119 share common operating principles. While there are differences in structure between the first and second embodiments, the components are not mutually exclusive. For example, the roof-attachment brackets of the second embodiment could be used in the first embodiment and vice-versa. Structural features of one example could be adapted for uses in the other example. For instance, the clamping mechanism for the module hook bracket and loop bracket of the second embodiment, could be adapted for use in the first embodiment. The first embodiment shows in FIGS. 68-71, the splice link 270 that allows the loop bracket, loop splice, and edge splice to optionally secure to a roof rafter via a roof-attachment bracket. The loop bracket, loop splice, and edge splice in the first embodiment, may include catch and groove to receive the splice link. The loop bracket, loop splice, and edge splice of the second embodiment, may also be adapted to include a catch and groove, and a splice link could be fashioned to attach to the roof-attachment bracket of the second embodiment.

The module end bracket 337 of FIG. 111 could be modified to include the wedge-shaped coupling structure of FIG. 90. The wedge-shaped bottom surface 321k and wedge-engaging surface 323b of FIG. 90 could replace the bottom surface 331k and lower arm 332b from FIG. 111, respectively. Likewise, the wedge-shaped bottom surface 321k and wedge-engaging surface 323b of FIG. 90 could be modified to the structure of FIG. 111.

Referring to FIG. 140, the module hook bracket 360 of the second embodiment can be adapted to have a generally curved-shaped seating surface to help facilitate rotation on the loop platform 311f of the loop splice 310. For example, the corner between the platform 361d and the body arm 361c can be radiused to form a convex curve. The platform 361d could be curved convexly downward instead of planar. The combination of platform 361d and the body arm 361c could together be shaped to form a convex curve. The gasket 245 of FIG. 30 can be optionally applied to the edge clamp 340 of FIG. 118.

This disclosure uses the term roof rafter to describe, in general terms, a structural member that supports the roof deck. As a non-limiting example, a roof rafter can be dimensional lumber such as a 2×4, 2×6, 2×8, 2×10, 4×4, 4×6, 4×8, 4×10, 4×12, 6×8, 6×10, 6×12, a glue laminated timber (i.e., a "glue lam"), non-dimensional lumber, a truss chord, or other members known in the construction trade that support the roof deck.

Roof-attachment brackets in this disclosure are illustrated as L-feet. One advantage of the illustrated L-foot used in the first embodiment, is its ability to be used in both roof rafter mount and deck mount installations. An installer could use other roof-attachment brackets. For deck mount installations, an installer could substitute an L-foot, an L-bracket, or other roof-attachment brackets specifically structured for deck mounting. Similarly, roof rafter mount installations, an installer could substitute an L-foot, an L-bracket, or other roof attachments specifically structured for roof rafter mounting. For metal roof applications, an installer could substitute an L-foot, L-bracket, or other roof-attachment brackets specifically structured for metal roofs. For example, an installer could choose the mounting device of FIG. 5 of the Applicant's U.S. Pat. No. 11,848,638 in place of roof-attachment bracket 126, for metal roof applications. As another example, an installer could also use the roof mount bracket illustrated in U.S. Pat. No. D983,018 in place of roof-attachment bracket 126 for metal roof application.

The roof-attachment brackets illustrated throughout this disclosure include a slot-shaped opening in their roof bracket risers. The slot-shaped opening helps to facilitate sliding the roof-attachment bracket on and off the end bracket or edge bracket bodies. An installer might opt to use a roof-attachment bracket with a riser that includes a closed slot-shaped aperture in place of the slot-shaped opening. Alternatively, an installer might choose a roof-attachment bracket with a riser that includes a circular aperture or series of vertically aligned circular apertures.

The roof-attachment bracket can have additional variations. For example, the roof-attachment bracket could have a rectangular base or a rectangular riser. The roof bracket could be a T-foot, a pedestal, a pedestal with a flange portion for attaching threaded fasteners to the building surface, and a slotted pedestal to allow for height adjustment. Other equivalent structures could be substituted as long as they are capable of being secured to the roof or building structure with sufficient holding force to withstand normal environmental conditions for solar module systems, and are capable of being used in accordance with the disclosed assembly methods.

The module hook bracket illustrated throughout the first embodiment is illustrated as a seating platform with a generally curve-shaped seating surface. This generally curve-shaped seating surface in FIG. 73, for example, is the hook arm 261*f* which is a generally convex-shaped seating surface with respect to the loop platform 211*f*. The generally curve-shaped seating surface can be a continuous smooth curve, formed from piece-wise linear segments, formed from piece-wise curved segments, or formed from piece-wise curved segments and piece-wise linear segments. As an example, the hook arm 261*f* could form a generally curve-shaped seating surface that has a downward-facing generally convex shape where a portion of the seating surface is flat. This portion of the seating platform can be positioned to help resist movement once the hook arm end 261*g* is engaged with the open loop 211*g*.

The threaded fasteners illustrated throughout this disclosure are suggestive of what could be used. For example, the following threaded fasteners are illustrated as hex-head machine screws: the first threaded fastener 214 and the second threaded fastener 215 of FIG. 5, the first threaded fastener 224 and the second threaded fastener 225 of FIG. 10, threaded fastener 254 of FIG. 14, threaded fastener 264 of FIG. 18, threaded fastener 234 and threaded fastener 239 of FIG. 23, threaded fastener 244 and threaded fastener 249 of FIG. 27, threaded fastener 274 of FIG. 68, the first threaded fastener 314 and the second threaded fastener 315 of FIG. 80, the first threaded fastener 324 and the second threaded fastener 325 of FIG. 87, the threaded fastener 354 of FIG. 93, threaded fastener 364 of FIG. 100, threaded fastener 334 of FIG. 106, and threaded fastener 344 of FIG. 116. This screw head style allows the installer to use a power tool such as an electric drill or impact driver. The Inventors envision that other types of screws could be used. For example, an installer could use socket head cap screws, pan-head screws, button-head screws, or round head screws. These can include hexagonal sockets, Phillips head sockets, slotted sockets, hi-torque sockets, square sockets, Robertson head sockets, or Torx head sockets. They can also include various custom or off-the-shelf security head screws. Any screw or bolt can be used that can perform the function specified in the specification, and provide enough holding strength to perform to typical environmental conditions expected for a solar module system installation.

The roof-attachment fastener 171 in FIGS. 62, 63, and 137 and illustrated in various figures throughout this disclosure, typically are hex head lag screws or lag bolts for added strength when attaching to roof rafters. This screw head style is compatible with common power or hand tools. The installer could choose threaded roof fasteners with other head styles that suits either power tools or hand tools. An installer can substitute screws or bolts that can perform the specified function, provide a watertight seal, and provide enough holding strength to meet environmental and regulatory conditions expected for their installation.

Threaded apertures are illustrated in this disclosure as directly threaded into their respective bracket body arms and clamp arms. Alternatively, they may be indirectly threaded, for example, by using an unthreaded aperture and a threaded insert.

The loop splices, loop brackets, end clamps, edge clamps, and splice links and other components in this disclosure are typically aluminum extrusions. The roof-attachment bracket of the second embodiment may also be manufactured as an aluminum extrusion. Extruded aluminum is durable, electrically conductive, and can have enough strength for typical solar module systems. The Inventors conceive of extruding the loop splices, loop brackets, end clamps, edge clamps, and splice links, and other components from other electrically conductive materials or non-electrically conductive materials. They also conceive of using other manufacturing processes such as molding, 3D printing, forging, or casting. Suitable materials could include steel or electrically conductive plastics, non-electrically conductive thermal plastic, or thermoset polyurethane.

The assembly procedure of FIGS. 31-35 is one example of an assembly procedure for mounting the solar module system 200 of FIG. 2 and the solar module system 300 of FIG. 3. The following are non-limiting examples of variations to the procedure.

While in the examples given the steps in FIGS. 31 and 32 were carried out at ground level, on the ground, a work surface, against a vehicle, against a building structure, in a garage or other covered structure, or out in the open, they could also be carried out on the roof.

In FIG. 31, the installer could create an alternative first-row module assembly by attaching end clamps on both the leading and trailing-edges of the solar module. As an alternative to step 423 and step 424 in FIG. 33, the installer would place the alternative first-row solar module assembly directly on roof with the end clamp or end clamps on the leading-edge of the solar module aligned with the chalk line that defines the leading-edge of the first-row. The installer would then repeat the same procedure for the remaining solar modules in the first-row. The installer would then proceed with step 425, by securing the edge splices and loop splices. With the edge splices and end splices installed, the installer may then align end clamps along the roof rafter chalk lines on the leading and trailing-edge of the modules and secure them. Unused end clamps on both the leading and trailing-edges of the first-row may be removed for reuse. In this alternative scenario, edge clamps are not required.

The method discussed in FIGS. 31-35 illustrate a row-by-row installation method for attaching the first-row module assemblies and non-first-row module assemblies to roof rafters. In some circumstances, it may be preferable to go with narrower spans and install the solar module system 200 of FIG. 2 and the solar module system 300 of FIG. 3 to the roof deck, i.e., deck mounting, instead of to the roof rafters. For deck mounting, the installer could preinstall end clamps on both the leading-edge and trailing-edge of the solar modules, as discussed above in the alternative procedure. Rather than wait until the complete first-row is placed along the leading-edge chalk line, the installer can attach each module to the roof as they are placed. In this scenario, the loop splices and edge splices are optional. If the installer opted not to use the loop splices, they could instead use a loop bracket in each trailing-edge corner.

In step 401 of FIG. 31 the installer attaches two end clamps to the trailing-edge of a first-row module. In step 412 of FIG. 32, the installer attaches two end clamps to the trailing-edge of non-first-row modules. While two end clamps can provide better stability than one during installation, an installer may opt to install one end clamp in step 401 and step 412 to simplify installation. The may also opt to install more than two end clamps in these steps.

Subsets of the components and methods discussed may be novel in-and-of themselves. A non-limiting example of this is the combination of the loop splice module hook bracket. The flow chart 440 of FIG. 143, shows how this may be applied independent of the other components.

In step 441, the installer secures a first solar module to a second solar module within a first-row by securing a loop splice to a first trailing-edge of the first solar module and securing the loop splice to a second trailing-edge of the second solar module.

In step 442, the installer secures a third solar module and a fourth solar module within a second row to the first-row by rotationally engaging a first module hook bracket with the loop splice and rotationally engaging a second module hook bracket with the loop splice. The first module hook bracket is secured to a third leading-edge of the third solar module and the second module hook bracket is secured to a fourth leading-edge of the fourth solar module.

Steps 441 and 442 may apply to both the first and second embodiment of a solar module system. For the first embodiment, FIGS. 58 and 60 illustrate the alignment of the loop splice 210 across two adjacent solar modules. FIGS. 73 and 75 illustrate rotationally engaging a module hook bracket 260 with a loop splice 210.

For the second embodiment, FIG. 135 illustrates the alignment of the loop splice 310 between two adjacent solar modules. FIGS. 140 and 141 illustrate rotationally engaging a module hook bracket 360 with a loop splice 310. FIG. 142 illustrates the alignment of instances of the module hook bracket 360 and the loop splice 310.

The variations described, the general principles taught, and undescribed variations, devices, and systems that encompass the general principles described in this disclosure, are within the claim's scope.

The invention claimed is:

1. A device for clamping a first solar module and a second solar module, comprising:
    a loop splice including:
        a loop splice body including:
            a splice body arm extending lengthwise along the loop splice body;
            a loop platform extending away from the splice body arm and lengthwise along the splice body arm;
            an open loop extending lengthwise and upward with respect to the loop platform, the open loop includes an end that extends downward toward the loop platform; and
            an upper platform extending lengthwise along the loop splice body and away from the splice body arm in a direction opposite the loop platform;
        a first clamp jaw and a second clamp jaw, spaced apart lengthwise in relation to the splice body arm so that the first clamp jaw is capable of clamping to a first frame of the first solar module and the second clamp jaw is capable of clamping to a second frame of the second solar module; and
        the upper platform includes a top surface structured to seat the first frame of the first solar module and the second frame of the second solar module, and a bottom surface extending obliquely downward, with respect to the top surface, toward the splice body arm;
    the first clamp jaw and the second clamp jaw are spaced apart lengthwise along the upper platform so that the first clamp jaw is capable of clamping to the first frame of the first solar module and the second clamp jaw is capable of clamping to the second frame of the second solar module, the first clamp jaw includes a first clamping surface and the second clamp jaw includes a second clamping surface; and
    the first clamp jaw and the second clamp jaw are movable along the bottom surface toward the splice body arm with the first clamping surface and the second clamping surface moving downward toward the upper platform.

2. The device of claim 1, further including:
    a first bonding pin and a second bonding pin, the first bonding pin and the second bonding pin are positioned within the upper platform; and
    the first clamping surface movable over the first bonding pin and the second clamping surface movable over the second bonding pin.

3. The device of claim 1, further including:
    a splice link including a link body arm and a hook with a hook end extending toward the link body arm;
    a roof-attachment bracket secured to the link body arm;
    the loop splice further includes:
        a catch extending lengthwise along the splice body arm opposite the loop platform, the catch includes a groove extending downward into the catch and extending lengthwise along the catch; and
    the hook end extends into the groove allowing the roof-attachment bracket and the splice link to slide lengthwise along the loop splice.

4. A device for clamping a first solar module and a second solar module, comprising:
    a loop splice including:
        a loop splice body including:
            a splice body arm extending lengthwise along the loop splice body;
            a loop platform extending away from the splice body arm and lengthwise along the splice body arm;
            an open loop extending lengthwise and upward with respect to the loop platform, the open loop includes an end that extends downward toward the loop platform; and
            an upper platform extending lengthwise along the loop splice body and away from the splice body arm in a direction opposite the loop platform;
        a first clamp jaw and a second clamp jaw, spaced apart lengthwise in relation to the splice body arm so that the first clamp jaw is capable of clamping to a first frame of the first solar module and the second clamp jaw is capable of clamping to a second frame of the second solar module; and
        a first threaded fastener extending through the splice body arm into the first clamp jaw and a second threaded fastener extending through the splice body arm into the second clamp jaw;
    the upper platform includes a top surface structured to seat the first frame of the first solar module and the second frame of the second solar module, and a bottom surface extending obliquely downward, with respect to the top surface, toward the splice body arm;
    the first clamp jaw and the second clamp jaw are spaced apart lengthwise along the upper platform so that the first clamp jaw is capable of clamping to the first frame of the first solar module and the second clamp jaw is capable of clamping to the second frame of the second solar module, the first clamp jaw includes a first clamping surface and the second clamp jaw includes a second clamping surface;

the first clamp jaw is made movable by the first threaded fastener along the bottom surface toward the splice body arm with the first clamping surface moving downward toward the upper platform; and the second clamp jaw is made movable by the second threaded fastener along the bottom surface toward the splice body arm with the second clamping surface moving downward toward the upper platform.

5. A device for clamping a solar module, comprising:
a loop bracket, including:
   a loop bracket body, including:
      a bracket body arm extending lengthwise along the loop bracket body;
      a loop platform extending away from the bracket body arm and lengthwise along the bracket body arm;
      an open loop extending lengthwise and upward with respect to the loop platform, the open loop includes an end that extends back toward the loop platform;
      an upper platform extending lengthwise along the bracket body arm and away from the bracket body arm in a direction opposite the loop platform; and
      the upper platform includes a top surface structured to seat a frame of the solar module, and a bottom surface extending obliquely downward, with respect to the top surface, toward the bracket body arm; and
   a clamp jaw including:
      a clamping surface and an engaging surface spaced apart from the clamping surface; and
      the engaging surface of the clamp jaw is movable along the bottom surface toward the bracket body arm with the clamping surface moving downward toward the upper platform.

6. The device of claim 5, further including:
a splice link including a link body arm and a hook with a hook end extending toward the link body arm;
a roof-attachment bracket secured to the link body arm;
the loop bracket body further includes:
a catch extending lengthwise along the bracket body arm opposite the loop platform, the catch includes a groove extending downward into the catch and extending lengthwise along the catch; and
the hook end extends into the groove allowing the roof-attachment bracket and the splice link to slide lengthwise along the loop bracket body.

7. The device of claim 5, further including:
a bonding pin positioned within the upper platform; and
the clamping surface movable over the bonding pin.

8. The device of claim 5, further including:
a threaded fastener extending through the bracket body arm into the clamp jaw; and
the clamp jaw is made movable by the threaded fastener along the bottom surface toward the bracket body arm with the clamping surface moving downward toward the upper platform.

9. The device of claim 5, wherein:
the upper platform includes a wedge-shape that is bound in-part by the top surface and the bottom surface; and
the engaging surface of the clamp jaw is a wedge-engaging surface.

* * * * *